(12) United States Patent
Murakami et al.

(10) Patent No.: US 12,132,540 B2
(45) Date of Patent: *Oct. 29, 2024

(54) COMMUNICATION APPARATUS AND COMMUNICATION METHOD

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,620

(22) Filed: Jun. 28, 2023

(65) Prior Publication Data

US 2023/0344475 A1 Oct. 26, 2023

Related U.S. Application Data

(63) Continuation of application No. 17/727,635, filed on Apr. 22, 2022, now Pat. No. 11,736,160, which is a
(Continued)

(30) Foreign Application Priority Data

Jun. 3, 2016 (JP) .................................. 2016-112055
Jul. 15, 2016 (JP) .................................. 2016-140323
(Continued)

(51) Int. Cl.
*H04B 7/04* (2017.01)
*H04B 7/0413* (2017.01)
(Continued)

(52) U.S. Cl.
CPC ......... *H04B 7/0456* (2013.01); *H04B 7/0413* (2013.01); *H04B 7/0452* (2013.01); *H04B 7/0628* (2013.01); *H04B 7/0671* (2013.01)

(58) Field of Classification Search
CPC .. H04B 7/0456; H04B 7/0628; H04B 7/0671; H04B 7/0413; H04B 7/0452; H04B 7/0613; H04B 7/0697; H04B 7/0682
See application file for complete search history.

(56) References Cited

U.S. PATENT DOCUMENTS 9,553,702 B2  1/2017  Luo et al.
10,027,428 B2  7/2018  Joung et al.
(Continued)

FOREIGN PATENT DOCUMENTS

CN  103477584 A  12/2013
CN  104321990 A  1/2015
(Continued)

OTHER PUBLICATIONS

Armin Dammann et al., "Standard Conformable Antenna Diversity Techniques for OFDM and its Application to the DVB-T System," IEEE Globecom 2001, Nov. 25, 2001, pp. 3100-3105.
(Continued)

*Primary Examiner* — Dac V Ha
(74) *Attorney, Agent, or Firm* — Seed IP Law Group LLP

(57) ABSTRACT

Provided are M signal processors that respectively generate modulated signals for M reception apparatuses (where M is an integer equal to 2 or greater), a multiplexing signal processor, and N antenna sections (where N is an integer equal to 1 or greater). When transmitting multiple streams, each of the M signal processors generates two mapped signals, generates first and second precoded signals by precoding the two mapped signals, periodically changes the phase of signal points in the IQ plane with respect to the
(Continued)

second precoded signal, outputs the phase-changed signal, and outputs the first precoded signal and the phase-changed second precoded signal as two modulated signals. When transmitting a single stream, each of the M signal processor outputs a single modulated signal. The multiplexing signal processor multiplexes the modulated signals output from the M signal processors, and generates N multiplexed signals. The N antenna sections respectively transmit the N multiplexed signals.

7 Claims, 65 Drawing Sheets

Related U.S. Application Data continuation of application No. 17/339,613, filed on Jun. 4, 2021, now Pat. No. 11,349,535, which is a continuation of application No. 16/551,084, filed on Aug. 26, 2019, now Pat. No. 11,057,084, which is a continuation of application No. 16/164,265, filed on Oct. 18, 2018, now Pat. No. 10,439,689, which is a continuation of application No. PCT/JP2017/018770, filed on May 19, 2017.

(30) Foreign Application Priority Data

| Oct. 14, 2016 | (JP) | 2016-202979 |
|---|---|---|
| Nov. 2, 2016 | (JP) | 2016-215395 |
| May 1, 2017 | (JP) | 2017-091411 |

(51) Int. Cl.
*H04B 7/0452* (2017.01)
*H04B 7/0456* (2017.01)
*H04B 7/06* (2006.01)

(56) References Cited

U.S. PATENT DOCUMENTS

| 2004/0002364 | A1 | 1/2004 | Trikkonen et al. |
| 2006/0050742 | A1 | 3/2006 | Grandhi et al. |
| 2009/0016263 | A1 | 1/2009 | Kishigami et al. |
| 2009/0232245 | A1 | 9/2009 | Lakkis |
| 2011/0134850 | A1 | 6/2011 | Kishigami et al. |
| 2012/0093258 | A1 | 4/2012 | Suh et al. |
| 2013/0051288 | A1 | 2/2013 | Yamada et al. |
| 2013/0100914 | A1 | 4/2013 | Nakamura et al. |
| 2013/0121342 | A1 | 5/2013 | Kim |
| 2013/0142125 | A1 | 6/2013 | Shimezawa et al. |
| 2014/0205032 | A1 | 7/2014 | Murakami et al. |
| 2015/0092884 | A1 | 4/2015 | Murakami et al. |
| 2015/0171983 | A1 | 6/2015 | Kusashima |
| 2016/0006521 | A1 | 1/2016 | Yoshimoto et al. |
| 2016/0021548 | A1 | 1/2016 | Raghavan et al. |
| 2016/0204846 | A1 | 7/2016 | Murakami et al. |
| 2016/0211901 | A1 | 7/2016 | Yamaura |
| 2017/0006598 | A1 | 1/2017 | Uemura et al. |
| 2017/0048092 | A1 | 2/2017 | Murakami et al. |
| 2017/0187444 | A1 | 6/2017 | Murakami et al. |
| 2018/0083687 | A1 | 3/2018 | Murakami et al. |
| 2019/0014584 | A1* | 1/2019 | Gilson ............... H04W 72/542 |
| 2019/0098688 | A1 | 3/2019 | Kimura et al. |
| 2019/0110210 | A1* | 4/2019 | Takeda ................. H04B 7/06 |
| 2020/0059799 | A1 | 2/2020 | Suzuki |
| 2020/0083939 | A1 | 3/2020 | Park et al. |
| 2020/0169303 | A1 | 5/2020 | Park et al. |
| 2021/0143887 | A1 | 5/2021 | Oteri et al. |
| 2021/0314873 | A1* | 10/2021 | Huang .................. H04W 8/24 |

FOREIGN PATENT DOCUMENTS

| EP | 2701326 A1 | 2/2014 |
| EP | 2858281 A1 | 4/2015 |
| EP | 2966885 A1 | 1/2016 |
| JP | 2008510380 A | 4/2008 |
| JP | 2012054885 A | 3/2012 |
| JP | 2013247513 A | 12/2013 |
| JP | 2014529203 A | 10/2014 |
| WO | WO 2012144206 A1 | 10/2012 |
| WO | WO 2014136620 A1 | 9/2014 |
| WO | WO 2015098837 A1 | 7/2015 |
| WO | WO 2015162886 A1 | 10/2015 |
| WO | WO 2016092738 A1 | 6/2016 |

OTHER PUBLICATIONS

Australia Office Action dated Mar. 31, 2021 for the related Australia Patent Application No. 2017274891, 3 pages.
David Vargas et al., "MIMO for DVB-NGH, The Next Generation Mobile TV Broadcasting," IEEE Communications Magazine, vol. 57, No. 7, Jul. 15, 2013, pp. 130-137.
English translation of Chinese Search Report dated Oct. 12, 2020 for the related Chinese Patent Application No. 201780029162.X, 3 pages.
Extended European Search Report dated Apr. 5, 2019 for the related European Patent Application No. 17806407.7, 11 pages.
Extended European Search Report dated Nov. 26, 2020 for the related European Patent Application No. 20201074.0, 12 pages.
IEEE P802.11n(TM)/D3.00, Draft Standard for Information Technology—Telecommunications and information exchange between systems—Local and metropolitan area networks—Specific requirements—Part11: Wireless LAN Medium Access Control (MAC) and Physical Layer (PHY) specifications: Amendment 4: Enhancements for Higher Throughput, Sep. 2007, 544 pages.
International Search Report of PCT application No. PCT/JP2017/018770 dated Aug. 8, 2017, 4 pages. (with English translation).

* cited by examiner

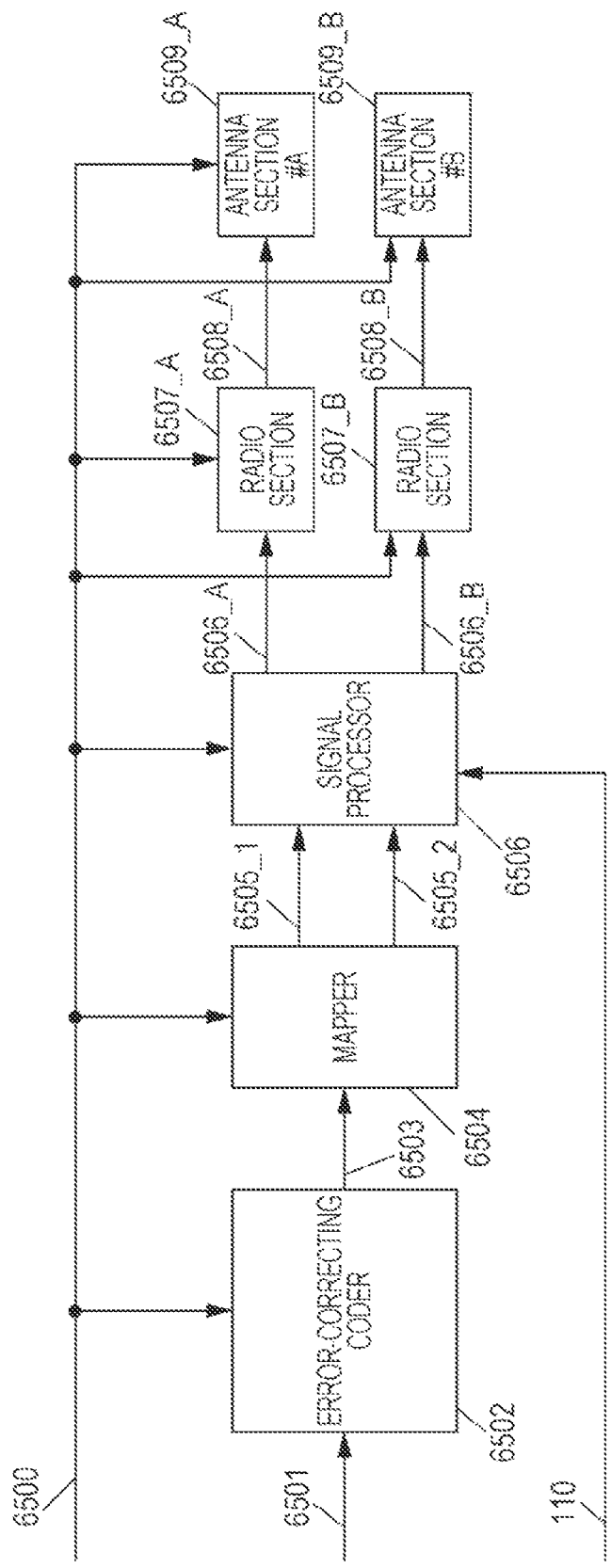

COMMUNICATION APPARATUS AND COMMUNICATION METHOD

BACKGROUND

1. Technical Field

The present disclosure relates to a transmission apparatus and a transmission method.

2. Description of the Related Art

In the related art, a communication method called multiple-input multiple-output (MIMO), for example, exists as a communication method using multiple antennas. In multi-antenna communication for a single user as typified by MIMO, by modulating each of multiple sequences of transmission data, and transmitting each modulated signal at the same time from different antennas, the communication speed of the data is increased.

FIG. 33 is a diagram illustrating an example of a configuration of a transmission apparatus based on the Digital Video Broadcasting-Next Generation Handheld (DVB-NGH) standard, in which there are two transmission antennas and two modulated signals to transmit (transmission streams), as described in "MIMO for DVB-NGH, the next generation mobile TV broadcasting," IEEE Commun. Mag., vol. 57, no. 7, pp. 130-137, July 2013. In the transmission apparatus, data 1 is input and coded by a coder 2 to obtain data 3, which is divided into data 5A and data 5B by a distributor 4. The data 5A is subjected to an interleaving process by an interleaver 4A, and a mapping process by a mapper 6A. Similarly, the data 5B is subjected to an interleaving process by an interleaver 4B, and a mapping process by a mapper 6B. The coding process in the coder 2, the interleaving processes in the interleavers 4A and 4B, and the mapping processes in the mappers 6A and 6B are executed according to settings information included in a frame configuration signal 13.

Weight combiners 8A and 8B have the mapped signals 7A and 7B as input and execute weight combining on them, respectively. With this arrangement, weighted combined signals 9A and 16B are generated. After that, the weighted combined signal 16B is phase-changed by a phase changer 17B, and a phase-changed signal 9B is output. Additionally, radio sections 10A and 10B execute, for example, processes related to orthogonal frequency-division multiplexing (OFDM), frequency conversion and amplification, and a transmission signal 11A is transmitted from an antenna 12A, while a transmission signal 11B is transmitted from an antenna 12B. The weight combining process in the weight combiners 8A and 8B as well as the phase change process in the phase changer 17B are executed on the basis of signal processing method information 115 generated by a signal processing method information generator 114. The signal processing method information generator 114 generates the signal processing method information 115 on the basis of the frame configuration signal 13. At this time, in the phase changer 17B, for example, 9 phase change values are provided, and phase change with a period of 9 is executed regularly.

With this arrangement, in an environment in which direct waves are dominant, there is an increased possibility of being able to avoid falling into a steady reception state, and the received signal quality of data at a reception apparatus on the other end of communication may be improved.

Additional information is described in "Standard conformable antenna diversity techniques for OFDM and its application to the DVB-T system," IEEE Globecom 2001, pp. 3100-3105, November 2001, and also in IEEE P802.11n (D3.00) Draft STANDARD for Information Technology-Telecommunications and information exchange between systems-Local and metropolitan area networks-Specific requirements-Part11: Wireless LAN Medium Access Control (MAC) and Physical Layer (PHY) specifications, 2007.

SUMMARY

However, the transmission apparatus in FIG. 33 uses identical times and identical frequencies, and does not consider the transmission of modulated signals to multiple terminals (multiple users).

One non-limiting and exemplary embodiment provides a transmission apparatus that transmits modulated signals to multiple terminals (multiple users) using identical times and identical frequencies, being a transmission apparatus that, when transmitting the modulated signals of multiple streams in an environment in which direct waves are dominant, is able to avoid falling into a steadily degraded reception state. With this arrangement, the received signal quality of data at a reception apparatus on the other end of communication may be improved.

In one general aspect, the techniques disclosed here feature a transmission apparatus comprising: M signal processors that respectively generate modulated signals with respect to M reception apparatuses (where M is an integer equal to 2 or greater), wherein each of the M signal processors includes a precoder that, in a case of transmitting multiple streams to a corresponding reception apparatus, generates two mapped signals to transmit to the corresponding reception apparatus, and generates a first precoded signal and a second precoded signal by precoding the two mapped signals, and a phase changer that periodically changes a phase of signal points in an IQ plane with respect to the second precoded signal, and outputs a phase-changed signal, outputs the first precoded signal and the phase-changed signal as two modulated signals, and each of the M signal processors outputs a single modulated signal in a case of transmitting a single stream to the corresponding reception apparatus; a multiplexing signal processor that generates N multiplexed signals (where N is an integer equal to 1 or greater) by multiplexing the modulated signals output from each of the M signal processors; and N antenna sections that include at least one antenna element each, and respectively transmit the N multiplexed signals.

It should be noted that general or specific embodiments may be implemented as a system, a method, an integrated circuit, a computer program, a storage medium, or any selective combination thereof.

The transmission apparatus according to the present disclosure is able to avoid falling into a steadily degraded reception state when transmitting the modulated signals of multiple streams to each terminal (each user) in an environment in which direct waves are dominant. With this arrangement, the received signal quality of data at a reception apparatus on the other end of communication may be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 60 is a diagram illustrating a first example of a configuration included in a control information symbol or the like;

FIG. 61 is a diagram illustrating a second example of a configuration included in a control information symbol or the like;

FIG. 65 is a diagram illustrating a different example from FIG. 1 of the configuration of a transmission apparatus of a base station (AP).

DETAILED DESCRIPTION

Hereinafter, exemplary embodiments of the present disclosure will be described in detail and with reference to the drawings. Note that each of the embodiments described hereinafter is an example, and the present disclosure is not limited to these embodiments.

Embodiment 1

A transmission method, transmission apparatus, reception method, and reception apparatus of the present embodiment will be described in detail.

Example of Configuration of Transmission Apparatus in Present Embodiment

Figure 1:
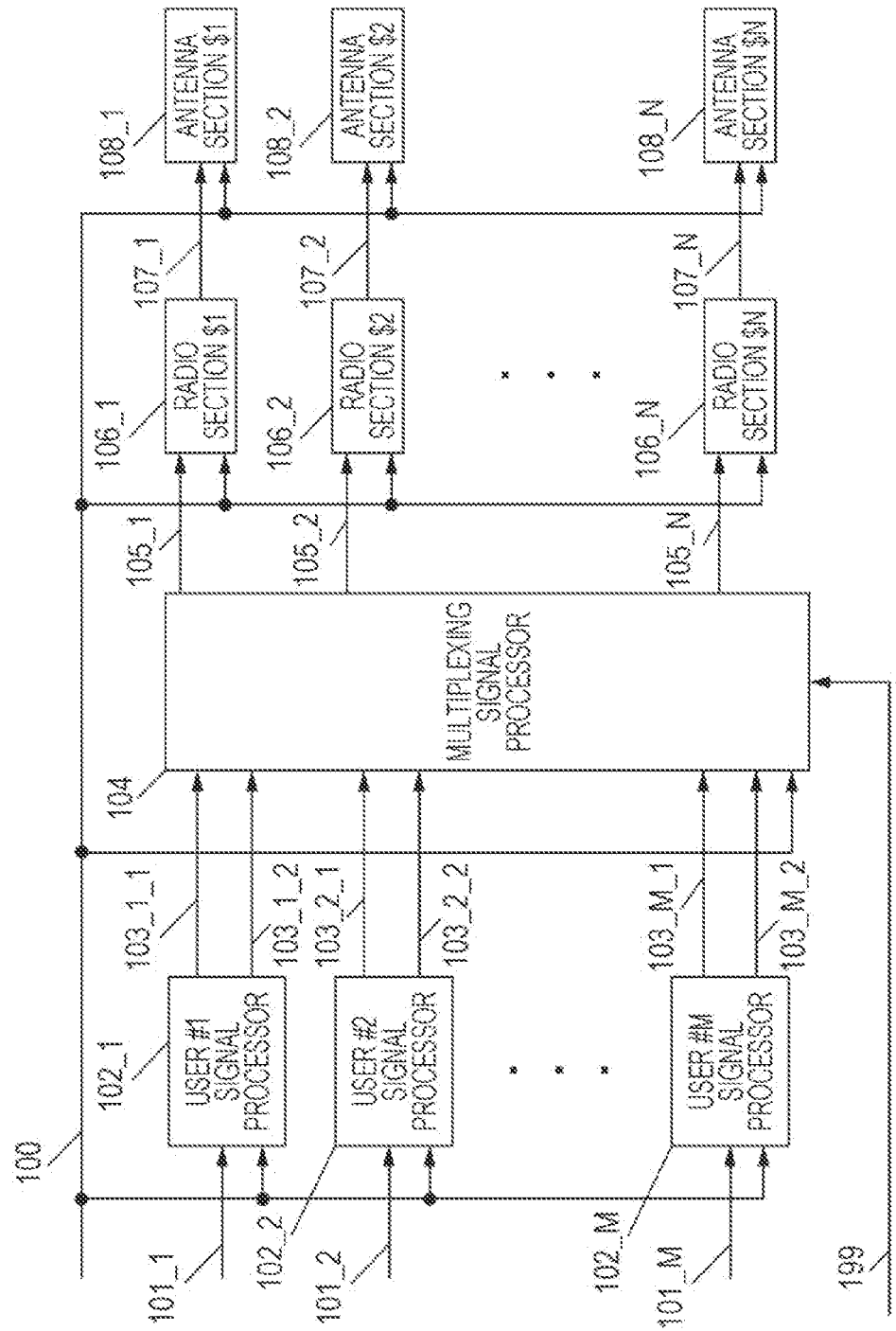
FIG. 1 is a diagram illustrating an example of a configuration of a transmission apparatus according to an embodiment of the present disclosure.

FIG. 1 is a diagram illustrating an example of the configuration of the transmission apparatus in the present embodiment. The transmission apparatus illustrated in FIG. 1 is, for example, a base station, an access point, a broadcasting station, or the like. The transmission apparatus is an apparatus that generates and transmits multiple modulated signals for transmission to M reception apparatuses (terminals) of user #1 to user #M (where M is an integer equal to 2 or greater).

The transmission apparatus illustrated in FIG. 1 is provided with a user #1 signal processor 102_1 to a user #M signal processor 102_M, a multiplexing signal processor 104, and a radio section $1 (106_1) to a radio section $N (106_N), an antenna section $1 (108_1) to an antenna section $N (108_N) (where N is an integer equal to 1 or greater).

The user #1 signal processor 102_1 accepts a control signal 100 and user #1 data 101_1 as input. The user #1 signal processor 102_1 executes signal processing on the basis of information about the transmission method for generating a user #1 modulated signal (for example, an error-correcting coding method (the code rate of the error-correcting code, the code length of the error-correcting code), a modulation scheme, a transmission method (for example, single-stream transmission, multi-stream transmission), and the like) included in the control signal 100, and generates a user #1 first baseband signal 103_1_1 and/or a user #1 second baseband signal 103_1_2. The user #1 signal processor 102_1 outputs the generated user #1 first baseband signal 103_1_1 and/or user #1 second baseband signal 103_1_2 to the multiplexing signal processor 104.

For example, in the case in which information indicating that multi-stream transmission has been selected is included in the control signal 100, the user #1 signal processor 102_1 generates the user #1 first baseband signal 103_1_1 and the user #1 second baseband signal 103_1_2. In the case in which information indicating that single-stream transmission has been selected is included in the control signal 100, the user #1 signal processor 102_1 generates the user #1 first baseband signal 103_1_1.

Similarly, the user #2 signal processor 102_2 accepts the control signal 100 and user #2 data 101_2 as input. The user #2 signal processor 102_2 executes signal processing on the basis of information about the transmission method for generating a user #2 modulated signal (for example, an error-correcting coding method (the code rate of the error-correcting code, the code length of the error-correcting code), a modulation scheme, a transmission method (for example, single-stream transmission, multi-stream transmission), and the like) included in the control signal 100, and generates a user #2 first baseband signal 103_2_1 and/or a user #2 second baseband signal 103_2_2. The user #2 signal processor 102_2 outputs the generated user #2 first baseband signal 103_2_1 and/or user #2 second baseband signal 103_2_2 to the multiplexing signal processor 104.

For example, in the case in which information indicating that multi-stream transmission has been selected is included in the control signal 100, the user #2 signal processor 102_2 generates the user #2 first baseband signal 103_2_1 and the user #2 second baseband signal 103_2_2. In the case in which information indicating that single-stream transmission has been selected is included in the control signal 100, the user #2 signal processor 102_2 generates the user #2 first baseband signal 103_2_1.

Similarly, the user #M signal processor 102_M accepts the control signal 100 and user #2 data 101_M as input. The user #M signal processor 102_M executes signal processing on the basis of information about the transmission method for generating a user #M modulated signal (for example, an error-correcting coding method (the code rate of the error-correcting code, the code length of the error-correcting code), a modulation scheme, a transmission method (for example, single-stream transmission, multi-stream transmission), and the like) included in the control signal 100, and generates a user #M first baseband signal 103_M_1 and/or a user #M second baseband signal 103_M_2. The user #M signal processor 102_M outputs the generated user #M first baseband signal 103_M_1 and/or user #M second baseband signal 103_M_2 to the multiplexing signal processor 104.

For example, in the case in which information indicating that multi-stream transmission has been selected is included in the control signal 100, the user #M signal processor 102_M generates the user #M first baseband signal 103_M_1 and the user #M second baseband signal 103_M_2. In the case in which information indicating that single-stream transmission has been selected is included in the control signal 100, the user #M signal processor 102_M generates the user #M first baseband signal 103_M_1.

Consequently, a user #p signal processor 102_p (where p is an integer from 1 to M) accepts the control signal 100 and user #p data 101p as input. The user #p signal processor 102_p executes signal processing on the basis of information about the transmission method for generating a user #p modulated signal (for example, an error-correcting coding method (the code rate of the error-correcting code, the code length of the error-correcting code), a modulation scheme, a transmission method (for example, single-stream transmission, multi-stream transmission), and the like) included in the control signal 100, and generates a user #p first baseband signal 103_p_1 and/or a user #p second baseband signal 103_p_2. The user #p signal processor 102_p outputs the generated user #p first baseband signal 103_p_1 and/or user #p second baseband signal 103_p_2 to the multiplexing signal processor 104.

For example, in the case in which information indicating that multi-stream transmission has been selected is included in the control signal 100, the user #p signal processor 102_p generates the user #p first baseband signal 103_p_1 and the user #p second baseband signal 103_p_2. In the case in which information indicating that single-stream transmission has been selected is included in the control signal 100, the user #p signal processor 102_p generates the user #p first baseband signal 103_p_1.

Note that the configuration of each from the user #1 signal processor 102_1 to the user #M signal processor 102_M will be described later by taking the configuration of the user #p signal processor as an example.

Note that the control signal 100 includes information indicating whether multi-stream transmission or single-stream transmission has been selected with respect to each from the user #1 signal processor 102_1 to the user #M signal processor 102_M.

The multiplexing signal processor 104 accepts the control signal 100, the user #1 first baseband signal 103_1_1, the user #1 second baseband signal 103_1_2, the user #2 first baseband signal 103_2_1, the user #2 second baseband signal 103_2_2, . . . , the user #M first baseband signal 103_M_1, the user #M second baseband signal 103_M_2, and a (common) reference signal 199 as input. The multiplexing signal processor 104 performs multiplexing signal processing on the basis of the control signal 100, and generates a multiplexed signal $1 baseband signal 105_1 to a multiplexed signal $N baseband signal 105N (where N is an integer equal to 1 or greater). The multiplexing signal processor 104 outputs the generated multiplexed signal $1 baseband signal 105_1 to the multiplexed signal $N baseband signal 105_N to corresponding radio sections (radio section $1 to radio section $N).

The (common) reference signal 199 is a signal transmitted from the transmission apparatus for the reception apparatus to estimate the propagation environment. The (common) reference signal 199 is inserted into the baseband signal of each user. Note that the multiplexing signal processing will be described later.

The radio section $1 (106_1) accepts the control signal 100 and the multiplexed signal $1 baseband signal 105_1 as input. On the basis of the control signal 100, the radio section $1 (106_1) executes processes such as frequency conversion and amplification, and outputs a transmission signal 107_1 to the antenna section $1 (108_1).

The antenna section $1 (108_1) accepts the control signal 100 and the transmission signal 107_1 as input. The antenna section $1 (108_1) processes the transmission signal 107_1 on the basis of the control signal 100. However, in the antenna section $1 (108_1), the control signal 100 may also not be present as input. Subsequently, the transmission signal 107_1 is output as a radio wave from the antenna section $1 (108_1).

The radio section $2 (106_2) accepts the control signal 100 and the multiplexed signal $2 baseband signal 105_2 as input. On the basis of the control signal 100, the radio section $2 (106_2) executes processes such as frequency conversion and amplification, and outputs a transmission signal 107_2 to the antenna section $2 (108_2).

The antenna section $2 (108_2) accepts the control signal 100 and the transmission signal 1072 as input. The antenna section $2 (108_2) processes the transmission signal 107_2 on the basis of the control signal 100. However, in the antenna section $2 (108_2), the control signal 100 may also not be present as input. Subsequently, the transmission signal 107_2 is output as a radio wave from the antenna section $2 (108_2).

The radio section $N (106_N) accepts the control signal 100 and the multiplexed signal $N baseband signal 105N as input. On the basis of the control signal 100, the radio section $N (106_N) executes processes such as frequency conversion and amplification, and outputs a transmission signal 107_N to the antenna section $N (108_N).

The antenna section $N (108_N) accepts the control signal 100 and the transmission signal 107_N as input. The antenna section $N (108_N) processes the transmission signal 107_N on the basis of the control signal 100. However, in the antenna section $N (108_N), the control signal 100 may also not be present as input. Subsequently, the transmission signal 107_N is output as a radio wave from the antenna section $N (108_N).

Consequently, the radio section $n (106_n) (where n is an integer from 1 to N) accepts the control signal 100 and the multiplexed signal $n baseband signal 105_n as input. On the basis of the control signal 100, the radio section $n (106_n) executes processes such as frequency conversion and amplification, and outputs a transmission signal 107_n to the antenna section $n (108_n).

The antenna section $n (108_n) accepts the control signal 100 and the transmission signal 107_n as input. The antenna section $n (108_n) processes the transmission signal 107_n on the basis of the control signal 100. However, in the antenna section $n (108_n), the control signal 100 may also not be present as input. Subsequently, the transmission signal 107_n is output as a radio wave from the antenna section $n (108_n).

Note that an example of the configurations of the radio sections $1 to $N and the antenna sections $1 to $N will be described later.

The control signal 100 may be generated on the basis of information transmitted to the transmission apparatus in FIG. 1 by the reception apparatus on the other end of communication in FIG. 1, or the transmission apparatus in FIG. 1 may be provided with an input section, and the control signal 100 may be generated on the basis of information input from the input section.

Note that in the transmission apparatus in FIG. 1, not all from the user #1 signal processor (102_1) to the user #M signal processor (102_M) may be operating. All may be operating, or some may be operating. In other words, the number of users that the transmission apparatus is communicating with is from 1 to M. The number of communication peers (users) to which the transmission apparatus in FIG. 1 transmits a modulated signal is from 1 to M.

Also, not all from the radio section $1 (106_1) to the radio section $N (106_N) may be operating. All may be operating, or some may be operating. Also, not all from the antenna section $1 (108_1) to the antenna section $N (108_N) may be operating. All may be operating, or some may be operating.

As above, the transmission apparatus in FIG. 1 is able to transmit the modulated signals (baseband signals) of multiple users using identical times and identical frequencies (bands) by using multiple antennas.

For example, the transmission apparatus in FIG. 1 is able to transmit the user #1 first baseband signal 103_1_1, the user #1 second baseband signal 103_1_2, the user #2 first baseband signal 103_2_1, and the user #2 second baseband signal 103_2_2 using identical times and identical frequencies (bands). Also, the transmission apparatus in FIG. 1 is able to transmit the user #1 first baseband signal 103_1_1, the user #1 second baseband signal 103_1_2, and the user #2 first baseband signal 103_2_1 using identical times and identical frequencies (bands). Note that the combinations of modulated signals (baseband signals) of multiple users to which the transmission apparatus in FIG. 1 transmits are not limited to these examples.

<Example of Configuration of User #p Signal Processor>

Figure 2:
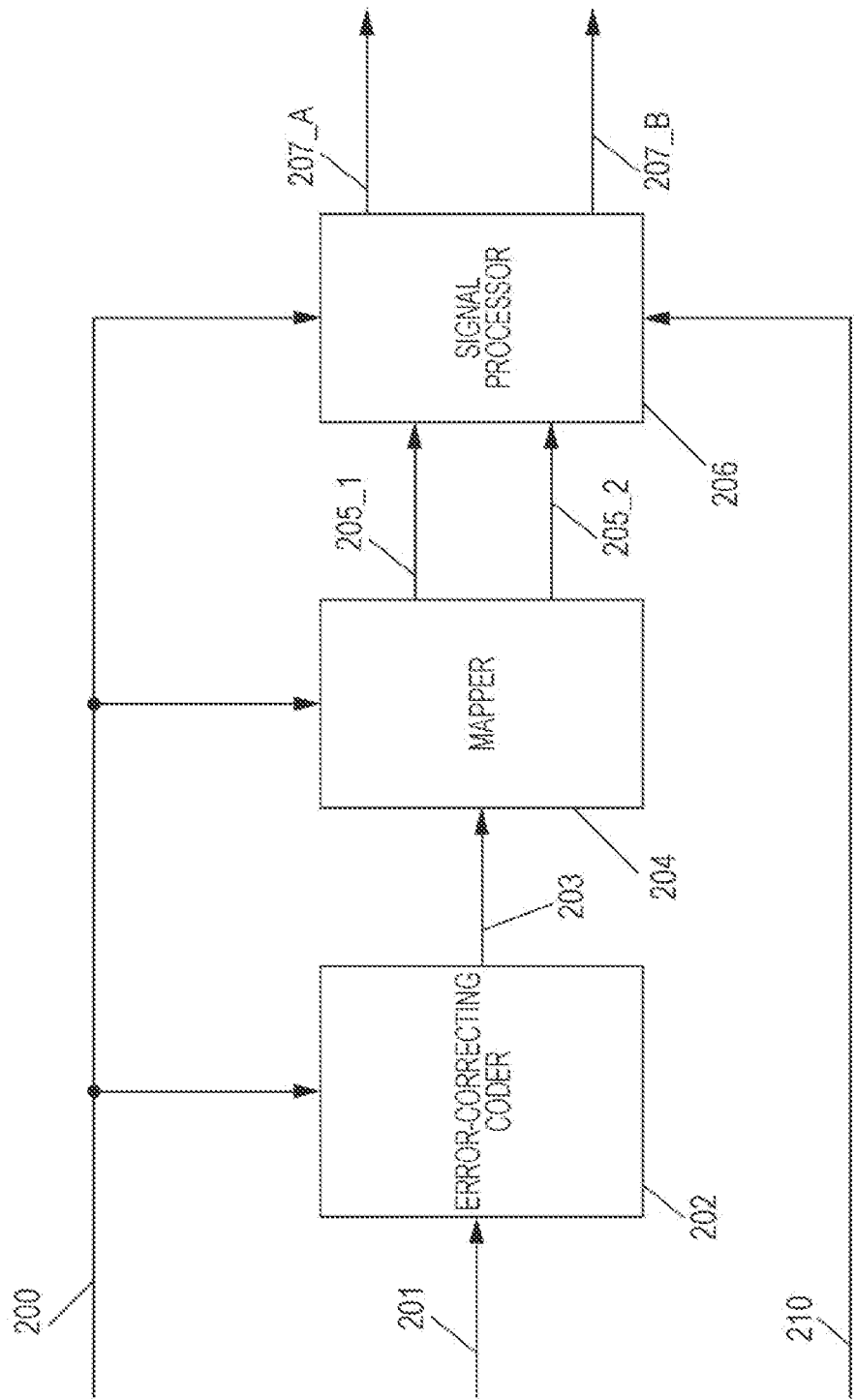
FIG. 2 is a diagram illustrating an example of a configuration of a signal processor for user #p.

Next, the configuration of each from the user #1 signal processor 102_1 to the user #M signal processor 102_M in FIG. 1 will be described by taking the configuration of the user #p signal processor 102_p as an example. FIG. 2 is a diagram illustrating an example of a configuration of the user #p signal processor 102_p.

The user #p signal processor 102_p is provided with an error-correcting coder 202, a mapper 204, and a signal processor 206.

The error-correcting coder 202 accepts user #p data 201 and a control signal 200 as input. The control signal 200 corresponds to the control signal 100 in FIG. 1, and the user #p data 201 corresponds to the user #p data 101_p in FIG. 1. The error-correcting coder 202 executes error-correcting coding on the basis of information related to error-correcting coding (for example, error-correcting code information, the code length (block length), and the code rate) included in the control signal 200, and outputs user #p coded data 203 to the mapper 204.

Note that the error-correcting coder 202 may also be provided with an interleaver. In the case of being provided with an interleaver, the error-correcting coder 202 sorts the data after coding, and outputs user #p coded data 203.

The mapper 204 accepts the user #p coded data 203 and the control signal 200 as input. The mapper 204 executes mapping corresponding to the modulation scheme on the basis of information about the modulation scheme included in the control signal 200, and generates a user #p mapped signal (baseband signal) 205_1 and/or mapped signal (baseband signal) 205_2. The mapper 204 outputs the generated user #p mapped signal (baseband signal) 205_1 and/or mapped signal (baseband signal) 205_2 to the signal processor 206.

Note that in the case in which the control signal 200 includes information indicating that multi-stream transmission has been selected, the mapper 204 divides the user #p coded data 203 into a first sequence and a second sequence. Subsequently, the mapper 204 uses the first sequence to generate a user #p mapped signal 205_1, and uses the second sequence to generate a user #p mapped signal 205_2. At this time, the first sequence and the second sequence are assumed to be different. However, it is possible to carry out the above similarly even if the first sequence and the second sequence are the same.

Also, in the case in which the control signal 200 includes information indicating that multi-stream transmission has been selected, the mapper 204 may divide the user #p coded data 203 into three or more sequences, use each sequence to execute mapping, and generate three or more mapped signals. In this case, the three or more sequences may be different from each other, but some or all of the three or more sequences may also be the same sequences.

In addition, in the case in which the control signal 200 includes information indicating that single-stream transmission has been selected, the user #p coded data 203 is treated as a single sequence to generate the user #p mapped signal 205_1.

The signal processor 206 accepts the user #p mapped signal 205_1 and/or the user #p mapped signal 205_2, as well as a signal group 210 and the control signal 200 as input. On the basis of the control signal 200, the signal processor 206 executes signal processing, and outputs user #p signal-processed signals 207_A and 207_B. The user #p signal-processed signal 207_A corresponds to the user #p first baseband signal 103_p_1 in FIG. 1, and the user #p signal-processed signal 207_B corresponds to the user #p second baseband signal 103_p_2 in FIG. 1.

At this time, the user #p signal-processed signal 207_A is designated up1(i), and the user #p signal-processed signal 207_B is designated up2(i). Herein, i is taken to be the symbol number. For example, i is an integer equal to 0 or greater.

Next, the configuration of the signal processor 206 in FIG. 2 will be described using FIG. 3.

<Example of Configuration of Signal Processor 206>

Figure 3:
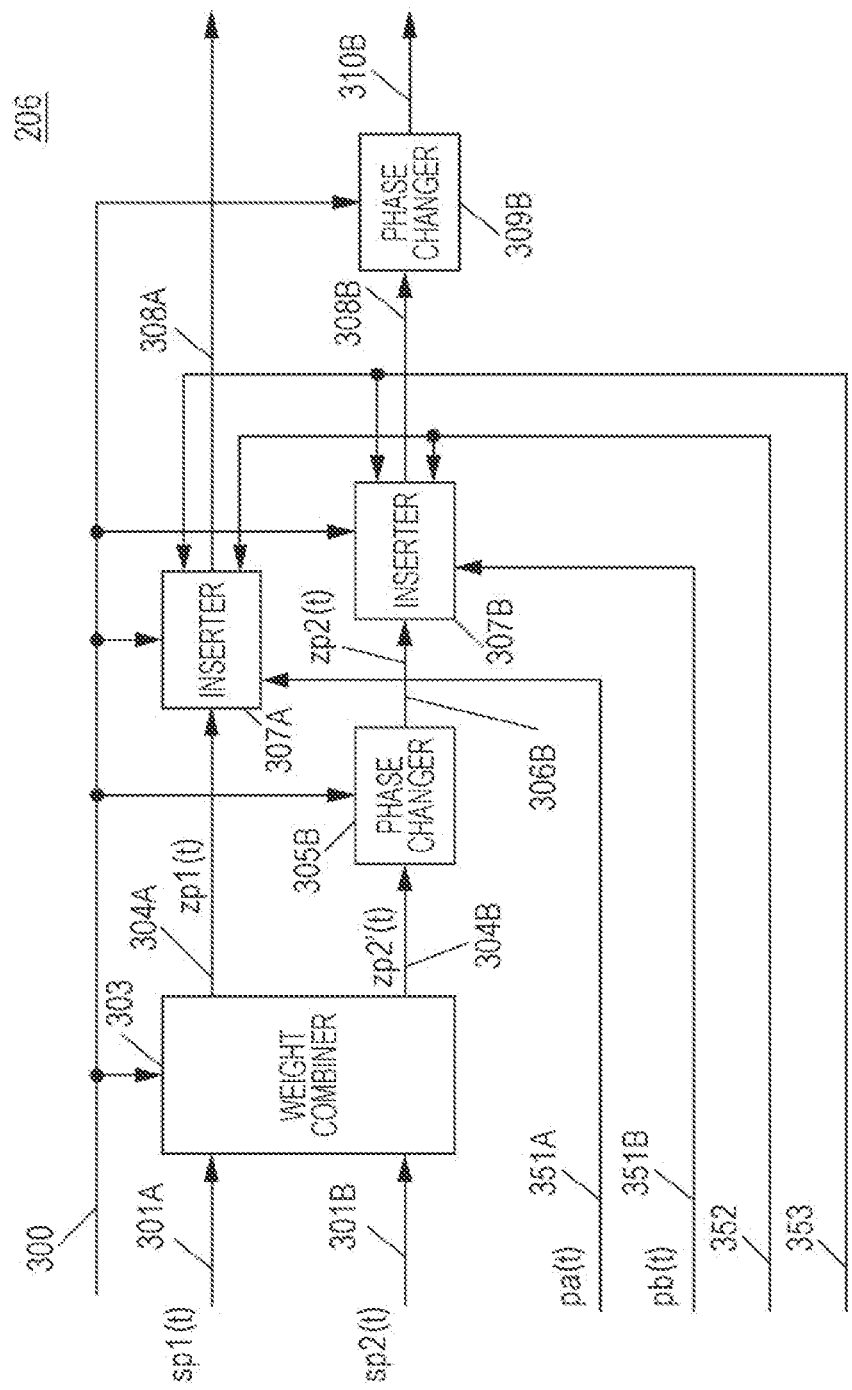
FIG. 3 is a diagram illustrating an example of a configuration of the signal processor in FIG. 2.

FIG. 3 is a diagram illustrating an example of the configuration of the signal processor 206 in FIG. 2. The signal processor 206 is provided with a weight combiner 303, a phase changer 305B, an inserter 307A, an inserter 307B, and a phase changer 309B. Note that FIG. 3 illustrates a case in which the mapper 204 in FIG. 2 generates the user #p mapped signal 205_1 and the user #p mapped signal 205_2 on the basis of information indicating that multi-stream transmission has been selected.

The weight combiner 303 (precoder) 303 accepts a user #p mapped signal 301A, a user #p mapped signal 301B, and a control signal 300 as input. The user #p mapped signal 301A corresponds to the user #p mapped signal 205_1 in FIG. 2, and the user #p mapped signal 301B corresponds to the user #p mapped signal 205_2 in FIG. 2. Also, the control signal 300 corresponds to the control signal 200 in FIG. 2.

On the basis of the control signal 300, the weight combiner 303 executes weight combining (precoding), and generates a user #p weighted signal 304A and a user #p weighted signal 304B. The weight combiner 303 outputs the user #p weighted signal 304A to the inserter 307A. The weight combiner 303 outputs the user #p weighted signal 304B to the phase changer 305B.

The user #p mapped signal 301A is designated sp1(t), the user #p mapped signal 301B is designated sp2(t), the user #p weighted signal 304A is designated zp1(t), and the user #p weighted signal 304B is designated zp2'(t). Note that t is taken to be time as an example. Also, sp1(t), sp2(t), zp1(t), and zp2'(t) are taken to be defined as complex numbers. Consequently, sp1(t), sp2(t), zp1(t), and zp2'(t) may also be real numbers.

In this case, the weight combiner 303 executes computation based on the following Formula (1).

$$\begin{pmatrix} zp1(i) \\ zp2'(i) \end{pmatrix} = \begin{pmatrix} a & b \\ c & d \end{pmatrix} \begin{pmatrix} sp1(i) \\ sp2(i) \end{pmatrix} \quad (1)$$

In Formula (1), a, b, c, and d are defined as complex numbers. However, a, b, c, and d may also be real numbers. Note that i is taken to be the symbol number.

The phase changer 305B accepts the weighted signal 304B and the control signal 300 as input. On the basis of the control signal 300, the phase changer 305B changes the phase of the weighted signal 304B, and outputs a phase-changed signal 306B to the inserter 307B. Note that the phase-changed signal 306B is designated zp2(t). Herein, zp2(t) is taken to be defined as a complex number. Note that zp2(t) may also be a real number.

The specific operation of the phase changer 305B will be described. In the phase changer 305B, assume that a phase change of yp(i) is performed on zp2'(i). Consequently, it is possible to express zp2(i)=yp(i)×zp2'(i). Herein, i is taken to be the symbol number (where i is an integer equal to 0 or greater).

For example, the phase changer 305B sets the value of the phase change expressed as yp(i) like the following Formula (2).

$$yp(i) = e^{j\frac{2\times\pi\times i}{Np}} \quad (2)$$

In Formula (2), j is the imaginary unit. Also, Np is an integer equal to 2 or greater, and indicates the period of the phase change. If Np is set to an odd number equal to 3 or greater, there is a possibility that the received signal quality of the data will improve. However, Formula (2) is merely one example, and the value of the phase change set in the phase changer 305B is not limited thereto. Accordingly, the phase change value is taken to be expressed as $yp(i)=e^{j\times\delta p(i)}$.

At this time, by using the phase change value $yp(i)=e^{j\times\delta p(i)}$ and Formula (1), zp1(i) and zp2(i) may be expressed as the following Formula (3).

$$\begin{pmatrix} zp1(i) \\ zp2(i) \end{pmatrix} = \begin{pmatrix} 1 & 0 \\ 0 & yp(i) \end{pmatrix} \begin{pmatrix} zp1(i) \\ zp2'(i) \end{pmatrix} \quad (3)$$

$$= \begin{pmatrix} 1 & 0 \\ 0 & yp(i) \end{pmatrix} \begin{pmatrix} a & b \\ c & d \end{pmatrix} \begin{pmatrix} sp1(i) \\ sp2(i) \end{pmatrix}$$

$$= \begin{pmatrix} 1 & 0 \\ 0 & e^{j\times\delta p(i)} \end{pmatrix} \begin{pmatrix} a & b \\ c & d \end{pmatrix} \begin{pmatrix} sp1(i) \\ sp2(i) \end{pmatrix}$$

Note that δp(i) is a real number. Additionally, zp1(i) and zp2(i) are transmitted from the transmission apparatus at identical times and identical frequencies (identical frequency bands).

In Formula (3), the phase change value yp(i) is not limited to Formula (2), and for example, a method that changes the phase periodically or regularly is conceivable.

The matrix used in the computation of the weight combiner 303 illustrated in Formula (1) and Formula (3) will be described. The matrix used in the computation of the weight combiner 303 is expressed as Fp, as illustrated in the following Formula (4).

$$\begin{pmatrix} a & b \\ c & d \end{pmatrix} = Fp \quad (4)$$

For example, for the matrix Fp, it is conceivable to use any of the matrices from Formula (5) to Formula (12) below.

$$Fp = \begin{pmatrix} \beta \times e^{j0} & \beta \times \alpha \times e^{j0} \\ \beta \times \alpha \times e^{j0} & \beta \times e^{j\pi} \end{pmatrix} \quad (5)$$

$$Fp = \frac{1}{\sqrt{\alpha^2 + 1}} \begin{pmatrix} e^{j0} & \alpha \times e^{j0} \\ \alpha \times e^{j0} & e^{j\pi} \end{pmatrix} \quad (6)$$

$$Fp = \begin{pmatrix} \beta \times e^{j0} & \beta \times \alpha \times e^{j\pi} \\ \beta \times \alpha \times e^{j0} & \beta \times e^{j0} \end{pmatrix} \quad (7)$$

$$Fp = \frac{1}{\sqrt{\alpha^2 + 1}} \begin{pmatrix} e^{j0} & \alpha \times e^{j\pi} \\ \alpha \times e^{j0} & e^{j0} \end{pmatrix} \quad (8)$$

$$Fp = \begin{pmatrix} \beta \times e^{j0} & \beta \times e^{j\pi} \\ \beta \times e^{j0} & \beta \times \alpha \times e^{j0} \end{pmatrix} \quad (9)$$

$$Fp = \frac{1}{\sqrt{\alpha^2 + 1}} \begin{pmatrix} \alpha \times e^{j0} & e^{j\pi} \\ e^{j0} & \alpha \times e^{j0} \end{pmatrix} \quad (10)$$

$$Fp = \begin{pmatrix} \beta \times \alpha \times e^{j0} & \beta \times e^{j0} \\ \beta \times e^{j0} & \beta \times \alpha \times e^{j\pi} \end{pmatrix} \quad (11)$$

$$Fp = \frac{1}{\sqrt{\alpha^2 + 1}} \begin{pmatrix} \alpha \times e^{j0} & e^{j0} \\ e^{j0} & \alpha \times e^{j\pi} \end{pmatrix} \quad (12)$$

Note that in Formula (5) to Formula (12), α may be a real number or an imaginary number. Also, β may be a real number or an imaginary number. However, α is not 0 (zero). Also, β is not 0 (zero).

Alternatively, for the matrix Fp, it is conceivable to use any of the matrices from Formula (13) to Formula (20) below.

$$Fp = \begin{pmatrix} \beta \times \cos\theta & \beta \times \sin\theta \\ \beta \times \sin\theta & -\beta \times \cos\theta \end{pmatrix} \quad (13)$$

$$Fp = \begin{pmatrix} \cos\theta & \sin\theta \\ \sin\theta & -\cos\theta \end{pmatrix} \quad (14)$$

$$Fp = \begin{pmatrix} \beta \times \cos\theta & -\beta \times \sin\theta \\ \beta \times \sin\theta & \beta \times \cos\theta \end{pmatrix} \quad (15)$$

$$Fp = \begin{pmatrix} \cos\theta & -\sin\theta \\ \sin\theta & \cos\theta \end{pmatrix} \quad (16)$$

-continued $$Fp = \begin{pmatrix} \beta \times \sin\theta & -\beta \times \cos\theta \\ \beta \times \cos\theta & \beta \times \sin\theta \end{pmatrix} \quad (17)$$

$$Fp = \begin{pmatrix} \sin\theta & -\cos\theta \\ \cos\theta & \sin\theta \end{pmatrix} \quad (18)$$

$$Fp = \begin{pmatrix} \beta \times \sin\theta & \beta \times \cos\theta \\ \beta \times \cos\theta & -\beta \times \sin\theta \end{pmatrix} \quad (19)$$

$$Fp = \begin{pmatrix} \sin\theta & \cos\theta \\ \cos\theta & -\sin\theta \end{pmatrix} \quad (20)$$

Note that in Formula (13) to Formula (20), θ is a real number. Also, in Formula (13), Formula (15), Formula (17), and Formula (19), β may be a real number or an imaginary number. However, β is not 0 (zero).

Alternatively, for the matrix Fp, it is conceivable to use any of the matrices from Formula (21) to Formula (32) below.

$$Fp(i) = \begin{pmatrix} \beta \times e^{j\theta_{11}(i)} & \beta \times \alpha \times e^{j(\theta_{11}(i)+\lambda)} \\ \beta \times \alpha \times e^{j\theta_{21}(i)} & \beta \times e^{j(\theta_{21}(i)+\lambda+\pi)} \end{pmatrix} \quad (21)$$

$$Fp(i) = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix} \quad (22)$$

$$Fp(i) = \begin{pmatrix} \beta \times \alpha \times e^{j\theta_{21}(i)} & \beta \times e^{j(\theta_{21}(i)+\lambda+\pi)} \\ \beta \times e^{j\theta_{11}(i)} & \beta \times \alpha \times e^{j(\theta_{11}(i)+\lambda)} \end{pmatrix} \quad (23)$$

$$Fp(i) = \frac{1}{\sqrt{\alpha^2+1}} \begin{pmatrix} \alpha \times e^{j\theta_{21}(i)} & e^{j(\theta_{21}(i)+\lambda+\pi)} \\ e^{j\theta_{11}(i)} & \alpha \times e^{j(\theta_{11}(i)+\lambda)} \end{pmatrix} \quad (24)$$

$$Fp(i) = \begin{pmatrix} \beta \times e^{j\theta_{11}} & \beta \times \alpha \times e^{j(\theta_{11}+\lambda(i))} \\ \beta \times \alpha \times e^{j\theta_{21}} & \beta \times e^{j(\theta_{21}+\lambda(i)+\pi)} \end{pmatrix} \quad (25)$$

$$Fp(i) = \frac{1}{\sqrt{\alpha^2+1}} \begin{pmatrix} e^{j\theta_{11}} & \alpha \times e^{j(\theta_{11}+\lambda(i))} \\ \alpha \times e^{j\theta_{21}} & e^{j(\theta_{21}+\lambda(i)+\pi)} \end{pmatrix} \quad (26)$$

$$Fp(i) = \begin{pmatrix} \beta \times \alpha \times e^{j\theta_{21}} & \beta \times e^{j(\theta_{21}+\lambda(i)+\pi)} \\ \beta \times e^{j\theta_{11}} & \beta \times \alpha \times e^{j(\theta_{11}+\lambda(i))} \end{pmatrix} \quad (27)$$

$$Fp(i) = \frac{1}{\sqrt{\alpha^2+1}} \begin{pmatrix} \alpha \times e^{j\theta_{21}} & e^{j(\theta_{21}+\lambda(i)+\pi)} \\ e^{j\theta_{11}} & \alpha \times e^{j(\theta_{11}+\lambda(i))} \end{pmatrix} \quad (28)$$

$$Fp = \begin{pmatrix} \beta \times e^{j\theta_{11}} & \beta \times \alpha \times e^{j(\theta_{11}+\lambda)} \\ \beta \times \alpha \times e^{j\theta_{21}} & \beta \times e^{j(\theta_{21}+\lambda+\pi)} \end{pmatrix} \quad (29)$$

$$Fp = \frac{1}{\sqrt{\alpha^2+1}} \begin{pmatrix} e^{j\theta_{11}} & \alpha \times e^{j(\theta_{11}+\lambda)} \\ \alpha \times e^{j\theta_{21}} & e^{j(\theta_{21}+\lambda+\pi)} \end{pmatrix} \quad (30)$$

$$Fp = \begin{pmatrix} \beta \times \alpha \times e^{j\theta_{21}} & \beta \times e^{j(\theta_{21}+\lambda+\pi)} \\ \beta \times e^{j\theta_{11}} & \beta \times \alpha \times e^{j(\theta_{11}+\lambda)} \end{pmatrix} \quad (31)$$

$$Fp = \frac{1}{\sqrt{\alpha^2+1}} \begin{pmatrix} \alpha \times e^{j\theta_{11}} & e^{j(\theta_{21}+\lambda+\pi)} \\ e^{j\theta_{11}} & \alpha \times e^{j(\theta_{11}+\lambda)} \end{pmatrix} \quad (32)$$

Herein, θ11(i), θ21(i), and λ(i) are functions of i (the symbol number), and are real values. For example, λ is a real, fixed value. Note that λ may also not be a fixed value. Also, α may be a real number or an imaginary number. Also, β may be a real number or an imaginary number. However, α is not 0 (zero). Also, β is not 0 (zero). Also, θ11 and θ21 are real numbers.

Alternatively, for the matrix Fp, it is conceivable to use any of the matrices from Formula (33) to Formula (36) below.

$$Fp = \begin{pmatrix} 1 & 0 \\ 0 & 1 \end{pmatrix} \quad (33)$$

$$Fp = \begin{pmatrix} \beta & 0 \\ 0 & \beta \end{pmatrix} \quad (34)$$

$$Fp = \begin{pmatrix} 1 & 0 \\ 0 & -1 \end{pmatrix} \quad (35)$$

$$Fp = \begin{pmatrix} \beta & 0 \\ 0 & -\beta \end{pmatrix} \quad (36)$$

Note that in Formula (34) and Formula (36), β may be a real number or an imaginary number. However, β is not 0 (zero).

Note that even if a precoding matrix different from Formulas (5) to (36) above is used, it is still possible to carry out each embodiment.

Also, in the case of expressing the precoding matrix Fp like in Formula (33) or Formula (34), the weight combiner 303 in FIG. 3 does not perform signal processing on the mapped signals 301A and 301B, and instead outputs the mapped signal 301A as a weighted signal 304A, and outputs the mapped signal 301B as a weighted signal 304B. In other words, the weight combiner 303 may also not exist, and in the case in which the weight combiner 303 exists, the weight combiner 303 may be controlled by the control signal 300 to perform weight combining or not perform weight combining.

The inserter 307A accepts the weighted signal 304A, a pilot symbol signal (pa(t)) (351A), a preamble signal 352, a control information symbol signal 353, and the control signal 300 as input. On the basis of information about the frame configuration included in the control signal 300, the inserter 307A outputs a baseband signal 308A based on the frame configuration to the multiplexing signal processor 104.

Similarly, the inserter 307B accepts the phase-changed signal 306B, a pilot symbol signal (pb(t)) (351B), the preamble signal 352, the control information symbol signal 353, and the control signal 300 as input. On the basis of information about the frame configuration included in the control signal 300, the inserter 307B outputs a baseband signal 308B based on the frame configuration to the phase changer 309B.

Note that the generation of control information for generating the control information symbol signal 353 and the frame configuration in the transmission apparatus used in the inserter 307B will be described later.

The phase changer 309B accepts the baseband signal 308B and the control signal 300 as input. The phase changer 309B changes the phase of the baseband signal 308B on the basis of the control signal 300, and outputs a phase-changed signal 310B to the multiplexing signal processor 104.

The baseband signal 308B is taken to be a function of the symbol number i, and is expressed as xp'(i). Thus, the phase-changed signal 310B (xp(i)) output from the phase changer 309B may be expressed as xp(i)=$e^{j \times E(i)} \times$xp'(i).

The operation of the phase changer 309B may be cyclic delay diversity (CDD) (cyclic shift diversity (CSD)) described in NPL 2 and NPL 3. Additionally, a characteristic of the phase changer 309B is that the phase change is executed on symbols existing in the frequency axis direction. The phase changer 309B performs phase change on data symbols, pilot symbols, control information symbols, and the like.

Note that although FIG. 3 illustrates the signal processor 206 provided with the phase changer 309B, the phase changer 309B may also not be included in the signal processor 206. Alternatively, even in the case in which the phase changer 309B is included in the signal processor 206, whether or not the phase changer 309B operates may be switched. In the case in which the phase changer 309B is not included in the signal processor 206, or in the case in which the phase changer 309B does not operate, the inserter 307B outputs the baseband signal 308B to the multiplexing signal processor 104 of FIG. 1. In this way, in FIG. 3, in the case in which the phase changer 309B does not exist, or in the case in which the phase changer 309B does not operate, the baseband signal 308B becomes the output signal to the multiplexing signal processor 104 instead of the phase-changed signal 310B. Hereinafter, for the sake of convenience, the case in which the phase changer 309B does not operate will be described.

Note that in the case in which the weight combining (precoding) process is executed using the (precoding) matrix Fp illustrated in Formula (33) or Formula (34), the weight combiner 303 does not perform signal processing for weight combining on the mapped signals 301A and 301B, and instead outputs the mapped signal 301A as the weighted signal 304A, and outputs the mapped signal 301B as the weighted signal 304B.

In this case, on the basis of the control signal 300, the weight combiner 303 controls the switching between a process (i) and a process (ii), namely, (i) a process of performing signal processing corresponding to weight combining to generate and output the weighted signals 304A and 304B, and (ii) a process of not executing signal processing for weight combining, and instead outputting the mapped signal 301A as the weighted signal 304A, and outputting the mapped signal 301B as the weighted signal 304B.

Also, in the case in which the weight combining (precoding) process is executed by using only the (precoding) matrix Fp of Formula (33) or Formula (34), the signal processor 206 of FIG. 2 may also not be provided with the weight combiner 303.

The above describes a case in which the mapper 204 of FIG. 2 generates the signals of two sequences when multi-stream transmission is selected for user #p. However, in the case in which single-stream transmission is selected for user #p, in FIG. 3, the weight combiner 303, the phase changer 305B, and the inserter 307B may not operate, and the user #p mapped signal 301A may be input into the inserter 307A without being weighted. Alternatively, in the case in which single-stream transmission is selected, the user #p signal processor 102_p in FIG. 1 may not be provided with the weight combiner 303, the phase changer 305B, and the inserter 307B among the configuration of FIG. 3.

Also, the above describes a case in which the mapper 204 of FIG. 2 generates the signals of two sequences when multi-stream transmission is selected for user #p. However, the mapper 204 of FIG. 2 may also generate the signals of three or more sequences when multi-stream transmission is selected for user #p. In the case in which the mapper 204 of FIG. 2 generates the signals of three or more sequences, the weight combiner 303 of FIG. 3 executes weight combining using a precoding matrix that depends on the number of input signals, for example, and outputs three or more weighted signals. Note that the number of signals input into the weight combiner 303 of FIG. 3 and the number of signals output from the weight combiner 303 do not have to be the same. In other words, the precoding matrix used by the weight combiner 303 does not have to be a square matrix.

Also, in the case in which the weight combiner 303 outputs three or more weighted signals, the signal processor 102_p may change the phase of all or some of the three or more weighted signals. Alternatively, in the signal processor 102p, phase change does not have to be executed on all of the three or more weighted signals which are output.

Figure 4:
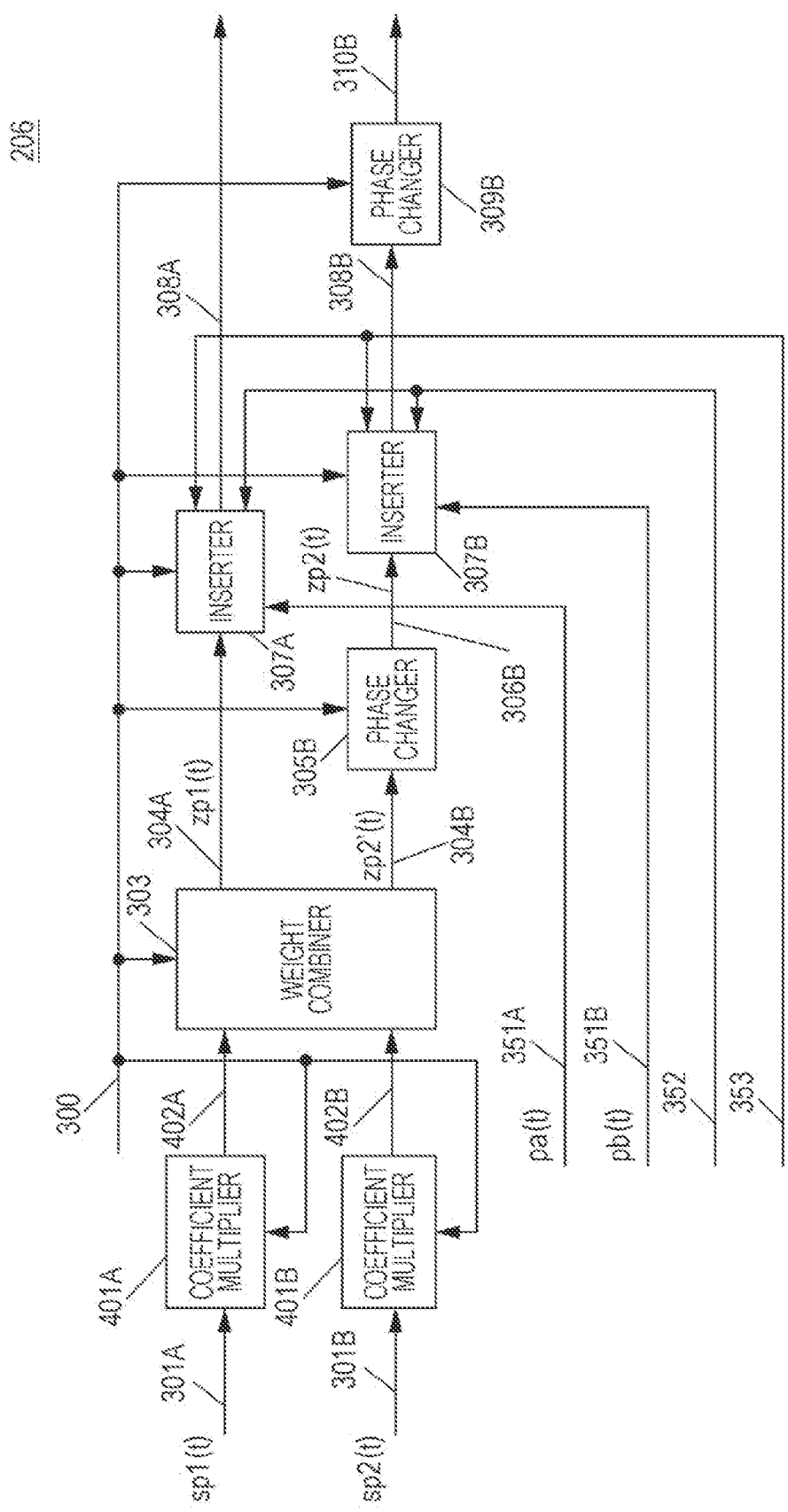
FIG. 4 is a diagram illustrating a different example from FIG. 3 of a configuration of the signal processor in FIG. 2.

FIG. 4 is a diagram illustrating a different example from FIG. 3 of the configuration of the signal processor 206 in FIG. 2. In FIG. 4, parts of the configuration which are similar to FIG. 3 are denoted with the same numbers. Note that a description will be omitted herein for the parts of the configuration which are similar to FIG. 3.

The signal processor 206 of FIG. 4 is a configuration obtained by adding a coefficient multiplier 401A and a coefficient multiplier 401B to the signal processor 206 of FIG. 3.

The coefficient multiplier 401A accepts the mapped signal 301A (sp1(i)) and the control signal 300 as input. On the basis of the control signal 300, the coefficient multiplier 401A multiplies the mapped signal 301A (sp1(i)) by a coefficient, and outputs a coefficient-multiplied signal 402A to the weight combiner 303. Note that, provided that the coefficient is up, the coefficient-multiplied signal 402A is expressed as up×sp1(i). Herein, up may be a real number or a complex number. However, up is not 0 (zero). Note that in the case of up=1, the coefficient multiplier 401A does not multiply the mapped signal 301A (sp1(i)) by the coefficient, and outputs the mapped signal 301A (sp1(i)) as the coefficient-multiplied signal 402A.

Similarly, the coefficient multiplier 401B accepts the mapped signal 301B (sp2(i)) and the control signal 300 as input. On the basis of the control signal 300, the coefficient multiplier 401B multiplies the mapped signal 301B (sp2(i)) by a coefficient, and outputs a coefficient-multiplied signal 402B to the weight combiner 303. Note that, provided that the coefficient is vp, the coefficient-multiplied signal 402B is expressed as vp×sp2(i). Herein, vp may be a real number or a complex number. However, vp is not 0 (zero). Note that in the case of vp=1, the coefficient multiplier 401B does not multiply the mapped signal 301B (sp2(i)) by the coefficient, and outputs the mapped signal 301B (sp2(i)) as the coefficient-multiplied signal 402B.

In FIG. 4, the weighted signal 304A (zp1(i)) output from the weight combiner 303 and the phase-changed signal 306B (zp2(i)) output from the phase changer 305B are expressed by the following Formula (37) using the coefficient up of the coefficient multiplier 401A, the coefficient vp of the coefficient multiplier 401B, and Formula (3).

$$\begin{pmatrix} zp1(i) \\ zp2(i) \end{pmatrix} = \begin{pmatrix} 1 & 0 \\ 0 & yp(i) \end{pmatrix} Fp \begin{pmatrix} up & 0 \\ 0 & vp \end{pmatrix} \begin{pmatrix} sp1(i) \\ sp2(i) \end{pmatrix} \quad (37)$$
$$= \begin{pmatrix} 1 & 0 \\ 0 & yp(i) \end{pmatrix} \begin{pmatrix} a & b \\ c & d \end{pmatrix} \begin{pmatrix} up & 0 \\ 0 & vp \end{pmatrix} \begin{pmatrix} sp1(i) \\ sp2(i) \end{pmatrix}$$
$$= \begin{pmatrix} 1 & 0 \\ 0 & e^{j \times \delta p(i)} \end{pmatrix} \begin{pmatrix} a & b \\ c & d \end{pmatrix} \begin{pmatrix} up & 0 \\ 0 & vp \end{pmatrix} \begin{pmatrix} sp1(i) \\ sp2(i) \end{pmatrix}$$

Note that examples of the (precoding) matrix Fp are Formulas (5) to (36), as described already. Also, an example of the phase change value yp(i) is illustrated in Formula (2). However, the (precoding) matrix Fp and the phase change value yp(i) are not limited to the above.

FIGS. 1 to 4 and Formulas (1) to (37) are cited as an example to describe a method by which the user #p signal processor 102_p generates symbols (for example, zp1(i), zp2(i)). The generated symbols may be arranged in the time axis direction. Also, in the case of using a multi-carrier scheme such as orthogonal frequency-division multiplexing (OFDM), the generated symbols may also be arranged in the frequency axis direction, or in the time-frequency directions.

Also, the generated symbols may be interleaved (that is, the symbols may be sorted) and arranged in the time axis direction, the frequency axis direction, or the time-frequency axis directions.

Symbol arranging is executed in the user #p signal processor 102_p by the error-correcting coder 202 and/or the mapper 204 illustrated in FIG. 2, for example.

Note that symbol arrangement method will be described later.

The transmission apparatus illustrated in FIG. 1 transmits zp1(i) and zp2(i) having the same symbol number i using identical times and identical frequencies (identical frequency bands).

The user #1 baseband signal 103_1_1 in FIG. 1 becomes zp1(i) when setting p=1, and the user #1 baseband signal 103_1_2 becomes zp2(i) when setting p=1. Similarly, the user #2 baseband signal 103_2_1 becomes zp1(i) when setting p=2, and the user #2 baseband signal 103_2_2 becomes zp2(i) when setting p=2. Similarly, the user #M baseband signal 103_M_1 becomes zp1(i) when setting p=M, and the user #M baseband signal 103_M_2 becomes zp2(i) when setting p=M.

Note that the user #1 signal processor 102_1 uses Formula (3) or Formula (37) to generate the user #1 baseband signal 103_1_1 and the user #1 baseband signal 103_1_2. Similarly, the user #2 signal processor 102_2 uses Formula (3) or Formula (37) to generate the user #2 baseband signal 103_2_1 and the user #2 baseband signal 103_2_2. Similarly, the user #M signal processor 102_M generates the user #M baseband signal 103_M_1 and the user #M baseband signal 103_M_2.

At this time, in the case of applying precoding and phase change to generate the user #p baseband signal 103_p_1 and the user #p baseband signal 103_p_2, the precoding matrix Fp made up of a, b, c, and d in Formula (3) and Formula (37) and/or the phase change value yp(i) are set depending on the value of p.

In other words, the precoding matrix Fp and/or the phase change value yp(i) used in the user #p signal processor 102_p are set respectively depending on the value of p, or in other words, for each user. Information for setting the precoding matrix Fp and/or the phase change value yp(i) is included in the control signal.

However, precoding and phase change may not be applied to all from the user #1 signal processor 102_1 to the user #M signal processor 102_M in FIG. 1. For example, a signal processor for which phase change is not executed may exist among the user #1 signal processor 102_1 to the user #M signal processor 102_M. Also, a signal processor that generates a single baseband signal (the baseband signal of a single stream) may exist among the user #1 signal processor 102_1 to the user #M signal processor 102_M.

As above, in the user #1 signal processor 102_1 to the user #M signal processor 102_M in FIG. 1, as described in the present embodiment, in the case of executing precoding and phase change, in an environment in which direct waves are dominant, there is an increased possibility of being able to avoid falling into a steady reception state, and an advantageous effect of improved received signal quality of data at a terminal may be obtained. Additionally, like in FIG. 1, by transmitting the modulated signals of multiple users, an advantageous effect of improved data transmission efficiency in the transmission apparatus of FIG. 1 may also be obtained.

Note that in the case in which the control signal 300 includes information indicating that "the phase changer 305B does not execute phase change", the phase changer 305B does not execute phase change, or in other words, the phase changer 305B does not change the phase of the input weighted signal 304B, and outputs the weighted signal 304B as 306B.

<Example of Multiplexing Signal Process of Multiplexing Signal Processor 104>

The multiplexing signal process (weight combining process) in the multiplexing signal processor 104 of FIG. 1 will be described specifically.

Assume that the user #p first baseband signal 103_p_1 and the user #p second baseband signal 103_p_2 output by the user #p signal processor 102_p (where p is an integer from 1 to M) in FIG. 1 are expressed as zp1(i) and zp2(i) on the basis of Formula (3). Herein, i is taken to be the symbol number. For example, i is treated as being an integer equal to 0 or greater. At this time, assume that the signals b{2p-1}(i) and b{2p}(i) are expressed as in the following Formulas (38) and (39).

$$b\{2p-1\}(i)=zp1(i) \tag{38}$$

$$b\{2p\}(i)=zp2(i) \tag{39}$$

For example, the user #1 first baseband signal 103_1_1 and the user #1 second baseband signal 103_1_2 are expressed as b{1}(i) and b{2}(i), respectively. In other words, in the case in which each from the user #1 signal processor 102_1 to the user #M signal processor 102_M outputs two signals, the output signals are expressed as b{1}(i) to b{2M}(i).

Note that in the case of transmitting a single stream (single modulated signal), either zp1(i) or zp2(i) may be zero.

In addition, the output of the multiplexing signal processor 104, namely the multiplexed signal $1 baseband signal 105_1 to the multiplexed signal $N baseband signal 105_N, are denoted v1(i) to vN(i), respectively. In other words, the multiplexed signal $n baseband signal 105_n becomes vn(i) (where n is an integer from 1 to N). At this time, vn(i) may be expressed by the following Formula (40).

$$vn(i) = \sum_{k=1}^{2M} \Omega\{n\}\{k\} \times b\{k\}(i) \tag{40}$$

At this time, $\Omega\{n\}\{k\}$ is the weighted coefficient of multiplexing, and may be defined as a complex number. Thus, $\Omega\{n\}\{k\}$ may be a real number. Additionally, $\Omega\{n\}\{k\}$ is decided by feedback information of each terminal.

Note that in the present embodiment, a case in which the user #p signal processor 102_p in FIG. 1 outputs one or two modulated signals is described as an example, but the configuration is not limited thereto, and the user #p signal processor 102_p may also output three or more modulated signals. In this case, the process of the multiplexing signal processor 104 must be expressed by a different formula from Formula (40).

<Example of Configuration of Radio Section>

As described earlier, the radio section $1 (106_1) to the radio section $N (106_N) in FIG. 1 execute processes such as frequency conversion and amplification on a signal input into each, and generate a transmission signal. At this time, in the radio section $1 (106_1) to the radio section $N (106_N), either a single-carrier scheme or a multi-carrier scheme such as orthogonal frequency-division multiplexing (OFDM) may be used. In the following, a radio section $n (106_n) in which OFDM is used will be described as an example.

Figure 5:
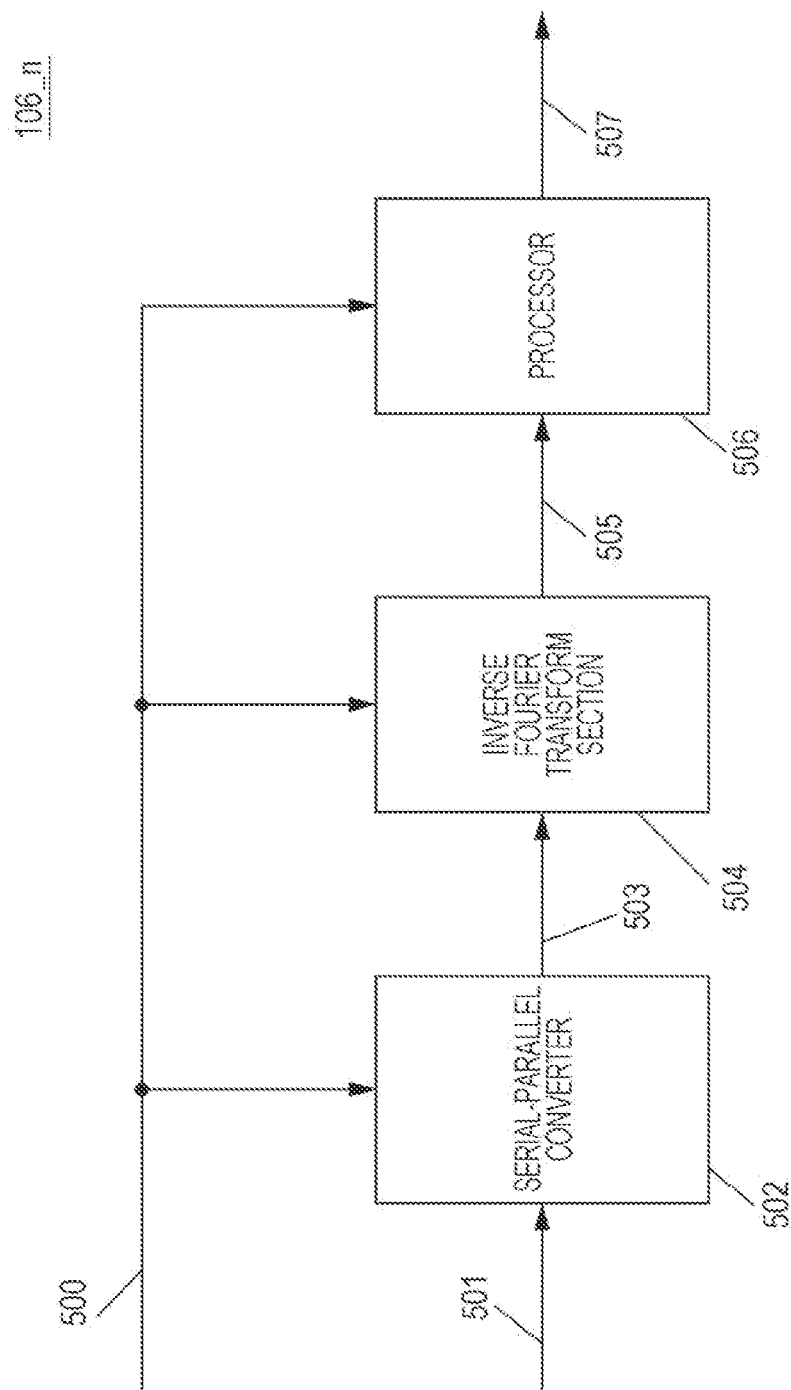
FIG. 5 is a diagram illustrating an example of a configuration of a radio section $n in which OFDM is used.

FIG. 5 is a diagram illustrating an example of a configuration of the radio section $n (106_n) in which OFDM is used. The radio section $n (106_n) is provided with a serial-parallel converter 502, an inverse Fourier transform section 504, and a processor 506.

The serial-parallel converter 502 accepts a signal 501 and a control signal 500 as input. On the basis of the control signal 500, the serial-parallel converter 502 executes serial-parallel conversion on the input signal 501, and outputs a serial-parallel converted signal 503 to the inverse Fourier transform section 504. Note that the signal 501 corresponds to the multiplexed signal $n baseband signal 105_n in FIG. 1, and the control signal 500 corresponds to the control signal 100 in FIG. 1.

The inverse Fourier transform section 504 accepts the serial-parallel converted signal 503 and the control signal 500 as input. On the basis of the control signal 500, the inverse Fourier transform section 504 performs an inverse Fourier transform (for example, the inverse fast Fourier transform (IFFT)), and outputs an inverse Fourier transformed signal 505 to the processor 506.

The processor 506 accepts the inverse Fourier transformed signal 505 and the control signal 500 as input. On the basis of the control signal 500, the processor 506 performs processes such as frequency conversion and amplification, and outputs a modulated signal 507 to the antenna section $n (108_n). The modulated signal 507 output from the processor 506 corresponds to the transmission signal 107_n in FIG. 1.

<Example of Configuration of Antenna Section>

Figure 6:
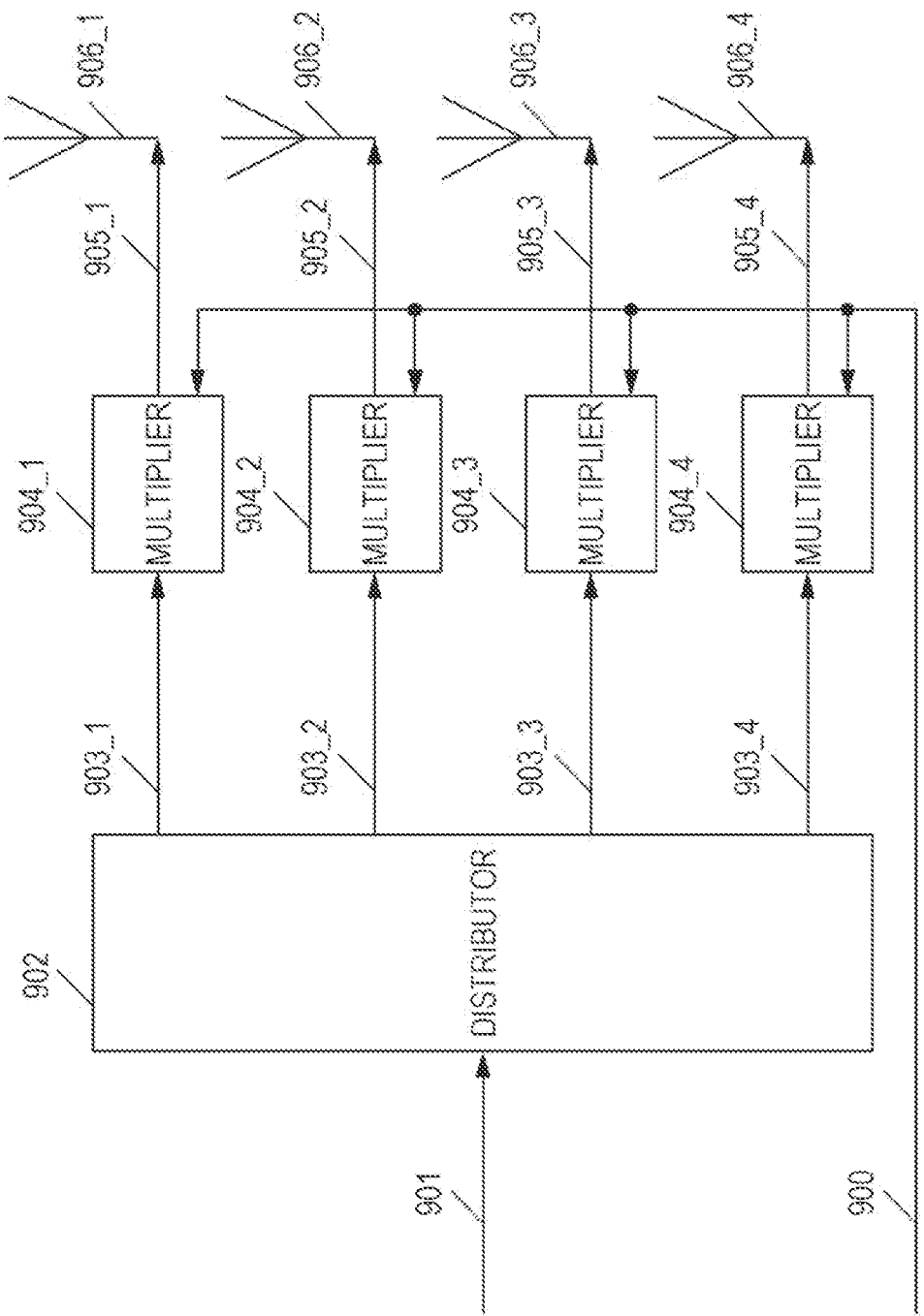
FIG. 6 is a diagram illustrating an example of a configuration of the antenna section in FIG. 1.

FIG. 6 is a diagram illustrating an example of the configuration of the antenna sections (antenna section $1 (108_1) to antenna section $N (108_N)) in FIG. 1. Note that the configuration in FIG. 6 is an example in which the antenna section $1 (108_1) to the antenna section $N (108_N) are configured with four antennas. An antenna section is provided with a distributor 902, multipliers 904_1 to 904_4, and antennas 906_1 to 906_4.

The distributor 902 accepts a transmission signal 901 as input. The distributor 902 distributes the transmission signal 901, and outputs transmission signals 903_1, 903_2, 903_3, and 903_4 to the corresponding multipliers (multiplier 904_1 to multiplier 904_4).

When the antenna section $1 (108_1) in FIG. 1 has the configuration of FIG. 6, the transmission signal 901 corresponds to the transmission signal 107_1 in FIG. 1. Also, when the antenna section $2 (108_2) in FIG. 1 has the configuration of FIG. 6, the transmission signal 901 corresponds to the transmission signal 107_2 in FIG. 1. When the antenna section $N (108_N) in FIG. 1 has the configuration of FIG. 6, the transmission signal 901 corresponds to the transmission signal 107_N in FIG. 1.

The multiplier 904_1 accepts the transmission signal 903_1 and a control signal 900 as input. On the basis of information about a multiplication coefficient included in the control signal 900, the multiplier 904_1 multiplies the transmission signal 903_1 by the multiplication coefficient, and outputs a multiplied signal 905_1 to the antenna 906_1. The multiplied signal 905_1 is output from the antenna 906_1 as a radio wave.

Provided that the transmission signal 903_1 is Tx1(t) (where t is time), and the multiplication coefficient is W1, the multiplied signal 905_1 is expressed as Tx1(t)×W1. Note that W1 may be defined as a complex number, and consequently, may also be a real number.

The multiplier 904_2 accepts the transmission signal 903_2 and the control signal 900 as input. On the basis of information about a multiplication coefficient included in the control signal 900, the multiplier 904_2 multiplies the transmission signal 903_2 by the multiplication coefficient, and outputs a multiplied signal 905_2 to the antenna 906_2. The multiplied signal 905_2 is output from the antenna 906_2 as a radio wave.

Provided that the transmission signal 903_2 is Tx2(t), and the multiplication coefficient is W2, the multiplied signal 905_2 is expressed as Tx2(t)×W2. Note that W2 may be defined as a complex number, and consequently, may also be a real number.

The multiplier 904_3 accepts the transmission signal 903_3 and the control signal 900 as input. On the basis of information about a multiplication coefficient included in the control signal 900, the multiplier 904_3 multiplies the transmission signal 903_3 by the multiplication coefficient, and outputs a multiplied signal 905_3 to the antenna 906_3. The multiplied signal 905_3 is output from the antenna 9063 as a radio wave.

Provided that the transmission signal 903_3 is Tx3(t), and the multiplication coefficient is W3, the multiplied signal 905_3 is expressed as Tx3(t)×W3. Note that W3 may be defined as a complex number, and consequently, may also be a real number.

The multiplier 904_4 accepts the transmission signal 903_4 and the control signal 900 as input. On the basis of information about a multiplication coefficient included in the control signal 900, the multiplier 904_4 multiplies the transmission signal 903_4 by the multiplication coefficient, and outputs a multiplied signal 905_4 to the antenna 906_4. The multiplied signal 905_4 is output from the antenna 906_4 as a radio wave.

Provided that the transmission signal 903_4 is Tx4(t), and the multiplication coefficient is W4, the multiplied signal 905_4 is expressed as Tx4(t)×W4. Note that W4 may be defined as a complex number, and consequently, may also be a real number.

Note that "the absolute value of W1, the absolute value of W2, the absolute value of W3, and the absolute value of W4 may be equal". This case corresponds to executing a phase change. Obviously, the absolute value of W1, the absolute value of W2, the absolute value of W3, and the absolute value of W4 may also not be equal.

Also, in FIG. 6, an example is described in which each antenna section is configured with four antennas (and four multipliers), but the number of antennas is not limited to four, and it is sufficient for each antenna section to include one or more antennas.

Also, the antenna section $1 (108_1) to the antenna section $N (108_N) do not have to be configured like in FIG. 6, and as described earlier, do not have to accept the control signal 100 as input. For example, each from the antenna section $1 (108_1) to the antenna section $N (108_N) in FIG. 1 may be configured to include a single antenna or multiple antennas.

<Generation of Control Information>

Figure 7:
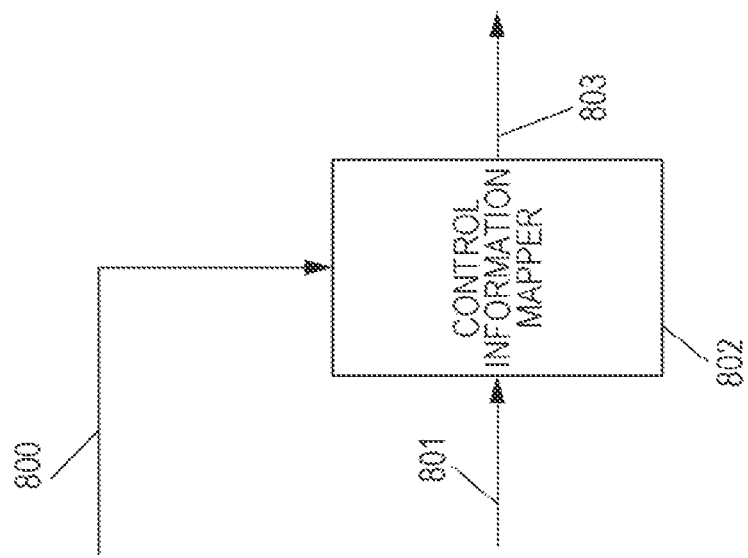
FIG. 7 is a diagram illustrating an example of a configuration of a portion related to control information generation for generating the control information symbol signal in FIG. 4.

FIG. 7 is a diagram illustrating an example of a configuration of a portion related to control information generation for generating the control information symbol signal 353 in FIGS. 3 and 4.

A control information mapper 802 accepts control information-related data 801 and a control signal 800 as input. The control information mapper 802 uses a modulation scheme based on the control signal 800 to map the control information-related data 801, and outputs a control information mapped signal 803. Note that the control information mapped signal 803 corresponds to the control information symbol signal 353 in FIGS. 3 and 4.

<First Example of Frame Configuration in Transmission Apparatus>

Next, the frame configuration in the transmission apparatus will be described. The frame configuration illustrates the arrangement of data symbols, pilot symbols, and other symbols to be transmitted. Information about the frame configuration is included in the control signal 300 (see FIGS. 3 and 4). Additionally, the inserter 307A and the inserter 307B illustrated in FIGS. 3 and 4 respectively generate the baseband signal 308A and the baseband signal 308B based on the frame configuration.

The following takes, as an example, a case in which a multi-carrier transmission scheme such as OFDM is used, and in the user #p signal processor 102_p, the inserter 307A outputs the user #p first baseband signal 103_p_1 as the baseband signal 308A, and the baseband signal 308B outputs the user #p second baseband signal 103_p_2 as the baseband signal 308B. Additionally, the frame configuration in this case will be described by taking the user #p first baseband signal 103_p_1 and the user #p second baseband signal 103_p_2 as an example.

Figure 8:
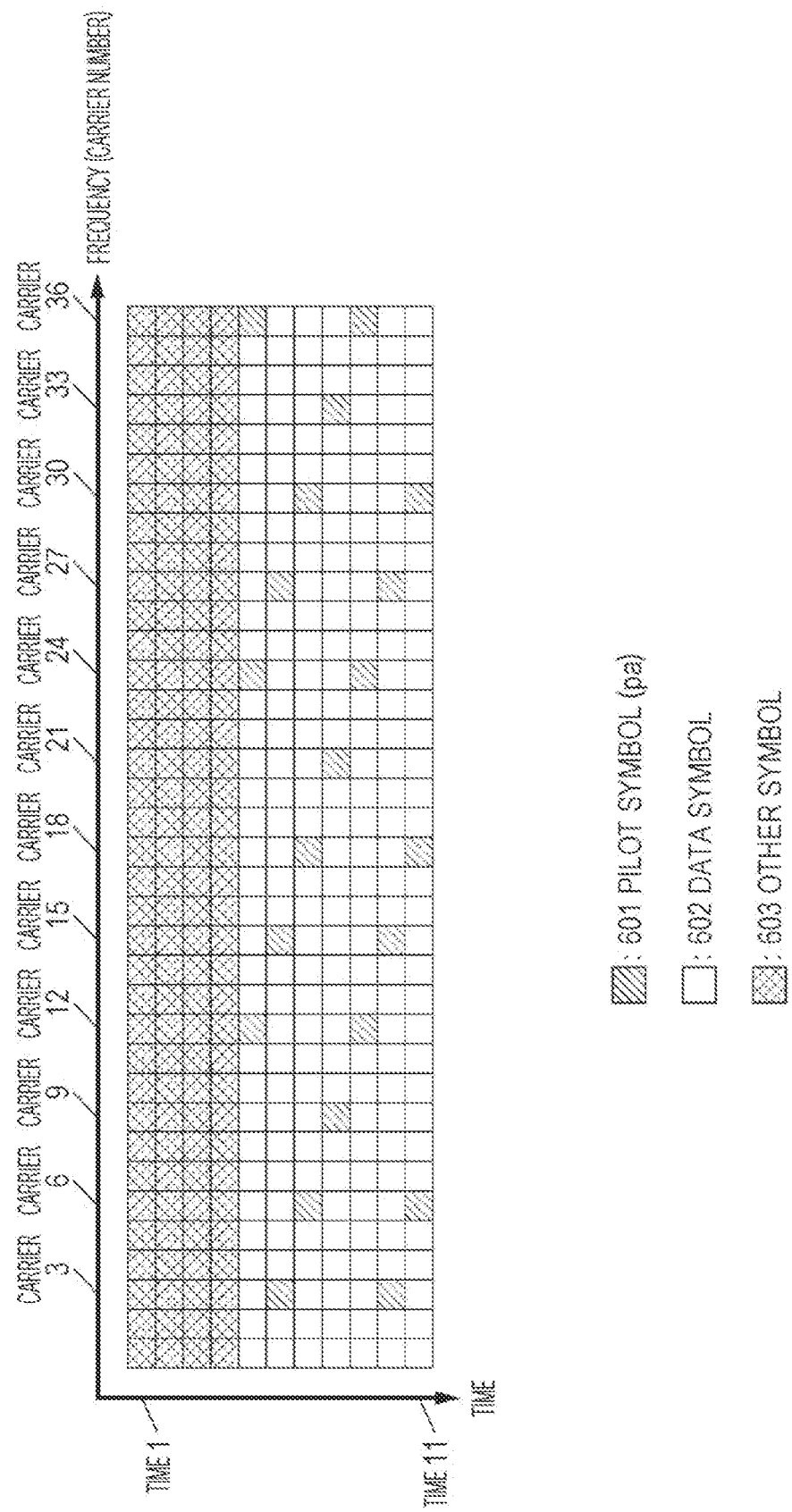
FIG. 8 is a diagram illustrating an example of the frame configuration of a first baseband signal for user #p.

FIG. 8 is a diagram illustrating an example of the frame configuration of the user #p first baseband signal 103_p_1. In FIG. 8, the horizontal axis indicates frequency (carrier), while the vertical axis indicates time. Since a multi-carrier transmission scheme such as OFDM is used, symbols exist in the carrier direction. FIG. 8 illustrates, as one example, symbols from carrier 1 to carrier 36. Also, FIG. 8 illustrates symbols from time 1 to time 11.

In FIG. 8, 601 illustrates pilot symbols (the pilot symbol signal 351A (corresponding to pa(t)) in FIGS. 3 and 4), 602 illustrates data symbols, and 603 illustrates other symbols. At this time, the pilot symbols are phase-shift keying (PSK) symbols, for example, and are symbols by which the reception apparatus that receives the frame executes channel estimation (estimation of channel variation) and estimation of the frequency offset/phase variation. For example, the transmission apparatus in FIG. 1 and the reception apparatus that receives a signal with the frame configuration of FIG. 8 preferably share the pilot symbol transmission method in common.

Meanwhile, the user #p mapped signal 205_1 is designated "stream #1", and the user #p mapped signal 205_2 is designated "stream #2". Note that the same also applies to the description hereinafter.

The data symbols 602 are symbols corresponding to the data symbols included in the baseband signal 207_A generated in FIG. 2. Consequently, the data symbols 602 are any of "symbols including both the symbols of 'stream #1' and the symbols of 'stream #2'", or "the symbols of 'stream #1'", or "the symbols of 'stream #2'". This is decided by the configuration of the precoding matrix used by the weight combiner 303 in FIG. 3. In other words, the data symbols 602 correspond to the weighted signal 304A (zp1(i)).

The other symbols 603 are taken to be symbols corresponding to the preamble signal 352 and the control information symbol signal 353 in FIGS. 3 and 4. However, the other symbols may also include symbols other than preamble and control information symbols. At this time, the preamble may transmit data (for control), or includes symbols for signal detection, symbols for executing frequency synchronization/time synchronization, symbols for channel estimation (symbols for estimating channel variation), and the like. Additionally, the control information symbols are symbols including control information by which the reception apparatus receiving the frame in FIG. 8 achieves the demodulation and decoding of the data symbols.

For example, carrier 1 to carrier 36 from time 1 to time 4 in FIG. 8 become the other symbols 603. Additionally, carrier 1 to carrier 11 at time 5 become the data symbols 602. In the following, carrier 12 at time 5 becomes a pilot symbol 601, carrier 13 to carrier 23 at time 5 become data symbols 602, carrier 24 at time 5 becomes a pilot symbol 601, carrier 1 and carrier 2 at time 6 become data symbols 602, carrier 3 at time 6 becomes a pilot symbol 601, carrier 30 at time 11 becomes a pilot symbol 601, and carrier 31 to carrier 36 at time 11 become data symbols 602.

Figure 9:
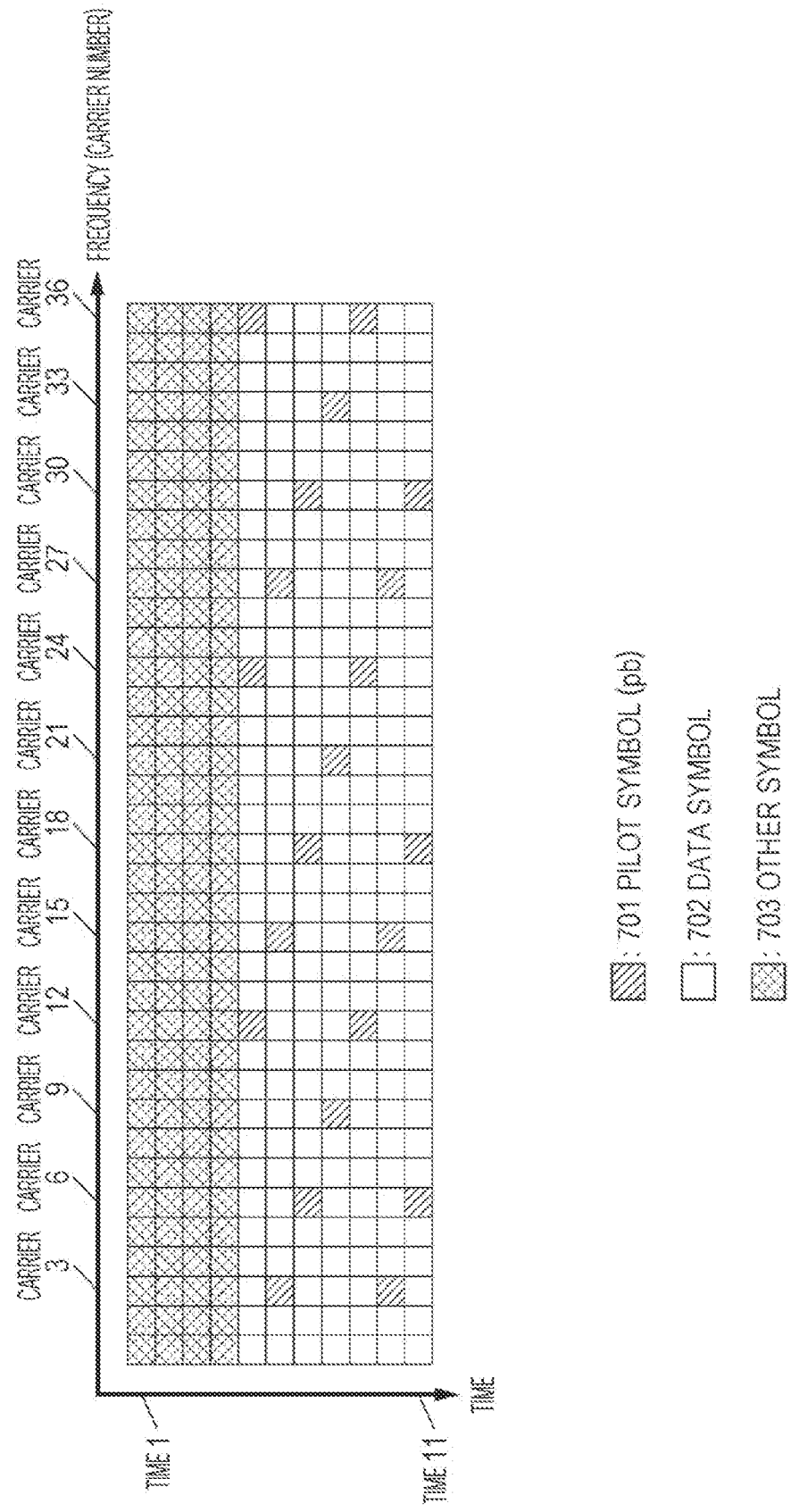
FIG. 9 is a diagram illustrating an example of the frame configuration of a second baseband signal for user #p.

FIG. 9 is a diagram illustrating an example of the frame configuration of the user #p second baseband signal 103_p_2. In FIG. 9, the horizontal axis indicates frequency (carrier), while the vertical axis indicates time. Since a multi-carrier transmission scheme such as OFDM is used, symbols exist in the carrier direction. FIG. 9 illustrates, as one example, symbols from carrier 1 to carrier 36. Also, FIG. 9 illustrates symbols from time 1 to time 11.

In FIG. 9, 701 illustrates pilot symbols (the pilot symbol signal 351B (corresponding to pb(t)) in FIGS. 3 and 4), 702 illustrates data symbols, and 703 illustrates other symbols. At this time, the pilot symbols are PSK symbols, for example, and are symbols by which the reception apparatus that receives the frame executes channel estimation (estimation of channel variation) and estimation of the frequency offset/phase variation. For example, the transmission apparatus in FIG. 1 and the reception apparatus that receives a signal with the frame configuration of FIG. 9 preferably share the pilot symbol transmission method in common.

The data symbols 702 are symbols corresponding to the data symbols included in the baseband signal 207_B generated in FIG. 2. Consequently, the data symbols 702 are the symbols of any of the three possibilities of "symbols including both the symbols of 'stream #1' and the symbols of 'stream #2'", "the symbols of 'stream #1'", and "the symbols of 'stream #2'". Which symbols among the three possibilities become the data symbols 702 is decided by the configuration of the precoding matrix used by the weight combiner 303 in FIG. 3. In other words, the data symbols 702 correspond to the phase-changed signal 306B (zp2(i)).

The other symbols 703 are taken to be symbols corresponding to the preamble signal 352 and the control information symbol signal 353 in FIGS. 3 and 4. However, the other symbols may also include symbols other than preamble and control information symbols. At this time, the preamble may transmit data (for control), or includes symbols for signal detection, symbols for executing frequency synchronization/time synchronization, symbols for channel estimation (symbols for estimating channel variation), and the like. Additionally, the control information symbols are symbols including control information by which the reception apparatus receiving the frame in FIG. 9 achieves the demodulation and decoding of the data symbols.

For example, carrier 1 to carrier 36 from time 1 to time 4 in FIG. 9 become the other symbols 703. Additionally, carrier 1 to carrier 11 at time 5 become the data symbols 702. In the following, carrier 12 at time 5 becomes a pilot symbol 701, carrier 13 to carrier 23 at time 5 become data symbols 702, carrier 24 at time 5 becomes a pilot symbol 701, carrier 1 and carrier 2 at time 6 become data symbols 702, carrier 3 at time 6 becomes a pilot symbol 701, carrier 30 at time 11 becomes a pilot symbol 701, and carrier 31 to carrier 36 at time 11 become data symbols 702.

When a symbol exists at carrier A, time B in FIG. 8, and a symbol exists at carrier A, time B in FIG. 9, the symbol at carrier A, time B in FIG. 8 and the symbol at carrier A, time B in FIG. 9 are transmitted at identical times and identical frequencies. Note that the frame configuration is not limited to FIGS. 8 and 9, and that FIGS. 8 and 9 are merely examples of the frame configuration.

Additionally, the other symbols 603 and 703 in FIGS. 8 and 9 are symbols corresponding to "the preamble signal 352 and the control symbols 353 in FIGS. 3 and 4". Consequently, in the case in which the other symbols 703 in FIG. 9 at identical times and identical frequencies (identical carriers) as the other symbols 603 in FIG. 8 are transmitting control information, identical data (identical control information) is being transmitted.

Note that although the reception apparatus is expecting to receive the frame in FIG. 8 and the frame in FIG. 9 at the same time, the reception apparatus is able to obtain the data transmitted by the transmission apparatus even if only the frame in FIG. 8 or only the frame in FIG. 9 is received.

Additionally, in the user #1 signal processor 102_1 of FIG. 1, in the case of outputting the first baseband signal 103_1_1 and the second baseband signal 103_1_2, the first baseband signal 103_1_1 and the second baseband signal 103_1_2 take the frame configurations of FIG. 8 and FIG. 9, respectively. Similarly, in the user #2 signal processor 102_2 of FIG. 1, in the case of outputting the first baseband signal 103_2_1 and the second baseband signal 103_2_2, the first baseband signal 103_2_1 and the second baseband signal 103_2_2 take the frame configurations of FIG. 8 and FIG. 9, respectively. Similarly, in the user #M signal processor 102_M of FIG. 1, in the case of outputting the first baseband signal 103_M_1 and the second baseband signal 103_M_2, the first baseband signal 103_M_1 and the second baseband signal 103_M_2 take the frame configurations of FIG. 8 and FIG. 9, respectively.

<Second Example of Frame Configuration in Transmission Apparatus>

In FIGS. 8 and 9, a frame configuration is described for the case in which a multi-carrier transmission scheme such as OFDM is used. Herein, a frame configuration in a transmission apparatus will be described for the case in which a single-carrier scheme is used.

Figure 10:
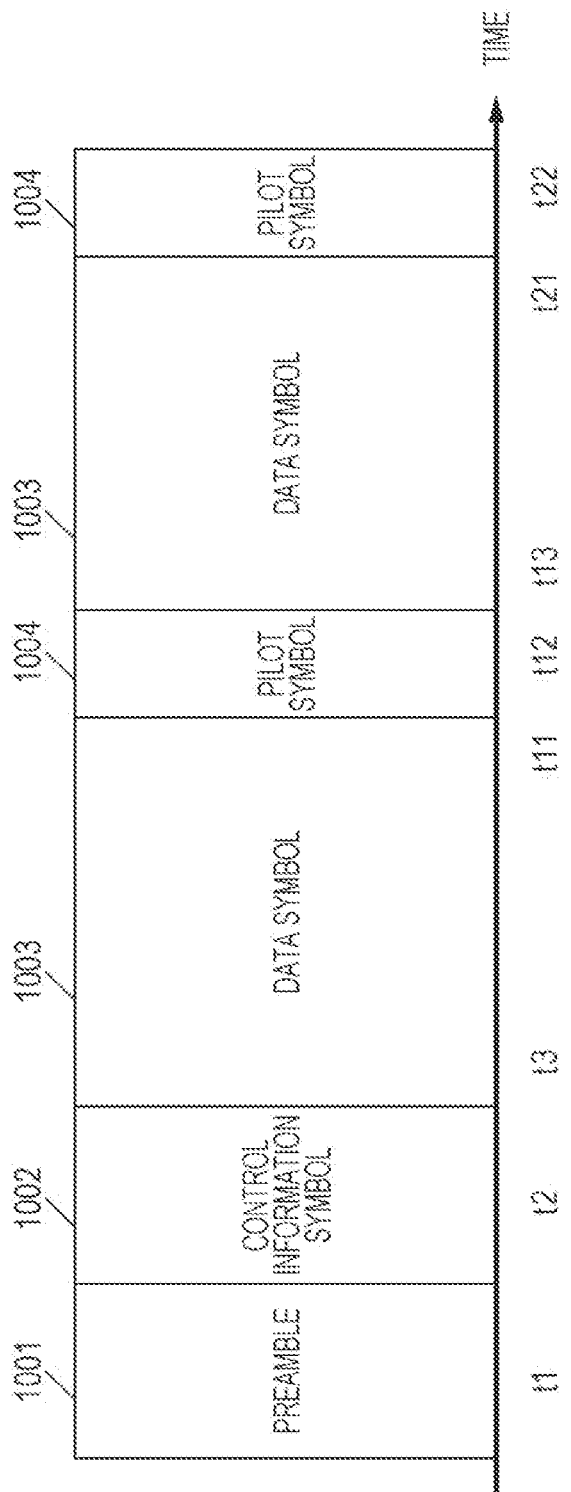
FIG. 10 is a diagram illustrating a different example of the frame configuration of a first baseband signal for user #p.

FIG. 10 is a diagram illustrating a different example of the frame configuration of the user #p first baseband signal 103_p_1. In FIG. 10, the horizontal axis is time. FIG. 10 is different from FIG. 8 in that the frame configuration in FIG. 10 is an example of the frame configuration for a single-carrier scheme, and symbols exist in the time direction. Additionally, in FIG. 10, symbols from time t1 to t22 are illustrated.

A preamble 1001 in FIG. 10 corresponds to the preamble signal 352 in FIGS. 3 and 4. At this time, the preamble may transmit data (for control), or may include symbols for signal detection, symbols for executing frequency synchronization/time synchronization, symbols for executing channel estimation (symbols for estimating channel variation), and the like.

A control information symbol 1002 in FIG. 10 is a symbol corresponding to the control information symbol signal 353 in FIGS. 3 and 4, and is a symbol including control information by which a reception apparatus that receives a signal with the frame configuration of FIG. 10 achieves demodulation and decoding of the data symbols.

A pilot symbol 1004 in FIG. 10 is a symbol corresponding to the pilot signal 351A (pa(t)) in FIGS. 3 and 4. The pilot symbol 1004 is a PSK symbol, for example, and is a symbol by which the reception apparatus that receives the frame executes channel estimation (estimation of channel variation) and estimation of the frequency offset/estimation of phase variation. For example, the transmission apparatus in FIG. 1 and the reception apparatus that receives a signal with the frame configuration of FIG. 10 preferably share the pilot symbol transmission method in common.

In FIG. 10, 1003 are data symbols for transmitting data.

The user #p mapped signal 205_1 is designated "stream #1", and the user #p mapped signal 205_2 is designated "stream #2".

The data symbols 1003 are symbols corresponding to the data symbols included in the baseband signal 206_A generated in FIG. 2. Consequently, the data symbols 1003 are the symbols of any of the three possibilities of "symbols including both the symbols of 'stream #1' and the symbols of 'stream #2'", "the symbols of 'stream #1'", and "the symbols of 'stream #2'". Which symbols among the three possibilities become the data symbols 702 is decided by the configuration of the precoding matrix used by the weight combiner 303 in FIG. 3. In other words, the data symbols 1003 correspond to the weighted signal 304A (zp1(i)).

For example, suppose that the transmission apparatus transmits the preamble 1001 at time t1 in FIG. 10, transmits the control information symbol 1002 at time t2, transmits the data symbols 1003 from time t3 to t11, transmits the pilot symbol 1004 at time t12, transmits the data symbols 1003 from time t13 to t21, and transmits the pilot symbol 1004 at time t22.

Note that, although not illustrated in FIG. 10, the frame may also include symbols other than the preamble, the control information symbol, the data symbols, and the pilot symbol. Also, the frame does not have to include all of the preamble, the control information symbol, and the pilot symbol.

Figure 11:
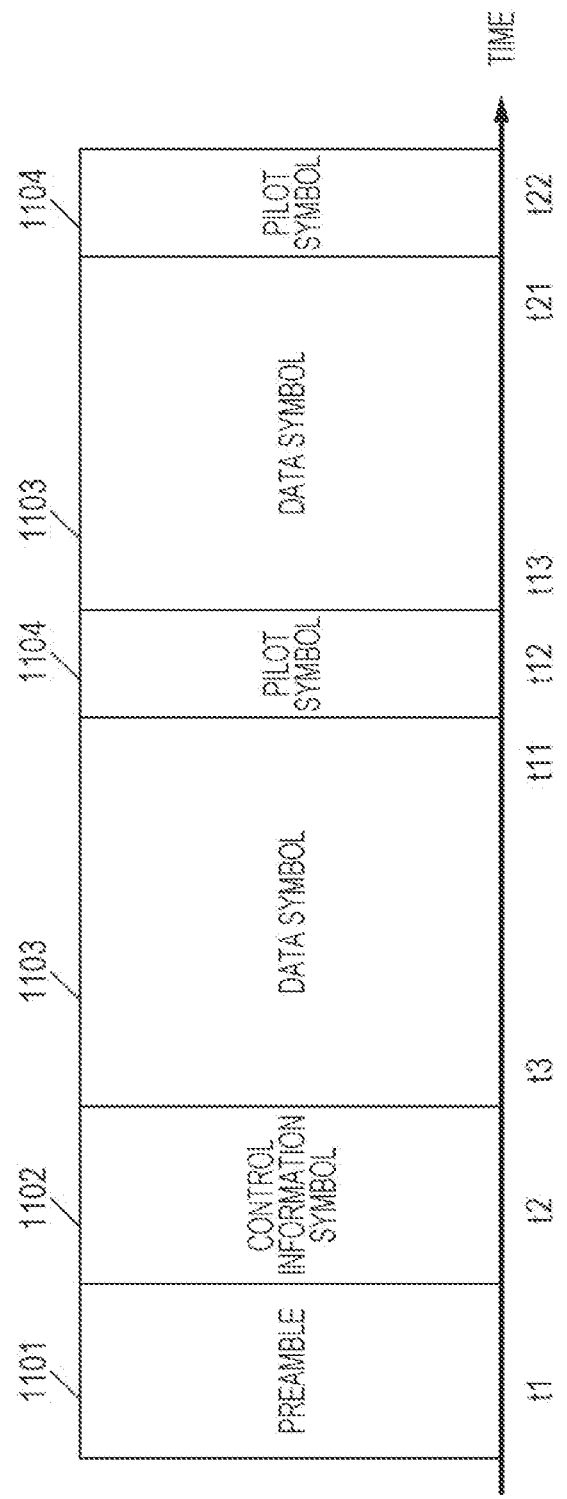
FIG. 11 is a diagram illustrating a different example of the frame configuration of a second baseband signal for user #p.

FIG. 11 is a diagram illustrating a different example of the frame configuration of the user #p second baseband signal 103_p_2. In FIG. 11, the horizontal axis is time. FIG. 11 is different from FIG. 9 in that the frame configuration in FIG. 11 is an example of the frame configuration for a single-carrier scheme, and symbols exist in the time direction. Additionally, in FIG. 11, symbols from time t1 to t22 are illustrated.

A preamble 1101 in FIG. 11 corresponds to the preamble signal 352 in FIGS. 3 and 4. At this time, the preamble may transmit data (for control), or may include symbols for signal detection, symbols for executing frequency synchronization/time synchronization, symbols for executing channel estimation (symbols for estimating channel variation), and the like.

A control information symbol 1102 in FIG. 11 is a symbol corresponding to the control information symbol signal 353 in FIGS. 3 and 4, and is a symbol including control information by which a reception apparatus that receives a signal with the frame configuration of FIG. 11 achieves demodulation and decoding of the data symbols.

A pilot symbol 1104 in FIG. 11 is a symbol corresponding to the pilot signal 351B (pb(t)) in FIGS. 3 and 4. The pilot symbol 1104 is a PSK symbol, for example, and is a symbol by which the reception apparatus that receives the frame executes channel estimation (estimation of channel variation) and estimation of the frequency offset/estimation of phase variation. For example, the transmission apparatus in FIG. 1 and the reception apparatus that receives a signal with the frame configuration of FIG. 11 preferably share the pilot symbol transmission method in common.

In FIG. 11, 1103 are data symbols for transmitting data.

The user #p mapped signal 205_1 is designated "stream #1", and the user #p mapped signal 205_2 is designated "stream #2".

The data symbols 1103 are symbols corresponding to the data symbols included in the baseband signal 206_B generated in FIG. 2. Consequently, the data symbols 1103 are the symbols of any of the three possibilities of "symbols including both the symbols of 'stream #1' and the symbols of 'stream #2'", "the symbols of 'stream #1'", and "the symbols of 'stream #2'". Which symbols among the three possibilities become the data symbols 702 is decided by the configuration of the precoding matrix used by the weight combiner 303 in FIG. 3. In other words, the data symbols 1103 correspond to the phase-changed signal 306B (zp2(i)).

For example, suppose that the transmission apparatus transmits the preamble 1101 at time t1 in FIG. 11, transmits the control information symbol 1102 at time t2, transmits the data symbols 1103 from time t3 to t11, transmits the pilot symbol 1104 at time t12, transmits the data symbols 1103 from time t13 to t21, and transmits the pilot symbol 1104 at time t22.

Note that, although not illustrated in FIG. 11, the frame may also include symbols other than the preamble, the control information symbol, the data symbols, and the pilot symbol. Also, the frame does not have to include all of the preamble, the control information symbol, and the pilot symbol.

When a symbol exists at time tz in FIG. 10, and a symbol exists at time tz in FIG. 11 (where z is an integer equal to 1 or greater), the symbol at time tz in FIG. 10 and the symbol at time tz in FIG. 11 are transmitted at identical times and identical frequencies. For example, the data symbol at time t3 in FIG. 10 and the data symbol at time t3 in FIG. 11 are transmitted at identical times and identical frequencies. Note that the frame configuration is not limited to FIGS. 10 and 11, and that FIGS. 10 and 11 are merely examples of the frame configuration.

Additionally, a method in which identical data (identical control information) is transmitted in the preamble and the control information symbol in FIGS. 10 and 11 is also possible.

Note that although the reception apparatus is expecting to receive the frame in FIG. 10 and the frame in FIG. 11 at the same time, the reception apparatus is able to obtain the data transmitted by the transmission apparatus even if only the frame in FIG. 10 or only the frame in FIG. 11 is received.

Additionally, in the user #1 signal processor 102_1 of FIG. 1, in the case of outputting the first baseband signal 103_1_1 and the second baseband signal 103_1_2, the first baseband signal 103_1_1 and the second baseband signal 103_1_2 take the frame configurations of FIG. 10 and FIG. 11, respectively. Similarly, in the user #2 signal processor 102_2 of FIG. 1, in the case of outputting the first baseband signal 103_2_1 and the second baseband signal 103_2_2, the first baseband signal 103_2_1 and the second baseband signal 103_2_2 take the frame configurations of FIG. 10 and FIG. 11, respectively. Similarly, in the user #M signal processor 102_M of FIG. 1, in the case of outputting the first baseband signal 103_M_1 and the second baseband signal 103_M_2, the first baseband signal 103_M_1 and the second baseband signal 103_M_2 take the frame configurations of FIG. 10 and FIG. 11, respectively.

<Symbol Arrangement Method>

Next, the symbol arrangement method in the present embodiment will be described. Symbols are sorted on the frequency axis and/or the time axis by the interleaver. For example, symbol arranging is executed in the user #p signal processor 102_p by the error-correcting coder 202 and/or the mapper 204 illustrated in FIG. 2, for example.

Figure 12:
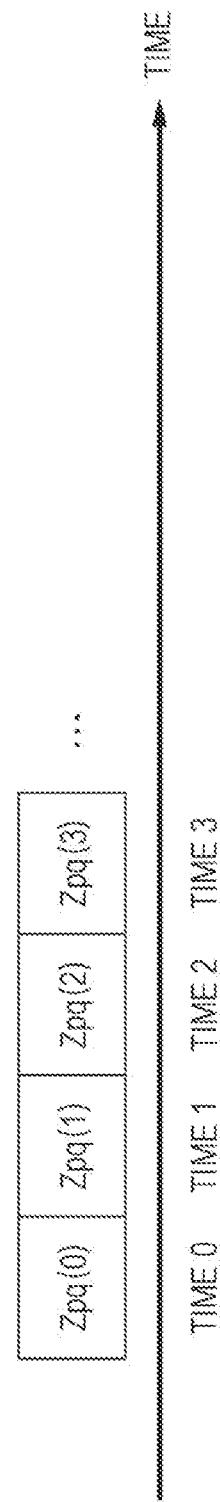
FIG. 12 is a diagram illustrating an example of a method of arranging symbols with respect to the time axis.

FIG. 12 is a diagram illustrating an example of a symbol arrangement method with respect to the time axis of the weighted signal 304A (zp1(i)) and the phase-changed signal 306B (zp2(i)).

In FIG. 12, symbols are denoted as zpq(0). At this time, q is 1 or 2. Thus, zpq(0) in FIG. 12 expresses "in zp1(i) and zp2(i), zp1(0) and zp2(0) when the symbol number i=0". Similarly, zpq(1) expresses "in zp1(i) and zp2(i), zp1(1) and zp2(1) when the symbol number i=1". In other words, zpq(X) expresses "in zp1(i) and zp2(i), zp1(X) and zp2(X) when the symbol number i=X". Note that the same applies to FIGS. 13, 14, and 15.

In the example of FIG. 12, the symbol zpq(0) with the symbol number i=0 is arranged at time 0, the symbol zpq(1) with the symbol number i=1 is arranged at time 1, the symbol zpq(2) with the symbol number i=2 is arranged at time 2, and the symbol zpq(3) with the symbol number i=3 is arranged at time 3. In this way, the symbols in the weighted signal 304A (zp1(i)) and the phase-changed signal 306B (zp2(i)) are arranged with respect to the time axis. However, FIG. 12 is an example, and the relationship between symbol number and time is not limited thereto.

Figure 13:
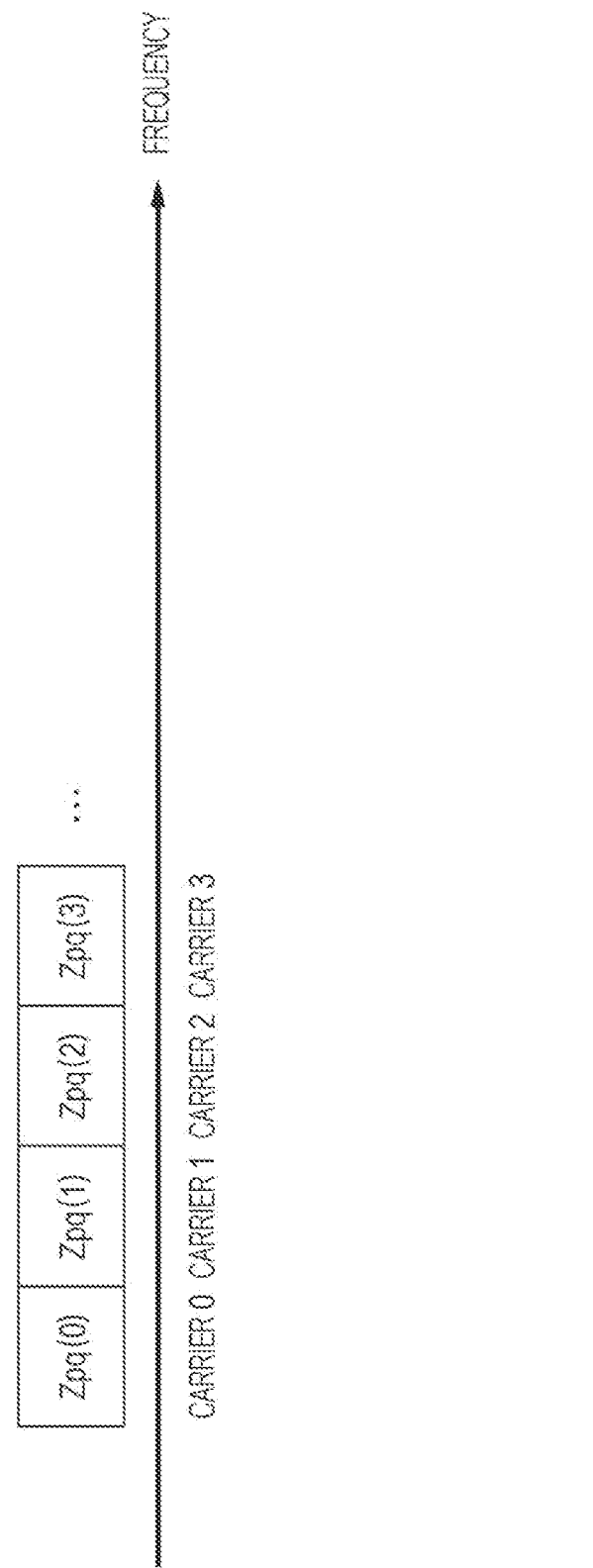
FIG. 13 is a diagram illustrating an example of a method of arranging symbols with respect to the frequency axis.

FIG. 13 is a diagram illustrating an example of a symbol arrangement method with respect to the frequency axis of the weighted signal 304A (zp1(i)) and the phase-changed signal 306B (zp2(i)).

In the example of FIG. 13, the symbol zpq(0) with the symbol number i=0 is arranged at carrier 0, the symbol zpq(1) with the symbol number i=1 is arranged at carrier 1, the symbol zpq(2) with the symbol number i=2 is arranged at carrier 2, and the symbol zpq(3) with the symbol number i=3 is arranged at carrier 3. In this way, symbols are arranged with respect to the frequency axis of the weighted signal 304A (zp1(i)) and the phase-changed signal 306B (zp2(i)). However, FIG. 13 is an example, and the relationship between symbol number and frequency is not limited thereto.

Figure 14:
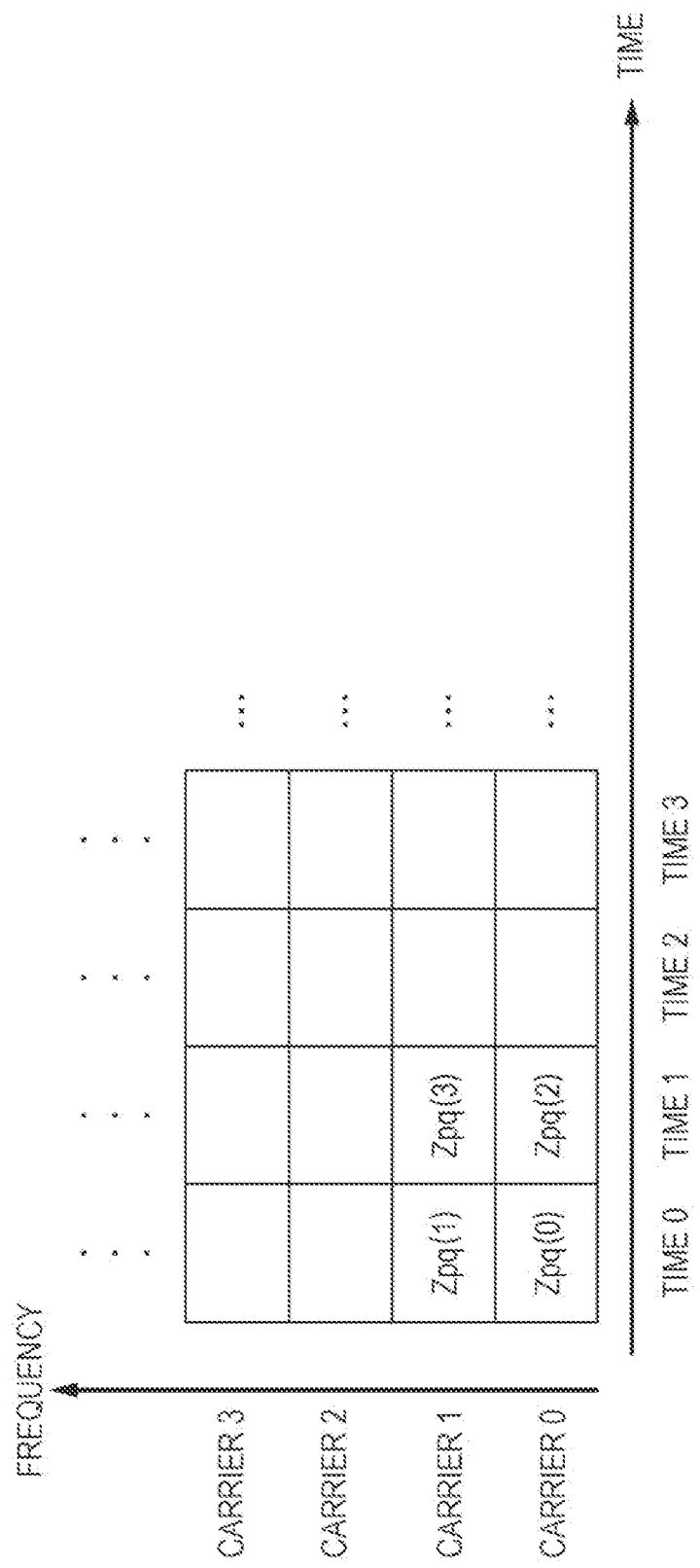
FIG. 14 is a diagram illustrating an example of arranging symbols with respect to the time-frequency axes.

FIG. 14 is a diagram illustrating an example of symbol arrangement with respect to the time/frequency axes of the weighted signal 304A (zp1(i)) and the phase-changed signal 306B (zp2(i)).

In the example of FIG. 14, the symbol zpq(0) with the symbol number i=0 is arranged at time 0 and carrier 0, the symbol zpq(1) with the symbol number i=1 is arranged at time 0 and carrier 1, the symbol zpq(2) with the symbol number i=2 is arranged at time 1 and carrier 0, and the symbol zpq(3) with the symbol number i=3 is arranged at time 1 and carrier 1. In this way, symbols are arranged with respect to the time and frequency axes of the weighted signal 304A (zp1(i)) and the phase-changed signal 306B (zp2(i)). However, FIG. 14 is an example, and the relationship between symbol number and time/frequency is not limited thereto.

Figure 15:
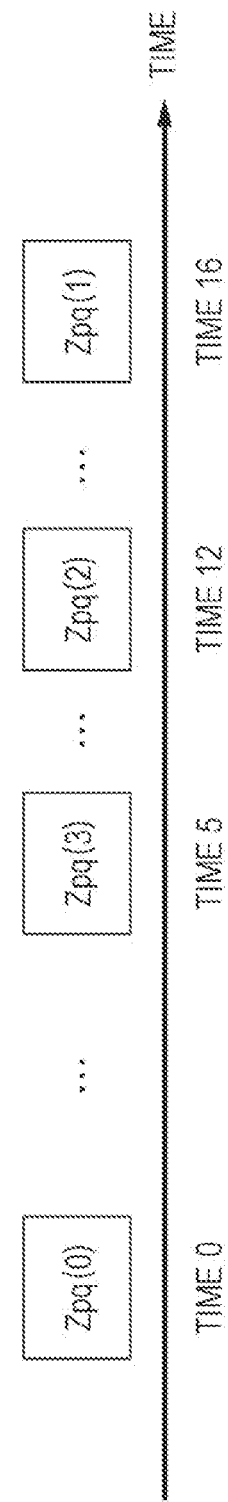
FIG. 15 is a diagram illustrating an example of arranging symbols with respect to the time axis.

FIG. 15 is a diagram illustrating an example of a symbol arrangement with respect to the time axis of the weighted signal 304A (zp1(i)) and the phase-changed signal 306B (zp2(i)).

In the example of FIG. 15, the symbol zpq(0) with the symbol number i=0 is arranged at time 0, the symbol zpq(1) with the symbol number i=1 is arranged at time 16, the symbol zpq(2) with the symbol number i=2 is arranged at time 12, and the symbol zpq(3) with the symbol number i=3 is arranged at time 5. In this way, symbols are arranged with respect to the time axis of the weighted signal 304A (zp1(i)) and the phase-changed signal 306B (zp2(i)) in FIG. 3. In other words, in the example of FIG. 15, symbols are sorted in the time axis direction. However, FIG. 15 is an example, and the relationship between symbol number and time is not limited thereto.

Note that in FIG. 15, each symbol is designated zpq(i), but the symbols may also be symbols generated by multiplexing signals directed at multiple users by the multiplexing signal processor 104 in FIG. 1. Also, the example of FIG. 15 may also be the symbol arrangement in the case in which each from the radio section $1 (106_1) to the radio section $N (106_N) in FIG. 1 includes an interleaver (the part that sorts symbols), and each interleaver sorts the symbols. The position where interleaving is executed is not limited to the user signal processor or the radio section.

Figure 16:
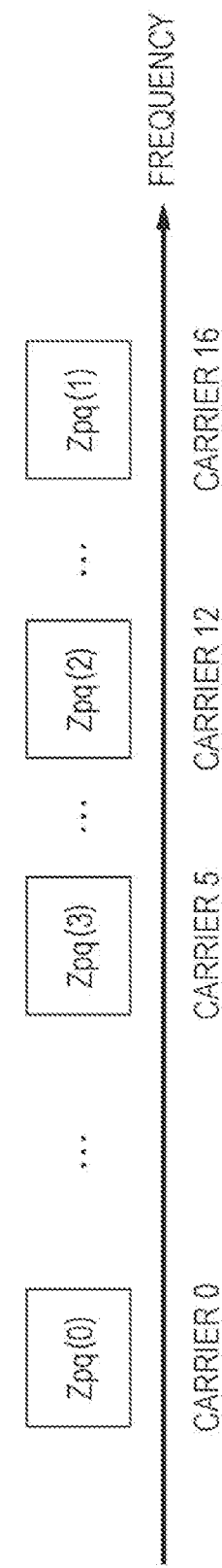
FIG. 16 is a diagram illustrating an example of arranging symbols with respect to the frequency axis.

FIG. 16 is a diagram illustrating an example of a symbol arrangement with respect to the frequency axis of the weighted signal 304A (zp1(i)) and the phase-changed signal 306B (zp2(i)).

In the example of FIG. 16, the symbol zpq(0) with the symbol number i=0 is arranged at carrier 0, the symbol zpq(1) with the symbol number i=1 is arranged at carrier 16, the symbol zpq(2) with the symbol number i=2 is arranged at carrier 12, and the symbol zpq(3) with the symbol number i=3 is arranged at carrier 5. In this way, symbols are arranged with respect to the frequency axis of the weighted signal 304A (zp1(i)) and the phase-changed signal 306B (zp2(i)) in FIG. 3. However, FIG. 16 is an example, and the relationship between symbol number and frequency is not limited thereto.

Note that in FIG. 16, each symbol is designated zpq(i), but the symbols may also be symbols generated by multiplexing signals directed at multiple users by the multiplexing signal processor 104 in FIG. 1. Also, the example of FIG. 16 may also be the symbol arrangement in the case in which each from the radio section $1 (106_1) to the radio section $N (106_N) in FIG. 1 includes an interleaver (the part that sorts symbols), and each interleaver sorts the symbols. The position where interleaving is executed is not limited to the user signal processor or the radio section.

Figure 17:
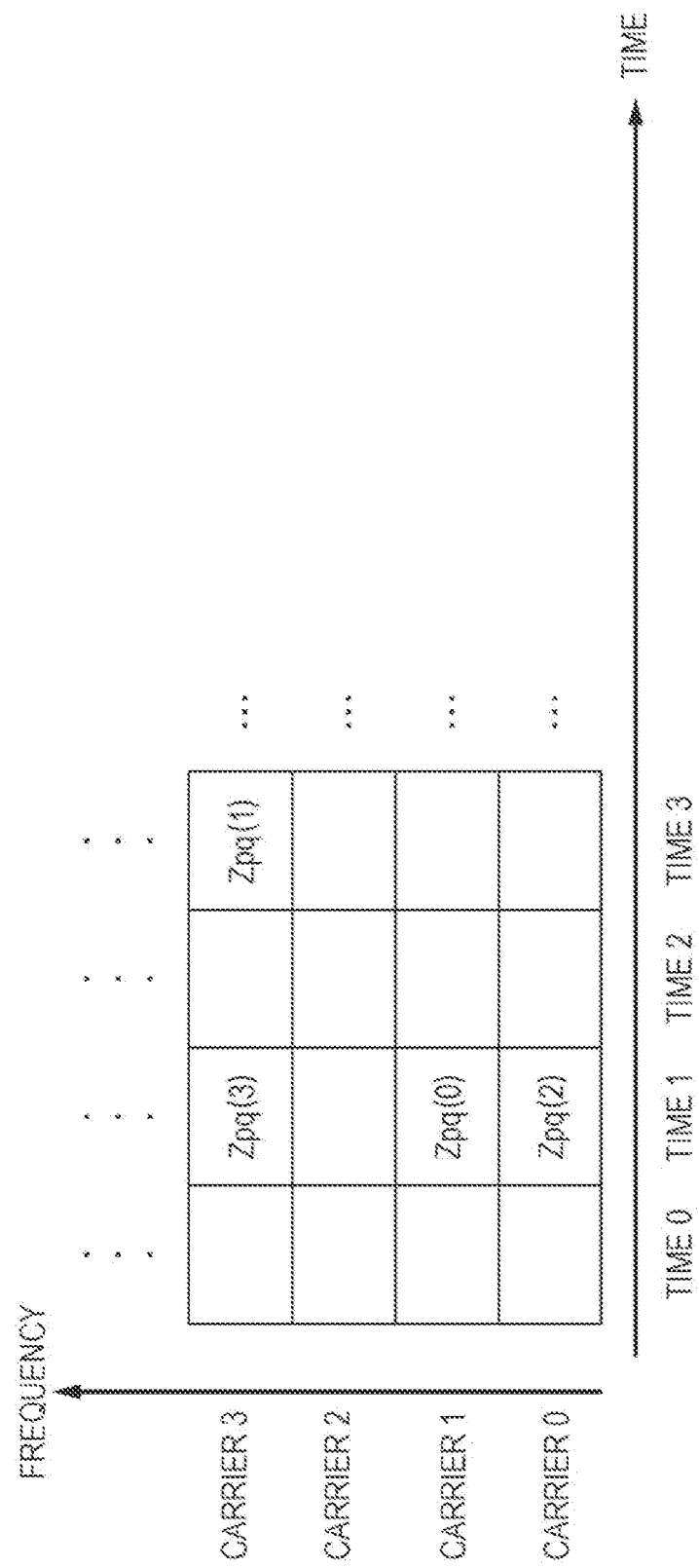
FIG. 17 is a diagram illustrating an example of arranging symbols with respect to the time-frequency axes.

FIG. 17 is a diagram illustrating an example of symbol arrangement with respect to the time/frequency axes of the weighted signal 304A (zp1(i)) and the phase-changed signal 306B (zp2(i)).

In the example of FIG. 17, the symbol zpq(0) with the symbol number i=0 is arranged at time 1 and carrier 1, the symbol zpq(1) with the symbol number i=1 is arranged at time 3 and carrier 3, the symbol zpq(2) with the symbol number i=2 is arranged at time 1 and carrier 0, and the symbol zpq(3) with the symbol number i=3 is arranged at time 1 and carrier 3. In this way, symbols are arranged with respect to the time and frequency axes of the weighted signal 304A (zp1(i)) and the phase-changed signal 306B (zp2(i)) in FIG. 3. However, FIG. 17 is an example, and the relationship between symbol number and time/frequency is not limited thereto.

Note that in FIG. 17, each symbol is designated zpq(i), but the symbols may also be symbols generated by multiplexing signals directed at multiple users by the multiplexing signal processor 104 in FIG. 1. Also, the example of FIG. 17 may also be the symbol arrangement in the case in which each from the radio section $1 (106_1) to the radio section $N (106_N) in FIG. 1 includes an interleaver (the part that sorts symbols), and each interleaver sorts the symbols. The position where interleaving is executed is not limited to the user signal processor or the radio section.

Note that although symbol arranging is executed in the user #p signal processor 102_p by the error-correcting coder 202 and/or the mapper 204 illustrated in FIG. 2, for example, the configuration is not limited thereto. As described earlier, it is also possible to take a configuration in which each from the radio section $1 (106_1) to the radio section $N (106_N) in FIG. 1 includes an interleaver (the part that sorts symbols), and each interleaver sorts the symbols. Alternatively, the multiplexing signal processor 104 may include an interleaver, and the interleaver may execute the symbol arranging illustrated in FIGS. 12 to 17. Hereinafter, the multiplexing signal processor 104 in the case of including an interleaver will be described using FIG. 18.

<Different Example of Configuration of Multiplexing Signal Processor>

Figure 18:
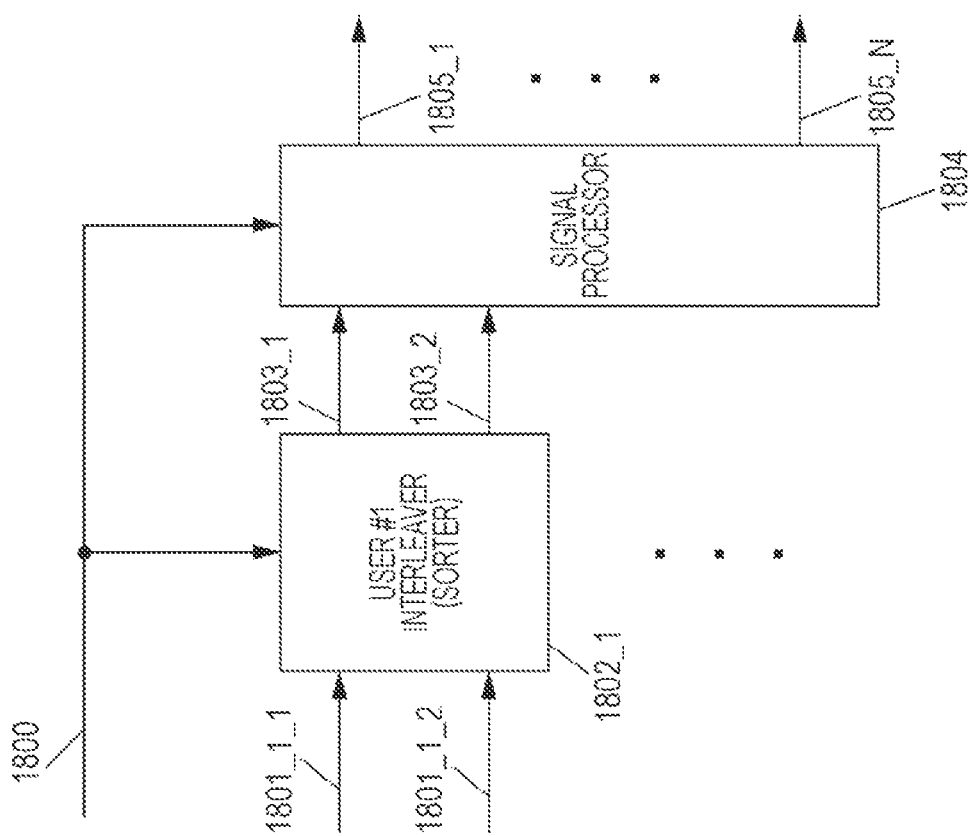
FIG. 18 is a diagram illustrating a configuration in a case of including an interleaver in a multiplexing signal processor.

FIG. 18 is a diagram illustrating the configuration in the case in which the multiplexing signal processor 104 in FIG. 1 includes an interleaver (the part that sorts symbols).

A user #1 interleaver (sorter) 1802_1 accepts signal-processed signals 1801_1_1 and 1801_1_2, as well as a control signal 1800 as input. The signal-processed signals 1801_1_1 and 1801_1_2 correspond to the user #1 first baseband signal 103_1_1 and the user #1 second baseband signal 103_1_2 in FIG. 1, respectively. The control signal 1800 corresponds to the control signal 100 in FIG. 1.

The user #1 interleaver (sorter) 1802_1, following the control signal 1800, for example, sorts symbols like in FIGS. 12 to 17, and outputs user #1 sorted signals 1803_1 and 1803_2.

Note that multiplexing signal processor 104 is similarly provided with a user #2 interleaver to a user #M interleaver. Each from the user #2 interleaver to the user #M interleaver includes functions similar to the user #1 interleaver 1802_1.

A signal processor 1804 accepts the control signal 1800, the user #1 sorted signals 1803_1 and 1803_2, and the like as input. Also, the sorted signals of other users are also input into the signal processor 1804. Following the control signal 1800, the signal processor 1804 executes signal processing such as the weight combining described earlier on the sorted signals, and outputs multiplexed signal $1 baseband signal 1805_1 to multiplexed signal $N baseband signal 1805_N. Note that the multiplexed signal $1 baseband signal 1805_1 to the multiplexed signal $N baseband signal 1805_N correspond to the multiplexed signal $1 baseband signal 105_1 to the multiplexed signal $N baseband signal 105_N in FIG. 1, respectively.

The above thus describes an example of a transmission apparatus according to the present embodiment. Next, an example of the configuration of a reception apparatus according to the present embodiment will be described.

<Example of Configuration of Reception Apparatus>

Figure 19:
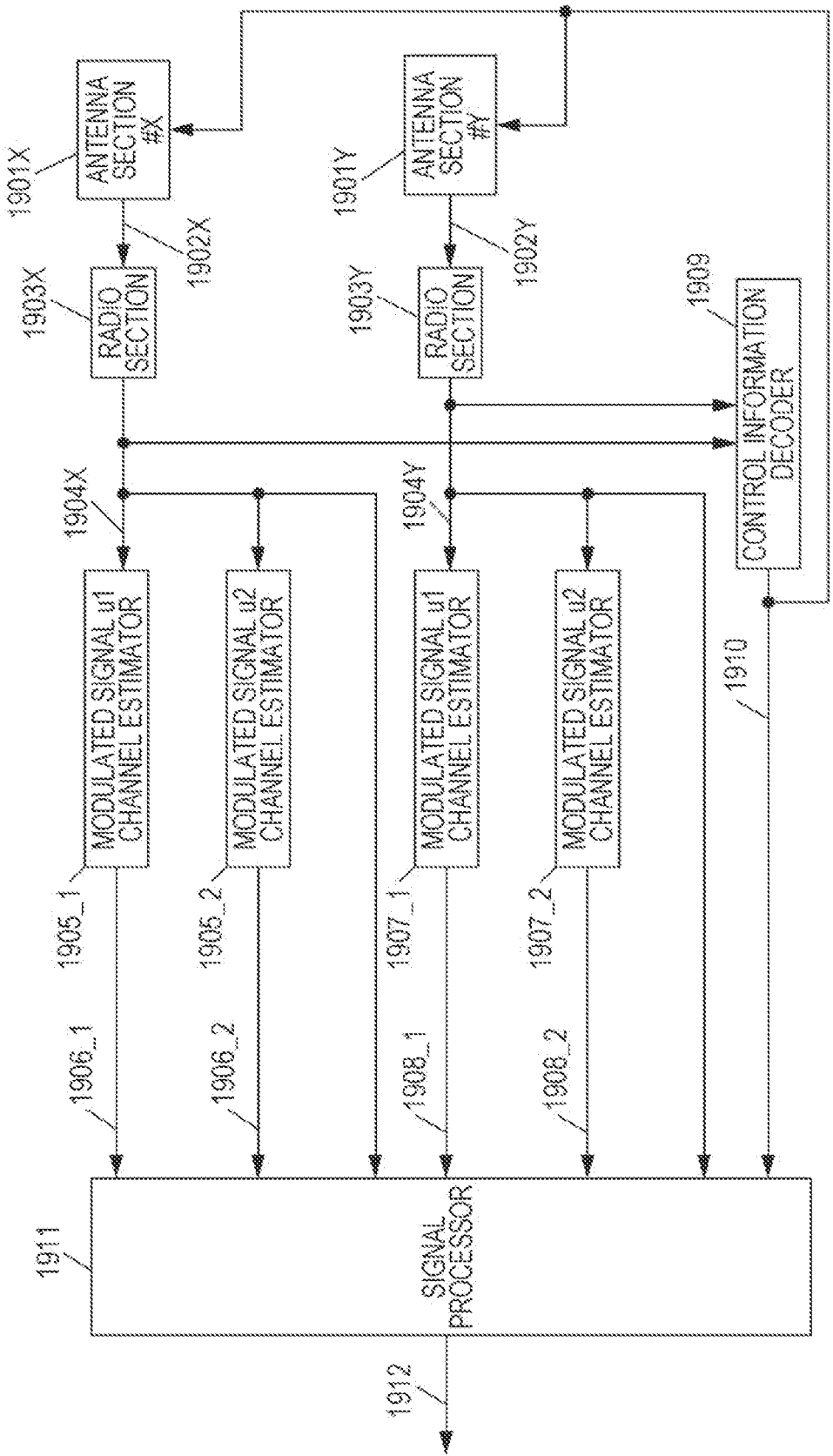
FIG. 19 is a diagram illustrating an example of a configuration of a reception apparatus according to the present embodiment.

FIG. 19 is a diagram illustrating an example of the configuration of the reception apparatus in the present embodiment. The reception apparatus in FIG. 19 is the reception apparatus of terminals corresponding from user 41 to user #p from among users #M that receive a modulated signal when the transmission apparatus in FIG. 1 transmits a transmission signal with the frame configuration in FIGS. 8 and 9 or FIGS. 10 and 11, for example.

A radio section 1903X accepts a received signal 1902X received by an antenna section #X (1901X) as input. The radio section 1903X performs reception processing such as frequency conversion and a Fourier transform, and outputs a baseband signal 1904X to a modulated signal u1 channel estimator 1905_1 and a modulated signal u2 channel estimator 1905_2.

Similarly, the radio section 1903Y accepts a received signal 1902Y received by an antenna section #Y (1901Y) as input. The radio section 1903Y performs reception processing such as frequency conversion and a Fourier transform, and outputs a baseband signal 1904Y.

Note that FIG. 19 illustrates a configuration in which a control signal 1910 is input into the antenna section #X (1901X) and the antenna section #Y (1901Y), but a configuration in which the control signal 1910 is not input is also acceptable. The configuration of the antenna sections in which the control signal 1910 is present as input will be described later.

The modulated signal u1 channel estimator 1905_1 and the modulated signal u2 channel estimator 1905_2 execute channel estimation on the basis of the baseband signal 1904X. A modulated signal u1 channel estimator 1907_1 and a modulated signal u2 channel estimator 1907_2 execute channel estimation on the basis of the baseband signal 1904X. Channel estimation will be described with reference to FIG. 20.

Figure 20:
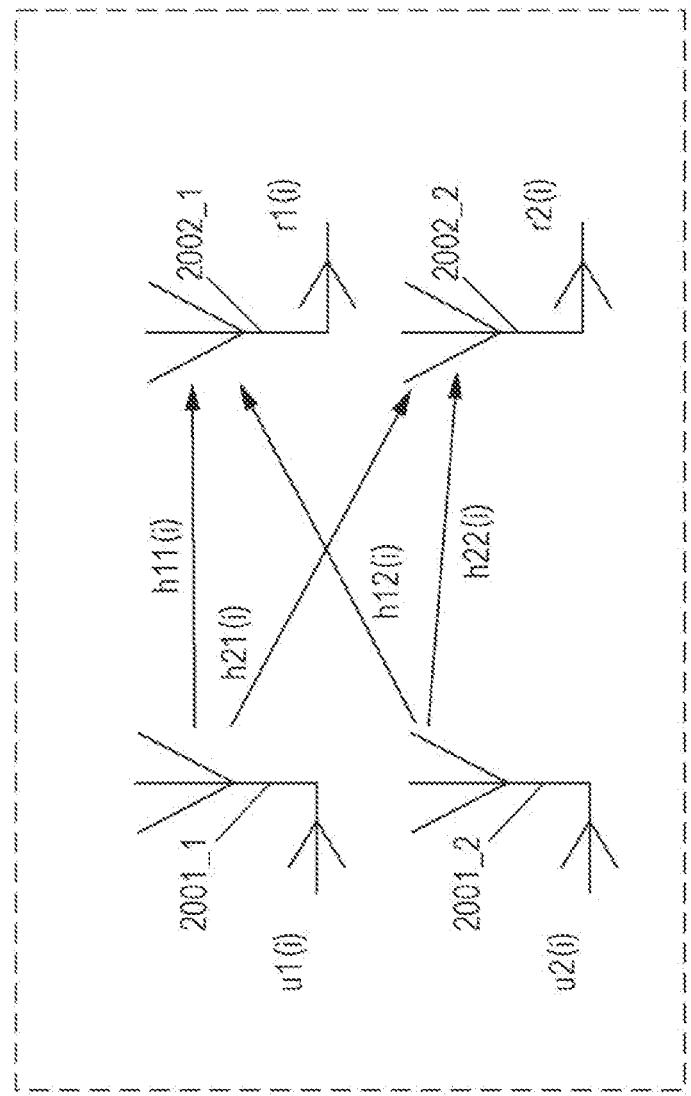
FIG. 20 is a diagram illustrating the relationship between the transmission apparatus and the reception apparatus.

FIG. 20 is a diagram illustrating the relationship between a transmission apparatus and a reception apparatus. The antenna 2001_1 and 2001_2 in FIG. 20 are transmission antennas. The antenna 2001_1 in FIG. 20 corresponds to the antenna section in FIG. 1 used to transmit a transmission signal u1(i), for example. Additionally, the antenna 2001_2 in FIG. 20 corresponds to the antenna section in FIG. 1 used to transmit a transmission signal u2(i), for example. Note that the correspondence between FIG. 20 and FIG. 1 is not limited to the above.

Additionally, the antenna 2002_1 and 2002_2 in FIG. 20 are reception antennas. The antenna 2002_1 in FIG. 20 corresponds to the antenna section #X (1901X) in FIG. 19. The antenna 2002_2 in FIG. 20 corresponds to the antenna section #Y (1901Y) in FIG. 19.

Like in FIG. 20, the signal transmitted from the transmission antenna 2001_1 is designated u1(i), the signal transmitted from the transmission antenna 2001_2 is designated u2(i), the signal received by the receiving antenna 2002_1 is designated r1(i), and the signal received by the reception antenna 2002_2 is designated r2(i). Note that i indicates the symbol number, and is, for example, an integer equal to 0 or greater.

Additionally, a propagation coefficient from the transmission antenna 2001_1 to the reception antenna 2002_1 is designated h11(i), a propagation coefficient from the transmission antenna 2001_1 to the reception antenna 2002_2 is designated h21(i), a propagation coefficient from the transmission antenna 2001_2 to the reception antenna 2002_1 is designated h12(i), and a propagation coefficient from the transmission antenna 2001_2 to the reception antenna 2002_2 is designated h22(i). Then, the relation expressed in the following Formula (41) holds.

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} u1(i) \\ u2(i) \end{pmatrix} + \begin{pmatrix} n1(i) \\ n2(i) \end{pmatrix} \quad (41)$$

Note that n1(i) and n2(i) are noise.

The modulated signal u1 channel estimator 1905_1 in FIG. 19 accepts the baseband signal 1904X as input, uses the preamble and/or the pilot symbol in FIGS. 8 and 9 (or FIGS. 10 and 11) to execute channel estimation of the modulated signal u1, or in other words, estimates h11(i) of Formula (41), and outputs a channel estimation signal 1906_1.

The modulated signal u2 channel estimator 1905_2 accepts the baseband signal 1904X as input, uses the preamble and/or the pilot symbol in FIGS. 8 and 9 (or FIGS. 10 and 11) to execute channel estimation of the modulated signal u2, or in other words, estimates h12(i) of Formula (41), and outputs a channel estimation signal 1906_2.

The modulated signal u1 channel estimator 1907_1 accepts the baseband signal 1904Y as input, uses the preamble and/or the pilot symbol in FIGS. 8 and 9 (or FIGS. 10 and 11) to execute channel estimation of the modulated signal u1, or in other words, estimates h21(i) of Formula (41), and outputs a channel estimation signal 1908_1.

The modulated signal u2 channel estimator 1907_2 accepts the baseband signal 1904Y as input, uses the preamble and/or the pilot symbol in FIGS. 8 and 9 (or FIGS. 10 and 11) to execute channel estimation of the modulated signal u2, or in other words, estimates h22(i) of Formula (41), and outputs a channel estimation signal 1908_2.

A control information decoder 1909 that accepts the baseband signals 1904X and 1904Y as input demodulates and decodes the control information in FIGS. 8 and 9 (or FIGS. 10 and 11), and outputs a control signal 1910 including control information.

A signal processor 1911 accepts the channel estimation signals 1906_1, 1906_2, 1908_1, and 1908_2, the baseband signals 1904X and 1904Y, and the control signal 1910 as input. The signal processor 1911 executes demodulation and decoding using the relationship in Formula (41) and also on the basis of the control information in the control signal 1910 (for example, information about the modulation scheme, and a scheme related to the error-correcting code), and outputs received data 1912.

Note that the control signal 1910 does not have to be generated by a method like that of FIG. 19. For example, the control signal 1910 in FIG. 19 may also be generated on the basis of information transmitted by the apparatus (FIG. 1) on the other end of the communication in FIG. 19. Alternatively, the reception apparatus in FIG. 19 may be provided with an input section, and the control signal 1910 may also be generated on the basis of information input from the input section.

<Example of Configuration of Antenna Section>

Figure 21:
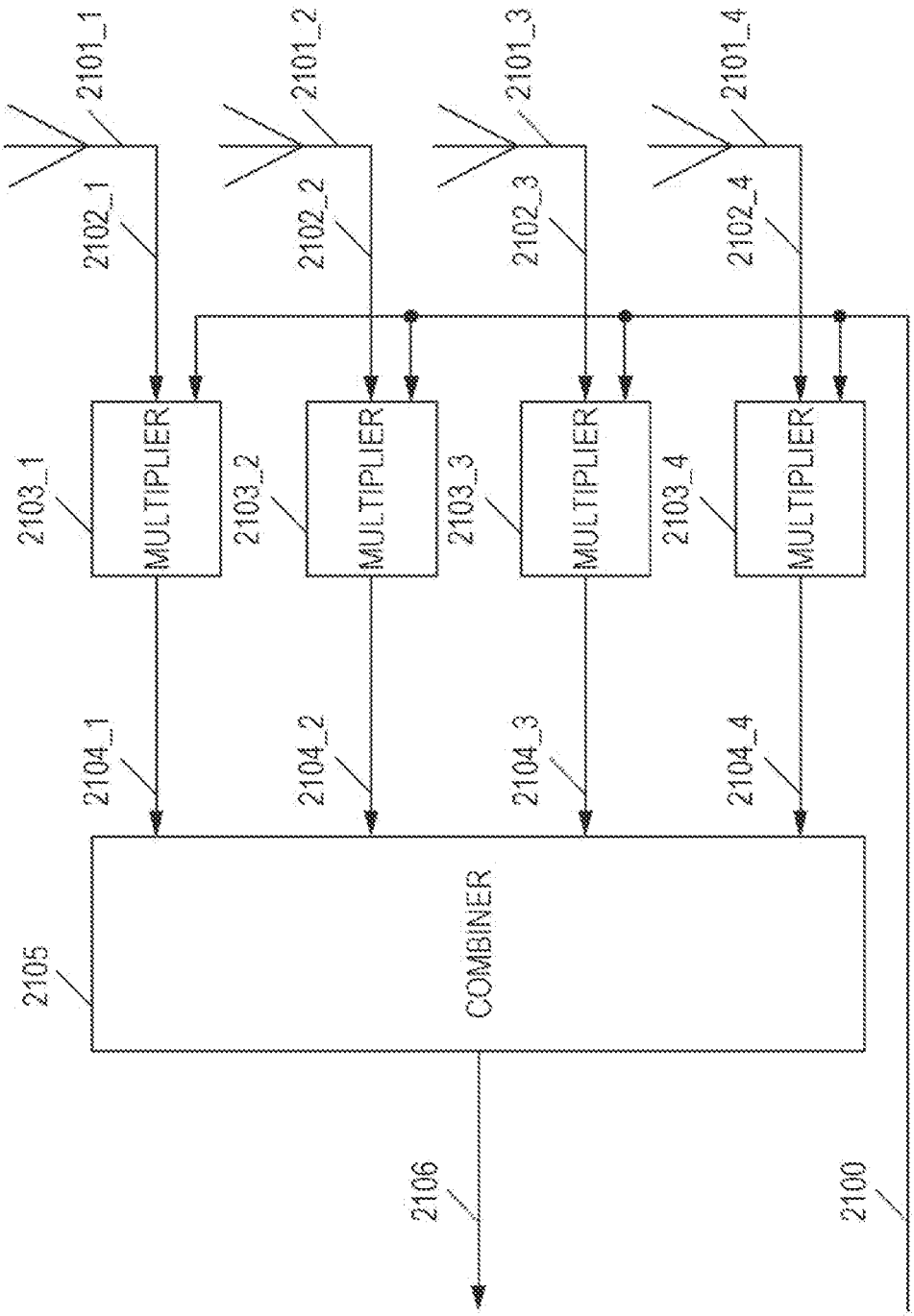
FIG. 21 is a diagram illustrating an example of a configuration of the antenna section in FIG. 19.

Next, the configuration of the antenna sections in which the control signal 1910 is present as input will be described. FIG. 21 is a diagram illustrating an example of the configuration of the antenna section (antenna section #X (1901X) or antenna section #Y (1901Y)) in FIG. 19. Note that the example in FIG. 19 is an example in which the antenna section is configured with four antennas 2101_1 to 2101_4.

A multiplier 2103_1 accepts a received signal 2102_1 received by the antenna 2101_1 and the control signal 2100 as input. On the basis of information about a multiplication coefficient included in the control signal 2100, the multiplier 2103_1 multiplies the received signal 2102_1 by the multiplication coefficient, and outputs a multiplied signal 2104_1.

Provided that the received signal 2102_1 is Rx1(t) (where t is time), and the multiplication coefficient is D1 (where D1 may be defined as a complex number, and thus may also be a real number), the multiplied signal 2104_1 is expressed as Rx1(t)×D1.

A multiplier 2103_2 accepts a received signal 2102_2 received by the antenna 2101_2 and the control signal 2100 as input. On the basis of information about a multiplication coefficient included in the control signal 2100, the multiplier 2103_2 multiplies the received signal 2102_2 by the multiplication coefficient, and outputs a multiplied signal 2104_2.

Provided that the received signal 2102_2 is Rx2(t), and the multiplication coefficient is D2 (where D2 may be defined as a complex number, and thus may also be a real number), the multiplied signal 2104_2 is expressed as Rx2(t)×D2.

A multiplier 2103_3 accepts a received signal 2102_3 received by the antenna 2101_3 and the control signal 2100 as input. On the basis of information about a multiplication coefficient included in the control signal 2100, the multiplier 2103_3 multiplies the received signal 2102_3 by the multiplication coefficient, and outputs a multiplied signal 2104_3.

Provided that the received signal 2102_3 is Rx3(t), and the multiplication coefficient is D3 (where D3 may be defined as a complex number, and thus may also be a real number), the multiplied signal 2104_3 is expressed as Rx3(t)×D3.

A multiplier 2103_4 accepts a received signal 2102_4 received by the antenna 2101_4 and the control signal 2100 as input. On the basis of information about a multiplication coefficient included in the control signal 2100, the multiplier 2103_4 multiplies the received signal 2102_4 by the multiplication coefficient, and outputs a multiplied signal 2104_4.

Provided that the received signal 2102_4 is Rx4(t), and the multiplication coefficient is D4 (where D4 may be defined as a complex number, and thus may also be a real number), the multiplied signal 2104_4 is expressed as Rx4(t)×D4.

A combiner 2105 accepts the multiplied signals 2104_1, 2104_2, 2104_3, and 2104_4 as input. The combiner 2105 combines the multiplied signals 2104_1, 2104_2, 2104_3, and 2104_4, and outputs a combined signal 2106. Note that the combined signal 2106 is expressed as Rx1(t)×D1+Rx2(t)×D2+Rx3(t)×D3+Rx4(t)×D4.

In FIG. 21, an example is described in which the antenna section is configured with four antennas (and four multipliers), but the number of antennas is not limited to four, and it is sufficient for the antenna section to include two or more antennas.

Additionally, in the case in which the antenna section #X (1901X) in FIG. 19 takes the configuration of FIG. 21, the received signal 1902X corresponds to the combined signal 2106 in FIG. 21, and the control signal 1910 corresponds to the control signal 2100 in FIG. 21. Also, in the case in which the antenna section #Y (1901Y) in FIG. 19 takes the configuration of FIG. 21, the received signal 1902Y corresponds to the combined signal 2106 in FIG. 21, and the control signal 1910 corresponds to the control signal 2100 in FIG. 21.

However, the antenna section #X (1901X) and the antenna section #Y (1901Y) do not have to be configured like FIG. 21, and as described earlier, the antenna sections do not have to accept the control signal 1910 as input. The antenna section #X (1901X) and the antenna section #Y (1901Y) may also have one antenna each.

Note that the control signal 1910 may also be generated on the basis of information transmitted by the transmission apparatus on the other end of the communication. Alternatively, an input section may be provided, and the control signal 1910 may also be generated on the basis of information input from the input section.

As above, in the present embodiment, by having the transmission apparatus in FIG. 1 use multiple antennas to transmit the modulated signals (baseband signals) of multiple users at identical times and identical frequencies (bands), the advantageous effect of improved data transmission efficiency of the transmission apparatus in FIG. 1 may be obtained. Note that the transmission apparatus in FIG. 1 sets whether to transmit multiple streams or transmit a single stream (or not to transmit a modulated signal) for each user, and in addition, sets a modulation scheme (in the case of multiple mappers, a set of modulation schemes) and an error-correcting coding scheme for each user, and thereby is able to control the data transmission efficiency favorably.

Note that when the transmission apparatus in FIG. 1 transmits multiple modulated signals (baseband signals) to users, by performing phase change, in an environment in which direct waves are dominant, an advantageous effect of raising the possibility of being able to avoid falling into a steady reception state, and improving the received signal quality of data at a reception apparatus on the other end of communication may be obtained.

Embodiment 2

In the present embodiment, a communication apparatus including the transmission apparatus of FIG. 1 described in Embodiment 1, a communication apparatus provided with the reception apparatus of FIG. 19 described in Embodiment 1, and an example of the flow of communication between the communication apparatus will be described.

Note for the sake of the following description, the communication apparatus provided with the transmission apparatus of FIG. 1 will be called the "base station (access point (AP))", and the communication apparatus provided with the reception apparatus of FIG. 19 will be called the "terminal".

Consequently, the user #1 signal processor 102_1 is a signal processor for generating a modulated signal for transmitting data to terminal #1, the user #2 signal processor 102_2 is a signal processor for generating a modulated signal for transmitting data to terminal #2, and the user #M signal processor 102_M is a signal processor for generating a modulated signal for transmitting data to terminal #M.

Figure 22:
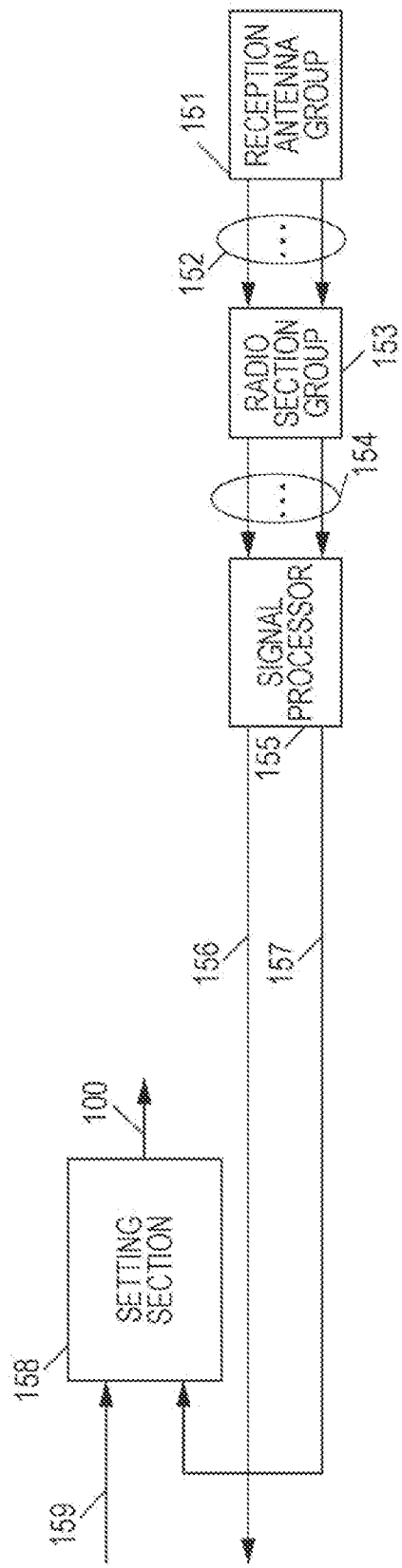
FIG. 22 is a diagram illustrating an example of a configuration provided together with the transmission apparatus of FIG. 1 in a base station (AP)

FIG. 22 is a diagram illustrating an example of a configuration provided together with the transmission apparatus of FIG. 1 in the base station (AP). In FIG. 22, parts of the configuration which are similar to FIG. 1 are denoted with the same numbers, and description is omitted.

A radio section group 153 accepts a received signal group 152 received by a reception antenna group 151 as input. The radio section group 153 performs processing such as frequency conversion on the received signal group 152, and outputs a baseband signal group 154 to a signal processor 155.

The signal processor 155 executes processing such as demodulation and error-correcting decoding on the input baseband signal group, and outputs received data 156 as well as control information 157. At this time, the control information 157 includes feedback information transmitted by each terminal.

A setting section 158 accepts base station (AP) settings information 159 and the control information 157 as input. The setting section 158 "decides the error-correcting coding method, the transmission method, the modulation scheme (or modulation scheme set), and the like in the user #1 signal processor 102_1 of FIG. 1", "decides the error-correcting coding method, the transmission method, the modulation scheme (or modulation scheme set), and the like in the user #2 signal processor 102_2 of FIG. 1", and "decides the error-correcting coding method, the transmission method, the modulation scheme (or modulation scheme set), and the like in the user #M signal processor 102_M of FIG. 1", and outputs a signal including the decided information as the control signal 100.

Also, on the basis of the feedback information transmitted by each terminal and included in the control information 157, the setting section 158 decides the processing method to be executed by the multiplexing signal processor 104, and outputs a signal including information about the decided processing method as the control signal 100.

Note that in FIG. 22, the term "group" is used, but it is sufficient to have at least one reception subsystem.

Figure 23:
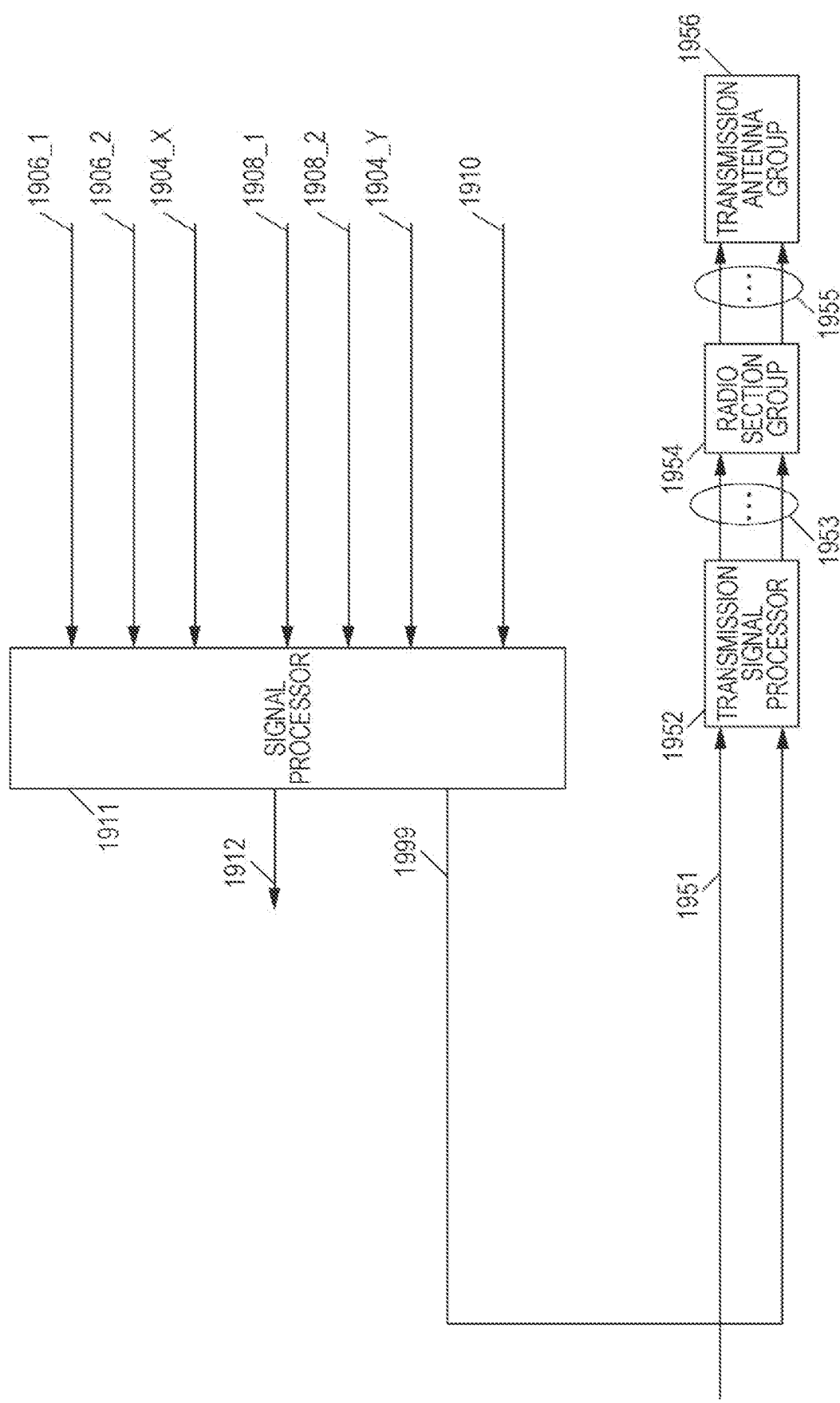
FIG. 23 is a diagram illustrating an example of a configuration provided together with the reception apparatus of FIG. 19 in a terminal.

FIG. 23 is a diagram illustrating an example of a configuration provided together with the reception apparatus of FIG. 19 in a terminal. In FIG. 23, parts which operate similarly to FIG. 19 are denoted with the same numbers.

The signal processor 1911 accepts the channel estimation signal 1906_1, the channel estimation signal 1906_2, the baseband signal 1904X, the channel estimation signal 1908_1, the channel estimation signal 1908_2, the baseband signal 1904Y, and the control signal 1910 as input. The signal processor 1911 executes demodulation and error-correcting decoding processing, and outputs the received data 1912. Also, the signal processor 1911, on the basis of a signal transmitted by the base station (AP), generates feedback information related to the state of the received signal, and outputs feedback information 1999.

A transmission signal processor 1952 accepts data 1951 and the feedback information 1999 as input. The transmission signal processor 1952 performs processing such as error-correcting coding and modulation on the data 1951 and the feedback information 1999, generates a baseband signal group 1953, and outputs the baseband signal group 1953 to a radio section group 1954.

The radio section group 1954 performs processing such as frequency conversion and amplification on the input baseband signal group 1953, and generates a transmission signal group 1955. The radio section group 1954 outputs the transmission signal group 1955 to a transmission antenna group 1956. Subsequently, the transmission signal group 1955 is output as radio waves from the transmission antenna group 1956.

Note that in FIG. 23, the term "group" is used, but it is sufficient to have at least one transmission subsystem.

The base station (AP) transmits a signal to a terminal with the configuration of the transmission apparatus in FIG. 1, and receives a signal from the terminal with the configuration in FIG. 22. The terminal receives a signal from the base station (AP) with the configuration of the reception apparatus in FIG. 19, and transmits a signal to the base station with the configuration in FIG. 23. With these configurations, communication between the base station (AP) and the terminal is executed.

Next, the flow of communication between the base station (AP) and terminals will be described.

Figure 24:
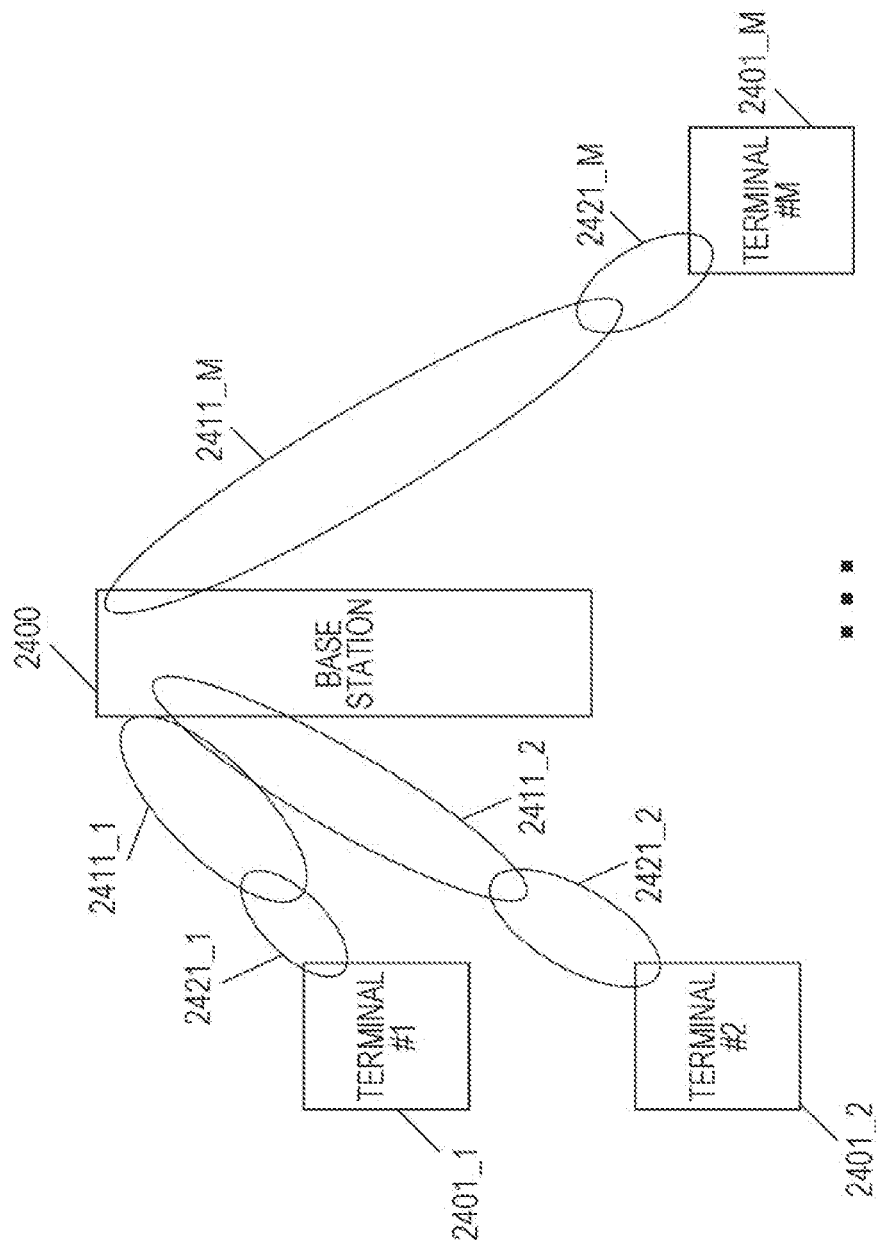
FIG. 24 is a diagram illustrating an example of the relationship between a base station (AP) and terminals.

FIG. 24 is a diagram illustrating an example of the relationship between a base station (AP) and terminals. The base station (AP) 2400 uses the user #1 signal processor 102_1 in FIG. 1 to generate a modulated signal to transmit to terminal #1 (2401_1), for example; uses user #2 signal processor 102_2 in FIG. 1 to generate a modulated signal to transmit to terminal #2 (2401_2), for example, and uses the user #M signal processor 102_M to generate a modulated signal to transmit to terminal #M (2401_M), for example.

The base station (AP) 2400 generates a transmission directivity 2411_1, and in addition, terminal #1 (2401_1) generates a reception directivity 2421_1. Additionally, by the transmission directivity 2411_1 and the reception directivity 2421_1, the transmission signal for terminal #1 transmitted by the base station (AP) 2400 is received by terminal #1 (2401_1).

Also, the base station (AP) 2400 generates a transmission directivity 2411_2, and in addition, terminal #2 (2401_2) generates a reception directivity 2421_2. Additionally, by the transmission directivity 2411_2 and the reception directivity 2421_2, the transmission signal for terminal #2 transmitted by the base station (AP) 2400 is received by terminal #2 (2401_2).

The base station (AP) 2400 generates a transmission directivity 2411_M, and in addition, terminal #M (2401_M) generates a reception directivity 2421_M. Additionally, by the transmission directivity 2411_M and the reception directivity 2421_M, the transmission signal for terminal #M transmitted by the base station (AP) 2400 is received by terminal #M (2401_M).

The example of FIG. 24 assumes that the base station (AP) 2400 is transmitting the modulated signal to transmit to terminal #1, the modulated signal to transmit to terminal #2, and the modulated signal to transmit to terminal #M at identical times and identical frequencies (bands). This point has been described in Embodiment 1. Note that although FIG. 24 illustrates "transmitting the modulated signal to transmit to terminal #1, the modulated signal to transmit to terminal #2, and the modulated signal to transmit to terminal #M at identical times and identical frequencies (bands)", this is merely one example. The number of modulated signals that the base station (AP) 2400 transmits at identical times and identical frequencies (bands) is not limited to this example. Also, times at which modulated signals do not overlap may also exist.

Figure 25:
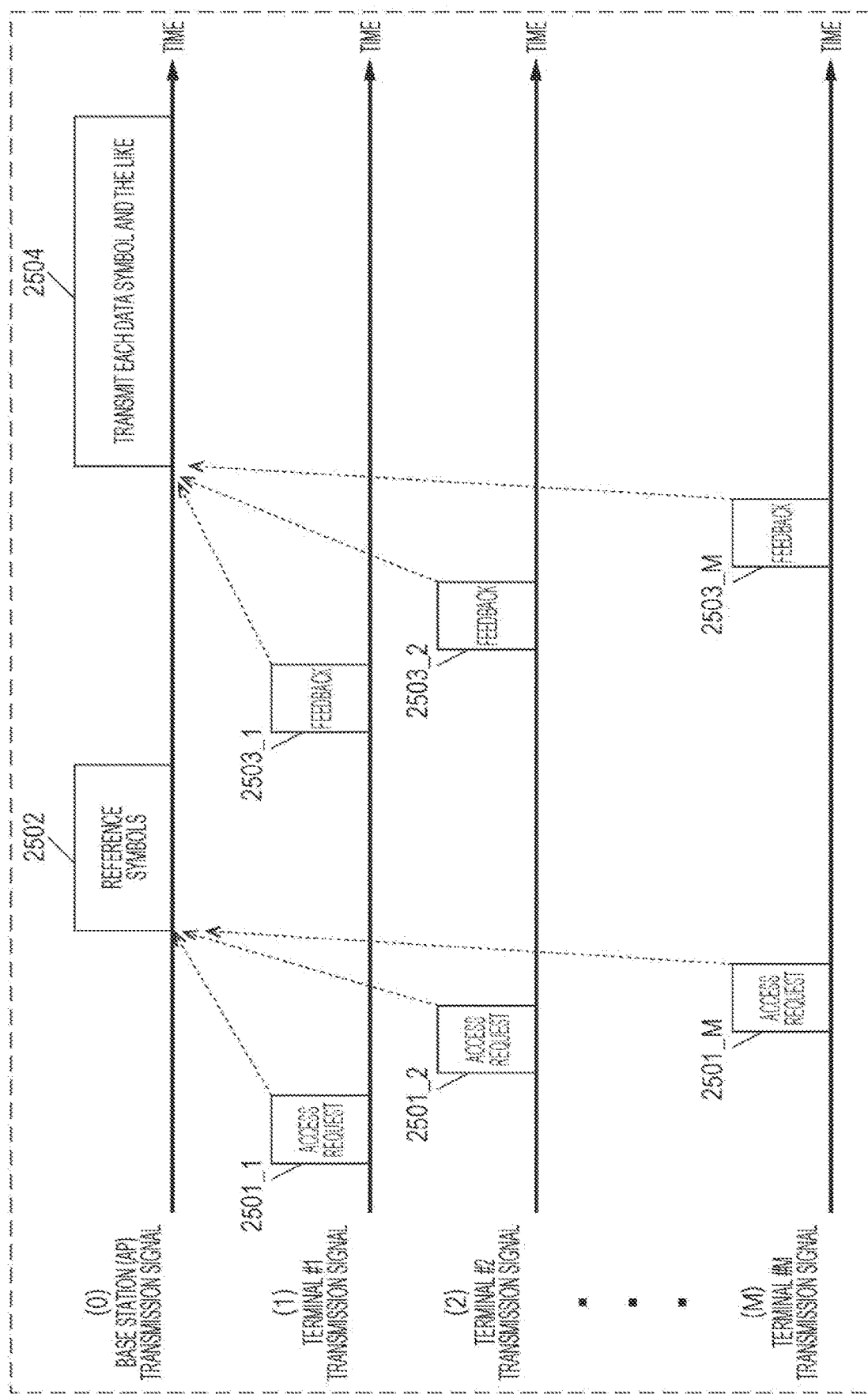
FIG. 25 is a diagram illustrating an example of the temporal flow of communication between a base station (AP) and terminals.

FIG. 25 is a diagram illustrating an example of the temporal flow of communication between the base station (AP) and terminals. In FIG. 25, transmission signals of the base station (AP), transmission signals of terminal #1, transmission signals of terminal #2, and transmission signals of terminal #M are illustrated. Also, the horizontal axis in FIG. 25 represents time. Note that terminals other than terminal #1, terminal #2, and terminal #M may also transmit transmission signals.

As illustrated in FIG. 25, suppose that terminal #1 issues an access request (transmission of data by the base station (AP)) 2501_1 to the base station (AP). Similarly, suppose that terminal #2 issues an access request (transmission of data by the base station (AP)) 2501_2 to the base station (AP). Suppose that terminal #M issues an access request (transmission of data by the base station (AP)) 2501_M to the base station (AP).

In response, suppose that the base station (AP) transmits reference symbols (2502). For example, as the reference symbols 2502, assume that PSK symbols which are known to the terminals are transmitted. However, the configuration of the reference symbols 2502 is not limited thereto. Note that the reference symbols 2502 correspond to the (common) reference signal 199 illustrated in FIG. 1.

Meanwhile, terminal #1 receives the reference symbols 2502 transmitted by the base station. Additionally, for example, terminal #1 estimates the received signal state at each reception antenna of terminal #1, and transmits information about the received signal state at each reception antenna as feedback information 2503_1. Similarly, terminal #2 receives the reference symbols 2502 transmitted by the base station. Additionally, for example, terminal #2 estimates the received signal state at each reception antenna of terminal #2, and transmits information about the received signal state at each reception antenna as feedback information 2503_2. Similarly, terminal #M receives the reference symbols 2502 transmitted by the base station. For example, terminal #M estimates the received signal state at each reception antenna of terminal #M, and transmits information about the received signal state at each reception antenna as feedback information 2503_M.

The base station (AP) receives the feedback information transmitted by each terminal. For example, in FIG. 22, suppose that the control information 157 includes the feedback information transmitted by each terminal. The setting section 158 in FIG. 22 accepts the control information 157 including the feedback information transmitted by each terminal as input, decides the processing method to be executed by the multiplexing signal processor 104 in FIG. 1, and outputs the control signal 100 including this information.

Additionally, as illustrated in FIG. 24, for example, the base station (AP) transmits each data symbol to each terminal (2504). Note that for "transmit each data symbol and the like" 2504 illustrated in FIG. 25, symbols other than data symbols, such as pilot symbols, control information symbols, reference symbols, and a preamble may also be present. The base station (AP) transmits the modulated signals of each terminal using identical times and identical frequencies (bands). Note that this point has been described in detail in Embodiment 1.

Embodiment 3

In Embodiment 1, an example is described in which primarily, when the transmission apparatus in FIG. 1 transmits multiple modulated signals to user #p, to generate the multiple modulated signals, the phase of at least one of the modulated signals after precoding is changed in the phase changer 305B (see FIGS. 3 and 4). Embodiment 3 describes a process in which the transmission apparatus in FIG. 1 switches between "executing phase change, not executing phase change" in the phase changer 305B with the control signal 300. Also, Embodiment 3 describes a process of changing the transmission scheme of the signal on the basis of information received from the other end of the communication when the transmission apparatus in FIG. 1 transmits a signal.

Note that the following describes a case in which the base station (AP) provided with the transmission apparatus in FIG. 1 communicates with terminals.

At this time, suppose that the base station (AP) is able to transmit multiple modulated signals including multiple streams of data to each user (each terminal) using multiple antennas.

For example, suppose that the base station (AP) is provided with the transmission apparatus in FIG. 1 to transmit multiple modulated signals including multiple streams of data to user #p (where p is an integer from 1 to M) using multiple antennas.

In FIG. 1, when transmitting the multiple modulated signals to user #p, to generate the multiple modulated signals, the phase of at least one of the modulated signals after precoding is changed. Note that since the operation when executing the phase change has been described in Embodiment 1, a description is omitted here.

At this point, for the base station (AP) to generate multiple modulated signals including multiple streams of data for user #p, suppose that the base station (AP) is able to switch between "executing phase change, not executing phase change" with a control signal. In other words, suppose that in the phase changer 305B of FIG. 3, it is possible to switch between "executing phase change, not executing phase change" with the control signal 300. Note that the operation when executing the phase change has been described in Embodiment 1. Additionally, in the case of not executing phase change, the phase changer 305B outputs the signal 304B as 306B.

Consequently, operations like the following are executed in the case of executing phase change and the case of not executing phase change.

<Case of Executing Phase Change>

The base station (AP) executes phase change on at least one modulated signal. Subsequently, the multiple modulated signals are transmitted using multiple antennas.

Note that the transmission method by which phase change is executed on at least one modulated signal and the multiple modulated signals are transmitted using multiple antennas is as described in Embodiment 1, for example.

<Case of not Executing Phase Change>

The base station (AP) executes precoding (weight combining) on the modulated signals (baseband signals) of multiple streams, and transmits the generated multiple modulated signals using multiple antennas. However, the precoder (weight combiner) does not have to execute precoding.

Note that, for example, the base station (AP) transmits control information for notifying the terminal on the other end of the communication of the setting for executing or not executing phase change using the preamble.

As described above, "phase change is executed on at least one modulated signal". Specifically, FIG. 3 is used to describe executing phase change on one modulated signal among multiple modulated signals. Herein, instead of FIG. 3, FIG. 26 will be used to describe the case of "executing phase change on multiple modulated signals".

Figure 26:
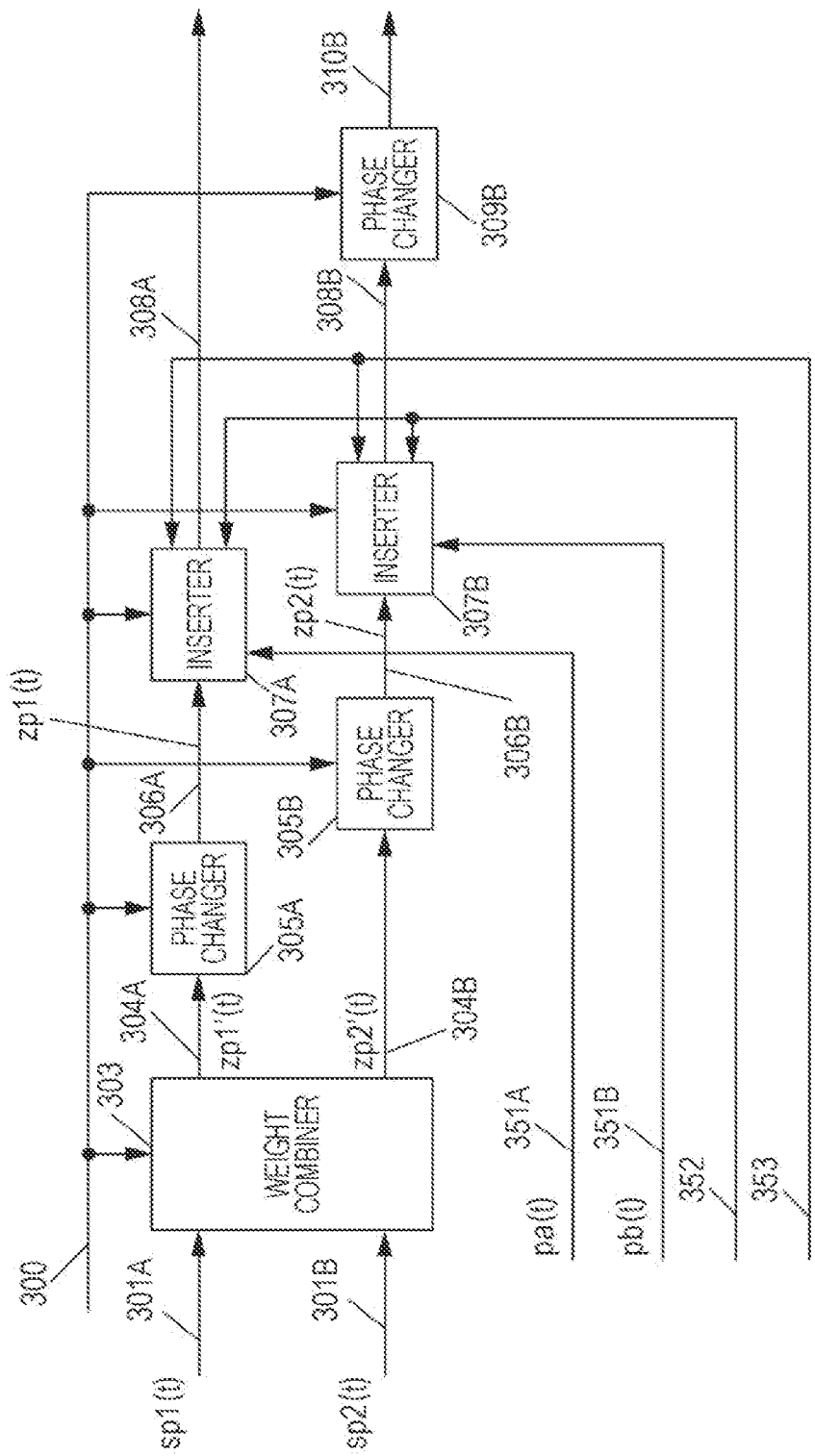
FIG. 26 is a diagram illustrating a different example from FIG. 3 of a configuration of the signal processor in FIG. 2.

FIG. 26 is a diagram illustrating a different example from FIG. 3 of the configuration of the signal processor 206 in FIG. 2. In FIG. 26, the points which are different from FIG. 3 will be described.

A phase changer 305A accepts the control signal 300 as input. On the basis of the control signal 300, the phase changer 305A determines whether or not to execute phase change. In the case of determining to execute phase change, the phase changer 305A executes phase change on the user #p weighted signal 304A (zp1'(t)), and outputs a phase-changed signal 306A. In the case of determining not to execute phase change, the phase changer 305A outputs a signal 306A without performing phase change on the user #p weighted signal 304A (zp1'(t)).

In FIG. 26, zp1(i) and zp2(i) are based on Formula (3), similarly to Embodiment 1. Additionally, the case in which phase change is executed on zp1(i) and zp2(i) in FIG. 26 may be expressed by the following Formula (42).

$$\begin{pmatrix} zp1(i) \\ zp2(i) \end{pmatrix} = \begin{pmatrix} Yp(i) & 0 \\ 0 & yp(i) \end{pmatrix} \begin{pmatrix} a & b \\ c & d \end{pmatrix} \begin{pmatrix} sp1(i) \\ sp2(i) \end{pmatrix} \quad (42)$$

$$= \begin{pmatrix} e^{j \times \lambda p(i)} & 0 \\ 0 & e^{j \times \delta p(i)} \end{pmatrix} \begin{pmatrix} a & b \\ c & d \end{pmatrix} \begin{pmatrix} sp1(i) \\ sp2(i) \end{pmatrix}$$

At this time, λp(i) is a real number. Additionally, zp1(i) and zp2(i) are transmitted from the transmission apparatus at identical times and identical frequencies (identical frequency bands). Additionally, for the phase change in the phase changer 305A, for example, a method that changes the phase periodically or regularly is conceivable.

Note that in other embodiments such as Embodiment 1 and Embodiment 2, FIG. 26 may be used instead of FIG. 3 as the configuration of the signal processor 206 in FIG. 2, and each embodiment is capable of carrying out the above.

Next, communication between the base station (AP) and terminal #p as well as a process based on data transmitted and received during such communication will be described.

Figure 27:
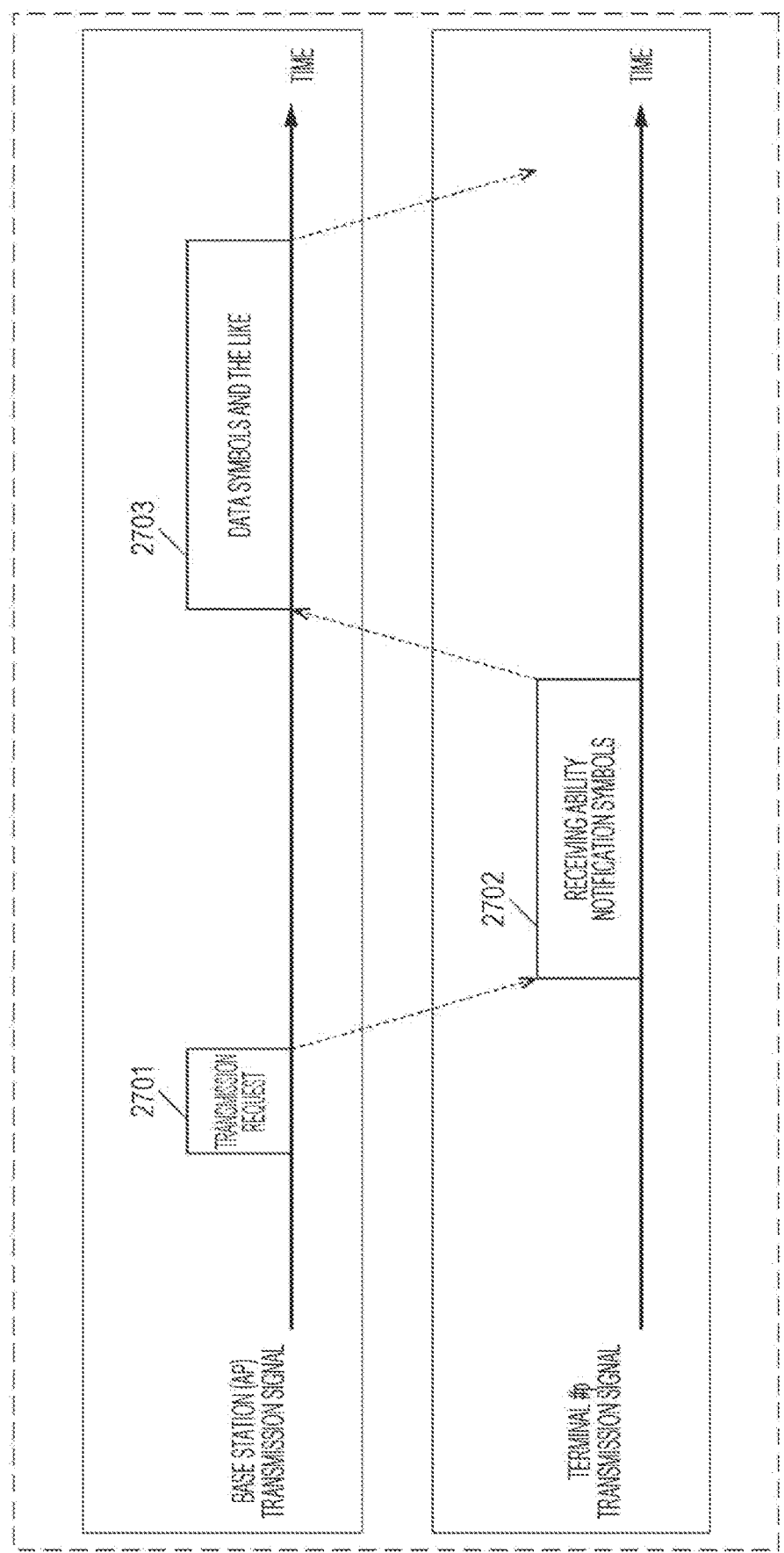
FIG. 27 is a diagram illustrating an example of communication between a base station (AP) and a terminal #p.

FIG. 27 is a diagram illustrating an example of communication between the base station (AP) and terminal #p. FIG. 27 illustrates the state of the base station (AP) at the time of a transmission signal, and the state of terminal #p at the time of the transmission signal. Note that in FIG. 27, the horizontal axis is time.

First, the base station (AP) transmits a transmission request 2701 indicating "request information for transmitting a modulated signal" to terminal #p.

Subsequently, terminal #p receives the transmission request 2701 transmitted by the base station (AP), and transmits reception capability notification symbols 2702, which indicate what the terminal is able to receive, to the base station (AP).

The base station (AP) receives the reception capability notification symbols 2702 transmitted by terminal #p, and on the basis of the information of the reception capability notification symbols 2702, decides the error-correcting coding method, the modulation scheme (or set of modulation schemes), and the transmission method. On the basis of these decided methods, the base station (AP) performs error-correcting code, mapping in the modulation scheme, and other signal processing (such as precoding and phase change, for example) on the information (data) to be transmitted, and transmits a modulated signal 2703 including data symbols and the like to terminal #p.

Note that the data symbols and the like 2703 may also include control information symbols, for example. At this time, when transmitting data symbols using "a transmission method for transmitting multiple modulated signals including multiple streams of data using multiple antennas", it is preferable to transmit a control symbol including information for notifying the other end of the communication whether phase change has been executed on at least one modulated signal, or the above phase change has not been executed. With this arrangement, the other end of the communication is able to change the demodulation method easily.

Terminal #p receives the data symbols and the like 2703 transmitted by the base station, and obtains data.

Note that the exchange between the base station (AP) and the terminal in FIG. 27 is executed by one or more terminals from among terminal #1 to terminal #M, and the base station (AP). Additionally the data symbols (including other symbols) transmitted to each terminal are transmitted using identical times and identical frequencies (bands) by the base station. This point has been described in Embodiment 1, Embodiment 2, and the like.

Figure 28:
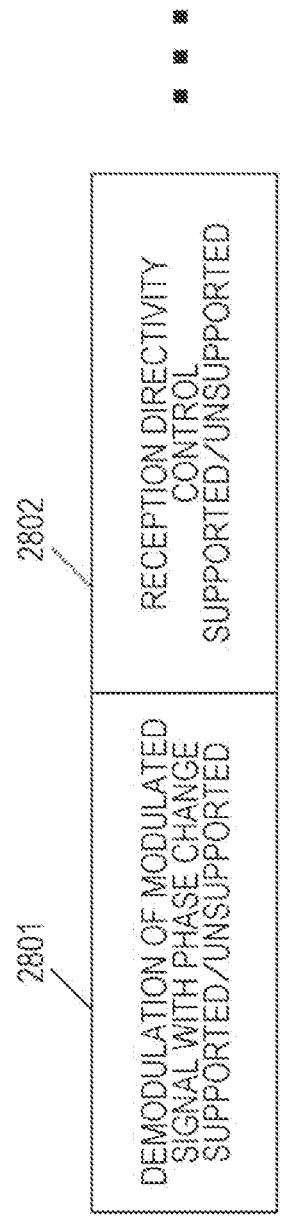
FIG. 28 is a diagram illustrating an example of data included in receiving ability notification symbols.

FIG. 28 is a diagram illustrating an example of data included in the reception capability notification symbols 2702 transmitted by terminal #p in FIG. 27. The data included in the reception capability notification symbols 2702 is data indicating the reception capability in terminal #p, for example. By having terminal #p transmit data indicating the reception capability to the base station (AP), the base station (AP) is able to transmit a transmission signal to terminal #p in accordance with the reception capability.

In FIG. 28, 2801 is data related to "demodulation of modulated signal with phase change supported/unsupported", and 2802 is data related to "reception directivity control supported/unsupported".

In the data 2801 related to "demodulation of modulated signal with phase change supported/unsupported", "demodulation of modulated signal with phase change supported" refers to the following.

"demodulation of modulated signal with phase change supported":

This means that, in the case in which the base station (AP) executes phase change on at least one modulated signal and transmits multiple modulated signals (multiple modulated signals including multiple streams) using multiple antennas, terminal #p is able to receive and demodulate the modulated signals. In other words, this means that terminal #p is able to execute demodulation that takes the phase change into account, and is able to obtain data. Note that the transmission method by which phase change is executed on at least one modulated signal and the multiple modulated signals are transmitted using multiple antennas has been described already in an embodiment.

In the data 2801 related to "demodulation of modulated signal with phase change supported/unsupported", "demodulation of modulated signal with phase change unsupported" refers to the following.

"demodulation of modulated signal with phase change unsupported":

This means that, when the base station (AP) executes phase change on at least one modulated signal and transmits multiple modulated signals (multiple modulated signals including multiple streams) using multiple antennas, terminal #p is unable to demodulate even if the modulated signals are received. In other words, this means that terminal #p is unable to execute demodulation that takes the phase change into account. Note that the transmission method by which phase change is executed on at least one modulated signal and the multiple modulated signals are transmitted using multiple antennas has been described already in an embodiment.

For example, suppose that the data 2801 related to "demodulation of modulated signal with phase change supported/unsupported" (hereinafter called the data 2801) is expressed by 1-bit data. Additionally, suppose that in the case in which terminal #p "supports phase change" as described above, terminal #p transmits with the data 2801 set to "0". Also, suppose that in the case in which terminal #p "does not support phase change" as described above, terminal #p transmits with the data 2801 set to "1". Subsequently, the base station (AP) receives the data 2801 transmitted by terminal #p.

In the case in which the data 2801 indicates "phase change supported" (that is, the data 2801 is "0"), and the base station (AP) decides to transmit modulated signals of multiple streams to terminal #p using multiple antennas (for example, in the case of deciding to generate multiple modulated signals for transmitting multiple streams in user #p signal processor 102_p illustrated in FIG. 1), the base station (AP) may generate and transmit modulated signals addressed to user #p by either of <Method #1> and <Method #2> described below. Alternatively, the base station (AP) generates and transmits modulated signals addressed to user #p by <Method #2> described below.

<Method #1>

The base station (AP) executes precoding (weight combining) on the modulated signals (baseband signals) of multiple streams to transmit to terminal #p, and transmits the generated multiple modulated signals using multiple antennas. At this time, assume that phase change is not performed. However, as described already, the precoder (weight combiner) does not have to execute precoding.

<Method #2>

The base station (AP) executes phase change on at least one modulated signal among the multiple modulated signals to transmit to terminal #p. Subsequently, the base station (AP) transmits the multiple modulated signal to terminal #p using multiple antennas.

The important point here is that <Method #2> is included as a transmission method selectable by the base station (AP). Consequently, the base station (AP) may also transmit the modulated signals by a method other than <Method #1> or <Method #2>.

On the other hand, in the case in which the data 2801 indicates "phase change unsupported" (that is, the data 2801 is "1"), and the base station (AP) decides to transmit the modulated signals of multiple streams to terminal #p using multiple antennas, for example, the base station (AP) transmits the modulated signals to terminal #p by <Method #1>.

The important point here is that, when transmitting modulated signals to terminal #p, <Method #2> is not included as a selectable transmission method. Consequently, the base station (AP) may also transmit the modulated signals to terminal #p by a transmission method which is different from <Method #1>, but not <Method #2>.

Note that the reception capability notification symbols 2702 may also include information other than the data 2801. For example, data 2802 related to "reception directivity control supported/unsupported" indicating whether or not the reception apparatus of the terminal supports reception directivity control (hereinafter called the data 2802) may be included. Consequently, the configuration of the reception capability notification symbols 2702 is not limited to FIG. 28.

For example, in the case in which terminal #p is able to execute reception directivity control, the data 2802 is set to "0". Also, in the case in which terminal #p is unable to execute reception directivity control, the data 2802 is set to "1".

Terminal #p transmits reception capability notification symbols 2702 including the data 2802, and on the basis of the reception capability notification symbols 2702, the base station (AP) determines whether or not terminal #p is capable of executing reception directivity control. In the case in which the base station (AP) determines that terminal #p "supports reception directivity control", the base station (AP) and terminal #p may also transmit training symbols, reference symbols, control information symbols, and the like for the reception directivity control of terminal #p.

Figure 29:
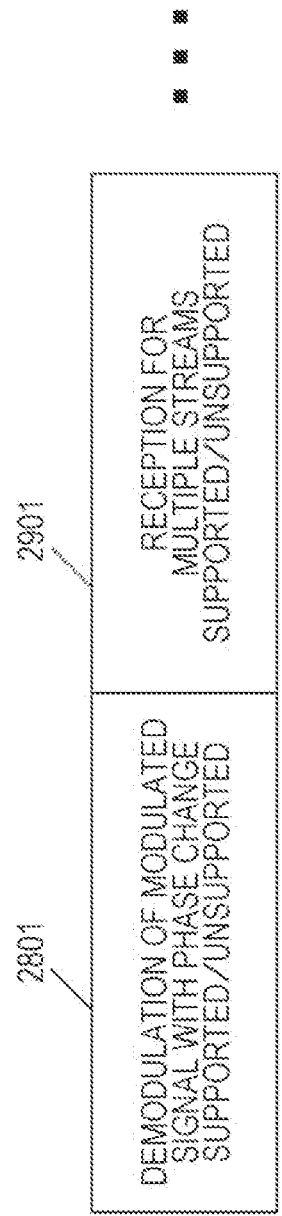
FIG. 29 is a diagram illustrating a different example from FIG. 28 of data included in reception capability notification symbols.

FIG. 29 is a diagram illustrating a different example from FIG. 28 of data included in the reception capability notification symbols 2702 transmitted by terminal #p in FIG. 27. Note that the data 2801 is similar to FIG. 28.

Next, data 2901 related to "reception for multiple streams supported/unsupported" in FIG. 29 will be described below.

In the data 2901 related to "reception for multiple streams supported/unsupported", "reception for multiple streams supported" refers to the following.

"Reception for multiple streams supported":

This means that when the base station (AP) transmits multiple modulated signals addressed to terminal #p from multiple antennas to transmit multiple streams to terminal #p, terminal #p is able to receive and demodulate the multiple modulated signals addressed to terminal #p transmitted by the base station.

However, for example, when the base station (AP) transmits multiple modulated signals addressed to terminal #p from multiple antennas, assume that there is no distinguishing between whether phase change is performed/not performed. In other words, in the case in which multiple transmission methods are defined as a transmission method by which the base station (AP) transmits multiple modulated signals addressed to terminal #p by multiple antennas to transmit multiple streams to terminal #p, it is sufficient for there to be at least one transmission method that terminal #p is capable of decoding.

In the data 2901 related to "reception for multiple streams supported/unsupported", "reception for multiple streams unsupported" refers to the following.

"Reception for multiple streams unsupported":

In the case in which multiple transmission methods are defined as a transmission method by which the base station transmits multiple modulated signals addressed to terminal #p by multiple antennas to transmit multiple streams to terminal #p, the terminal is unable to demodulate no matter which transmission method the base station uses to transmit the modulated signals.

For example, suppose that the data 2901 related to "reception for multiple streams supported/unsupported" (hereinafter called the data 2901) is expressed by 1-bit data. In the case in which terminal #p "supports reception for multiple streams", terminal #p sets "0" as the data 2901. Also, in the case in which terminal #p "does not support reception for multiple streams", terminal #p sets "1" as the data 2901.

Note that since the base station (AP) executes phase change on at least one modulated signal among the multiple modulated signals (the multiple modulated signals including multiple streams), in the case in which terminal #p does not support reception for multiple streams, the base station (AP) is unable to transmit multiple modulated signals, and as a result, is also unable to execute phase change.

Consequently, in the case in which terminal #p has set "0" as the data 2901, the data 2801 is valid. At this time, the base station (AP) decides the transmission method by which to transmit data according to the data 2801 and the data 2901.

In the case in which terminal #p has set "1" as the data 2901, the data 2801 is invalid. At this time, the base station (AP) decides the transmission method by which to transmit data according to the data 2901.

As above, by having the terminal transmit the reception capability notification symbols 2702, and having the base station (AP) decide the transmission method by which to transmit data on the basis of the symbols, it is possible to reduce cases in which data is transmitted by a transmission method that terminal #p is unable to demodulate, and thus there is an advantage of being able to transmit data appropriately to terminal #p. With this arrangement, an advantageous effect of improved data transmission efficiency of the base station (AP) may be obtained.

In addition, the data 2801 related to "demodulation of modulated signal with phase change supported/unsupported" exists as the reception capability notification symbols 2702. For this reason, in the case in which terminal #p supporting demodulation of modulated signal with phase change communicates with the base station (AP), the base station (AP) is able to appropriately select a mode that "transmits modulated signals by a transmission method that performs phase change", and thus an advantageous effect may be obtained whereby terminal #p obtains data of high received signal quality, even in an environment in which direct waves are dominant. Also, in the case in which terminal #p not supporting demodulation of modulated signal with phase change communicates with the base station (AP), the base station (AP) is able to appropriately select a transmission method that the terminal is capable of receiving, and thus an advantageous effect of improving the data transmission efficiency may be obtained.

Note that although the transmission signal of the base station (AP) and the transmission signal of terminal #p are illustrated in FIG. 27, the transmission signals are not limited thereto. For example, the signal illustrated as the transmission signal of the base station (AP) in FIG. 27 may also be the transmission signal of the terminal, and the signal illustrated as the transmission signal of terminal #p in FIG. 27 may also be the transmission signal of the base station (AP).

Alternatively, the signal illustrated as the transmission signal of the base station (AP) may also be the transmission signal of a terminal other than terminal #p. In other words, the transmission and reception of the signals illustrated in FIG. 27 may also be transmission and reception between terminals.

Alternatively, the transmission and reception of the signals illustrated in FIG. 27 may also be transmission and reception between base stations (APs).

Note that the configuration is not limited to these examples, and communication between communication apparatus is sufficient.

In addition, the data symbols in the data symbols and the like 2703 in FIG. 27 may be signals of a multi-carrier scheme such as OFDM, or signals of a single-carrier scheme. Similarly, the reception capability notification symbols 2702 in FIG. 27 may be signals of a multi-carrier scheme such as OFDM, or signals of a single-carrier scheme.

For example, when the reception capability notification symbols 2702 in FIG. 27 are treated as a single-carrier scheme, in the case of FIG. 27, the terminal is able to obtain an advantageous effect of reducing power consumption.

Note that in the above description, when the base station (AP) is communicating with multiple terminals, the base station (AP) receives reception capability notification symbols (see 2702) from multiple terminals. At this time, each terminal transmits the data illustrated in FIG. 28 or 29 as the "reception capability notification symbols", for example, and the base station (AP) decides the transmission method for the modulated signals addressed to each terminal. Subsequently, when transmitting modulated signals to multiple terminals, for example, the base station (AP) transmits the modulated signals addressed to each terminal by the method described in Embodiment 1 or Embodiment 2.

Next, a different example of the reception capability notification symbols 2702 will be described using FIG. 30.

Figure 30:
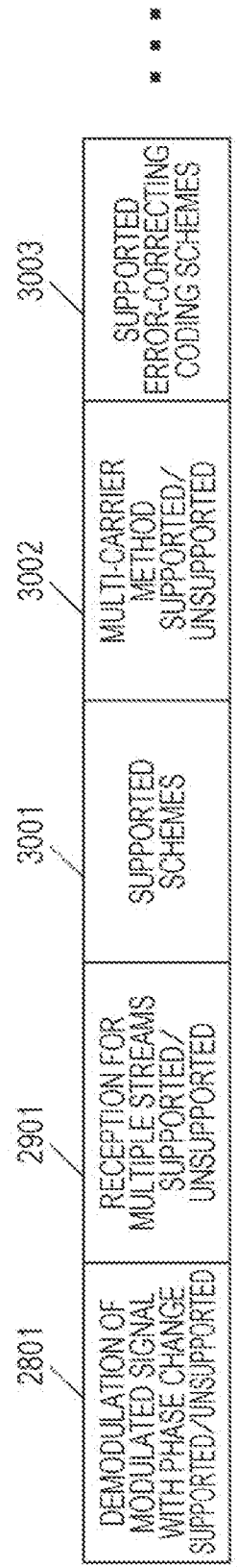
FIG. 30 is a diagram illustrating a different example from FIGS. 28 and 29 of data included in reception capability notification symbols.

FIG. 30 is a diagram illustrating a different example from FIGS. 28 and 29 of data included in the reception capability notification symbols 2702 transmitted by terminal #p in FIG. 27. Note that the data 2801 related to "demodulation of modulated signal with phase change supported/unsupported" is similar to FIGS. 28 and 29. Also, the data 2901 related to "reception for multiple streams supported/unsupported" is similar to FIG. 29.

Data 3001 related to "supported schemes" in FIG. 30 (hereinafter called the data 3001) will be described. The transmission of modulated signals to the terminals by the base station (AP) and the transmission of modulated signals to the base station (AP) by the terminals in FIG. 24 are assumed to be the transmission of modulated signals in a communication scheme in a certain specific frequency (band). Additionally, suppose that, for example, communication scheme #A and communication scheme #B exist as the "communication scheme in a certain specific frequency (band)".

Note that "communication scheme #A" is assumed not to support a "method that transmits multiple modulated signals including multiple streams using multiple antennas". In other words, "communication scheme #A" lacks a selection option for a "method that transmits multiple modulated signals including multiple streams using multiple antennas". Also, "communication scheme #B" is assumed to support a "method that transmits multiple modulated signals including multiple streams using multiple antennas". In other words, as "communication scheme #B", it is possible to select a "method that transmits multiple modulated signals including multiple streams using multiple antennas".

For example, assume that the data 3001 is made up of 2 bits. Additionally, assume that the 2-bit data is set as follows.

In the case in which terminal #p supports "communication scheme #A" only, the data 3001 is set to "01". In the case of setting the data 3001 to "01", even if the base station (AP) transmits a modulated signal of "communication scheme #B", terminal #p is unable to demodulate and obtain data.

In the case in which terminal #p supports "communication scheme #B" only, the data 3001 is set to "10". In the case of setting the data 3001 to "10", even if the base station (AP) transmits a modulated signal of "communication scheme #A", terminal #p is unable to demodulate and obtain data.

In the case in which terminal #p supports both "communication scheme #A" and "communication scheme #B", the data 3001 is set to "11".

Next, data 3002 related to "multi-carrier scheme supported/unsupported" in FIG. 30 (hereinafter called the data 3002) will be described. Suppose that in "communication scheme #A", a "single-carrier scheme" and a "multi-carrier scheme such as OFDM" are selectable as the modulated signal transmission method. Also, suppose that in "communication scheme #B", a "single-carrier scheme" and a "multi-carrier scheme such as OFDM" are selectable as the modulated signal transmission method.

For example, assume that the data 3002 is made up of 2 bits. Additionally, assume that the 2-bit data is set as follows.

In the case in which terminal #p supports the "single-carrier scheme" only, the data 3002 is set to "01". In the case of setting the data 3002 to "01", even if the base station (AP) transmits a modulated signal by the "multi-carrier scheme such as OFDM", terminal #p is unable to demodulate and obtain data.

In the case in which terminal #p supports the "multi-carrier scheme such as OFDM" only, the data 3002 is set to "10". In the case of setting the data 3002 to "10", even if the base station (AP) transmits a modulated signal by the "single-carrier scheme", terminal #p is unable to demodulate and obtain data.

In the case in which terminal #p supports both the "single-carrier scheme" and the "multi-carrier scheme such as OFDM", the data 3002 is set to "11".

Next, data 3003 related to "supported error-correcting coding schemes" in FIG. 30 (hereinafter called the data 3003) will be described. For example, suppose that "error-correcting coding scheme #C" is an "error-correcting coding scheme supporting one or more code rates with a code length (block length) of c bits (where c is an integer equal to 1 or greater)". Suppose that "error-correcting coding scheme #D" is an "error-correcting coding scheme supporting one or more code rates with a code length (block length) of d bits (where d is an integer equal to 1 or greater, and the relationship of d being greater than c (d>c) holds)". Note that as the method supporting one or more code rates, different error-correcting codes may be used for each code rate, or one or more code rates may be supported by puncturing. Also, one or more code rates may be supported by both of the above.

Note that in "communication scheme #A", it is assumed that only "error-correcting coding scheme #C" is selectable, while in "communication scheme #B", it is assumed that "error-correcting coding scheme #C" and "error-correcting coding scheme #D" are selectable.

For example, assume that the data 3003 is made up of 2 bits. Additionally, assume that the 2-bit data is set as follows.

In the case in which terminal #p supports "error-correcting coding scheme #C" only, the data 3003 is set to "01". In the case of setting the data 3003 to "01", even if the base station (AP) uses "error-correcting coding scheme #D" to generate and transmit a modulated signal, terminal #p is unable to demodulate/decode and obtain data.

In the case in which terminal #p supports "error-correcting coding scheme #D" only, the data 3003 is set to "10". In the case of setting the data 3003 to "10", even if the base station (AP) uses "error-correcting coding scheme #C" to generate and transmit a modulated signal, terminal #p is unable to demodulate/decode and obtain data.

In the case in which terminal #p supports both "error-correcting coding scheme #C" and "error-correcting coding scheme #D", the data 3003 is set to "11".

The base station (AP) receives the reception capability notification symbols 2702 transmitted by terminal #p and configured like in FIG. 30, for example. Additionally, on the basis of the content of the reception capability notification symbols 2702, the base station (AP) decides the method of generating modulated signals including data symbols addressed to terminal #p, and transmits the modulated signals addressed to terminal #p.

At this time, the characteristic points will be described.

Example 1

In the case in which terminal #p transmits with the data 3001 set to "01" (that is, supporting "communication scheme #A"), the base station (AP) obtaining this data determines that in "communication scheme #A", since the "error-correcting coding scheme #D" cannot be selected, the data 3003 is invalid. Subsequently, when generating modulated signals addressed to terminal #p, the base station (AP) uses the "error-correcting coding scheme #C" to execute error-correcting coding.

Example 2

In the case in which terminal #p transmits with the data 3001 set to "01" (that is, supporting "communication scheme #A"), the base station (AP) obtaining this data determines that in "communication scheme #A", since the "method that transmits multiple modulated signals including multiple streams using multiple antennas" is not supported, the data 2801 and the data 2901 are invalid. Subsequently, when generating the modulated signals addressed to the terminal, the base station (AP) generates and transmits the modulated signal of a single stream.

In addition to the above, for example, consider the cases in which constraints like the following exist.

[Constraint Condition 1]

In "communication scheme #B", assume that with the single-carrier scheme, in the "method that transmits multiple modulated signals including multiple streams using multiple antennas", the method of "changing the phase of at least one modulated signal among multiple modulated signals" is not supported (other methods may be supported), and in addition, in the multi-carrier scheme such as OFDM, the method of "changing the phase of at least one modulated signal among multiple modulated signals" is supported at least (other methods may be supported).

This case becomes like the following.

Example 3

In the case in which terminal #p transmits with the data 3002 set to "01" (that is, supporting only the single-carrier scheme), the base station (AP) obtaining this data determines that the data 2801 is invalid. Subsequently, when generating modulated signals addressed to terminal #p, the base station (AP) does not use the method of "changing the phase of at least one modulated signal among multiple modulated signals".

Note that FIG. 30 is an example of the reception capability notification symbols 2702 transmitted by terminal #p. As described using FIG. 30, in the case in which terminal #p transmits multiple pieces of reception capability information (for example, the data 2801, the data 2901, the data 3001, the data 3002, and the data 3003 in FIG. 30), when the base station (AP) decides the method of generating modulated signals addressed to terminal #p on the basis of the reception capability notification symbols 2702, in some cases the base station (AP) needs to determine that some of the multiple pieces of reception capability information is invalid. When such a situation is considered, if terminal #p bundles and transmits the multiple pieces of reception capability information as the reception capability notification symbols 2702, an advantageous effect may be obtained in which the base station (AP) decides the generation of the modulated signals addressed to terminal #p easily and with little processing time.

Note that the data structure described in Embodiment 3 is merely one example, and the configuration is not limited thereto. Also, the number of bits in each piece of data and method of settings the bits are not limited to the example described in Embodiment 3.

Embodiment 4

Embodiment 1, Embodiment 2, and Embodiment 3 describe that both the case of generating multiple modulated signals including multiple streams and the case of generating the modulated signal of a single stream are possible in the user #p signal processor 102_p (where p is an integer from 1 to M) in FIG. 1. In Embodiment 4, a different example of the user #p signal processor 102_p at this time will be described.

Figure 31:
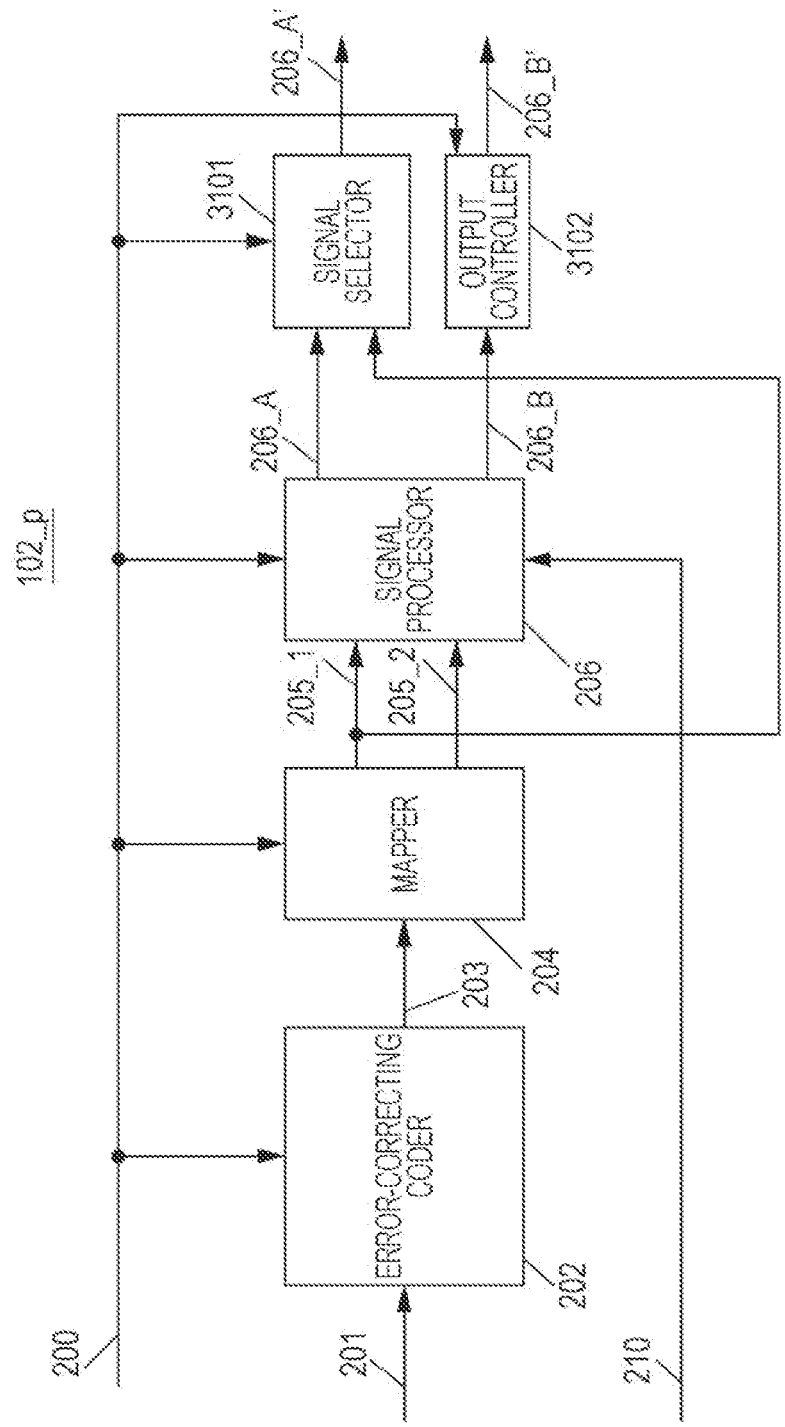
FIG. 31 is a diagram illustrating an example of a configuration of a signal processor for user #p.

FIG. 31 is a diagram illustrating an example of a configuration of the user #p signal processor 102_p. Note that in FIG. 31, parts which operate similarly to FIG. 2 are denoted with the same numbers. In FIG. 31, since the detailed operation of the signal processor 206 has been described in Embodiment 1, a description is omitted here. In the following, the characteristic operation will be described.

Assume that the control signal 200 includes information about whether to use the "method of transmitting the modulated signal of a single stream" or the "method of transmitting multiple modulated signals including multiple streams" in the signal processor for each user.

In the user #p signal processor 102_p, in the case in which generating modulated signals by the "method of transmitting multiple modulated signals including multiple streams" is specified by the control signal 200, the signal processor 206 generates multiple modulated signals including multiple streams, outputs a user #p signal-processed signal 206_A to a signal selector 3101, and outputs a user #p signal-processed signal 206_B to an output controller 3102.

The signal selector 3101 accepts the control signal 200, the user #p signal-processed signal 206_A, and the mapped signal 205_1 as input. Since generating modulated signals by the "method of transmitting multiple modulated signals including multiple streams" is specified by the control signal 200, the signal selector 3101 outputs the user #p signal-processed signal 206_A as a selected signal 206_A'. Additionally, the selected signal 206_A' corresponds to the user #p first baseband signal 103_p_1 in FIG. 1.

The output controller 3102 accepts the control signal 200 and the user #p signal-processed signal 206_B as input, and since generating modulated signals by the "method of transmitting multiple modulated signals including multiple streams" is specified by the control signal 200, the output controller 3102 outputs the user #p signal-processed signal 206_B as an output signal 206_B'. Additionally, the output signal 206_B' corresponds to the user #p second baseband signal 103_p_2 in FIG. 1.

In the user #p signal processor 102_p, in the case in which generating a modulated signal by the "method of transmitting a modulated signal of a single stream" is specified by the control signal 200, the signal processor 206 does not operate.

Likewise, the mapper 204 does not output the mapped signal 205_2.

The signal selector 3101 accepts the control signal 200, the user #p signal-processed signal 206_A, and the mapped signal 205_1 as input, and since generating a modulated signal by the "method of transmitting a modulated signal of a single stream" is specified, the signal selector 3101 outputs the mapped signal 205_1 as a selected signal 206_A'. Additionally, the selected signal 206_A' corresponds to the user #p first baseband signal 103_p_1 in FIG. 1.

The output controller 3102 accepts the control signal 200 and the user #p signal-processed signal 206_B as input, and since generating a modulated signal by the "method of transmitting a modulated signal of a single stream" is specified by the control signal 200, the output controller 3102 does not output the output signal 206_B'.

By operating as above, in the user #p signal processor 102_p in FIG. 1, the output of a modulated signal or signals for the case of generating multiple modulated signals including multiple streams, or the case of generating a modulated signal of a single stream, may be realized.

It has been described that both the case of generating multiple modulated signals including multiple streams and the case of generating the modulated signal of a single stream are possible in the user #p signal processor 102_p (where p is an integer from 1 to M) in FIG. 1. Herein, an example of the configuration of the user #p signal processor 102_p in FIG. 32 different from FIG. 31 will be described.

Figure 32:
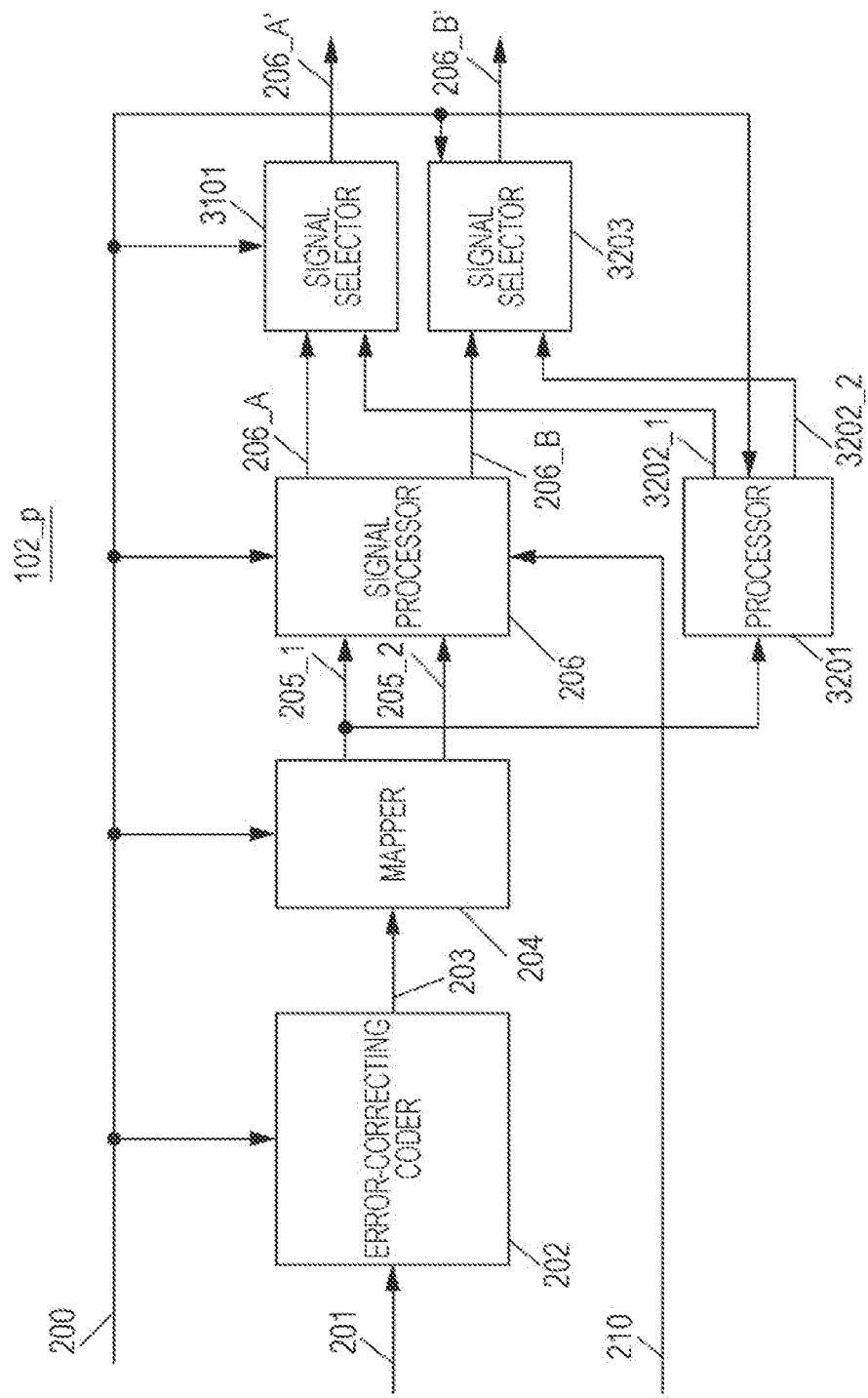
FIG. 32 is a diagram illustrating an example of a configuration of a signal processor for user #p.
Figure 33:
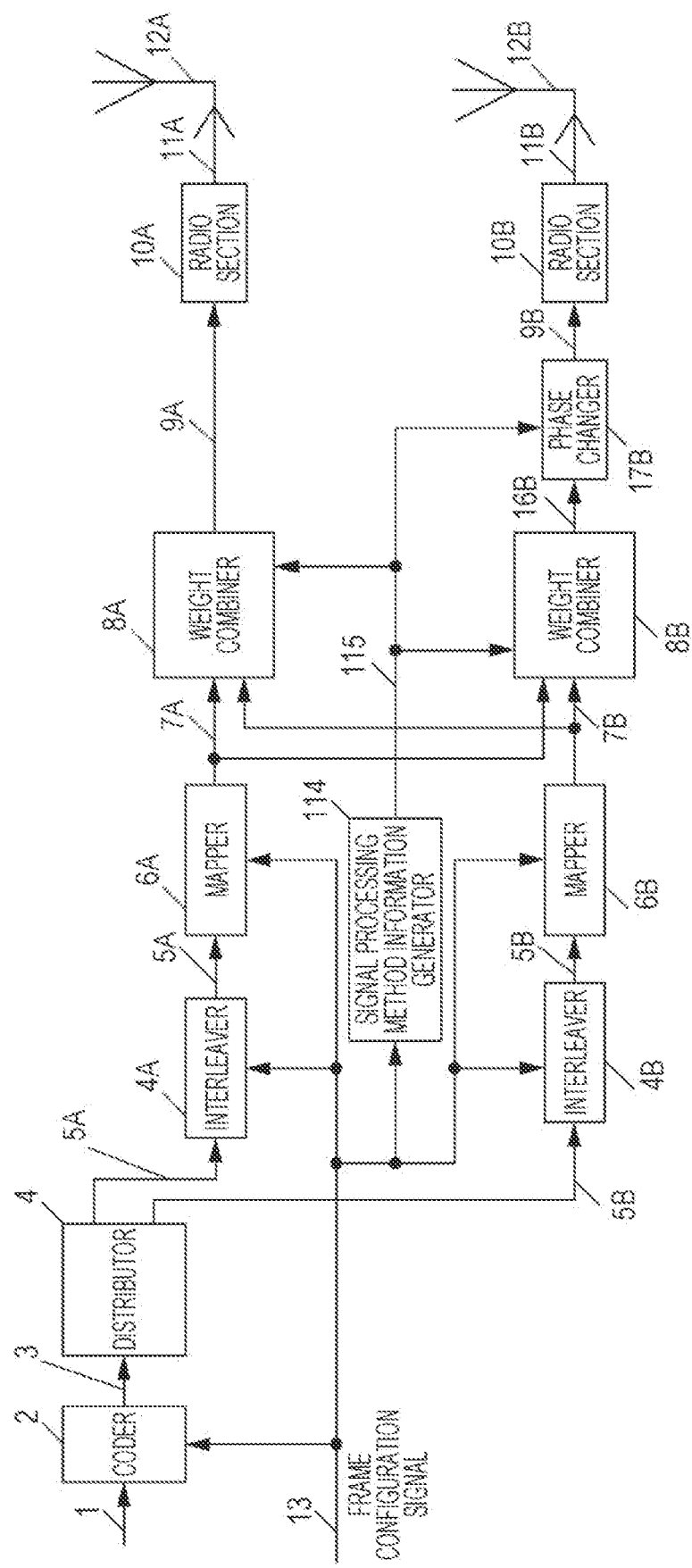
FIG. 33 is a diagram illustrating an example of a configuration of a transmission apparatus based on the DVB-NGH standard described in NPL 1.

FIG. 32 is a diagram illustrating an example of a configuration of the user #p signal processor 102_p. Parts of the configuration which are similar to FIGS. 2 and 31 are denoted with the same numbers. In FIG. 32, since the detailed operation of the signal processor 206 has been described in Embodiment 1, a description is omitted here. In the following, the characteristic operation will be described.

Assume that the control signal 200 includes information about whether to use the "method of transmitting the modulated signal of a single stream" or the "method of transmitting multiple modulated signals including multiple streams" in the signal processor for each user.

In the user #p signal processor 102_p, in the case in which generating modulated signals by the "method of transmitting multiple modulated signals including multiple streams" is specified by the control signal 200, the signal processor 206 operates, generating multiple modulated signals including multiple streams, and outputting user #p signal-processed signals 206_A and 206_B.

The signal selector 3101 accepts the control signal 200, the user #p signal-processed signal 206_A, and a processed signal 3202_1 as input. Since generating modulated signals by the "method of transmitting multiple modulated signals including multiple streams" is specified by the control signal 200, the signal selector 3101 outputs the user #p signal-processed signal 206_A as a selected signal 206_A'. Additionally, the selected signal 206_A' corresponds to the user #p first baseband signal 103_p_1 in FIG. 1.

The signal selector 3203 accepts the control signal 200, the user #p signal-processed signal 206_B, and a processed signal 3202_2 as input. Since generating modulated signals by the "method of transmitting multiple modulated signals including multiple streams" is specified by the control signal 200, the signal selector 3203 outputs the user #p signal-processed signal 206_B as a selected signal 206_B'. Additionally, the selected signal 206_B' corresponds to the user #p second baseband signal 103_p_2 in FIG. 1.

In the user #p signal processor 102_p, in the case in which generating a modulated signal by the "method of transmitting a modulated signal of a single stream" is specified by the control signal 200, the signal processor 206 does not operate.

Likewise, the mapper 204 does not output the mapped signal 205_2.

A processor 3201 accepts the control signal 200 and the mapped signal 205_1 as input. Since generating modulated signals by the "method of transmitting a modulated signal of a single stream" is specified by the control signal 200, the processor 3201 generates and outputs signal-processed signals 3202_1 and 3202_2, which correspond to the mapped signal 205_1. At this time, assume that the data included in the mapped signal 205_1 and the data included in the processed signal 3202_1 are the same, and additionally, the data included in the mapped signal 205_1 and the data included in the processed signal 3202_2 are the same.

The signal selector 3101 accepts the control signal 200, the user #p signal-processed signal 206_A, and a processed signal 3202_1 as input. Since generating modulated signals by the "method of transmitting a modulated signal of a single stream" is specified by the control signal 200, the signal selector 3101 outputs the processed signal 3202_1 as the selected signal 206_A'. Additionally, the selected signal 206_A' corresponds to the user #p first baseband signal 103_p_1 in FIG. 1.

The signal selector 3203 accepts the control signal 200, the user #p signal-processed signal 206_B, and a processed signal 3202_2 as input. Since generating modulated signals by the "method of transmitting a modulated signal of a single stream" is specified by the control signal 200, the signal selector 3203 outputs the processed signal 3202_2 as the selected signal 206_B'. Additionally, the selected signal 206_B' corresponds to the user #p second baseband signal 103_p_2 in FIG. 1.

As above, two exemplary configurations are used to describe exemplary operation of the case of generating multiple modulated signals including multiple streams and the case of generating the modulated signal of a single stream in the user #p signal processor 102_p (where p is an integer from 1 to M) in FIG. 1. In the signal processor for each user in FIG. 1, either the generation of multiple modulated signals including multiple streams or the generation of the modulated signal of a single stream as described above may be executed. Also, as described in Embodiment 1 and the like, a modulated signal may not be output by the signal processor for a user in FIG. 1 in some cases.

(Supplement 1)

In Formula (1) to Formula (42), formulas which are functions of i (the symbol number) are included. Additionally, FIGS. 12 to 17 are used to describe how symbols may be arranged in the time axis direction, the frequency axis direction, or the time-frequency axis directions. Consequently, in Formula (1) to Formula (42), a formula described as a function of i may be interpreted as being a function of time, interpreted as a function of frequency, or interpreted as being a function of time and frequency.

In this specification, for example, it is assumed that the transmission apparatus in FIG. 1 is capable of generating and transmitting "modulated signals using OFDM and modulated signals of a single-carrier scheme in a specific frequency band". At this time, in the case in which the transmission apparatus in FIG. 1 transmits multiple modulated signals (baseband signals) of a certain user, and executes phase change as described in this specification, the period of the phase change when OFDM is used may be set differently from the period of the phase change when the single-carrier scheme is used. Since the frame configurations are different, setting different periods is favorable in some cases. However, the period of phase change when using OFDM and the period of phase change when using the single-carrier scheme may also be the same.

Also, the user #1 signal processor 102_1 to the user #M signal processor 102_M in FIG. 1 may generate single-carrier modulated signals or multi-carrier modulated signals like OFDM, for example. Consequently, the single-carrier modulated signals and the multi-carrier modulated signals like OFDM may be transmitted from the transmission apparatus of FIG. 1 using identical times and identical frequencies (frequency bands that overlap with each other at least partially).

For example, in the user #1 signal processor 102_1, the user #1 first baseband signal 103_1_1 corresponding to a modulated signal of the single-carrier scheme and the user #1 second baseband signal 103_1_2 corresponding to a modulated signal of the single-carrier scheme are generated, while in the user #2 signal processor 102_2, the user #2 first baseband signal 103_2_1 corresponding to a modulated signal of the multi-carrier scheme like OFDM and the user #2 second baseband signal 103_2_2 corresponding to a modulated signal of the multi-carrier scheme like OFDM are generated, and the transmission apparatus in FIG. 1 may transmit "the user #1 first baseband signal 103_1_1 corresponding to a modulated signal of the single-carrier scheme and the user #1 second baseband signal 103_1_2 corresponding to a modulated signal of the single-carrier scheme" and the "user #2 first baseband signal 103_2_1 corresponding to a modulated signal of the multi-carrier scheme like OFDM and the user #2 second baseband signal 103_2_2 corresponding to a modulated signal of the multi-carrier scheme like OFDM" at identical times and identical frequencies (frequency bands that overlap with each other at least partially). At this time, it is sufficient for the "user #1 first baseband signal 103_1_1 corresponding to a modulated signal of the single-carrier scheme and the user #1 second baseband signal 103_1_2 corresponding to a modulated signal of the single-carrier scheme" to be baseband signals generated by any of the methods of "performing precoding and phase change", "performing precoding", "performing phase change without precoding", and "not performing precoding or phase change". Similarly, it is sufficient for the "user #2 first baseband signal 103_2_1 corresponding to a modulated signal of the multi-carrier scheme like OFDM and the user #2 second baseband signal 103_2_2 corresponding to a modulated signal of the multi-carrier scheme like OFDM" to be baseband signals generated by any of the methods of "performing precoding and phase change", "performing precoding", "performing phase change without precoding", and "not performing precoding or phase change".

As another example, in the user #1 signal processor 102_1, the baseband signal of a single stream of the single-carrier scheme is generated, while in the user #2 signal processor 102_2, the user #2 first baseband signal 103_2_1 corresponding to a modulated signal of the multi-carrier scheme like OFDM and the user #2 second baseband signal 103_2_2 corresponding to a modulated signal of the multi-carrier scheme like OFDM are generated, and the transmission apparatus in FIG. 1 may transmit the "baseband signal of a single stream of the single-carrier scheme" and the "user #2 first baseband signal 103_2_1 corresponding to a modulated signal of the multi-carrier scheme like OFDM and the user #2 second baseband signal 103_2_2 corresponding to a modulated signal of the multi-carrier scheme like OFDM" at identical times and identical frequencies (frequency bands that overlap with each other at least partially). At this time, it is sufficient for the "user #2 first baseband signal 103_2_1 corresponding to a modulated signal of the multi-carrier scheme like OFDM and the user #2 second baseband signal 103_2_2 corresponding to a modulated signal of the multi-carrier scheme like OFDM" to be baseband signals generated by any of the methods of "performing precoding and phase change", "performing precoding", "performing phase change without precoding", and "not performing precoding or phase change".

Also, as another example, in the user #1 signal processor 102_1, the user #1 first baseband signal 103_1_1 corresponding to a modulated signal of the single-carrier scheme and the user #1 second baseband signal 103_1_2 corresponding to a modulated signal of the single-carrier scheme are generated, while in the user #2 signal processor 102_2, the baseband signal of a single stream of the multi-carrier scheme like OFDM is generated, and the transmission apparatus in FIG. 1 may transmit "the user #1 first baseband signal 103_1_1 corresponding to a modulated signal of the single-carrier scheme and the user #1 second baseband signal 103_1_2 corresponding to a modulated signal of the single-carrier scheme" and the "baseband signal of a single stream of the multi-carrier scheme such as OFDM" at identical times and identical frequencies (frequency bands that overlap with each other at least partially). At this time, it is sufficient for the "user #2 first baseband signal 103_2_1 corresponding to a modulated signal of the multi-carrier scheme like OFDM and the user #2 second baseband signal 103_2_2 corresponding to a modulated signal of the multi-carrier scheme like OFDM" to be baseband signals generated by any of the methods of "performing precoding and phase change", "performing precoding", "performing phase change without precoding", and "not performing precoding or phase change".

Furthermore, as another example, in the user #1 signal processor 102_1, the baseband signal of a single stream of the single-carrier scheme is generated, while in the user #2 signal processor 102_2, the baseband signal of a single stream of the multi-carrier scheme like OFDM is generated, and the transmission apparatus in FIG. 1 may transmit "baseband signal of a single stream of the single-carrier scheme" and the "baseband signal of a single stream of the multi-carrier scheme such as OFDM" at identical times and identical frequencies (frequency bands that overlap with each other at least partially).

Also, FIGS. 2 and 31 illustrate a configuration in which the signal processor for each other is provided with a single error-correcting coder and a single mapper, but the configuration is not limited thereto. For example, it is also possible to take a configuration in which a first error-correcting coder and a first mapper are provided to generate the user #p mapped signal (baseband signal) 205_1 for transmitting first data, while a second error-correcting coder and a second mapper are provided to generate the user #p mapped signal (baseband signal) 205_2 for transmitting second data. Also, the numbers of error-correcting coders and mappers may each be three or more.

Embodiment 5

Figure 34:
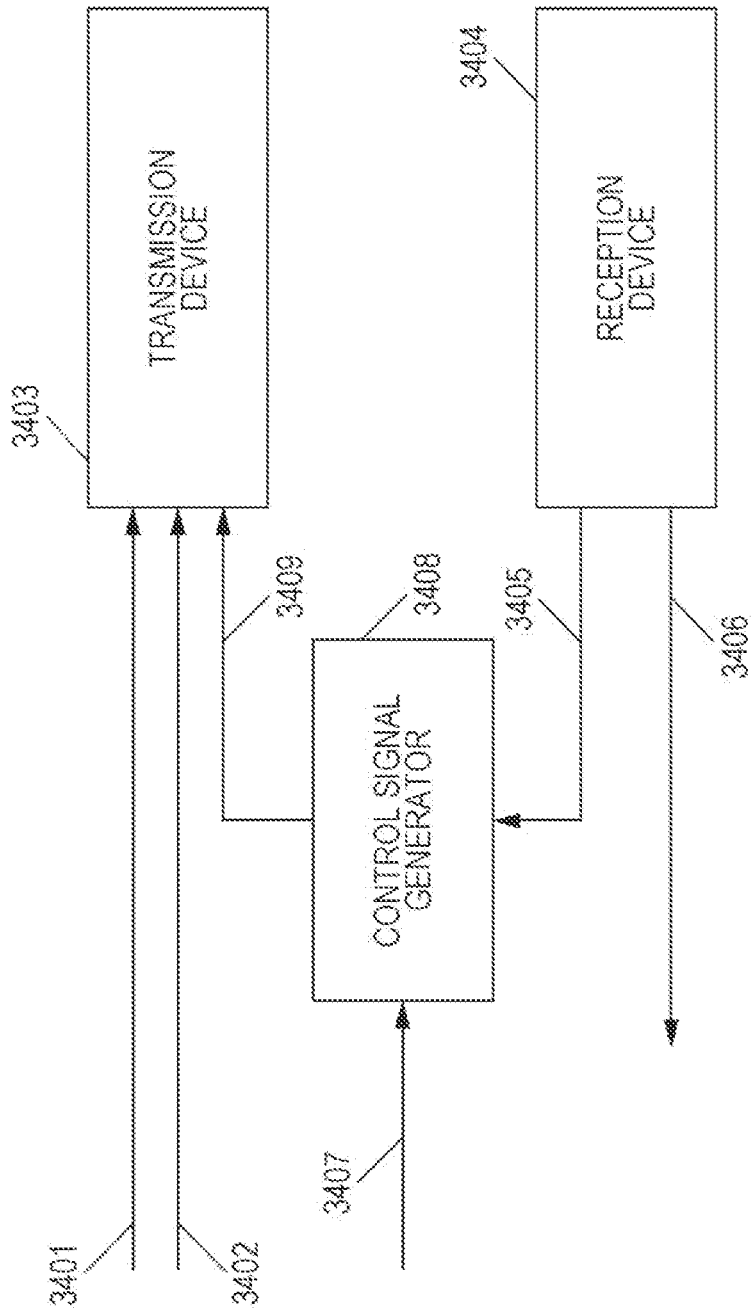
FIG. 34 is a diagram illustrating an example of a configuration of a terminal #p on the other end of communication with the base station illustrated in FIG. 24.

In the present embodiment, the example described in Embodiment 3 will be used to describe the exemplary operation of a terminal. FIG. 34 is a diagram illustrating an example of a configuration of the terminal #p on the other end of communication with the base station in FIG. 24. Terminal #p includes a transmission apparatus 3403, a reception apparatus 3404, and a control signal generator 3408.

The transmission apparatus 3403 accepts data 3401, a signal group 3402, and a control signal 3409 as input. The transmission apparatus 3403 generates a modulated signal corresponding to the data 3401 and the signal group 3402, and transmits the modulated signal from an antenna.

The reception apparatus 3404 receives a modulated signal transmitted from the other end of communication, such as a base station, for example, executes signal processing, demodulation, and decoding on the modulated signal, and outputs a control information signal 3405 and received data 3406 from the other end of communication.

The control signal generator 3408 accepts the control information signal 3405 from the other end of communication and a setting signal 3407 as input. On the basis of this information, the control signal generator 3408 generates and outputs the control signal 3409 to the transmission apparatus 3403.

Figure 35:
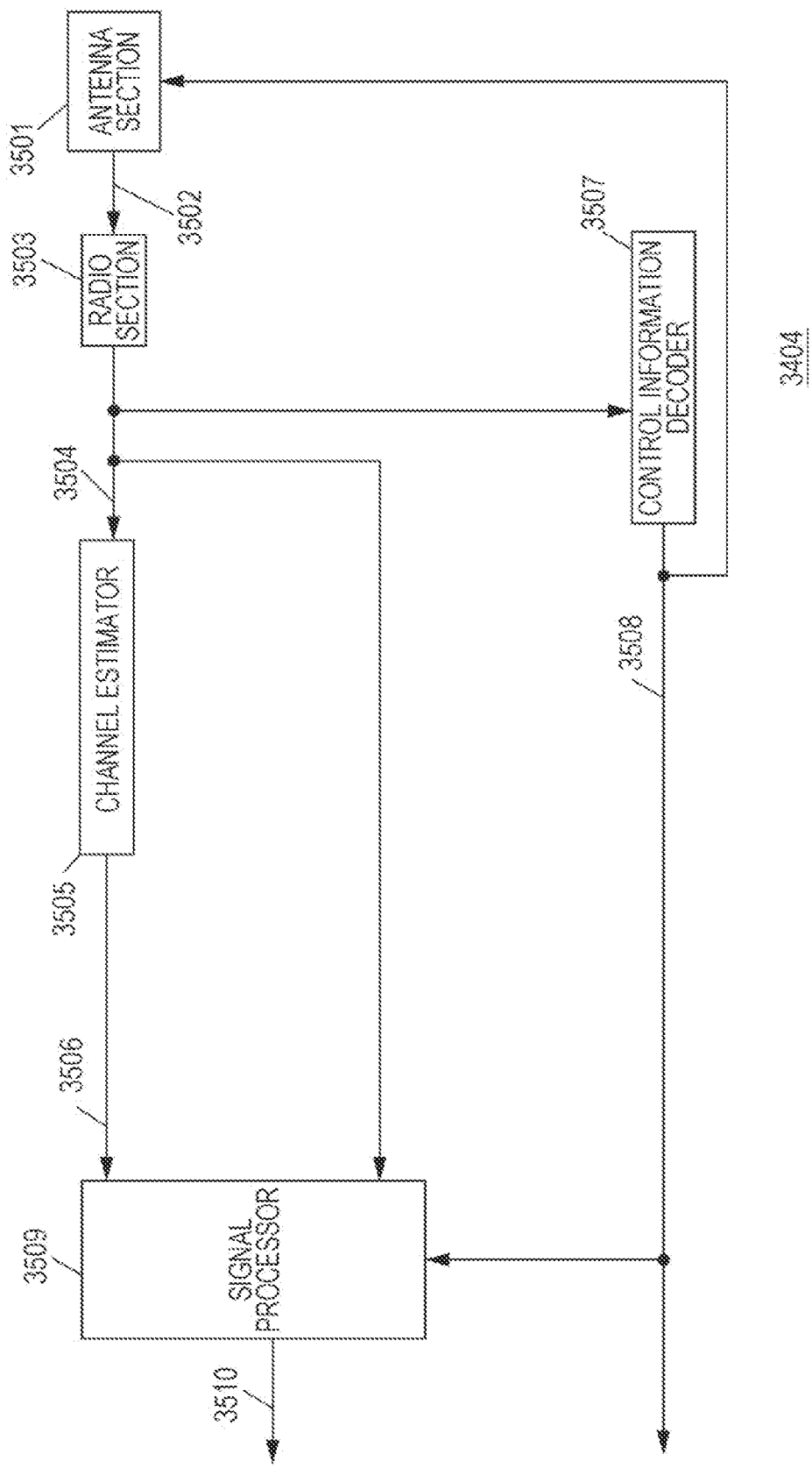
FIG. 35 is a diagram illustrating an example of a configuration of the terminal #p illustrated in FIG. 34.

FIG. 35 is a diagram illustrating an example of a configuration of the reception apparatus 3404 of the terminal #p illustrated in FIG. 34. The reception apparatus 3404 includes an antenna section 3501, a radio section 3503, a channel estimator 3505, a signal processor 3509, and a control information decoder 3507.

The radio section 3503 accepts a received signal 3502 received by the antenna section 3501 as input. The radio section 3503 executes processing such as frequency conversion on the received signal 3502, and generates a baseband signal 3504. The radio section 3503 outputs the baseband signal 3504 to the channel estimator 3505, the control information decoder 3507, and the signal processor 3509.

The control information decoder 3507 accepts the baseband signal 3504 as input. The control information decoder 3507 outputs control information 3508 obtained by demodulating control information symbols included in the baseband signal 3504.

The channel estimator 3505 accepts the baseband signal 3504 as input. The channel estimator 3505 extracts a preamble and pilot symbols included in the baseband signal 3504. The channel estimator 3505 estimates channel variation on the basis of the preamble and the pilot symbols, and generates a channel estimation signal 3506 indicating the estimated channel variation. The channel estimator 3505 outputs the channel estimation signal 3506 to the signal processor 3509.

The signal processor 3509 accepts the baseband signal 3504, the channel estimation signal 3506, and the control information 3508 as input. On the basis of the channel estimation signal 3506 and the control information 3508, the signal processor 3509 executes demodulation and error-correcting decoding on data symbols included in the baseband signal 3504, and generates received data 3510. The signal processor 3509 outputs the received data 3510.

Figure 36:
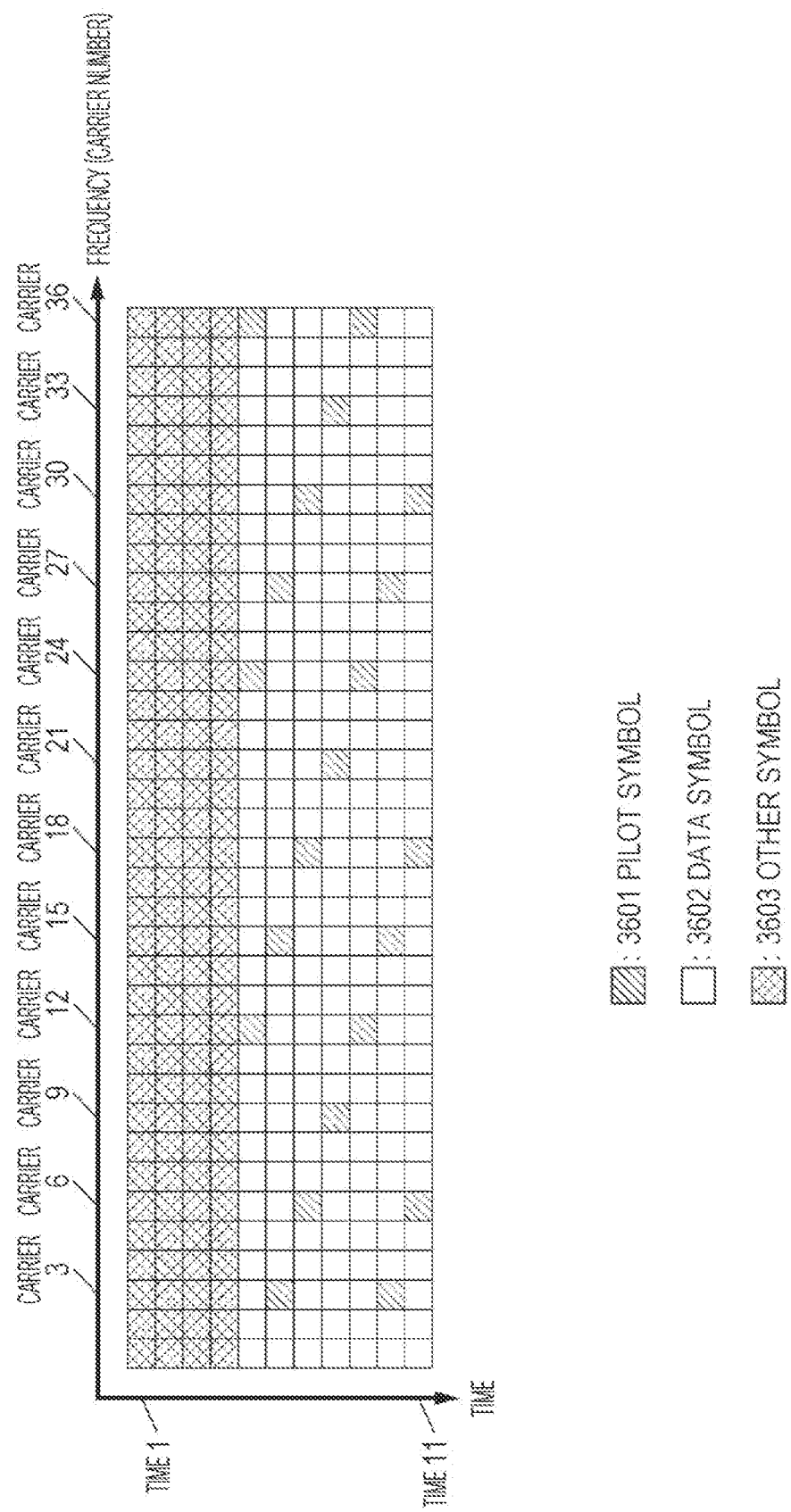
FIG. 36 is a diagram illustrating an example of a frame configuration of a modulated signal of a single stream transmitted using a multi-carrier transmission scheme such as OFDM.

FIG. 36 is a diagram illustrating an example of a frame configuration of a modulated signal of a single stream transmitted using a multi-carrier transmission scheme such as OFDM. In FIG. 36, the horizontal axis is frequency, and the vertical axis is time. FIG. 36 illustrates, as one example, symbols from carrier 1 to carrier 36. Also, FIG. 36 illustrates symbols from time 1 to time 11. The frame configuration illustrated in FIG. 36 is an example of a frame configuration of a modulated signal of a single stream transmitted using a multi-carrier transmission scheme such as OFDM by the base station (AP) on the other end of communication with terminal #p.

In FIG. 36, 3601 are pilot symbols, 3602 are data symbols, and 3603 are other symbols. The pilot symbols 3601 are taken to be symbols by which terminal #p estimates the channel variation. The data symbols 3602 are taken to be symbols by which the base station or AP transmits data to terminal #p. The other symbols 3603 are taken to include, for example, symbols by which terminal #p executes frequency offset estimation, frequency synchronization, and time synchronization, and/or control information symbols for demodulating the data symbols 3602 (such as information related to the transmission method, the modulation scheme, and the error-correcting coding method of the data symbols 3602).

Additionally, for example, the transmission apparatus of the base station illustrated in FIG. 1 or 24 may also transmit a modulated signal of a single stream with the frame configuration in FIG. 36 to terminal #p.

Figure 37:
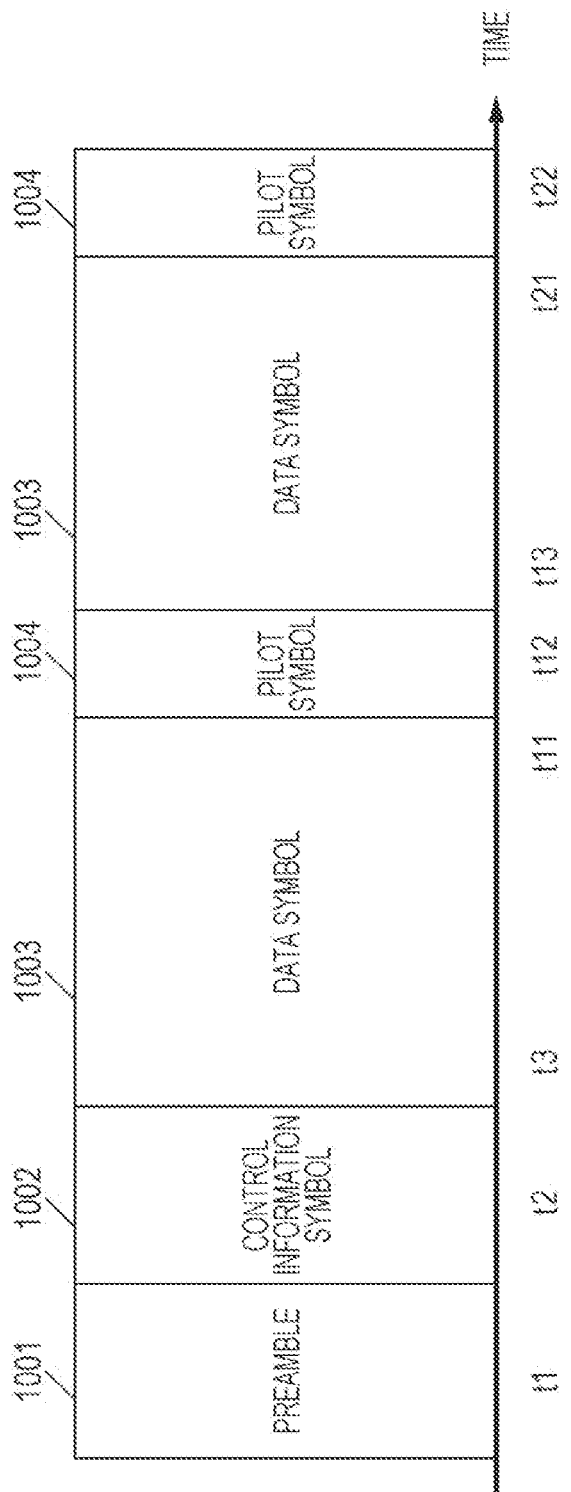
FIG. 37 is a diagram illustrating an example of a frame configuration of a modulated signal of a single stream transmitted using a single-carrier transmission scheme.

FIG. 37 is a diagram illustrating an example of a frame configuration of a modulated signal of a single stream transmitted using a single-carrier transmission scheme. Note that in FIG. 37, the parts of the configuration which are similar to FIG. 10 are denoted with the same numbers. In FIG. 37, the horizontal axis is time, and FIG. 37 illustrates symbols from time t1 to t22. The frame configuration illustrated in FIG. 37 is an example of a frame configuration of a modulated signal of a single stream transmitted using a single-carrier transmission scheme by the base station or AP on the other end of communication with terminal #p.

Additionally, for example, the transmission apparatus of the base station illustrated in FIG. 1 or 24 may also transmit to terminal #p a modulated signal of a single stream with the frame configuration in FIG. 37.

Additionally, for example, the transmission apparatus of the base station illustrated in FIG. 1 or 24 may also transmit to terminal #p multiple modulated signals of multiple streams with the frame configuration in FIG. 8 or 9.

Furthermore, for example, the transmission apparatus of the base station illustrated in FIG. 1 or 24 may also transmit to terminal #p multiple modulated signals of multiple streams with the frame configuration in FIG. 10 or 11.

Next, the reception capability in the reception apparatus of terminal #p illustrated in FIG. 35, or in other words, the schemes supported by the reception apparatus, and the processes of terminal #p and the processes of the base station (AP) based on the supported schemes will be described below by citing first to tenth examples.

First Example

As the first example, suppose that the configuration of the reception apparatus of terminal #p is the configuration illustrated in FIG. 35, and the reception apparatus of terminal #p supports the following.

The reception, for example, of "communication scheme #A" described in Embodiment 3 is supported.
Consequently, even if the other end of communication transmits multiple modulated signals of multiple streams, terminal #p does not support the reception of such signals.
Thus, in the case in which the other end of communication performs phase change when transmitting multiple modulated signals of multiple streams, terminal #p does not support the reception of such signals.
Only the single-carrier scheme is supported.
As the error-correcting coding scheme, only the decoding of "error-correcting coding scheme #C" is supported.

Thus, terminal #p having the configuration of FIG. 35 supporting the above generates the reception capability notification symbols 2702 illustrated in FIG. 30 on the basis of the rules described in Embodiment 3, and transmits the reception capability notification symbols 2702 by following the procedure in FIG. 27, for example.

At this time, terminal #p generates the reception capability notification symbols 2702 illustrated in FIG. 30 in the transmission apparatus 3403 of FIG. 34, for example. Additionally, following the procedure in FIG. 27, the transmission apparatus 3403 of FIG. 34 transmits the reception capability notification symbols 2702 illustrated in FIG. 30.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that terminal #p supports the "communication scheme #A" from the data 3001 related to "supported schemes" (see FIG. 30).

Consequently, since the data 2801 related to "demodulation of modulated signal with phase change supported/unsupported" in FIG. 30 is invalid, and the communication scheme #A is supported, the signal processor 155 of the base station decides not to transmit a phase-changed modulated signal, and outputs control information 157 (see FIG. 22) including this information. This is because the communication scheme #A does not support the transmitting and receiving of multiple modulated signals for multiple streams.

Also, since the data 2901 related to "reception for multiple streams supported/unsupported" in FIG. 30 is invalid, and the communication scheme #A is supported, the signal processor 155 of the base station decides not to transmit multiple modulated signals for multiple streams, and outputs a control signal 157 including this information. This is because the communication scheme #A does not support the transmitting and receiving of multiple modulated signals for multiple streams.

Additionally, since the data 3003 related to "supported error-correcting coding schemes" in FIG. 30 is invalid, and the communication scheme #A is supported, the signal processor 155 of the base station decides to use "error-correcting coding scheme #C", and outputs a control signal 157 including this information. This is because the communication scheme #A supports the "error-correcting coding scheme #C".

For example, as in FIG. 35, the "communication scheme #A" is supported, and consequently, by having the base station or AP execute operations as described above to not transmit multiple modulated signals for multiple streams, the base station (AP) appropriately transmits a modulated signal of the "communication scheme #A", and an advantageous effect of improving the data transmission efficiency in the system including the base station (AP) and the terminal #p may be obtained.

Second Example

As the second example, suppose that the configuration of the reception apparatus of terminal #p is the configuration illustrated in FIG. 35, and the reception apparatus of terminal #p supports the following.

The receiving, for example, of "communication scheme #B" described in Embodiment 3 is supported.
Since the reception apparatus adopts the configuration illustrated in FIG. 35, even if the other end of communication transmits multiple modulated signals of multiple streams, terminal #p does not support the reception of such signals.
Thus, in the case in which the other end of communication performs phase change when transmitting multiple modulated signals of multiple streams, terminal #p does not support the reception of such signals.
The single-carrier scheme and the multi-carrier scheme such as OFDM are supported.
As the error-correcting coding scheme, the decoding of "error-correcting coding scheme #C" and "error-correcting coding scheme #D" is supported.

Thus, terminal #p having the configuration of FIG. 35 supporting the above generates the reception capability notification symbols 2702 illustrated in FIG. 30 on the basis of the rules described in Embodiment 3, and transmits the reception capability notification symbols 2702 by following the procedure in FIG. 27, for example.

At this time, terminal #p generates the reception capability notification symbols 2702 illustrated in FIG. 30 in the transmission apparatus 3403 of FIG. 34, for example. Additionally, following the procedure in FIG. 27, the transmission apparatus 3403 of FIG. 34 transmits the reception capability notification symbols 2702 illustrated in FIG. 30.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that terminal #p supports the "communication scheme #B" from the data 3001 related to "supported schemes".

Also, from the data 2901 related to "reception for multiple streams supported/unsupported" in FIG. 30, the signal processor 155 of the base station learns that terminal #p on the other end of communication is unable to demodulate multiple modulated signals for multiple streams.

Consequently, since the data 2801 related to "demodulation of modulated signal with phase change supported/unsupported" in FIG. 30 is invalid, the signal processor 155 of the base station decides not to transmit a phase-changed modulated signal, and outputs control information 157 including this information. This is because terminal #p does not support "reception for multiple streams".

Also, from the data 3002 related to "multi-carrier scheme supported/unsupported" in FIG. 30, the signal processor 155 of the base station outputs control information 157 including information related to the terminal #p on the other end of communication supporting a multi-carrier scheme and/or supporting a single-carrier scheme.

Additionally, from the data 3003 related to "supported error-correcting coding schemes" in FIG. 30, the signal processor 155 of the base station outputs control information 157 including information related to the terminal #p on the other end of communication supporting "error-correcting coding scheme #C" and/or "error-correcting coding scheme #D".

Consequently, by having the base station (AP) execute operations as described above to not transmit multiple modulated signals for multiple streams, the base station (AP) is able to transmit a modulated signal of a single stream appropriately, and with this arrangement, an advantageous effect of improving the data transmission efficiency in the system including the base station (AP) and the terminal #p may be obtained.

Third Example

As the third example, suppose that the configuration of the reception apparatus of terminal #p is the configuration illustrated in FIG. 35, and the reception apparatus of terminal #p supports the following.

The reception of "communication scheme #A" and the reception of "communication scheme #B" described in Embodiment 3 are supported.

In both "communication scheme #A" and "communication scheme #B", even if the other end of communication transmits multiple modulated signals of multiple streams, terminal #p does not support the reception of such signals.

Thus, in the case in which the other end of communication performs phase change when transmitting multiple modulated signals of multiple streams, terminal #p does not support the reception of such signals.

In both "communication scheme #A" and "communication scheme #B", only the single-carrier scheme is supported.

Regarding the error-correcting coding schemes, for "communication scheme #A", the decoding of "error-correcting coding scheme #C" is supported, and for "communication scheme #B", the decoding of "error-correcting coding scheme #C" and "error-correcting coding scheme #D" is supported.

Thus, terminal #p having the configuration of FIG. 35 supporting the above generates the reception capability notification symbols 2702 illustrated in FIG. 30 on the basis of the rules described in Embodiment 3, and transmits the reception capability notification symbols 2702 by following the procedure in FIG. 27, for example.

At this time, terminal #p generates the reception capability notification symbols 2702 illustrated in FIG. 30 in the transmission apparatus 3403 of FIG. 34, for example. Additionally, following the procedure in FIG. 27, the transmission apparatus 3403 of FIG. 34 transmits the reception capability notification symbols 2702 illustrated in FIG. 30.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that terminal #p supports the "communication scheme #A" and the "communication scheme #B" from the data 3001 related to "supported schemes".

Additionally, from the data 2901 related to "reception for multiple streams supported/unsupported" in FIG. 30, the signal processor 155 of the base station learns that terminal #p "does not support reception for multiple streams".

Consequently, since the data 2801 related to "demodulation supported/unsupported when using phase change" in FIG. 30 is invalid, and the communication scheme #A is supported, the signal processor 155 of the base station decides not to transmit a phase-changed modulated signal, and outputs control information 157 including this information. This is because terminal #p does not support the transmitting and receiving of multiple modulated signals for multiple streams.

Additionally, from the data 3002 related to "multi-carrier scheme supported/unsupported" in FIG. 30, the signal processor 155 of the base station learns whether terminal #p supports the single-carrier scheme and whether terminal #p supports the multi-carrier scheme such as OFDM.

Also, from the data 3003 related to "supported error-correcting coding schemes" in FIG. 30, the signal processor 155 of the base station learns that terminal #p supports the decoding of "error-correcting coding scheme #C" and "error-correcting coding scheme #D".

Consequently, by having the base station (AP) execute operations as described above to not transmit multiple modulated signals for multiple streams, the base station (AP) is able to transmit a modulated signal of a single stream appropriately, and with this arrangement, an advantageous effect of improving the data transmission efficiency in the system including the base station (AP) and the terminal #p may be obtained.

Fourth Example

As the fourth example, suppose that the configuration of the reception apparatus of terminal #p is the configuration illustrated in FIG. 35, and the reception apparatus of terminal #p supports the following.

The reception of "communication scheme #A" and the reception of "communication scheme #B" described in Embodiment 3 are supported.

In both "communication scheme #A" and "communication scheme #B", even if the other end of communication transmits multiple modulated signals of multiple streams, terminal #p does not support the reception of such signals.

Thus, in the case in which the other end of communication performs phase change when transmitting multiple modulated signals of multiple streams, terminal #p does not support the reception of such signals.

For "communication scheme #A", the single-carrier scheme is supported, and for "communication scheme

B", the single-carrier scheme and the multi-carrier scheme such as OFDM is supported.

Regarding the error-correcting coding schemes, for "communication scheme #A", the decoding of "error-correcting coding scheme #C" is supported, and for "communication scheme #B", the decoding of "error-correcting coding scheme #C" and "error-correcting coding scheme #D" is supported.

Thus, terminal #p having the configuration of FIG. 35 supporting the above generates the reception capability notification symbols 2702 illustrated in FIG. 30 on the basis of the rules described in Embodiment 3, and transmits the reception capability notification symbols 2702 by following the procedure in FIG. 27, for example.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that terminal #p supports the "communication scheme #A" and the "communication scheme #B" from the data 3001 related to "supported schemes".

Additionally, from the data 2901 related to "reception for multiple streams supported/unsupported" in FIG. 30, the signal processor 155 of the base station learns that terminal #p "does not support reception for multiple streams".

Consequently, since the data 2801 related to "demodulation of modulated signal with phase change supported/unsupported" in FIG. 30 is invalid, and the communication scheme #A is supported, the signal processor 155 of the base station decides not to transmit a phase-changed modulated signal, and outputs control information 157 including this information. This is because terminal #p does not support the transmitting and reception of multiple modulated signals for multiple streams.

Additionally, from the data 3002 related to "multi-carrier scheme supported/unsupported" in FIG. 30, the signal processor 155 of the base station learns whether terminal #p supports the single-carrier scheme and whether terminal #p supports the multi-carrier scheme such as OFDM.

At this time, the data 3002 related to "multi-carrier scheme supported/unsupported" needs a configuration like the one described below, for example.

Assume that the data 3002 related to "multi-carrier scheme supported/unsupported" is made up of 4 bits, and the 4 bits are expressed as g0, g1, g2, and g3. At this time, terminal #p sets g0, g1, g2, and g3 as follows according to the reception capability of terminal #p, and transmits the data 3002 related to "multi-carrier scheme supported/unsupported".

For the "communication scheme #A", in the case in which terminal #p supports demodulation of the single-carrier scheme, terminal #p sets (g0, g1)=(0, 0).

For the "communication scheme #A", in the case in which terminal #p supports demodulation of the multi-carrier scheme such as OFDM, terminal #p sets (g0, g1)=(0, 1).

For the "communication scheme #A", in the case in which terminal #p supports demodulation of the multi-carrier scheme such as OFDM, terminal #p sets (g0, g1)=(1, 1).

For the "communication scheme #B", in the case in which terminal #p supports demodulation of the single-carrier scheme, terminal #p sets (g2, g3)=(0, 0).

For the "communication scheme #B", in the case in which terminal #p supports demodulation of the multi-carrier scheme such as OFDM, terminal #p sets (g2, g3)=(0, 1).

For the "communication scheme #B", in the case in which terminal #p supports demodulation of the multi-carrier scheme such as OFDM, terminal #p sets (g2, g3)=(1, 1).

Also, from the data 3003 related to "supported error-correcting coding schemes" in FIG. 30, the signal processor 155 of the base station learns that terminal #p supports the decoding of "error-correcting coding scheme #C" and "error-correcting coding scheme #D".

Consequently, by having the base station (AP) execute operations as described above to not transmit multiple modulated signals for multiple streams, the base station (AP) is able to transmit a modulated signal of a single stream appropriately, and with this arrangement, an advantageous effect of improving the data transmission efficiency in the system including the base station (AP) and the terminal #p may be obtained.

Fifth Example

As the fifth example, suppose that the configuration of the reception apparatus of terminal #p is the configuration illustrated in FIG. 19, and the reception apparatus of terminal #p supports the following, for example.

The reception, for example, of "communication scheme #A" and "communication scheme #B" described in Embodiment 3 is supported.

If the other end of communication transmits multiple modulated signals of multiple streams in "communication scheme #B", terminal #p supports the reception of such signals. Also, in "communication scheme #A" and "communication scheme #B", if the other end of communication transmits a modulated signal of a single stream, terminal #p supports the reception of such a signal.

Additionally, in the case in which the other end of communication performs phase change when transmitting modulated signals of multiple streams, terminal #p supports the reception of such signals.

Only the single-carrier scheme is supported.

As the error-correcting coding scheme, only the decoding of "error-correcting coding scheme #C" is supported.

Thus, terminal #p having the configuration of FIG. 19 supporting the above generates the reception capability notification symbols 2702 illustrated in FIG. 30 on the basis of the rules described in Embodiment 3, and transmits the reception capability notification symbols 2702 by following the procedure in FIG. 27, for example.

At this time, terminal #p generates the reception capability notification symbols 2702 illustrated in FIG. 30 with the transmission apparatus 3403 in FIG. 34, for example, and following the procedure in FIG. 27, the transmission apparatus 3403 of FIG. 34 transmits the reception capability notification symbols 2702 illustrated in FIG. 30.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that terminal #p supports the "communication scheme #A" and the "communication scheme #B" from the data 3001 related to "supported schemes".

Also, from the data 2901 related to "reception for multiple streams supported/unsupported" in FIG. 30, the signal processor 155 of the base station learns that "if the other end of communication transmits multiple modulated signals of multiple streams "communication scheme #B", terminal #p supports the reception of such signals". Also, from the data 2901 related to "reception for multiple streams supported/unsupported" in FIG. 30, the signal processor 155 of the base station learns that "if the other end of communication transmits a modulated signal of a single stream in "communication scheme #A" and "communication scheme #B", terminal #p supports the reception of such a signal".

Additionally, from the data 2801 related to "demodulation of modulated signal with phase change supported/unsupported" in FIG. 30, the signal processor 155 of the base station learns that terminal #p "supports demodulation of modulated signal with phase change".

From the data 3002 related to "multi-carrier scheme supported/unsupported" in FIG. 30, the signal processor 155 of the base station learns that terminal #p "supports the single-carrier scheme only".

From the data 3003 related to "supported error-correcting coding schemes" in FIG. 30, the signal processor 155 of the base station learns that terminal #p supports the decoding of "error-correcting coding scheme #C" only.

Consequently, by having the base station (AP) take into account the communication schemes supported by terminal #p, the communication environment, and the like, and by having the base station (AP) appropriately generate and transmit modulated signals receivable by terminal #p, an advantageous effect of improving the data transmission efficiency in the system including the base station (AP) and the terminal #p may be obtained.

Sixth Example

As the sixth example, suppose that the configuration of the reception apparatus of terminal #p is the configuration illustrated in FIG. 19, and the reception apparatus of terminal #p supports the following, for example.

The reception, for example, of "communication scheme #A" and "communication scheme #B" described in Embodiment 3 is supported.
If the other end of communication transmits multiple modulated signals of multiple streams in "communication scheme #B", terminal #p supports the reception of such signals. Also, in "communication scheme #A" and "communication scheme #B", if the other end of communication transmits a modulated signal of a single stream, terminal #p supports the reception of such a signal.
Additionally, in the case in which the other end of communication performs phase change when transmitting modulated signals of multiple streams, terminal #p does not support the reception of such signals.
Only the single-carrier scheme is supported.
As the error-correcting coding scheme, the decoding of "error-correcting coding scheme #C" and the decoding of "error-correcting coding scheme #D" are supported.

Thus, terminal #p having the configuration of FIG. 19 supporting the above generates the reception capability notification symbols 2702 illustrated in FIG. 30 on the basis of the rules described in Embodiment 3, and transmits the reception capability notification symbols 2702 by following the procedure in FIG. 27, for example.

At this time, terminal #p generates the reception capability notification symbols 2702 illustrated in FIG. 30 with the transmission apparatus 3403 in FIG. 34, for example, and following the procedure in FIG. 27, the transmission apparatus 3403 of FIG. 34 transmits the reception capability notification symbols 2702 illustrated in FIG. 30.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that terminal #p supports the "communication scheme #A" and the "communication scheme #B" from the data 3001 related to "supported schemes".

Also, from the data 2901 related to "reception for multiple streams supported/unsupported" in FIG. 30, the signal processor 155 of the base station learns that "if the other end of communication transmits multiple modulated signals of multiple streams with terminal #p in "communication scheme #B", terminal #p supports the reception of such signals". Also, from the data 2901 related to "reception for multiple streams supported/unsupported" in FIG. 30, the signal processor 155 of the base station learns that "if the other end of communication transmits a modulated signal of a single stream in "communication scheme #A" and "communication scheme #B", terminal #p supports the reception of such a signal".

Additionally, from the data 2801 related to "demodulation of modulated signal with phase change supported/unsupported" in FIG. 30, the signal processor 155 of the base station learns that terminal #p "does not support demodulation of modulated signal with phase change." Consequently, when transmitting multiple modulated signals of multiple streams to the terminal #p, the base station (AP) transmits the modulated signals without performing phase change.

From the data 3002 related to "multi-carrier scheme supported/unsupported" in FIG. 30, the signal processor 155 of the base station learns that terminal #p "supports the single-carrier scheme only".

From the data 3003 related to "supported error-correcting coding schemes" in FIG. 30, the signal processor 155 of the base station learns that terminal #p "supports the decoding of 'error-correcting coding scheme #C' and the decoding of 'error-correcting coding scheme #D'".

Consequently, by having the base station (AP) take into account the communication schemes supported by terminal #p, the communication environment, and the like, and by having the base station (AP) appropriately generate and transmit modulated signals receivable by terminal #p, an advantageous effect of improving the data transmission efficiency in the system including the base station (AP) and the terminal #p may be obtained.

Seventh Example

As the seventh example, suppose that the configuration of the reception apparatus of terminal #p is the configuration illustrated in FIG. 19, and the reception apparatus of terminal #p supports the following, for example.

The reception, for example, of "communication scheme #A" and "communication scheme #B" described in Embodiment 3 is supported.
If the other end of communication transmits multiple modulated signals of multiple streams in "communication scheme #B", terminal #p supports the reception of such signals. Also, in "communication scheme #A" and "communication scheme #B", if the other end of communication transmits a modulated signal of a single stream, terminal #p supports the reception of such a signal.

For "communication scheme #A", the single-carrier scheme is supported, and for "communication scheme #B", the single-carrier scheme and the multi-carrier scheme such as OFDM is supported. However, assume that "the other end of communication is able to perform phase change when transmitting modulated signals of multiple streams" only in the case of the multi-carrier scheme such as OFDM of "communication scheme #B".

Additionally, in the case in which the other end of communication performs phase change when transmitting modulated signals of multiple streams, terminal #p supports the reception of such signals.

As the error-correcting coding scheme, the decoding of "error-correcting coding scheme #C" and the decoding of "error-correcting coding scheme #D" are supported.

Thus, terminal #p having the configuration of FIG. 19 supporting the above generates the reception capability notification symbols 2702 illustrated in FIG. 30 on the basis of the rules described in Embodiment 3 and in the present embodiment, and transmits the reception capability notification symbols 2702 by following the procedure in FIG. 27, for example.

At this time, terminal #p generates the reception capability notification symbols 2702 illustrated in FIG. 30 with the transmission apparatus 3403 in FIG. 34, for example, and following the procedure in FIG. 27, the transmission apparatus 3403 of FIG. 34 transmits the reception capability notification symbols 2702 illustrated in FIG. 30.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that terminal #p supports the "communication scheme #A" and the "communication scheme #B" from the data 3001 related to "supported schemes".

Also, from the data 2901 related to "reception for multiple streams supported/unsupported" in FIG. 30, the signal processor 155 of the base station learns that "if the other end of communication transmits multiple modulated signals of multiple streams with terminal #p in "communication scheme #B", terminal #p supports the reception of such signals". Also, from the data 2901 related to "reception for multiple streams supported/unsupported" in FIG. 30, the signal processor 155 of the base station learns that "if the other end of communication transmits a modulated signal of a single stream in "communication scheme #A" and "communication scheme #B", terminal #p supports the reception of such a signal".

Additionally, from the data 2801 related to "demodulation of modulated signal with phase change supported/unsupported" in FIG. 30, the signal processor 155 of the base station learns that terminal #p "does not support phase modulation demodulation". Consequently, when transmitting multiple modulated signals of multiple streams to the terminal #p, the base station (AP) transmits the modulated signals without performing phase change. Note that when terminal #p obtains information indicating "demodulation of modulated signal with phase change supported" in the data 2801 related to "demodulation of modulated signal with phase change supported/unsupported" as described above, terminal #p understands that this applies only to "communication scheme #B".

From the data 3002 related to "multi-carrier scheme supported/unsupported" in FIG. 30, the signal processor 155 of the base station learns that terminal #p supports the single-carrier scheme as "communication scheme #A", and supports the single-carrier scheme and the multi-carrier scheme such as OFDM as "communication scheme #B". At this time, as described above, terminal #p preferably is configured to notify the base station or AP of the conditions of support for the single-carrier scheme and the multi-carrier scheme such as OFDM in "communication scheme #A", and support for the single-carrier scheme and the multi-carrier scheme such as OFDM in "communication scheme #B".

From the data 3003 related to "supported error-correcting coding schemes" in FIG. 30, the signal processor 155 of the base station learns that terminal #p "supports the decoding of 'error-correcting coding scheme #C' and the decoding of 'error-correcting coding scheme #D'".

Consequently, by having the base station (AP) take into account the communication schemes supported by terminal #p, the communication environment, and the like, and by having the base station (AP) appropriately generate and transmit modulated signals receivable by terminal #p, an advantageous effect of improving the data transmission efficiency in the system including the base station (AP) and the terminal #p may be obtained.

Eighth Example

As the eighth example, suppose that the configuration of the reception apparatus of terminal #p is the configuration illustrated in FIG. 19, and the receiving apparatus of terminal #p supports the following, for example.

The reception, for example, of "communication scheme #A" and "communication scheme #B" described in Embodiment 3 is supported.

If the other end of communication transmits multiple modulated signals of multiple streams in "communication scheme #B", terminal #p supports the reception of such signals. Also, in "communication scheme #A" and "communication scheme #B", if the other end of communication transmits a modulated signal of a single stream, terminal #p supports the reception of such a signal.

Additionally, in the case of the single-carrier scheme of "communication scheme #B", if the other end of communication transmits multiple modulated signals of multiple streams, terminal #p supports the reception of such signals.

On the other hand, assume that in the case of the multi-carrier scheme such as OFDM of "communication scheme #B", if the other end of communication transmits multiple modulated signals of multiple streams, terminal #p does not support the reception of such signals.

Also, assume that in the case of the single-carrier scheme of "communication scheme #A", when the other end of communication transmits a modulated signal of a single stream, terminal #p supports the reception of such a signal. The reception of the multi-carrier scheme such as OFDM is not supported.

Additionally, in the case in which the other end of communication performs phase change when transmitting modulated signals of multiple streams, terminal #p supports the reception of such signals.

As the error-correcting coding scheme, the decoding of "error-correcting coding scheme #C" and the decoding of "error-correcting coding scheme #D" are supported.

Thus, terminal #p having the configuration of FIG. 19 supporting the above generates the reception capability notification symbols 2702 illustrated in FIG. 30 on the basis of the rules described in Embodiment 3, and transmits the reception capability notification symbols 2702 by following the procedure in FIG. 27, for example.

At this time, terminal #p generates the reception capability notification symbols 2702 illustrated in FIG. 30 with the transmission apparatus 3403 in FIG. 34, for example, and following the procedure in FIG. 27, the transmission apparatus 3403 of FIG. 34 transmits the reception capability notification symbols 2702 illustrated in FIG. 30.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that terminal #p supports the "communication scheme #A" and the "communication scheme #B" from the data 3001 related to "supported schemes".

Also, from the data 2901 related to "reception for multiple streams supported/unsupported" in FIG. 30, the signal processor 155 of the base station learns that "in the case of the single-carrier scheme of "communication scheme #B", if the base station transmits multiple modulated signals of multiple streams, terminal #p supports the reception of such signals". Also, from the data 2901 related to "reception for multiple streams supported/unsupported" in FIG. 30, the signal processor 155 of the base station learns that "in the case of the multi-carrier scheme such as OFDM of "communication scheme #B", if the base station transmits multiple modulated signals of multiple streams, terminal #p does not support the reception of such signals". Also, from the data 2901 related to "reception for multiple streams supported/unsupported" in FIG. 30, the signal processor 155 of the base station learns that "in "communication scheme #A" and "communication scheme #B", if the base station transmits a modulated signal of a single stream, terminal #p supports the reception of such a signal".

At this time, the data 2901 related to "reception for multiple streams supported/unsupported" needs a configuration of data like the one described below, for example.

Assume that the data 2901 related to "reception for multiple streams supported/unsupported" is made up of 2 bits, and the 2 bits are expressed as h0 and h1.

In the case in which terminal #p supports the demodulation of multiple modulated signals of multiple streams transmitted by the other end of communication in the single-carrier scheme of "communication scheme #B", terminal #p sets h0=1, whereas when terminal #p does not support such demodulation, terminal #p sets h0=0.

In the case in which terminal #p supports the demodulation of multiple modulated signals of multiple streams transmitted by the other end of communication in the multi-carrier scheme such as OFDM of "communication scheme #B", terminal #p sets h1=1, whereas when terminal #p does not support such demodulation, terminal #p sets h1=0.

Additionally, from the data 2801 related to "demodulation of modulated signal with phase change supported/unsupported" in FIG. 30, the signal processor 155 of the base station learns that terminal #p "supports demodulation of modulated signal with phase change".

From the data 3002 related to "multi-carrier scheme supported/unsupported" in FIG. 30, the signal processor 155 of the base station learns that terminal #p "supports the single-carrier scheme only".

From the data 3003 related to "supported error-correcting coding schemes" in FIG. 30, the signal processor 155 of the base station learns that terminal #p supports the decoding of "error-correcting coding scheme #C" and "error-correcting coding scheme #D".

Consequently, by having the base station (AP) take into account the communication schemes supported by terminal #p, the communication environment, and the like, and by having the base station (AP) appropriately generate and transmit modulated signals receivable by terminal #p, an advantageous effect of improving the data transmission efficiency in the system including the base station (AP) and the terminal #p may be obtained.

Ninth Example

As the ninth example, suppose that the configuration of the reception apparatus of terminal #p is the configuration illustrated in FIG. 19, and the reception apparatus of terminal #p supports the following, for example.

The reception, for example, of "communication scheme #A" and "communication scheme #B" described in Embodiment 3 is supported.

If the other end of communication transmits multiple modulated signals of multiple streams in "communication scheme #B", terminal #p supports the reception of such signals. Also, in "communication scheme #A" and "communication scheme #B", if the other end of communication transmits a modulated signal of a single stream, terminal #p supports the reception of such a signal.

In the "communication scheme #B", the base station (AP) on the other end of communication is able to transmit multiple modulated signals for multiple streams in the case of the single-carrier scheme and the multi-carrier scheme such as OFDM. However, assume that the other end of communication is able to perform phase change when transmitting multiple modulated signals of multiple streams only in the case of the multi-carrier scheme such as OFDM of "communication scheme #B". Additionally, in the case in which the other end of communication performs phase change when transmitting multiple modulated signals of multiple streams, terminal #p supports the reception of such signals.

As the error-correcting scheme, the decoding of "error-correcting coding scheme #C" and the decoding of "error-correcting coding scheme #D" are supported.

Thus, terminal #p having the configuration of FIG. 19 supporting the above generates the reception capability notification symbols 2702 illustrated in FIG. 30 on the basis of the rules described in Embodiment 3, and transmits the reception capability notification symbols 2702 by following the procedure in FIG. 27, for example.

At this time, terminal #p generates the reception capability notification symbols 2702 illustrated in FIG. 30 with the transmission apparatus 3403 in FIG. 34, for example, and following the procedure in FIG. 27, the transmission apparatus 3403 of FIG. 34 transmits the reception capability notification symbols 2702 illustrated in FIG. 30.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station in FIG. 22 extracts the data included in the reception capability notification symbols 2702, and learns that terminal #p supports the "communication scheme #A" and the "communication scheme #B" from the data 3001 related to "supported schemes".

From the data 2901 related to "reception for multiple streams supported/unsupported" in FIG. 30, the signal processor 155 of the base station learns that "if the other end of communication transmits multiple modulated signals of multiple streams with terminal #p in "communication scheme #B", the reception of such signals is supported". Also, from the data 2901 related to "reception for multiple streams supported/unsupported" in FIG. 30, the signal processor 155 of the base station learns that "if the other end of communication transmits a modulated signal of a single stream in "communication scheme #A" and "communication scheme #B", the reception of such a signal is supported".

Additionally, from the data 3002 related to "multi-carrier scheme supported/unsupported" in FIG. 30, the signal processor 155 of the base station learns whether terminal #p supports the "single-carrier scheme", supports the "multi-carrier scheme such as OFDM", or supports "both the single-carrier scheme and the multi-carrier scheme such as OFDM".

When the signal processor 155 of the base station learns that terminal #p "supports the single-carrier scheme", the signal processor 155 of the base station interprets the data 2801 related to "demodulation of modulated signal with phase change supported/unsupported" in FIG. 30 as being invalid, and interprets that "phase change demodulation is unsupported". This is because the base station on the other side of communication does not support phase change in the case of the single-carrier scheme.

When the signal processor 155 of the base station learns that terminal #p "supports the multi-carrier scheme such as OFDM" or "supports both the single-carrier scheme and the multi-carrier scheme such as OFDM", the signal processor 155 of the base station does not interpret the data 2801 related to "demodulation of modulated signal with phase change supported/unsupported" in FIG. 30 as being invalid (that is, interprets the data as being valid). From the data 2801 related to "demodulation of modulated signal with phase change supported/unsupported" in FIG. 30, the signal processor 155 of the base station obtains information about whether terminal #p supports or does not support demodulation of modulated signal with phase change in the case of the multi-carrier scheme such as OFDM.

From the data 3003 related to "supported error-correcting coding schemes" in FIG. 30, the signal processor 155 of the base station learns that terminal #p "supports the decoding of 'error-correcting coding scheme #C' and the decoding of 'error-correcting coding scheme #D'".

Consequently, by having the base station (AP) take into account the communication schemes supported by terminal #p, the communication environment, and the like, and by having the base station (AP) appropriately generate and transmit modulated signals receivable by terminal #p, an advantageous effect of improving the data transmission efficiency in the system including the base station (AP) and the terminal #p may be obtained.

Tenth Example

As the tenth example, suppose that the configuration of the reception apparatus of terminal #p is the configuration illustrated in FIG. 19, and the reception apparatus of terminal #p supports the following, for example.

The reception, for example, of "communication scheme #A" and "communication scheme #B" described in Embodiment 3 is supported.

If the other end of communication transmits multiple modulated signals of multiple streams in "communication scheme #B", terminal #p supports the reception of such signals. Also, in "communication scheme #A" and "communication scheme #B", if the other end of communication transmits a modulated signal of a single stream, terminal #p supports the reception of such a signal.

In the "communication scheme #B", the base station or AP is able to transmit multiple modulated signals for multiple streams in the case of the single-carrier scheme and the multi-carrier scheme such as OFDM.

Additionally, in the case of the single-carrier scheme, when the other end of communication transmits modulated signals of multiple streams, whether or not to perform phase change may be set, and also, in the case of the multi-carrier scheme such as OFDM, when the other end of communication transmits modulated signals of multiple streams, whether or not to perform phase change may be set.

As the error-correcting scheme, the decoding of "error-correcting coding scheme #C" and the decoding of "error-correcting coding scheme #D" are supported.

Thus, terminal #p having the configuration of FIG. 19 supporting the above generates the reception capability notification symbols 2702 illustrated in FIG. 30 on the basis of the rules described in Embodiment 3, and transmits the reception capability notification symbols 2702 by following the procedure in FIG. 27, for example.

At this time, terminal #p generates the reception capability notification symbols 2702 illustrated in FIG. 30 with the transmission apparatus 3403 in FIG. 34, for example, and following the procedure in FIG. 27, the transmission apparatus 3403 of FIG. 34 transmits the reception capability notification symbols 2702 illustrated in FIG. 30.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that terminal #p supports the "communication scheme #A" and the "communication scheme #B" from the data 3001 related to "supported schemes".

From the data 2901 related to "reception for multiple streams supported/unsupported" in FIG. 30, the signal processor 155 of the base station learns that "if the other end of communication transmits multiple modulated signals of multiple streams with terminal #p in "communication scheme #B", the reception of such signals is supported". Also, from the data 2901 related to "reception for multiple streams supported/unsupported" in FIG. 30, the signal processor 155 of the base station learns that "if the other end of communication transmits a modulated signal of a single stream in "communication scheme #A" and "communication scheme #B", the reception of such a signal is supported".

Additionally, from the data 3002 related to "multi-carrier scheme supported/unsupported" in FIG. 30, the signal processor 155 of the base station learns whether terminal #p supports the "single-carrier scheme", supports the "multi-carrier scheme such as OFDM", or supports "both the single-carrier scheme and the multi-carrier scheme such as OFDM".

Additionally, from the data 2801 related to "demodulation of modulated signal with phase change supported/unsupported" in FIG. 30, the signal processor 155 of the base station learns the conditions of phase change support in the terminal #p.

At this time, the data 2801 related to "demodulation of modulated signal with phase change supported/unsupported" needs a configuration like the one described below, for example.

Assume that the data 2801 related to "demodulation of modulated signal with phase change supported/unsupported" is made up of 2 bits, and the 2 bits are expressed as k0 and k1.

In the case in which the other end of communication transmits multiple modulated signals of multiple streams in the single-carrier scheme of "communication scheme #B", executes phase change at that time, and terminal #p supports the demodulation of such signals, terminal #p sets k0=1, whereas when terminal #p does not support such demodulation, terminal #p sets k0=0.

In the case in which the other end of communication transmits multiple modulated signals of multiple streams in the multi-carrier scheme such as OFDM of "communication scheme #B", executes phase change at that time, and terminal #p supports the demodulation of such signals, terminal #p sets k1=1, whereas when terminal #p does not support such demodulation, terminal #p sets k1=0.

From the data 3003 related to "supported error-correcting coding schemes" in FIG. 30, the signal processor 155 of the base station learns that terminal #p supports the decoding of "error-correcting coding scheme #C" and "error-correcting coding scheme #D".

Consequently, by having the base station (AP) take into account the communication schemes supported by terminal #p, the communication environment, and the like, and by having the base station (AP) appropriately generate and transmit modulated signals receivable by terminal #p, an advantageous effect of improving the data transmission efficiency in the system including the base station (AP) and the terminal #p may be obtained.

As above, the base station (AP) acquires information related to the demodulation schemes supported by terminal #p from terminal #p on the other end of communication, and on the basis of the information, decides the number of modulated signals, the modulated signal communication method, the signal processing method of the modulated signal, and the like, and thereby is able to appropriately generate and transmit modulated signals receivable by terminal #p. With this arrangement, an advantageous effect of improved data transmission efficiency in the system including the base station (AP) and terminal #p may be obtained.

At this time, by including multiple pieces of data in the reception capability notification symbols like in FIG. 30, for example, the base station (AP) is able to determine the validity/invalidity of the data included in the reception capability notification symbols easily. This arrangement has an advantage of enabling fast determination of the modulated signal scheme, signal processing method, and the like for transmission.

Additionally, on the basis of the content of the information of the reception capability notification symbols transmitted by each terminal #p, the base station (AP) is able to transmit modulated signals to each terminal #p by a favorable transmission method, thereby improving the data transmission efficiency.

Note that the method of configuring the data of the reception capability notification symbols described in the present embodiment is an example, and the method of configuring the data of the reception capability notification symbols is not limited thereto. Also, the transmission procedure by which terminal #p transmits the reception capability notification symbols to the base station (AP) and the description of the present embodiment regarding the transmission timings are merely one example, and the configuration is not limited thereto.

Also, each terminal transmits the reception capability notification symbols as described above. However, depending on the terminal, the reception capability notification symbols may also not be transmitted in some cases. Subsequently, the base station (AP) receives the reception capability notification symbols transmitted by each terminal, and creates the modulated signals to transmit to each terminal. In particular, by having the base station (AP) described in this specification transmit modulated signals to each terminal at identical frequencies (or using a subset of frequencies shared in common) and identical times (or using a subset of times shared in common), an advantageous effect of improved data transmission efficiency in the system including the base station (AP) and the terminals may be obtained thereby.

Embodiment 6

Figure 38:
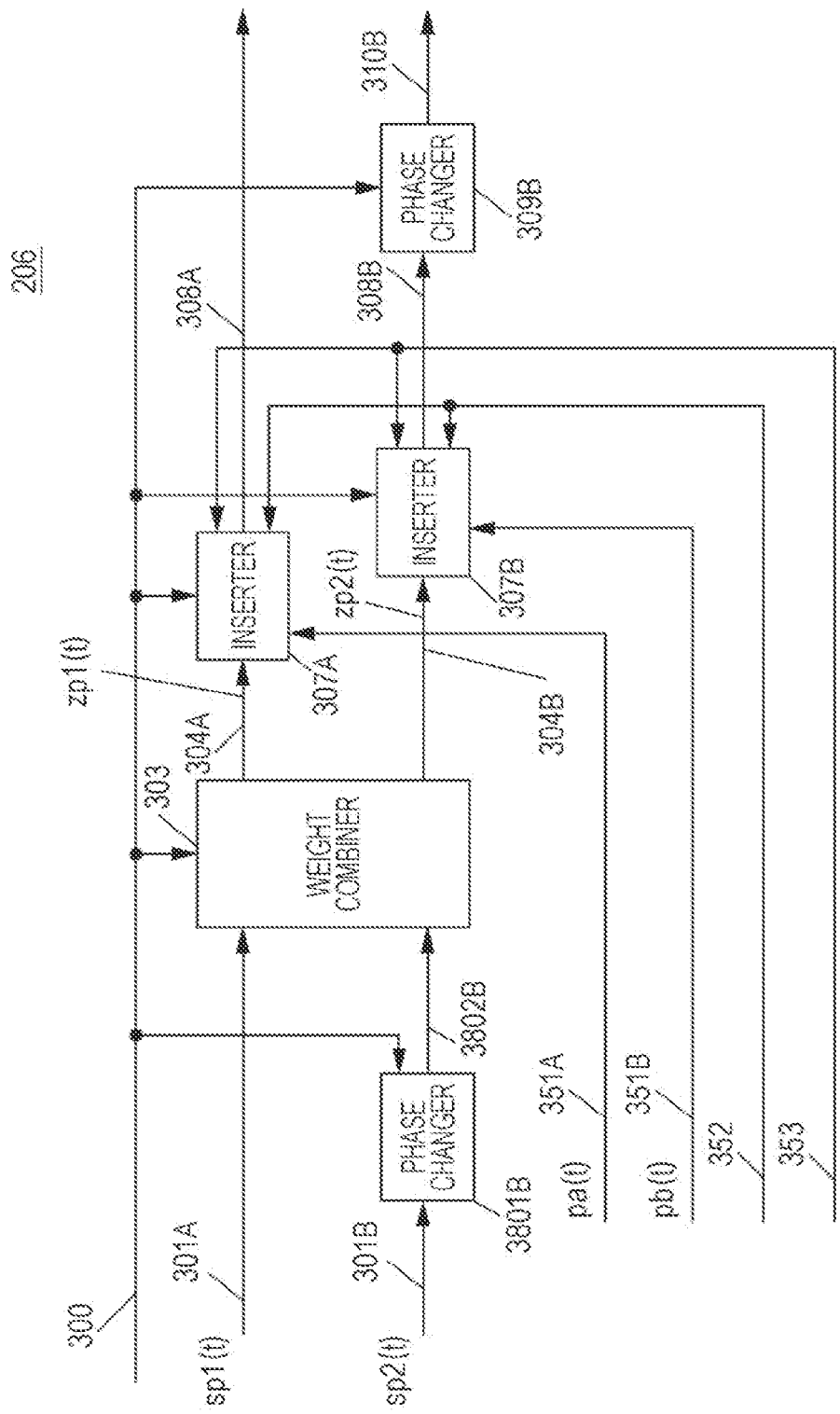
FIG. 38 is a diagram illustrating yet another example of a configuration of the signal processor in FIG. 2.

In embodiments such as Embodiment 1, Embodiment 2, and Embodiment 3, examples of the configuration of the signal processor 206 in FIG. 2 are described. In the following, an example of the configuration of the signal processor 206 in FIG. 2 different from FIGS. 3, 4, and 26 will be described. FIG. 38 is a diagram illustrating yet another example of the configuration of the signal processor 206 in FIG. 2. Note that in FIG. 38, parts which operate similarly to FIG. 3 are denoted with the same numbers, and a description is omitted.

A phase changer 3801B accepts the user #p mapped signal 301B expressed as sp2(t) and the control signal 300 as input. On the basis of the control signal 300, the phase changer 3801B changes the phase of the user #p mapped signal 301B, and outputs a phase-changed signal 3802B to the weight combiner 303.

When the weighted and combined signal 304A (for user #p) output from the weight combiner 303 is expressed as zp1(i), and the weighted and combined signal 304B (for user #p) output from the weight combiner 303 is expressed as zp2(i), zp1(i) and zp2(i) are expressed by the following Formula (43).

$$\begin{pmatrix} zp1(i) \\ zp2(i) \end{pmatrix} = \begin{pmatrix} a & b \\ c & d \end{pmatrix} \begin{pmatrix} 1 & 0 \\ 0 & vp(i) \end{pmatrix} \begin{pmatrix} sp1(i) \\ sp2(i) \end{pmatrix} \qquad (43)$$
$$= \begin{pmatrix} a & b \\ c & d \end{pmatrix} \begin{pmatrix} 1 & 0 \\ 0 & e^{j \times \delta p(i)} \end{pmatrix} \begin{pmatrix} sp1(i) \\ sp2(i) \end{pmatrix}$$

Note that a, b, c, and d are defined as complex numbers. Consequently, the above may also be real numbers. Also, i is taken to be the symbol number. Note that j is the imaginary unit, and δp(i) is a real number. Additionally, zp1(i) and zp2(i) are transmitted from the transmission apparatus at identical times and identical frequencies (identical frequency bands).

For example, a phase change value vp(i) in the phase changer 3801B is set like in the following Formula (44).

$$vp(i) = e^{j\frac{2\times \pi \times i}{Np}} \quad (44)$$

In Formula (44), j is the imaginary unit. Also, Np is an integer equal to 2 or greater, and indicates the period of the phase change. If Np is set to an odd number equal to 3 or greater, there is a possibility that the received signal quality of the data will improve. Also, Np preferably is set to be greater than 2, the number of streams (number of modulated signals) to transmit to user #p. However, Formula (44) is merely one example, and the value of the phase change set in the phase changer 3801B is not limited thereto.

Figure 39:
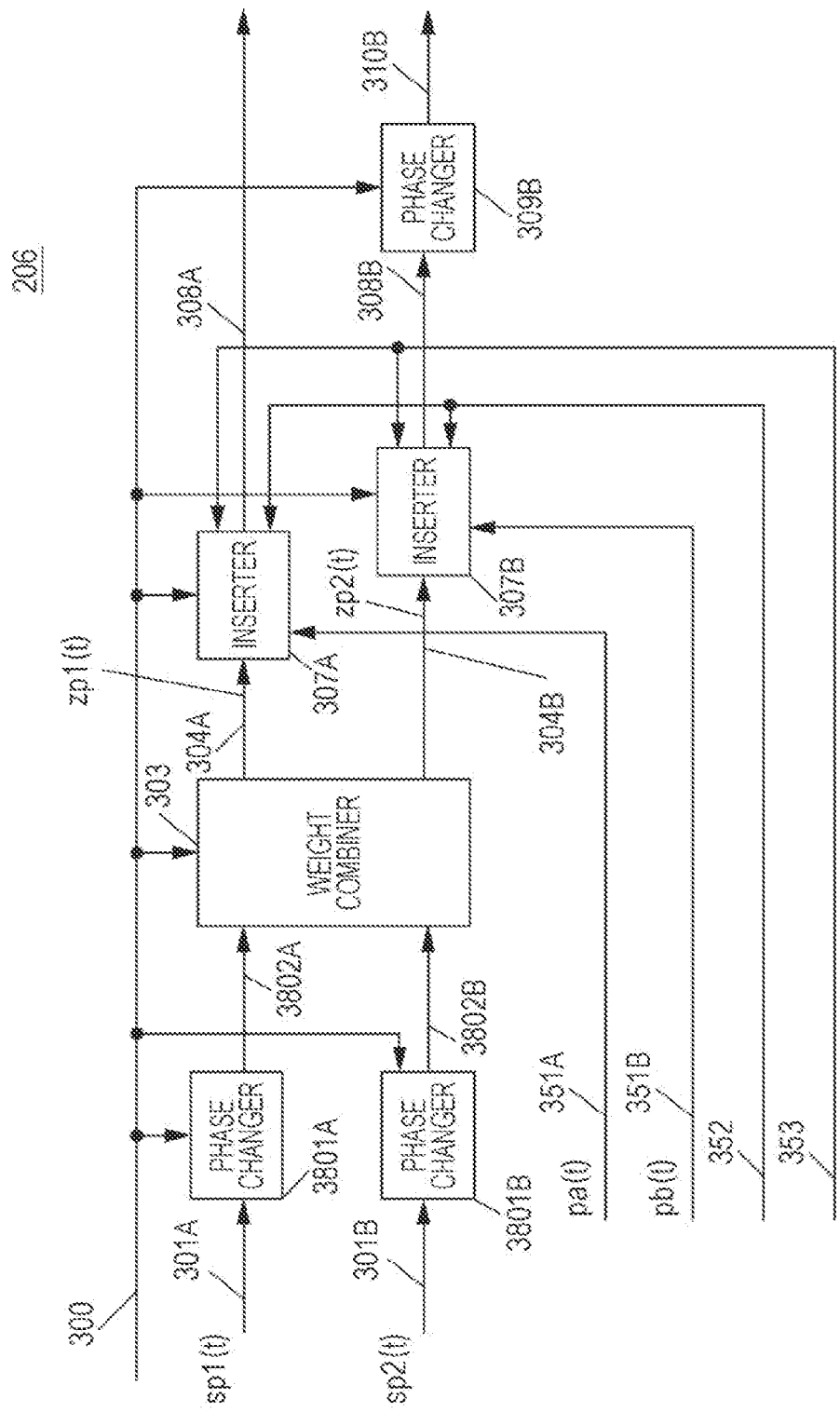
FIG. 39 is a diagram illustrating yet another example of a configuration of the signal processor in FIG. 2.

Next, a configuration different from FIGS. 3, 4, 26, and 38 will be described. FIG. 39 is a diagram illustrating yet another example of the configuration of the signal processor 206 in FIG. 2. Note that in FIG. 39, parts which operate similarly to FIGS. 3 and 38 are denoted with the same numbers, and a description is omitted.

A phase changer 3801A accepts the user #p mapped signal 301A expressed as sp1(t) and the control signal 300 as input. On the basis of the control signal 300, the phase changer 3801A changes the phase of the user #p mapped signal 301A, and outputs a phase-changed signal 3802A.

When the weighted and combined signal 304A (for user #p) output from the weight combiner 303 is expressed as zp1(i), and the weighted and combined signal 304B (for user #p) output from the weight combiner 303 is expressed as zp2(i), zp1(i) and zp2(i) are expressed by the following Formula (45).

$$\begin{pmatrix} zp1(i) \\ zp2(i) \end{pmatrix} = \begin{pmatrix} a & b \\ c & d \end{pmatrix} \begin{pmatrix} Vp(i) & 0 \\ 0 & vp(i) \end{pmatrix} \begin{pmatrix} sp1(i) \\ sp2(i) \end{pmatrix} \quad (45)$$

$$= \begin{pmatrix} a & b \\ c & d \end{pmatrix} \begin{pmatrix} e^{j\times \lambda p(i)} & 0 \\ 0 & e^{j\times \delta p(i)} \end{pmatrix} \begin{pmatrix} sp1(i) \\ sp2(i) \end{pmatrix}$$

Note that a, b, c, and d are defined as complex numbers. Consequently, the above may also be real numbers. Also, i is taken to be the symbol number. Note that j is the imaginary unit, and λp(i) is a real number. Additionally, zp1(i) and zp2(i) are transmitted from the transmission apparatus at identical times (or using a subset of times shared in common) and identical frequencies (identical frequency bands) (or using a subset of frequencies shared in common).

By carrying out a configuration as above, particularly in an environment in which direct waves are dominant, the base station transmits modulated signals using the transmission method described above, thereby enabling the terminal on the other end of communication to obtain an advantageous effect of acquiring high data reception quality.

Embodiment 7

In the present embodiment, the arrangement of the phase changer will be described. In FIGS. 3 and 26 described above, a configuration in which a phase changer is disposed on the output side of the weight combiner 303 (hereinafter also referred to as downstream of the weight combiner 303 where appropriate) is illustrated. Also, in FIGS. 38 and 39, a configuration in which one or more phase changers are disposed on the input side of the weight combiner 303 (hereinafter also referred to as upstream of the weight combiner 303 where appropriate) is illustrated. Phase changers may also be disposed both upstream and downstream of the weight combiner 303. In the present embodiment, an example in which phase changers are disposed upstream and downstream of the weight combiner 303 will be described.

Figure 40:
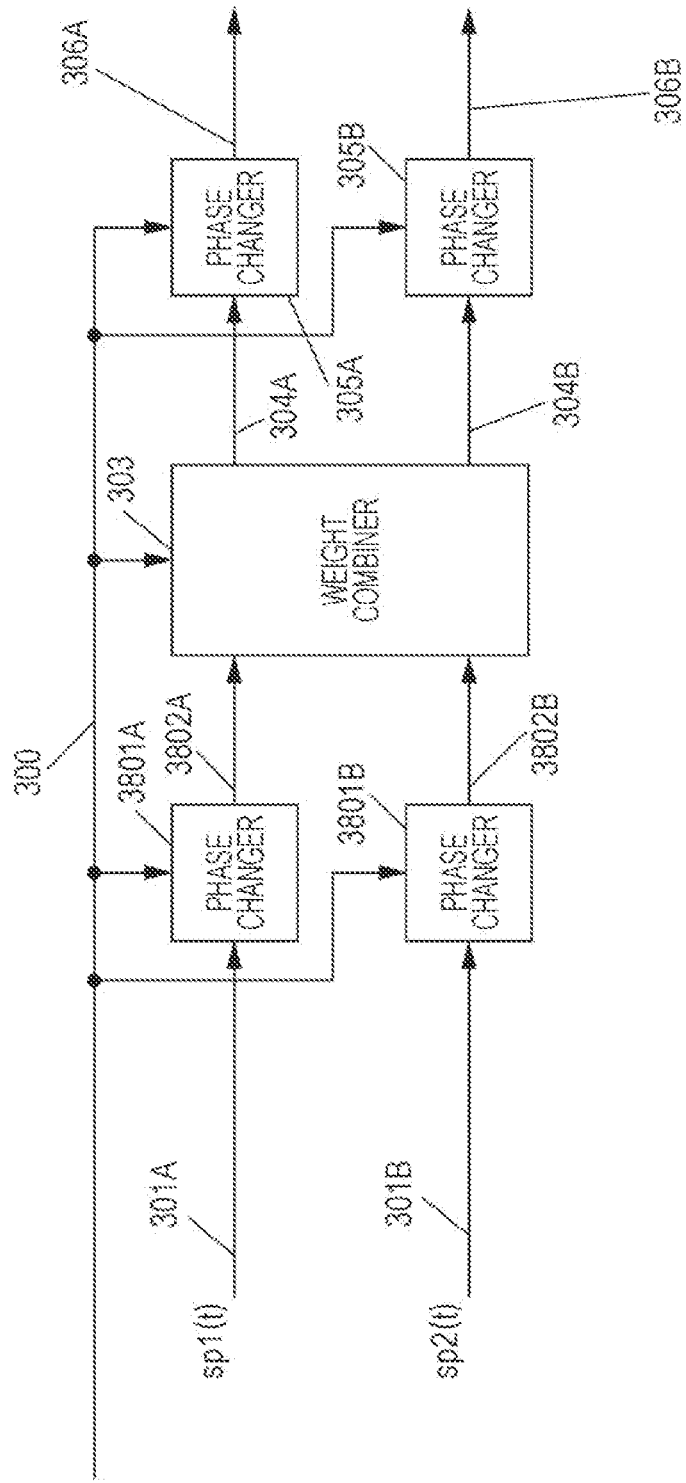
FIG. 40 is a diagram illustrating a first example of disposing phase changers upstream and downstream of a weight combiner.

FIG. 40 is a diagram illustrating a first example of disposing phase changers upstream and downstream of the weight combiner 303. In FIG. 40, components similar to FIGS. 3, 26, 38, and 39 are denoted with the same numbers, and a description is omitted.

As illustrated in FIG. 40, the phase changer 3801A is disposed upstream of the weight combiner 303, on the side where the user #p mapped signal 301A of sp1(t) is input (that is, the upper part of the page). The phase changer 3801B is disposed upstream of the weight combiner 303, on the side where the user #p mapped signal 301B of sp2(t) is input (that is, the lower part). The phase changer 305A is disposed downstream of the weight combiner 303, on the side where the user #p weighted signal 304A is output (that is, the upper part). The phase changer 305B is disposed downstream of the weight combiner 303, on the side where the user #p weighted signal 304B is output (that is, the lower part).

As illustrated in FIG. 40, the phase changer 3801A accepts the user #p mapped signal 301A of sp1(t) and the control signal 300 as input. On the basis of information about the phase change method included in the control signal 300, for example, the phase changer 3801A changes the phase of the user #p mapped signal 301A, and outputs the phase-changed signal 3802A.

Similarly, the phase changer 3801B accepts the user #p mapped signal 301B of sp2(t) and the control signal 300 as input. On the basis of information about the phase change method included in the control signal 300, for example, the phase changer 3801B changes the phase of the user #p mapped signal 301B, and outputs the phase-changed signal 3802B.

Subsequently, the phase-changed signal 306A is input into the inserter 307A illustrated in FIGS. 3, 26, 38, and 39, while in addition, the phase-changed signal 306B is input into the inserter 307B illustrated in FIGS. 3, 26, 38, and 39.

Figure 41:
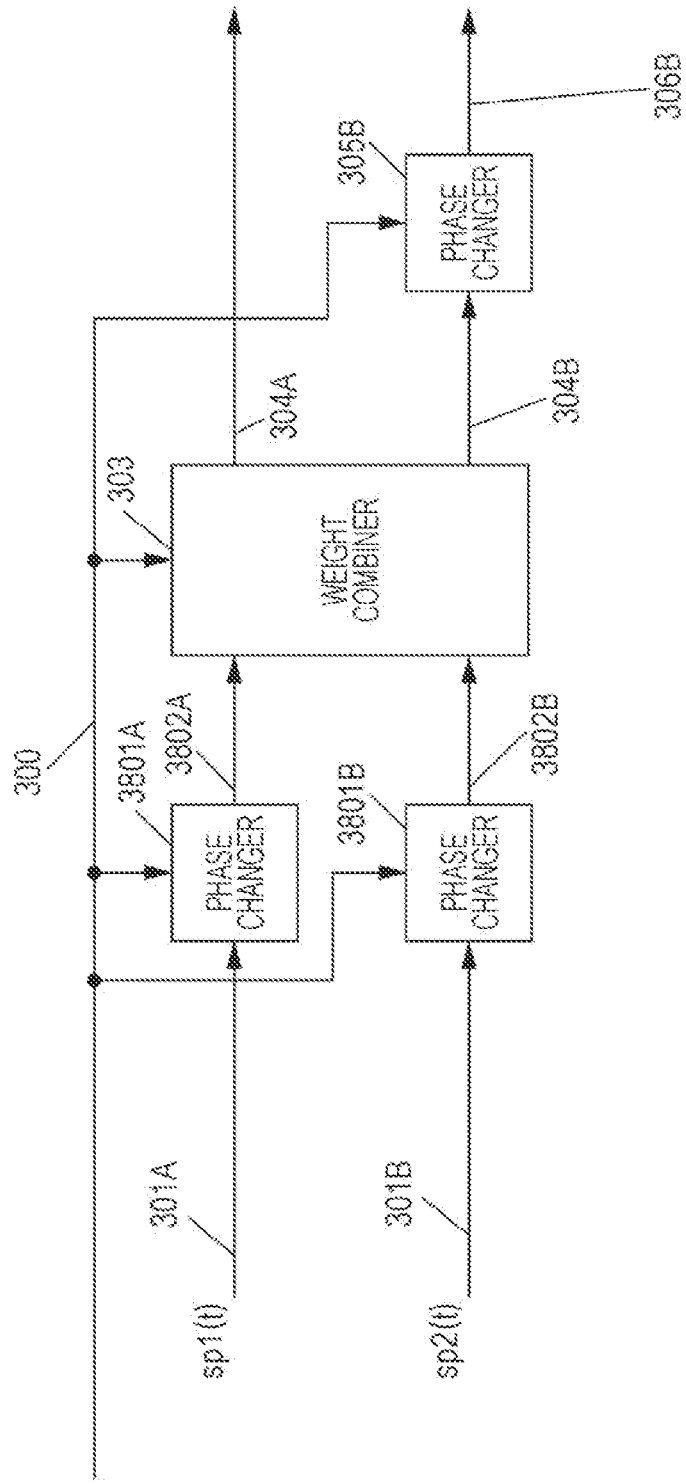
FIG. 41 is a diagram illustrating a second example of disposing phase changers upstream and downstream of a weight combiner.

FIG. 41 is a diagram illustrating a second example of disposing phase changers upstream and downstream of the weight combiner 303. In FIG. 41, components similar to FIGS. 3, 26, 38, 39, and 40 are denoted with the same numbers, and a description is omitted.

In FIG. 41, unlike FIG. 40, only the phase changer 305B is disposed downstream of the weight combiner 303. Subsequently, the weighted signal 304A is input into the inserter 307A illustrated in FIGS. 3, 26, 38, and 39. Also, the phase-changed signal 306B is input into the inserter 307B illustrated in FIGS. 3, 26, 38, and 39.

Figure 42:
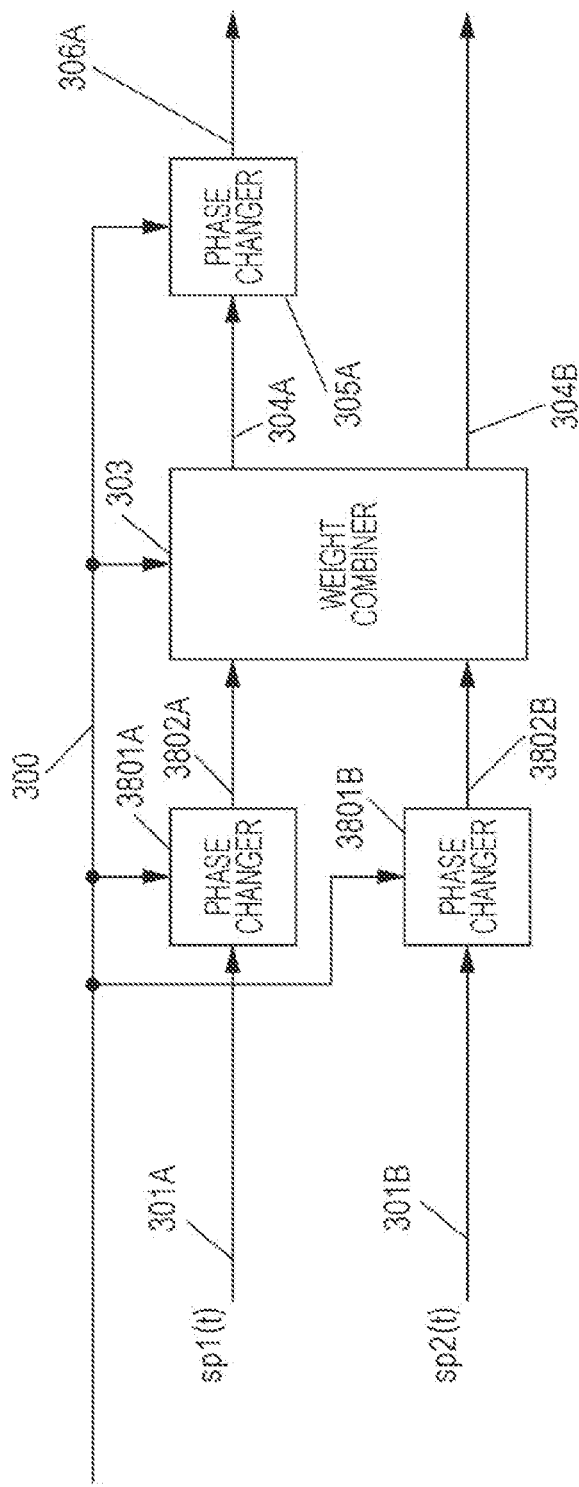
FIG. 42 is a diagram illustrating a third example of disposing phase changers upstream and downstream of a weight combiner.

FIG. 42 is a diagram illustrating a third example of disposing phase changers upstream and downstream of the weight combiner 303. In FIG. 42, components similar to FIGS. 3, 26, 38, 39, and 40 are denoted with the same numbers, and a description is omitted.

In FIG. 42, unlike FIG. 41, the phase changer 305A exists on the upper part downstream of the weight combiner 303. Subsequently, the phase-changed signal 306A is input into the inserter 307A illustrated in FIGS. 3, 26, 38, and 39. Also, the weighted signal 304B is input into the inserter 307B illustrated in FIGS. 3, 26, 38, and 39.

Figure 43:
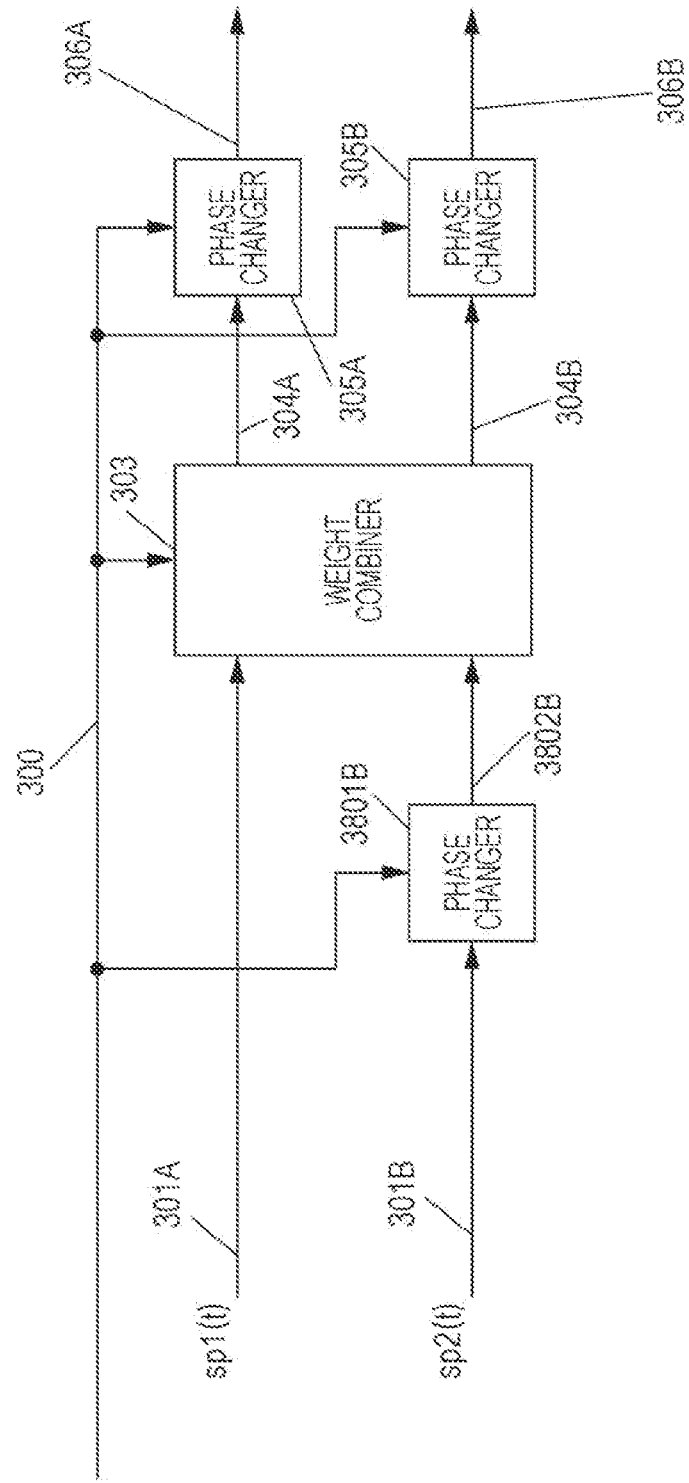
FIG. 43 is a diagram illustrating a fourth example of disposing phase changers upstream and downstream of a weight combiner.

FIG. 43 is a diagram illustrating a fourth example of disposing phase changers upstream and downstream of the weight combiner 303. In FIG. 43, components similar to FIGS. 3, 26, 38, 39, and 40 are denoted with the same numbers, and a description is omitted.

In FIG. 43, unlike FIG. 40, only the phase changer 3801B exists upstream of the weight combiner 303. Subsequently, the phase-changed signal 306A is input into the inserter 307A illustrated in FIGS. 3, 26, 38, and 39. Also, the phase-changed signal 306B is input into the inserter 307B illustrated in FIGS. 3, 26, 38, and 39.

Figure 44:
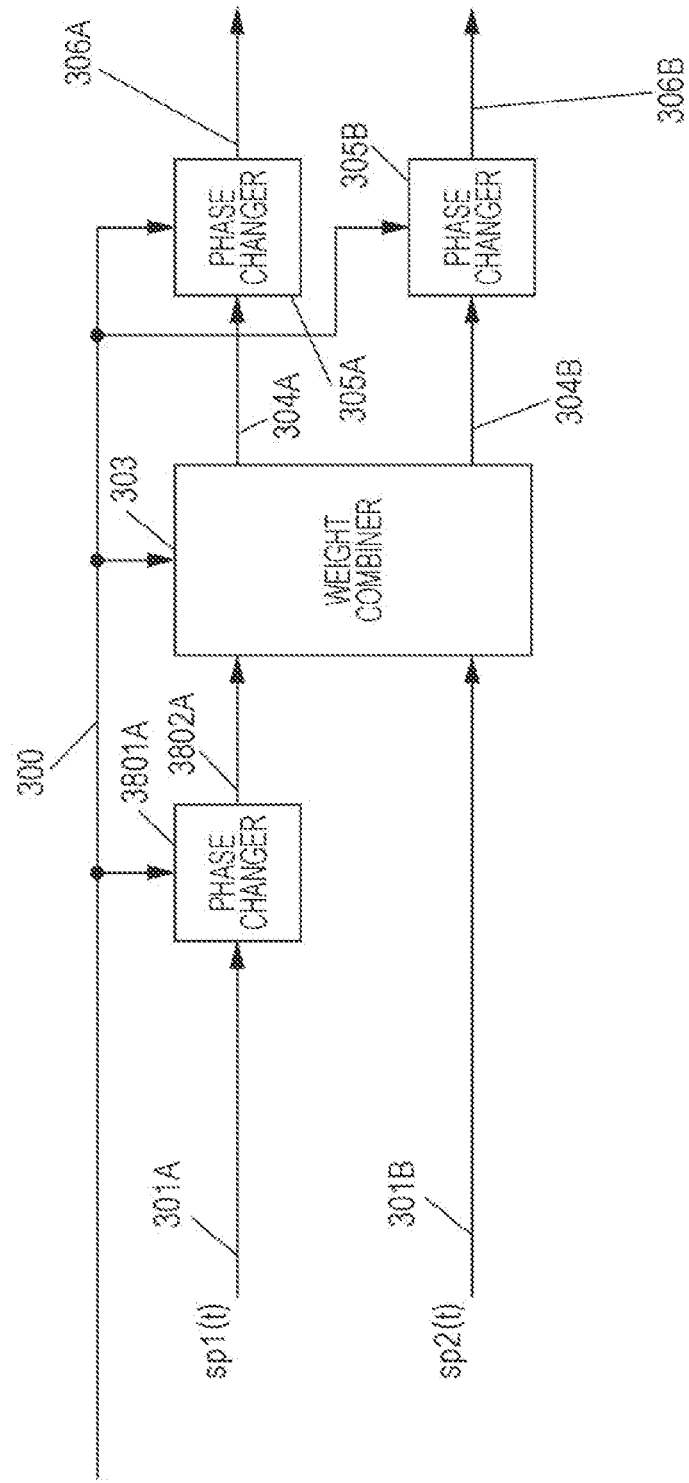
FIG. 44 is a diagram illustrating a fifth example of disposing phase changers upstream and downstream of a weight combiner.

FIG. 44 is a diagram illustrating a fifth example of disposing phase changers upstream and downstream of the weight combiner 303. In FIG. 44, components similar to FIGS. 3, 26, 38, 39, and 40 are denoted with the same numbers, and a description is omitted.

In FIG. 44, unlike FIG. 43, the phase changer 3801A exists on the upper part upstream of the weight combiner 303. Subsequently, the phase-changed signal 306A is input into the inserter 307A illustrated in FIGS. 3, 26, 38, and 39. Also, the phase-changed signal 306B is input into the inserter 307B illustrated in FIGS. 3, 26, 38, and 39.

Figure 45:
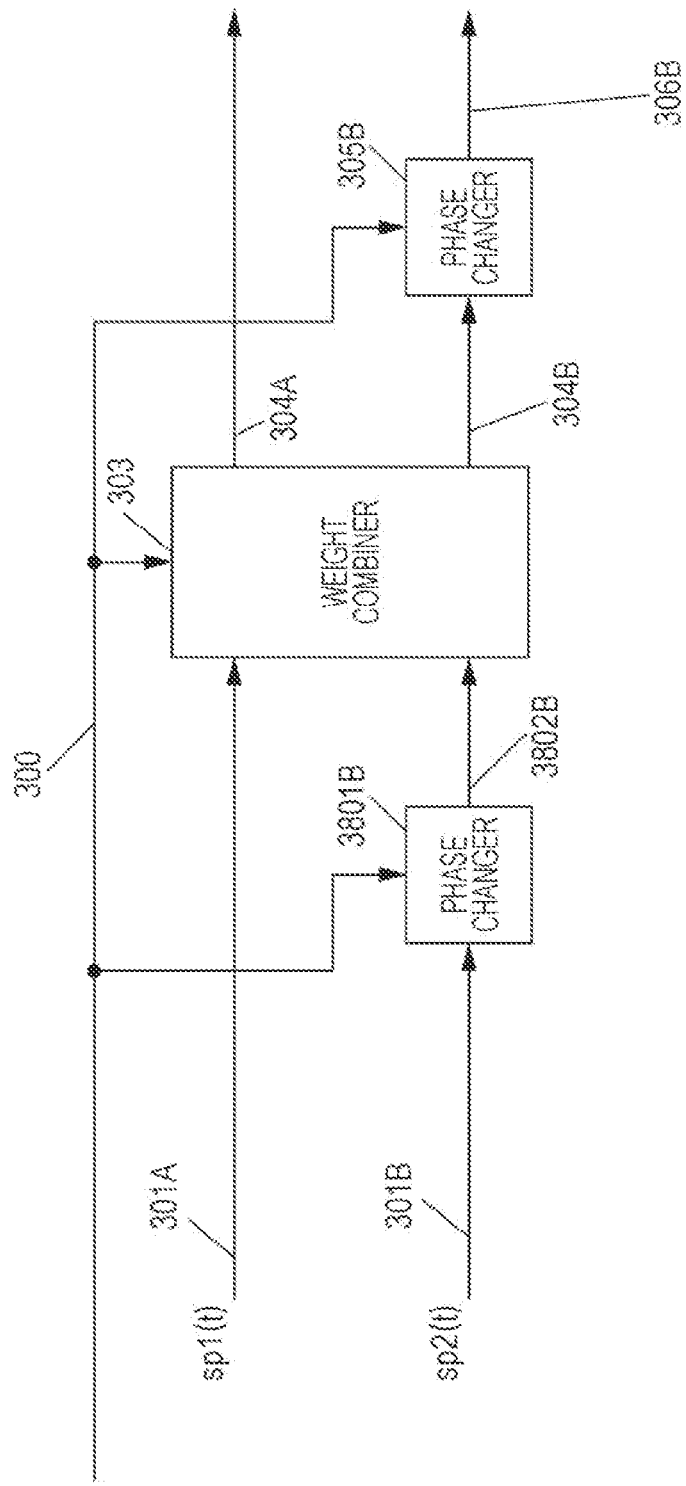
FIG. 45 is a diagram illustrating a sixth example of disposing phase changers upstream and downstream of a weight combiner.

FIG. 45 is a diagram illustrating a sixth example of disposing phase changers upstream and downstream of the weight combiner 303. In FIG. 45, components similar to FIGS. 3, 26, 38, 39, and 40 are denoted with the same numbers, and a description is omitted.

In FIG. 45, the phase changer 3801B is disposed on the lower part upstream of the weight combiner 303, and the phase changer 305B is disposed on the lower part downstream of the weight combiner 303. Subsequently, the weighted signal 304A is input into the inserter 307A illustrated in FIGS. 3, 26, 38, and 39. Also, the phase-changed signal 306B is input into the inserter 307B illustrated in FIGS. 3, 26, 38, and 39.

Figure 46:
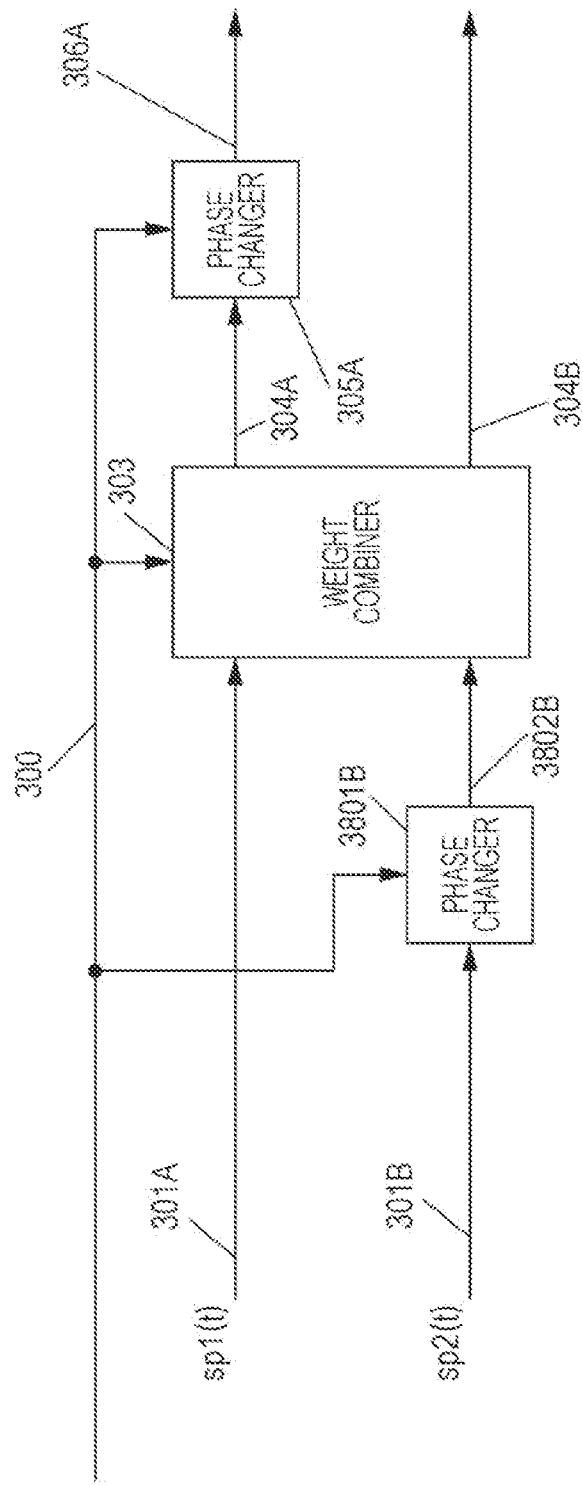
FIG. 46 is a diagram illustrating a seventh example of disposing phase changers upstream and downstream of a weight combiner.

FIG. 46 is a diagram illustrating a seventh example of disposing phase changers upstream and downstream of the weight combiner 303. In FIG. 46, components similar to FIGS. 3, 26, 38, 39, and 40 are denoted with the same numbers, and a description is omitted.

In FIG. 46, the phase changer 3801B is disposed on the lower part upstream of the weight combiner 303, and the phase changer 305A is disposed on the upper part downstream of the weight combiner 303. Subsequently, the phase-changed signal 306A is input into the inserter 307A illustrated in FIGS. 3, 26, 38, and 39. Also, the weighted signal 304B is input into the inserter 307B illustrated in FIGS. 3, 26, 38, and 39.

Figure 47:
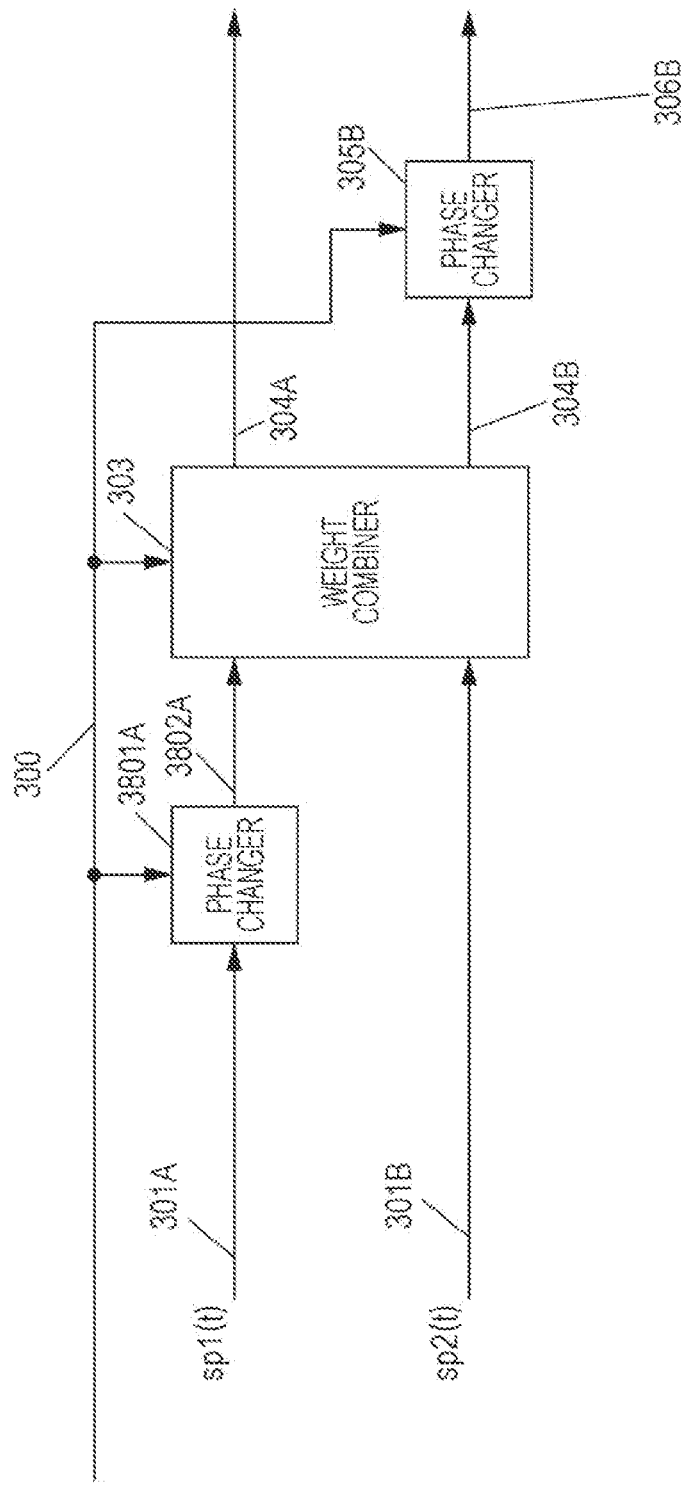
FIG. 47 is a diagram illustrating an eighth example of disposing phase changers upstream and downstream of a weight combiner.

FIG. 47 is a diagram illustrating an eighth example of disposing phase changers upstream and downstream of the weight combiner 303. In FIG. 47, components similar to FIGS. 3, 26, 38, 39, and 40 are denoted with the same numbers, and a description is omitted.

In FIG. 47, the phase changer 3801A is disposed on the upper part upstream of the weight combiner 303, and the phase changer 305B is disposed on the lower part downstream of the weight combiner 303. Subsequently, the weighted signal 304A is input into the inserter 307A illustrated in FIGS. 3, 26, 38, and 39. Also, the phase-changed signal 306B is input into the inserter 307B illustrated in FIGS. 3, 26, 38, and 39.

Figure 48:
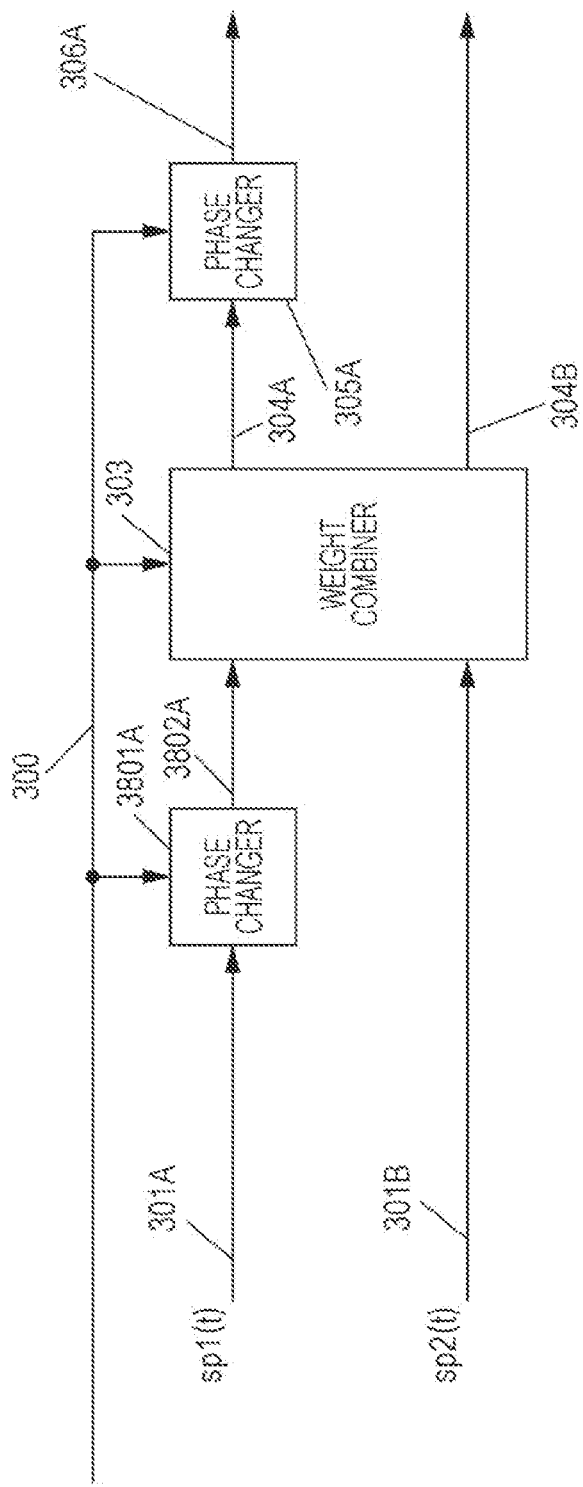
FIG. 48 is a diagram illustrating a ninth example of disposing phase changers upstream and downstream of a weight combiner.

FIG. 48 is a diagram illustrating a ninth example of disposing phase changers upstream and downstream of the weight combiner 303. In FIG. 48, components similar to FIGS. 3, 26, 38, 39, and 40 are denoted with the same numbers, and a description is omitted.

In FIG. 48, the phase changer 3801A is disposed on the upper part upstream of the weight combiner 303, and the phase changer 305A is disposed on the upper part downstream of the weight combiner 303. Subsequently, the phase-changed signal 306A is input into the inserter 307A illustrated in FIGS. 3, 26, 38, and 39. Also, the weighted signal 304B is input into the inserter 307B illustrated in FIGS. 3, 26, 38, and 39.

Even with configurations like the above, it is possible to carry out each embodiment in this specification, making it possible to obtain the advantageous effects described in each embodiment. Additionally, each phase change method of the phase changers 3801A, 3801B, 305A, and 305B in FIGS. 40, 41, 42, 43, 44, 45, 46, 47, and 48 is set by the control signal 300, for example.

Embodiment 8

In this specification, the exemplary configuration illustrated in FIG. 2 is described as an example of the configuration of the user #p signal processor $102\_p$ in FIG. 1. In the present embodiment, a configuration different from FIG. 2 will be described as the configuration of the user #p signal processor $102\_p$ in FIG. 1.

Figure 49:
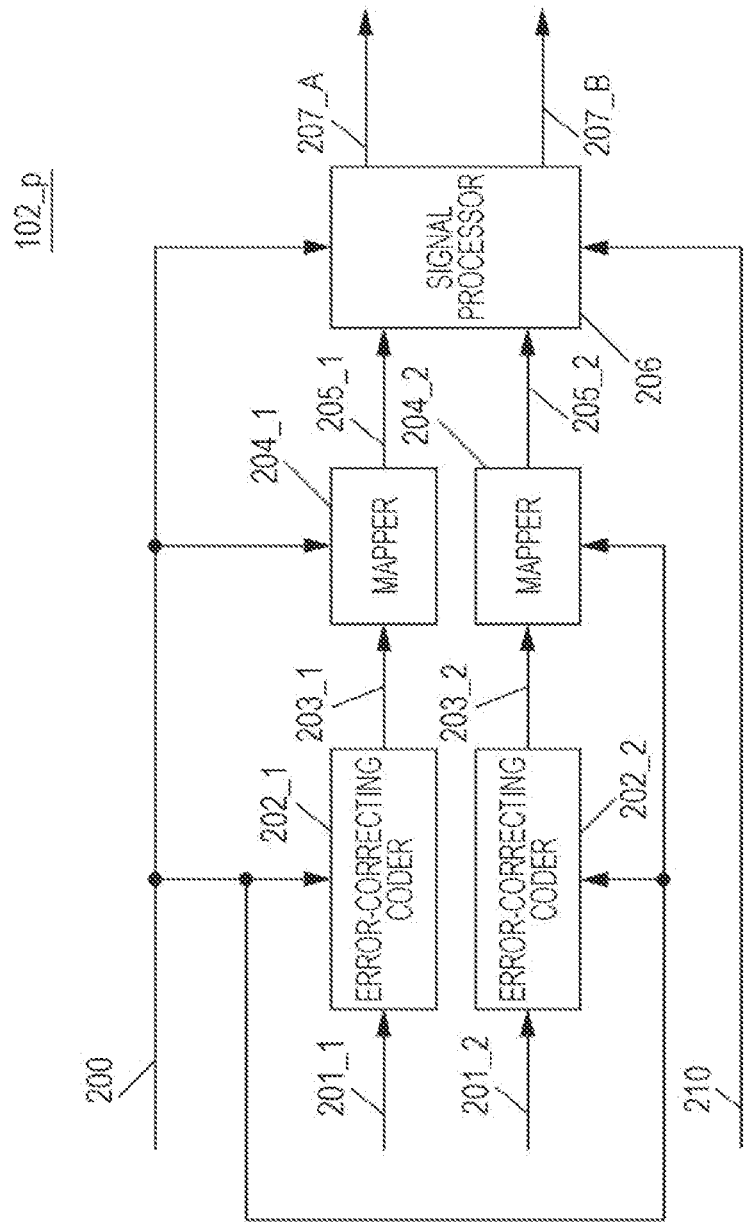
FIG. 49 is a diagram illustrating a different example from FIG. 2 of a configuration of a signal processor for user #p.

FIG. 49 is a diagram illustrating a different example from FIG. 2 of the configuration of the user #p signal processor. In FIG. 47, parts of the configuration which are similar to FIG. 2 are denoted with the same numbers, and description is omitted. In FIG. 49, the point that differs from FIG. 2 is the existence of multiple error-correcting coders and mappers.

Specifically, in FIG. 49, two error-correcting coders (error-correcting coders 202_1 and 202_2) exist. Note that in FIG. 2, a configuration including one error-correcting coder 202 is illustrated, while in FIG. 49, a configuration including two error-correcting coders (202_1, 202_2) is illustrated, but the number of error-correcting coders is not limited thereto. For example, in the case of three or more, the mapper or mappers 204 (204_1, 204_2) execute mapping using the data output by each error-correcting coder.

In FIG. 49, the error-correcting coder 202_1 accepts first data 201_1 and the control signal 200 as input. The error-correcting coder 202_1, on the basis of information about the error-correcting coding method included in the control signal 200, executes error-correcting coding on the first data 201_1, and outputs coded data 203_1.

The mapper 204_1 accepts the coded data 203_1 and the control signal 200 as input. The mapper 204_1, on the basis of information about the modulation scheme included in the control signal 200, executes mapping on the coded data 203_1, and outputs a mapped signal 205_1.

The error-correcting coder 202_2 accepts second data 201_2 and the control signal 200 as input. The error-correcting coder 202_2, on the basis of information about the error-correcting coding method included in the control signal 200, executes error-correcting coding on the second data 201_2, and outputs coded data 203_2.

The mapper 204_2 accepts the coded data 203_2 and the control signal 200 as input. The mapper 204_2, on the basis of information about the modulation scheme included in the control signal 200, executes mapping on the coded data 203_2, and outputs a mapped signal 205_2.

Additionally, it is possible to carry out each embodiment described in this specification by similarly replacing the configuration illustrated in FIG. 2 as the user #p signal processor $102\_p$ with the configuration illustrated in FIG. 49, and it is possible to obtain similar advantageous effects.

Note that, for example, as for the user #p signal processor $102\_p$, it is possible to switch between the case of generating a signal with a configuration like in FIG. 2 and the case of generating a signal with a configuration like in FIG. 49.

(Supplement 2)

In this specification, in FIGS. 3, 26, 38, 39, 40 to 48, and the like related to the signal processor 206 of FIG. 2, phase change is described as being executed in the phase changer 305A and/or the phase changer 305B. At this time, in the case in which NA is the period of phase change in the phase changer 305A, provided that NA is an integer equal to 3 or greater, that is, an integer larger than the number of transmitted streams or the number of transmitted modulated signals (2), there is a high probability that the reception apparatus on the other end of communication will obtain favorable data reception quality. Similarly, in the case in which NB is the period of phase change in the phase changer 305B, provided that NB is an integer equal to 3 or greater, that is, an integer larger than the number of transmitted streams or the number of transmitted modulated signals (2), there is a high probability that the reception apparatus on the other end of communication will obtain favorable data reception quality.

In this specification, in FIGS. 3, 26, 38, 39, 40 to 48, and the like related to the signal processor 206 in FIG. 2, 49, or the like, in the case in which the weight combining (precoding) process is executed by using only the (precoding) matrix Fp of Formula (33) or Formula (34), the signal processor 206 of FIG. 2, 49, or the like may also not be provided with the weight combiner 303.

In this specification, in FIGS. 3, 26, 38, 39, 40 to 48, and the like related to the signal processor 206 of FIG. 2, phase change is described mainly as being executed in the phase changer 305A, and/or the phase changer 305B, and/or the phase changer 3801A, and/or the phase changer 3801B. However, switching between carrying out phase change and not carrying out phase change may also be controlled by the control signal 300 input into the phase changer 305A, the phase changer 305B, the phase changer 3801A, and the phase changer 3801B. Consequently, for example, the control signal 300 may also include control information related to "carrying out phase change or not carrying out phase change in the phase changer 305A", control information related to "carrying out phase change or not carrying out phase change in the phase changer 305B", control information related to "carrying out phase change or not carrying out phase change in the phase changer 3801A", and control information related to "carrying out phase change or not carrying out phase change in the phase changer 3801B". Also, by this control information, "carrying out phase change or not carrying out phase change in the phase changer 305A, the phase changer 305B, the phase changer 3801A, and the phase changer 3801B" may also be controlled.

For example, the phase changer 3801A accepts the control signal 300 as input, and in the case of receiving an instruction not to carry out phase change by the control signal 300, the phase changer 3801A outputs the input signal 301A as 3802A. Also, the phase changer 3801B accepts the control signal 300 as input, and in the case of receiving an instruction not to carry out phase change by the control signal 300, the phase changer 3801B outputs the input signal 301B as 3802B. The phase changer 305A accepts the control signal 300 as input, and in the case of receiving an instruction not to carry out phase change by the control signal 300, the phase changer 305A outputs the input signal 304A as 306A. The phase changer 305B accepts the control signal 300 as input, and in the case of receiving an instruction not to carry out phase change by the control signal 300, the phase changer 305B outputs the input signal 304B as 306B.

In this specification, in FIGS. 3, 26, 38, 39, and the like, phase change is described mainly as being executed in the 309A and the phase changer 309B. Also, the CDD (CSD) process is described mainly as being executed in a CDD (CSD) section 4909A and a CDD (CSD) section 4909B. However, switching between carrying phase change or not carrying out phase change may also be controlled by the control signal 300 input into the phase changer 309A and the phase changer 309B.

Consequently, for example, the control signal 300 may also include control information related to "carrying out phase change or not carrying out phase change in the phase changer 309A" and control information related to "carrying out phase change or not carrying out phase change in the phase changer 309B", and by this control information, "carrying out phase change or not carrying out phase change in the phase changer 309A and the phase changer 308B" may also be controlled.

Also, switching between carrying out the CDD (CSD) process or not carrying out the CDD (CSD) process may also be controlled by the control signal 300 input into the CDD (CSD) section 4909A and the CDD (CSD) section 4909B. Consequently, for example, the control signal 300 may also include control information related to "carrying out the CDD (CSD) process or not carrying out the CDD (CSD) process in the CDD (CSD) section 4909A", and control information related to "carrying out the CDD (CSD) process or not carrying out the CDD (CSD) process in the CDD (CSD) section 4909B", and by this control information, "carrying out the CDD (CSD) process or not carrying out the CDD (CSD) process in the CDD (CSD) sections 4909A and 4909B" may also be controlled.

For example, the phase changer 309A accepts the control signal 300 as input, and in the case of receiving an instruction not to carry out phase change by the control signal 300, the phase changer 309A outputs the input signal 308A as 310A. Also, the phase changer 309B accepts the control signal 300 as input, and in the case of receiving an instruction not to carry out phase change by the control signal 300, the phase changer 309B outputs the input signal 308B as 310B. Additionally, the CDD (CSD) section 4909A accepts the control signal 300 as input, and in the case of receiving an instruction not to carry out the CDD (CSD) process, the CDD (CSD) section 4909A outputs the input signal 308A as 4910A. Also, the CDD (CSD) section 4909B accepts the control signal 300 as input, and in the case of receiving an instruction not to carry out the CDD (CSD) process, the CDD (CSD) section 4909B outputs the input signal 308B as 4910B.

Note that obviously the embodiments described in this specification and other content, such as the content described in the supplements, may also be combined plurally.

Also, in the description in this specification, the terms "base station (or AP)" and "terminal" are used to describe each embodiment, and are non-limiting. Consequently, in each embodiment, the operations described as the operations of the "base station (or AP)" may also be the operations of a "terminal", a "communication apparatus", a "broadcasting station", a "mobile phone", a "personal computer", a "television", or the like. Similarly, in each embodiment, the operations described as the operations of the "terminal" may also be the operations of a "base station (or AP)", a "communication apparatus", a "broadcasting station", a "mobile phone", a "personal computer", a "television", or the like.

Embodiment 9

In the present embodiment, phase change is described as being executed by the phase changers 305A, 305B, 3801A, and 3801B according to FIGS. 3, 26, 38, 39, 40 to 48, or the like, and an example of the transmission state and an example of the reception state at this time will be described. Additionally, as an example, the operations in FIG. 3 will be described.

First, for the sake of comparison, the case in which phase change is not executed by the phase changer 305B in FIG. 3 will be described.

Figure 50A:
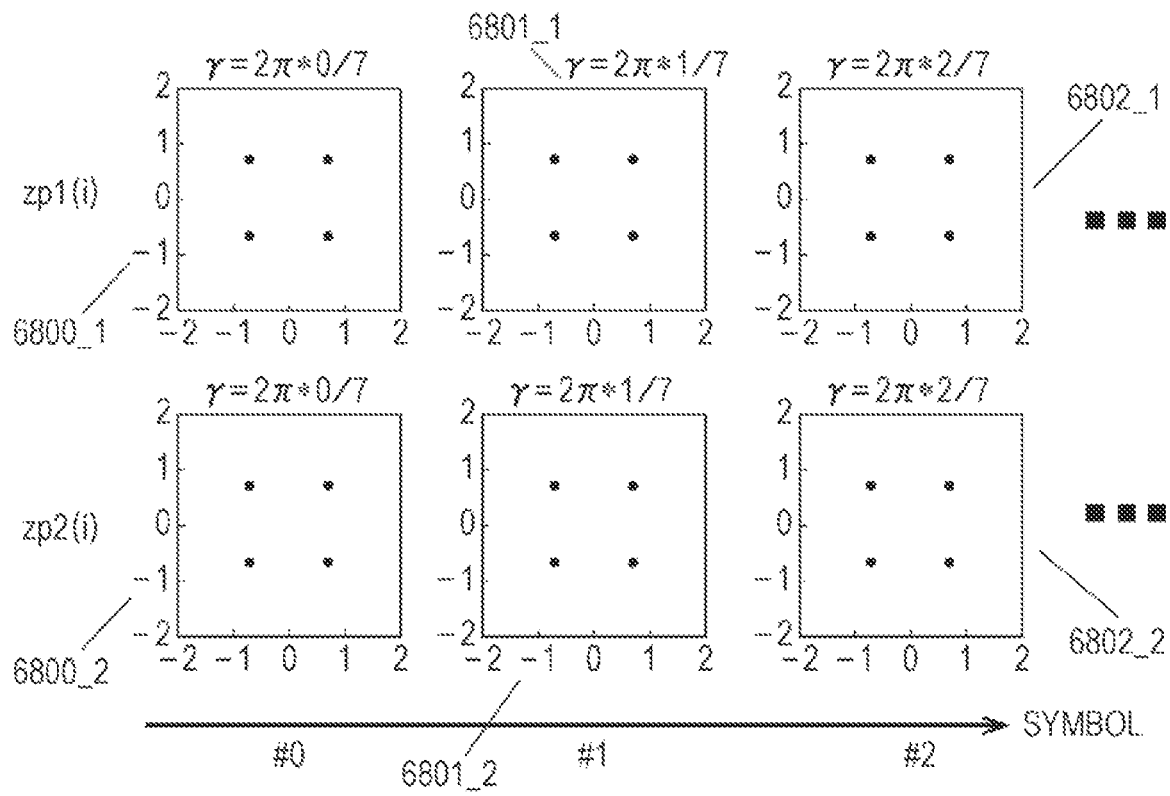
FIG. 50A is a diagram illustrating a first example of a state of signal points transmitted in a transmission apparatus that includes the configuration of FIG. 3.
Figure 50B:
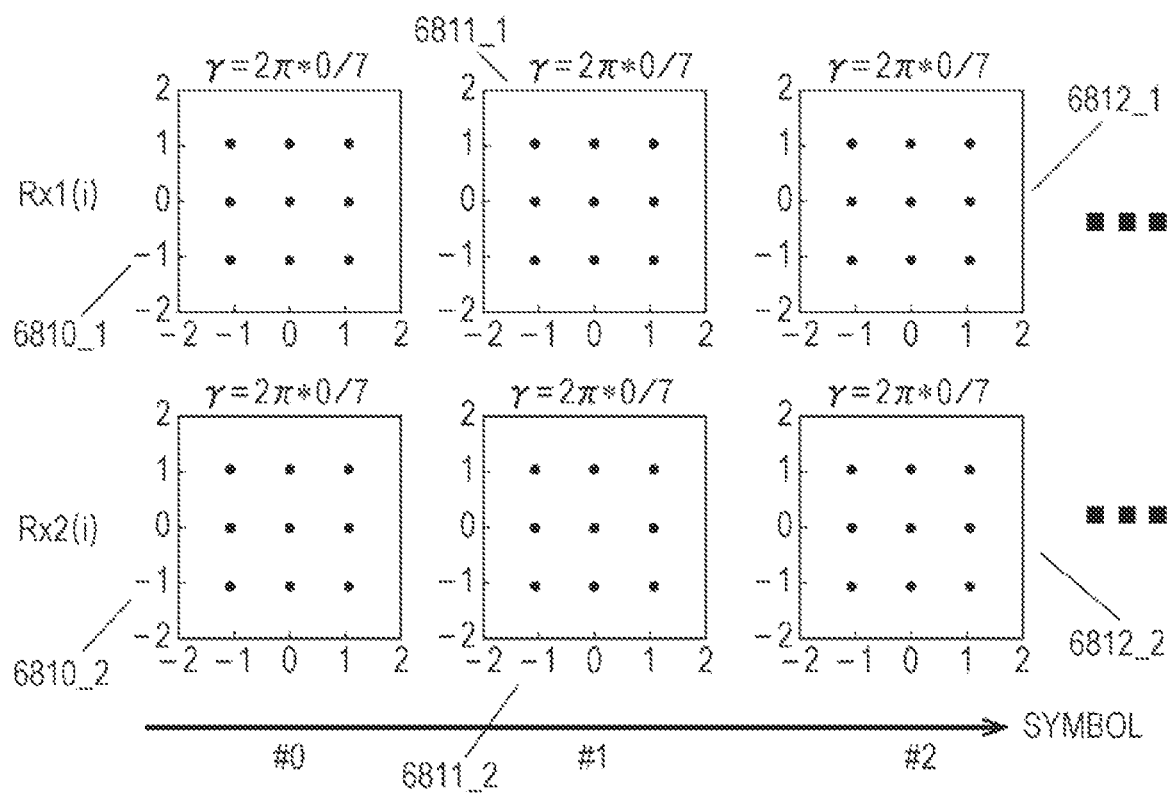
FIG. 50B is a diagram illustrating a first example of a state of signal points of a signal received in a reception apparatus on the other end of communication with a transmission apparatus that includes the configuration of FIG. 3.

FIG. 50A is a diagram illustrating a first example of a state of signal points of a signal transmitted in a transmission apparatus that includes the configuration of FIG. 3. FIG. 50B is a diagram illustrating a first example of a state of signal points of a signal received in a reception apparatus on the other end of communication with a transmission apparatus that includes FIG. 3. In FIGS. 50A and 50B, the state of signal points on the in-phase I-quadrature Q plane is illustrated successively in the direction of the horizontal axis for each symbol number.

Note that the example illustrated in FIGS. 50A and 50B is an example of the case in which, in the transmission apparatus, the phase changer 305B of FIG. 3 is assumed not to operate, while in the weight combiner 303, the weight combining of any of Formulas (33), (34), (35), and (36) is assumed to be executed. Also, assume that the modulation scheme performed on sp1(i) of the mapped signal 301A is QPSK, and that the modulation scheme performed on sp2(i) of the mapped signal 301B is QPSK.

In FIG. 50A, 6800_1 illustrates the state of signal points of zp1(i) of the signal 304A for the symbol number #0, and • represents the signal points. Note that 4 signal points exist. In FIG. 50A, 6800_2 illustrates the state of signal points of zp2(i) of the signal 306B for the symbol number #0, and • represents the signal points. Note that 4 signal points exist. In FIG. 50A, 6801_1 illustrates the state of signal points of zp1(i) of the signal 304A for the symbol number #1, and • represents the signal points. Note that 4 signal points exist. In FIG. 50A, 6801_2 illustrates the state of signal points of zp2(i) of the signal 306B for the symbol number #1, and • represents the signal points. Note that 4 signal points exist. In FIG. 50A, 6802_1 illustrates the state of signal points of zp1(i) of the signal 304A for the symbol number #2, and • represents the signal points. Note that 4 signal points exist. In FIG. 50A, 6802_2 illustrates the state of signal points of zp2(i) of the signal 306B for the symbol number #2, and • represents the signal points. Note that 4 signal points exist.

FIG. 50B is the state of signal points during reception with respect to the state of signal points in the transmitted signal illustrated in FIG. 50A. Note that to simplify the description, as an example of an LOS environment, assume that the channel matrix of Formula (41) is expressed by the following Formula (46).

$$\begin{pmatrix} h11(i) & h12(i) \\ h21(i) & h22(i) \end{pmatrix} = \begin{pmatrix} 1 & 1 \\ 1 & 1 \end{pmatrix} \quad (46)$$

In FIG. 50B, 6810_1 indicates the state of signal points during reception of Rx1(i), which is the received signal 1902X in FIG. 19 for the symbol number #0, and • represents the signal points. Note that 9 signal points exist. In FIG. 50B, 6810_2 indicates the state of signal points during reception of Rx2(i), which is the received signal 1902Y in FIG. 19 for the symbol number #0, and • represents the signal points. Note that 9 signal points exist. In FIG. 50B, 6811_1 indicates the state of signal points during reception of Rx1(i), which is the received signal 1902X in FIG. 19 for the symbol number #1, and • represents the signal points. Note that 9 signal points exist. In FIG. 50B, 6811_2 indicates the state of signal points during reception of Rx2(i), which is the received signal 1902Y in FIG. 19 for the symbol number #1, and • represents the signal points. Note that 9 signal points exist. In FIG. 50B, 6812_1 indicates the state of signal points during reception of Rx1(i), which is the received signal 1902X in FIG. 19 for the symbol number #2, and • represents the signal points. Note that 9 signal points exist. In FIG. 50B, 6812_2 indicates the state of signal points during reception of Rx2(i), which is the received signal 1902Y in FIG. 19 for the symbol number #2, and • represents the signal points. Note that 9 signal points exist.

In the case of transmitting modulated signals like in FIG. 50A, the signal points at the reception apparatus become like FIG. 50B. In this case, the number of signal points during reception becomes 9, and in addition, this state has the characteristic of not changing even if the symbol number changes. Note that, ideally, 16 signal points would exist, but in this state, obtaining a high data reception quality at the reception apparatus is difficult.

Next, the case in which phase change is executed by the phase changer 305B in FIG. 3 will be described.

Figure 51A:
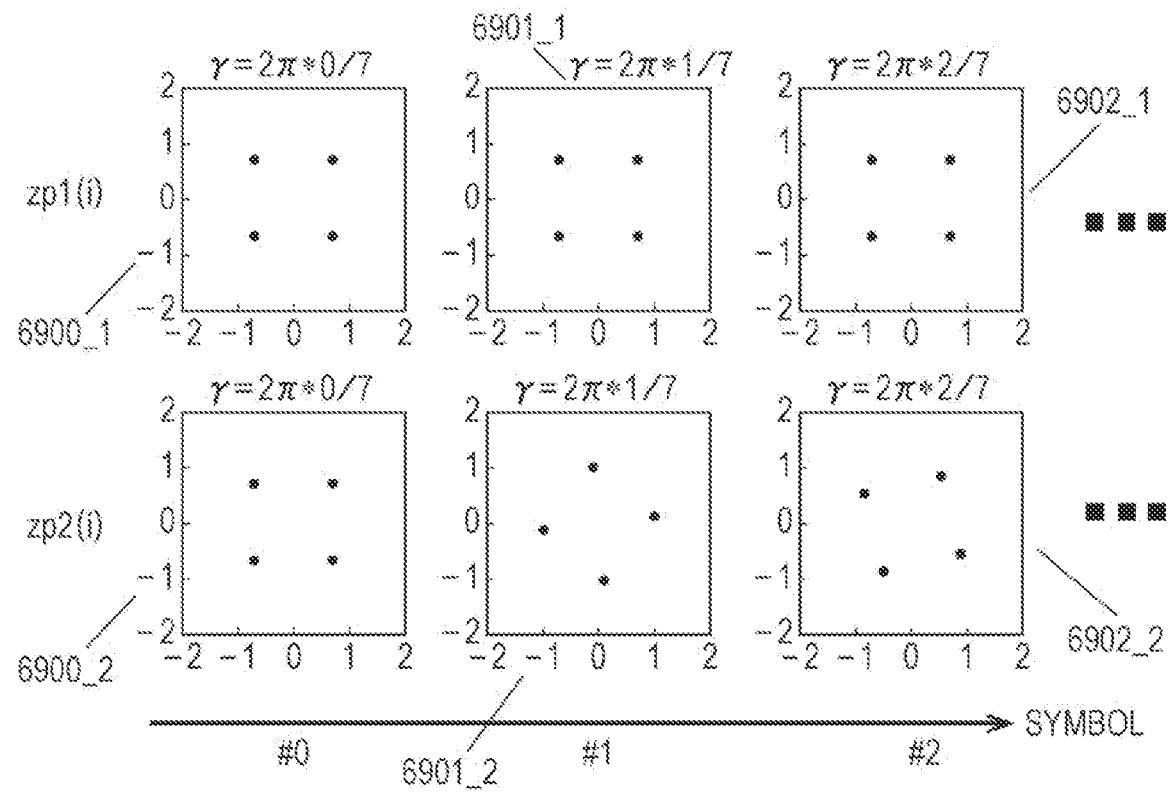
FIG. 51A is a diagram illustrating a second example of a state of signal points of a signal transmitted in a transmission apparatus that includes the configuration of FIG. 3.
Figure 51B:
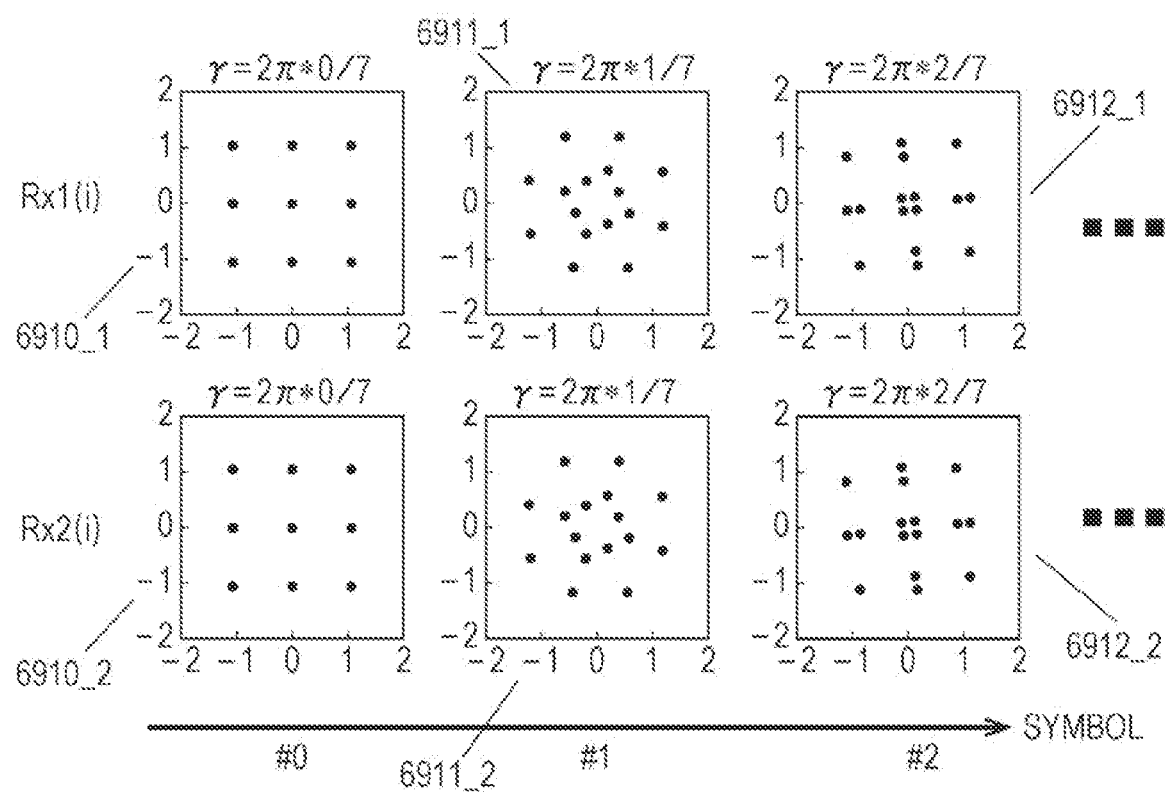
FIG. 51B is a diagram illustrating a second example of a state of signal points of a signal received in a reception apparatus on the other end of communication with a transmission apparatus that includes FIG. 3.

FIG. 51A is a diagram illustrating a second example of a state of signal points of a signal transmitted in a transmission apparatus that includes the configuration of FIG. 3. FIG. 51B is a diagram illustrating a second example of a state of signal points of a signal received in a reception apparatus on the other end of communication with a transmission apparatus that includes FIG. 3. In FIGS. 51A and 51B, the state of signal points on the in-phase I-quadrature Q plane is illustrated successively in the direction of the horizontal axis for each symbol number.

Note that the example illustrated in FIGS. 51A and 51B is an example of the case in which, in the transmission apparatus, the phase changer 305B operates, while in the weight combiner 303, the weight combining of any of Formulas (33), (34), (35), and (36) is executed. Also, assume that the modulation scheme performed on sp1(i) of the mapped signal 301A is QPSK, and that the modulation scheme performed on sp2(i) of the mapped signal 301B is QPSK.

In FIG. 51A, 6900_1 illustrates the state of signal points of zp1(i) of the signal 304A for the symbol number #0, and • represents the signal points. Note that 4 signal points exist. In FIG. 51A, 6900_2 illustrates the state of signal points of zp2(i) of the signal 306B for the symbol number #0, and • represents the signal points. Note that 4 signal points exist. In FIG. 51A, 6901_1 illustrates the state of signal points of zp1(i) of the signal 304A for the symbol number #1, and • represents the signal points. Note that 4 signal points exist. In FIG. 51A, 6901_2 illustrates the state of signal points of zp2(i) of the signal 306B for the symbol number #1, and • represents the signal points. Note that 4 signal points exist. Additionally, since the phase changer 305B operates, and phase change is performed, the phase of the signal points illustrated in 6901_2 is changed from the signal points illustrated in 6900_2. In FIG. 51A, 6902_1 illustrates the state of signal points of zp1(i) of the signal 304A for the symbol number #2, and • represents the signal points. Note that 4 signal points exist. In FIG. 51A, 6902_2 illustrates the state of signal points of zp2(i) of the signal 306B for the symbol number #2, and • represents the signal points. Note that 4 signal points exist. Additionally, since the phase changer 305B operates, and phase change is performed, the phase of the signal points illustrated in 6902_2 is changed from the signal points illustrated in 6901_2.

FIG. 51B is the state of signal points during reception with respect to the state of signal points in the transmitted signal illustrated in FIG. 51A. Note that to simplify the description, as an example of an LOS environment, assume that the channel matrix is expressed by Formula (46).

In FIG. 51B, 6910_1 indicates the state of signal points during reception of Rx1(i), which is the received signal 1902X in FIG. 19 for the symbol number #0, and • represents the signal points. Note that 9 signal points exist. In FIG. 51B, 6910_2 indicates the state of signal points during reception of Rx2(i), which is the received signal 1902Y in FIG. 19 for the symbol number #0, and • represents the signal points. Note that 9 signal points exist. In FIG. 51B, 6911_1 indicates the state of signal points during reception of Rx1(i), which is the received signal 1902X in FIG. 19 for the symbol number #1, and • represents the signal points. Note that 16 signal points exist. Although the positions and number of signal points has changed from 6910_1, as illustrated in FIG. 51A, this is because the phase of the signal points illustrated in 6901_2 has been changed from the signal points illustrated in 6900_2. In FIG. 51B, 6911_2 indicates the state of signal points during reception of Rx2(i), which is the received signal 1902Y in FIG. 19 for the symbol number #1, and • represents the signal points. Note that 16 signal points exist. Although the positions and number of signal points has changed from 6910_2, as illustrated in FIG. 51A, this is because the phase of the signal points illustrated in 6901_2 has been changed from the signal points illustrated in 6900_2. In FIG. 51B, 6912_1 indicates the state of signal points during reception of Rx1(i), which is the received signal 1902X in FIG. 19 for the symbol number #2, and • represents the signal points. Note that 16 signal points exist. Although the positions of signal points has changed from 6911_1, as illustrated in FIG. 51A, this is because the phase of the signal points illustrated in 6902_2 has been changed from the signal points illustrated in 6901_2. In FIG. 51B, 6912_2 indicates the state of signal points during reception of Rx2(i), which is the received signal 1902Y in FIG. 19 for the symbol number #2, and • represents the signal points. Note that 16 signal points exist. Although the positions of signal points has changed from 6911_2, as illustrated in FIG. 51A, this is because the phase of the signal points illustrated in 6902_2 has been changed from the signal points illustrated in 6901_2.

In the case of transmitting modulated signals like in FIG. 51A, the signal points at the reception apparatus become like FIG. 51B, the number of existing signal points may be 16, and additionally, if the symbol numbers change, the positions where the signal points exist in the in-phase I-quadrature Q plane change.

In this way, by executing phase change in the transmission apparatus in the case of a state in which the radio wave conditions are steady, like an LOS environment, at the reception apparatus, the state of signal points during reception changes, and thus there is a higher probability of being able to obtain an advantageous effect of improved data reception quality at the reception apparatus.

Note that the above description is merely one example, and to "induce change in the state of reception at the reception apparatus in a steady state like an LOS environment" as described above, for example, there is the method of executing phase change with the phase changers 305A, 305B, 3801A, and 3801B according to FIGS. 3, 26, 38, 39, 40 to 48, and the like. Even with such a configuration, as described above, there is a higher probability of being able to obtain an advantageous effect of improved data reception quality.

[Description of Operation of Reception Apparatus]

As described above, the reception apparatus illustrated in FIG. 19 receives a received signal in which the signal point arrangement during reception changes as a result of phase change being executed. Hereinafter, a supplementary description of the operation of the reception apparatus in FIG. 19 will be given. The case in which the transmission apparatus has the configuration illustrated in FIGS. 3, 26, and the like, or in other words, the configuration in which a phase changer is disposed downstream of the weight combiner, and the transmission apparatus generates and transmits modulated signals will be described.

For example, the transmission apparatus transmits modulated signals with the frame configuration like (FIGS. 8 and 9) or (FIGS. 10 and 11).

In the reception apparatus of terminal #p in FIG. 19, the control information decoder 1909 obtains information such as the transmission method, the modulation scheme, and the error-correcting coding method used to generate data symbols from the control information symbols in (FIGS. 8 and 9) or (FIGS. 10 and 11). Also, in the case in which the transmission apparatus performs phase change, the control information decoder 1909 obtains information about "how phase change was performed on the data symbols" included in the control information symbols, and in the demodulation of the data symbols, outputs a control signal 1901 including information related to the phase change method so that demodulation that takes the phase change into account can be executed. Note that the control signal 1901 is also assumed to include information about the transmission method, the method of the modulation scheme, the error-correcting coding method, and the like.

As described in FIG. 20, the received signals r1(i) and r2(i) are expressed as in Formula (41). From Formulas (3), (41), and (42), the received signals r1(i) and r2(i) are expressed as in the following Formula (47).

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} Yp(i) & 0 \\ 0 & yp(i) \end{pmatrix} Fp \begin{pmatrix} sp1(i) \\ sp2(i) \end{pmatrix} + \begin{pmatrix} n1(i) \\ n2(i) \end{pmatrix} \quad (47)$$

$$= \begin{pmatrix} h11(i) & h12(i) \\ h21(i) & h22(i) \end{pmatrix} \begin{pmatrix} Yp(i) & 0 \\ 0 & yp(i) \end{pmatrix} \begin{pmatrix} a & b \\ c & d \end{pmatrix}$$

$$\begin{pmatrix} sp1(i) \\ sp2(i) \end{pmatrix} + \begin{pmatrix} n1(i) \\ n2(i) \end{pmatrix}$$

Note that in the case of not executing phase change by the phase changer 305A (or in the case in which the phase changer 305A does not exist), Yp(i)=1. Also, in the case of not executing phase change by the phase changer 305B (or in the case in which the phase changer 305B does not exist), yp(i)=1.

The modulated signal u1 channel estimator 1905_1 uses the preamble and pilot symbols in (FIGS. 8 and 9) or (FIGS. 10 and 11) to estimate and output h11(i) of Formula (47) (see 1906_1 in FIG. 19). The modulated signal u2 channel estimator 1905_2 uses the preamble and pilot symbols in (FIGS. 8 and 9) or (FIGS. 10 and 11) to estimate and output h12(i) of Formula (47) (see 1906_2 in FIG. 19). The modulated signal u1 channel estimator 1907_1 uses the preamble and pilot symbols in (FIGS. 8 and 9) or (FIGS. 10 and 11) to estimate and output h21(i) of Formula (47) (see 1908_1 in FIG. 19). The modulated signal u2 channel estimator 1907_2 uses the preamble and pilot symbols in (FIGS. 8 and 9) or (FIGS. 10 and 11) to estimate and output h22(i) of Formula (47) (see 1908_2 in FIG. 19).

Since the relationship of Formula (47) is understood by the input signal, the signal processor 1911 executes demodulation of sp1(i) and sp2(i) from the relationship of Formula (47), and after that, executes error-correcting decoding to thereby obtain and output the received data 1912.

The case in which the transmission apparatus has a configuration like in FIGS. 40 to 48, or in other words, a configuration in which phase changers are disposed both upstream and downstream of the weight combiner, and the transmission apparatus generates and transmits modulated signals will be described.

For example, the transmission apparatus transmits modulated signals with the frame configuration like (FIGS. 8 and 9) or (FIGS. 10 and 11).

In the reception apparatus of terminal #p in FIG. 19, the control information decoder 1909 obtains information such as the transmission method, the modulation scheme, and the error-correcting coding method used to generate data symbols from the control information symbols in (FIGS. 8 and 9) or (FIGS. 10 and 11). Also, in the case in which the transmission apparatus performs phase change, the control information decoder 1909 obtains information about "how phase change was performed on the data symbols" included in the control information symbols, and in the demodulation of the data symbols, outputs a control signal 1901 including information related to the phase change method so that demodulation that takes the phase change into account can be executed. Note that the control signal 1901 is also assumed to include information about the transmission method, the method of the modulation scheme, the error-correcting coding method, and the like.

As described in FIG. 20, the received signals r1(i) and r2(i) are expressed as in Formula (41). At this time, from Formulas (3), (41), (42), and (45), the received signals r1(i) and r2(i) are expressed as in the following Formula (48).

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} Yp(i) & 0 \\ 0 & yp(i) \end{pmatrix} Fp \quad (48)$$

$$\begin{pmatrix} Vp(i) & 0 \\ 0 & vp(i) \end{pmatrix} \begin{pmatrix} sp1(i) \\ sp2(i) \end{pmatrix} + \begin{pmatrix} n1(i) \\ n2(i) \end{pmatrix}$$

$$= \begin{pmatrix} h11(i) & h12(i) \\ h21(i) & h22(i) \end{pmatrix} \begin{pmatrix} Yp(i) & 0 \\ 0 & yp(i) \end{pmatrix} \begin{pmatrix} a & b \\ c & d \end{pmatrix}$$

$$\begin{pmatrix} Vp(i) & 0 \\ 0 & vp(i) \end{pmatrix} \begin{pmatrix} sp1(i) \\ sp2(i) \end{pmatrix} + \begin{pmatrix} n1(i) \\ n2(i) \end{pmatrix}$$

Note that in the case of not executing phase change by the phase changer 305A (or in the case in which the phase changer 305A does not exist), Yp(i)=1. Also, in the case of not executing phase change by the phase changer 305B (or in the case in which the phase changer 305B does not exist), yp(i)=1. Also, in the case of not executing phase change by the phase changer 3801A (or in the case in which the phase changer 3801A does not exist), Vp(i)=1. Also, in the case of not executing phase change by the phase changer 3801B (or in the case in which the phase changer 3801B does not exist), vp(i)=1.

The modulated signal u1 channel estimator 1905_1 uses the preamble and pilot symbols in (FIGS. 8 and 9) or (FIGS. 10 and 11) to estimate and output h11(i) of Formula (48) (see 1906_1 in FIG. 19). The modulated signal u2 channel estimator 1905_2 uses the preamble and pilot symbols in (FIGS. 8 and 9) or (FIGS. 10 and 11) to estimate and output h12(i) of Formula (48) (see 1906_2 in FIG. 19). The modulated signal u1 channel estimator 1907_1 uses the preamble and pilot symbols in (FIGS. 8 and 9) or (FIGS. 10 and 11) to estimate and output h21(i) of Formula (48) (see 1908_1 in FIG. 19). The modulated signal u2 channel estimator 1907_2 uses the preamble and pilot symbols in (FIGS. 8 and 9) or (FIGS. 10 and 11) to estimate and output h22(i) of Formula (48) (see 1908_2 in FIG. 19).

Since the relationship of Formula (48) is understood by the input signal, the signal processor 1911 executes demodulation of sp1(i) and sp2(i) from the relationship of Formula (48), and after that, executes error-correcting decoding to thereby obtain and output the received data 1912.

Embodiment 10

In the present embodiment, a configuration of a transmission apparatus of a base station, an access point, a broadcasting station, or the like, for example, which is a configuration of a transmission apparatus different from FIG. 1, will be described.

Figure 52:
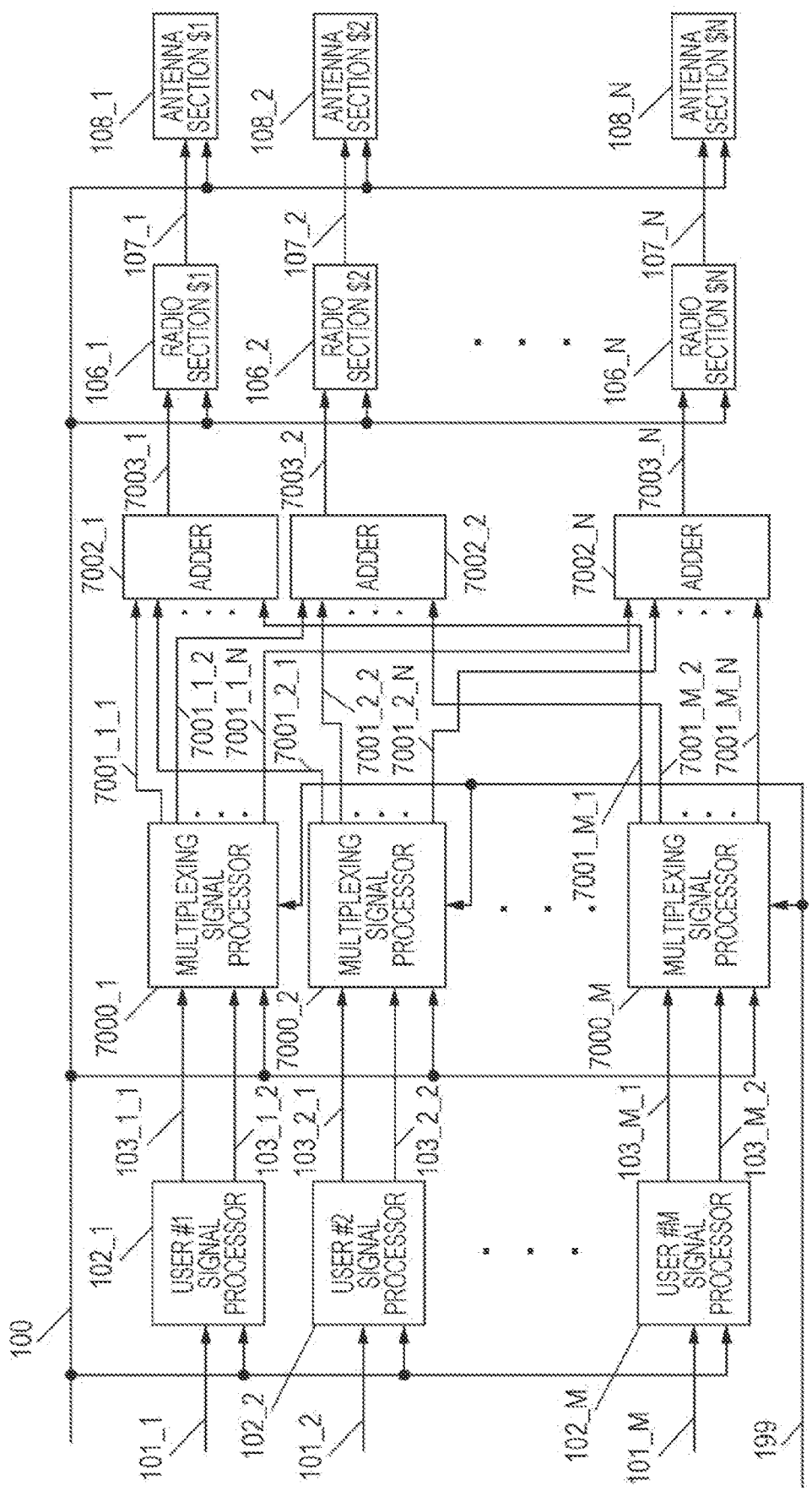
FIG. 52 is a diagram illustrating a different example from FIG. 1, of the configuration of a transmission apparatus of a base station (AP)

FIG. 52 is a diagram illustrating a different example from FIG. 1 of the configuration of a transmission apparatus of a base station (AP). Note that in FIG. 52, parts of the configuration which are similar to FIG. 1 are denoted with the same numbers, and description is omitted.

The points by which FIG. 52 and FIG. 1 are different are that the multiplexing signal processor 104 in FIG. 1 is broken up into per-user multiplexing signal processors (multiplexing signal processors 7000_1 to 7000_M) in FIG. 52, and that adders (adder 7002_1 to adder 7002_N) exist downstream of the multiplexing signal processors.

The multiplexing signal processor 7000_1 accepts the control signal 100, the user #1 first baseband signal 103_1_1, the user #1 second baseband signal 103_1_2, and the (common) reference signal 199 as input. On the basis of the control signal 100, the multiplexing signal processor 7000_1 performs multiplexing signal processing on the user #1 first baseband signal 103_1_1 and the user #1 second baseband signal 103_1_2, and generates and outputs a user #1 multiplexed signal $1 baseband signal 7001_1_1 to a user #1 multiplexed signal $N baseband signal 7001_1_N. Note that N is an integer equal to 1 or greater. Also, in the case of treating q as an integer from 1 to N, a user #1 multiplexed signal $q baseband signal 7001_1_*q* exists. Also, a reference signal may be included in the user #1 multiplexed signal $1 baseband signal 7001_1_1 to the user #1 multiplexed signal $N baseband signal 7001_1_N.

Similarly, the multiplexing signal processor 7000_2 accepts the control signal 100, the user #2 first baseband signal 103_2_1, the user #2 second baseband signal 103_2_2, and the (common) reference signal 199 as input. On the basis of the control signal 100, the multiplexing signal processor 7000_2 performs multiplexing signal processing on the user #2 first baseband signal 103_2_1 and the user #2 second baseband signal 103_2_2, and generates and outputs a user #2 multiplexed signal $1 baseband signal 7001_2_1 to a user #2 multiplexed signal $N baseband signal 7001_2_N. Note that N is an integer equal to 1 or greater. Also, in the case of treating q as an integer from 1 to N, a user #2 multiplexed signal $q baseband signal 7001_2_*q* exists. Also, a reference signal may be included in the user #2 multiplexed signal $1 baseband signal 7001_2_1 to the user #2 multiplexed signal $N baseband signal 7001_2_N.

Similarly, the multiplexing signal processor 7000_M accepts the control signal 100, the user #M first baseband signal 103_M_1, the user #M second baseband signal 103_M_2, and the (common) reference signal 199 as input. On the basis of the control signal 100, the multiplexing signal processor 7000_M performs multiplexing signal processing on the user #M first baseband signal 103_M_1 and the user #2 second baseband signal 103_M_2, and generates and outputs a user #M multiplexed signal $1 baseband signal 7001_M_1 to a user #M multiplexed signal $N baseband signal 7001_M_N. Note that N is an integer equal to 1 or greater. Also, in the case of treating q as an integer from 1 to N, a user #M multiplexed signal $q baseband signal 7001_M_q exists. Also, a reference signal may be included in the user #M multiplexed signal $1 baseband signal 7001_M_1 to the user #M multiplexed signal $N baseband signal 7001_M_N.

Consequently, the multiplexing signal processor 7000_p (where p is an integer from 1 to M) accepts the control signal 100, the user #p first baseband signal 103_p_1, and the user #p second baseband signal 103_p_2 as input. On the basis of the control signal 100, the multiplexing signal processor 7000_p performs multiplexing signal processing on the user #p first baseband signal 103_p_1 and the user #p second baseband signal 103_p_2, and generates and outputs a user #p multiplexed signal $1 baseband signal 7001_p_1 to a user #p multiplexed signal $N baseband signal 7001_p_N. Note that N is an integer equal to 1 or greater. Also, in the case of treating q as an integer from 1 to N, a user #p multiplexed signal $q baseband signal 7001_p_q exists. Also, a reference signal may be included in the user #p multiplexed signal $1 baseband signal 7001_p_1 to the user #p multiplexed signal $N baseband signal 7001_p_N.

The adder 7002_1 accepts the user #1 multiplexed signal $1 baseband signal 7001_1_1 to the user #M multiplexed signal $1 baseband signal 7001_M_1 as input. In other words, in the case of treating p as an integer from 1 to M, a user #p multiplexed signal $1 baseband signal 7001_p_1 is treated as input. The adder 7002_1 adds together the user #1 multiplexed signal $1 baseband signal 7001_1_1 to the user #M multiplexed signal $1 baseband signal 7001_M_1, and outputs a first added signal 7003_1.

Similarly, the adder 7002_2 accepts the user #1 multiplexed signal $2 baseband signal 7001_1_2 to the user #M multiplexed signal $2 baseband signal 7001_M_2 as input. In other words, in the case of treating p as an integer from 1 to M, a user #p multiplexed signal $2 baseband signal 7001_p_2 is treated as input. The adder 7002_2 adds together the user #1 multiplexed signal $2 baseband signal 7001_12 to the user #M multiplexed signal $2 baseband signal 7001_M_2, and outputs a second added signal 7003_2.

The adder 7002_N accepts the user #1 multiplexed signal $N baseband signal 7001_1_N to the user #M multiplexed signal $N baseband signal 7001_M_N as input. In other words, in the case of treating p as an integer from 1 to M, a user #p multiplexed signal $N baseband signal 7001_p_N is treated as input. The adder 7002_N adds together the user #1 multiplexed signal $N baseband signal 7001_1_N to the user #M multiplexed signal $N baseband signal 7001_M_N, and outputs an Nth added signal 7003_N.

Consequently, the adder 7002_q accepts the user #1 multiplexed signal $q baseband signal 7001_1_q to the user #M multiplexed signal $q baseband signal 7001_M_q as input. In other words, in the case of treating p as an integer from 1 to M, a user #p multiplexed signal $q baseband signal 7001_p_q is treated as input. The adder 7002_q adds together the user #1 multiplexed signal $q baseband signal 7001_1_q to the user #M multiplexed signal $q baseband signal 7001_M_q, and outputs a qth added signal 7003_q. At this time, q is an integer from 1 to N.

The radio section $1 (106_1) accepts the control signal 100 and the first added signal 7003_1 as input, executes processes such as frequency conversion and amplification on the first added signal 7003_1 on the basis of the control signal 100, and outputs the transmission signal 1071.

Similarly, the radio section $2 (106_2) accepts the control signal 100 and the second added signal 7003_2 as input, executes processes such as frequency conversion and amplification on the second added signal 7003_2 on the basis of the control signal 100, and outputs the transmission signal 107_2.

Similarly, the radio section $N (106_N) accepts the control signal 100 and the Nth added signal 7003_N as input, executes processes such as frequency conversion and amplification on the Nth added signal 7003_N on the basis of the control signal 100, and outputs the transmission signal 107_N.

Consequently, the radio section $q (106_q) accepts the control signal 100 and the qth added signal 7003_q as input, executes processes such as frequency conversion and amplification on the qth added signal 7003_q on the basis of the control signal 100, and outputs the transmission signal 107_q. At this time, q is an integer from 1 to N.

Next, an example of the operations of the multiplexing signal processor 7000_p will be described.

For example, on the basis of Formula (3), Formula (42), or the like, assume that the user #p first baseband signal 103_p_1 and the user #p second baseband signal 103_p_2 output by the user #p signal processor 102_p (where p is an integer from 1 to M) in FIG. 52 are expressed as zp1(i) and zp2(i), respectively. However, zp1(i) and zp2(i) may be generated by a process other than Formula (3) or Formula (42), and in addition, zp1(i)=0 and zp2(i)=0 is also acceptable. Note that when zp1(i)=0, zp1(i) does not exist, and when zp2(i)=0, zp2(i) does not exist.

If the user #p multiplexed signal $q baseband signal 7001_p_q output by the multiplexing signal processor 7000_p is expressed as gpq(i), then gpq(i) is expressed by the following Formula (49).

$$gpq(i)=a\_p\_q\_1(i) \times zp1(i)+a\_p\_q\_2(i) \times zp2(i) \tag{49}$$

At this time, a_p_q_1(i) and a_p_q_2(i) are multiplexing weighting coefficients, and may be defined as complex numbers. Thus, a_p_q_1(i) and a_p_q_2(i) may also be real numbers. Also, a_p_q_1(i) and a_p_q_2(i) are described as functions of the symbol number i, but the value does not have to change for every symbol. Additionally, a_p_q_1(i) and a_p_q_2(i) are decided on the basis of the feedback information of each terminal.

Note that in FIG. 52, the number of baseband signals for user #p output by the user #p signal processor 102_p is not limited to two or less. For example, suppose that the number of baseband signals for user #p output by the user #p signal processor 102_p is S or less. Note that S is taken to be an integer equal to 1 or greater. Additionally, suppose that the user #p kth baseband signal (where k is an integer from 1 to S) is expressed as zpk(i).

At this time, if the user #p multiplexed signal $q baseband signal 7001_p_q output by the multiplexing signal processor 7000_p is expressed as gpq(i), then gpq(i) is expressed by the following Formula (50).

$$gpq(i) = \sum_{k=1}^{s} a\_p\_q\_k(i) \times zpk(i) \tag{50}$$

At this time, a_p_q_k(i) is a multiplexing weighting coefficient, and may be defined as a complex number. Thus, a_p_q_k(i) may also be a real number. Also, a_p_q_k(i) is described as a function of the symbol number i, but the value does not have to change for every symbol. Additionally, a_p_q_k(i) is decided on the basis of the feedback information of each terminal.

Next, an example of the operations of the adder 7002_*q* will be described.

Suppose that the qth added signal 7003_*q* output by the adder 7002_*q* in FIG. 52 is expressed as eq(i). Accordingly, eq(i) is expressed by the following Formula (51).

$$eq(i) = \sum_{k=1}^{M} gkq(i) \tag{51}$$

As above, even if the configuration of the transmission apparatus in the base station or AP is a configuration like the one in FIG. 52, each embodiment described in this specification may be carried out in a similar manner, and the advantageous effects described in each embodiment may be obtained in a similar manner.

(Supplement 3)

In this specification, when the transmission apparatus of the base station or AP transmits a modulated signal of a single stream, FIG. 35 is illustrated as an example of the configuration of the reception apparatus of terminal #p on the other end of communication with the base station or AP, but the configuration of terminal #p that receives the modulated signal of a single stream is not limited to FIG. 35, and for example, the reception apparatus of terminal #p may also have a configuration equipped with multiple reception antennas. For example, in FIG. 19, in the case in which the modulated signal u2 channel estimators 1905_2 and 1907_2 do not operate, the channel estimators operate with respect to a single modulated signal, and thus even with such a configuration, the modulated signal of a single stream may be received.

Consequently, in the description in this specification, even if the embodiment described using FIG. 35 has the reception apparatus configuration of the above description instead of FIG. 35, similar operation may be achieved, and similar advantageous effects may be obtained.

Embodiment 11

In the present embodiment, a different embodiment method of the operations of terminal #p described in Embodiment 3, Embodiment 5, and the like will be described.

Since an example of the configuration of terminal #p has already been described using FIG. 34 and the like, a description is omitted. Also, since an example of the configuration of the reception apparatus 3404 of terminal #p in FIG. 34 has been described using FIG. 35 and the like, a description is omitted.

Since an example of the frame configuration when transmitting a modulated signal of a single stream using the multi-carrier transmission scheme such as OFDM by the base station or AP on the other end of communication with terminal #p has been described using FIG. 36 and the like, a description is omitted.

For example, the transmission apparatus of the base station (AP) in FIG. 1 may also transmit a modulated signal of a single stream with the frame configuration in FIG. 36.

Since an example of the frame configuration when transmitting a modulated signal of a single stream using the single-carrier transmission scheme by the base station or AP on the other end of communication with terminal #p has been described using FIG. 37 and the like, a description is omitted.

For example, the transmission apparatus of the base station (AP) in FIG. 1 may also transmit a modulated signal of a single stream with the frame configuration in FIG. 37.

Also, for example, the transmission apparatus of the base station (AP) in FIG. 1 may also transmit modulated signals of multiple streams with the frame configuration in FIGS. 8 and 9.

Furthermore, for example, the transmission apparatus of the base station (AP) in FIG. 1 may also transmit modulated signals of multiple streams with the frame configuration in FIGS. 10 and 11.

Figure 53:
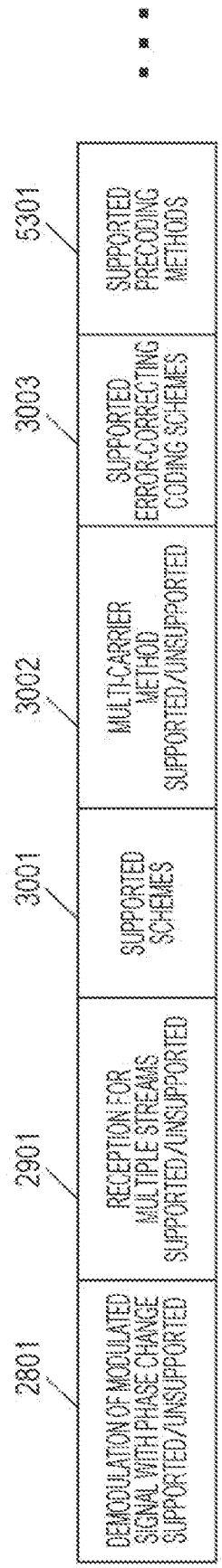
FIG. 53 is a diagram illustrating a different example from FIGS. 28, 29, and 30 of data included in reception capability notification symbols.

FIG. 53 is a diagram illustrating a different example from FIGS. 28, 29, and 30 of data included in the reception capability notification symbols 2702 transmitted by terminal #p in FIG. 27. Note that the parts of the configuration which are similar to FIGS. 28, 29, and 30 are denoted with the same numbers. Additionally, a description is omitted for parts which operate similarly to FIGS. 28, 29, and 30.

The example of data illustrated in FIG. 53 takes a configuration in which data 5301 related to "supported precoding methods" has been added to the example of data in FIG. 30. Hereinafter, the data 5301 related to "supported precoding methods" will be described.

Assume that when transmitting multiple modulated signals for multiple streams, the base station or AP is able to select one precoding method from among multiple precoding methods, executes weight combining (for example, by the weight combiner 303 in FIG. 3) according to the selected precoding method, and generates and transmits the modulated signals. Note that, as described in this specification, the base station or AP may also perform phase change.

At this time, the data by which terminal #p notifies the base station or AP "whether or not demodulation of a modulated signal is possible when the base station or AP performs one precoding among the multiple precoding" becomes the data 5301 related to "supported precoding methods".

For example, assume that when the base station or AP generates the modulated signals of multiple streams with respect to terminal #p, there is a possibility that precoding using the precoding matrix of Formula (33) or Formula (34), for example, is supported as a precoding method #A; and precoding using the precoding matrix taking θ=π/4 radians in Formula (15) or Formula (16), for example, is supported as a precoding method #B.

Assume that when generating the modulated signals of multiple streams with respect to the terminal #p, the base station or AP selects a precoding method between the precoding method #A and the precoding method #B, performs precoding (weight combining) according to the selected precoding method, and transmits the modulated signals.

At this time, the terminal #p transmits a modulated signal including "information about whether or not the terminal #p is able to receive multiple modulated signals, execute demodulation, and obtain data when the base station or AP transmits multiple modulated signals to the terminal #p according to the precoding method #A" and "information about whether or not the terminal #p is able to receive multiple modulated signals, execute demodulation, and obtain data when the base station or AP transmits multiple modulated signals to the terminal #p according to the precoding method #B". Additionally, by receiving this modulated signal, the base station or AP is able to learn "whether or not the terminal #p on the other end of communication supports the precoding method #A and the precoding method #B, and is able to demodulate modulated signals".

For example, the data 5301 related to "supported precoding methods" in FIG. 53 included in the reception capability notification symbols 2702 transmitted by the terminal #p is configured as follows.

Assume that the data 5301 related to "supported precoding methods" is made up of the 2 bits of bit m0 and bit m1. Additionally, the terminal #p transmits bit m0 and bit m1 to the base station or AP on the other end of communication as the data 5301 related to "supported precoding methods".

For example, in the case in which the terminal #p is able to receive and demodulate "a modulated signal generated by the base station or AP according to the precoding method #A" (demodulation is supported), m0=1 is set, and bit m0 is transmitted to the base station or AP on the other end of communication as a part of the data 5301 related to "supported precoding methods".

Also, in the case in which the terminal #p does not support demodulation even if "a modulated signal generated by the base station or AP according to the precoding method #A" is received, m0=0 is set, and bit m0 is transmitted to the base station or AP on the other end of communication as a part of the data 5301 related to "supported precoding methods".

Also, for example, in the case in which the terminal #p is able to receive and demodulate "a modulated signal generated by the base station or AP according to the precoding method #B" (demodulation is supported), m1=1 is set, and bit m1 is transmitted to the base station or AP on the other end of communication as a part of the data 5301 related to "supported precoding methods".

Also, in the case in which the terminal #p does not support demodulation even if "a modulated signal generated by the base station or AP according to the precoding method #B" is received, m1=0 is set, and bit m1 is transmitted to the base station or AP on the other end of communication as a part of the data 5301 related to "supported precoding methods".

Next, specific examples of operation will be described hereinafter by citing a first example to a fifth example.

First Example

As the first example, suppose that the configuration of the reception apparatus of the terminal #p is the configuration illustrated in FIG. 19, and the reception apparatus of the terminal #p supports the following, for example.

The reception, for example, of "communication scheme #A" and "communication scheme #B" described in Embodiment 3 is supported.

If the other end of communication transmits modulated signals of multiple streams in "communication scheme #B" to the terminal #p, the terminal #p supports the reception of such signals. Also, in "communication scheme #A" and "communication scheme #B", if the other end of communication transmits a modulated signal of a single stream to the terminal #p, the terminal #p supports the reception of such a signal.

Additionally, in the case in which the other end of communication performs phase change when transmitting modulated signals of multiple streams to the terminal #p, the terminal #p supports the reception of such signals.

The single-carrier scheme and the OFDM scheme are supported.

As the error-correcting coding scheme, the decoding of "error-correcting coding scheme #C" and the decoding of "error-correcting coding scheme #D" are supported.

The reception of "precoding method #A" and the reception of "precoding method #B" described above are supported.

Thus, terminal #p having the configuration of FIG. 19 supporting the above generates the reception capability notification symbols 2702 adopting the configuration illustrated in FIG. 53 on the basis of the rules described in Embodiment 3 and the description in the present embodiment, and transmits the reception capability notification symbols 2702 by following the procedure in FIG. 27, for example.

At this time, the terminal #p generates the reception capability notification symbols 2702 adopting the configuration illustrated in FIG. 53 in the transmission apparatus 3403 in FIG. 34, for example, and following the procedure in FIG. 27, the transmission apparatus 3403 of FIG. 34 transmits the reception capability notification symbols 2702 adopting the configuration illustrated in FIG. 53.

Note that in the case of the first example, since the terminal #p supports the reception of "precoding method #A" and the reception of "precoding method #B", bit m0 is set to 1 and bit m1 is set to 1 in the data 5301 related to "supported precoding methods".

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and thereby learns that terminal #p supports the "communication scheme #A" and the "communication scheme #B" from the data 3001 related to "supported schemes".

Also, from the data 2901 related to "reception for multiple streams supported/unsupported" in FIG. 53, the signal processor 155 of the base station (AP) learns that "if the other end of communication transmits modulated signals of multiple streams to the terminal #p, the terminal #p supports the reception of such signals" and "if the other end of communication transmits a modulated signal of a single stream in "communication scheme #A" and "communication scheme #B" to the terminal #p, the terminal #p supports the reception of such a signal".

Additionally, from the data 2801 related to "demodulation of modulated signal with phase change supported/unsupported" in FIG. 53, the signal processor 155 of the base station (AP) learns that terminal #p "supports demodulation of modulated signal with phase change".

From the data 3002 related to "multi-carrier scheme supported/unsupported" in FIG. 53, the signal processor 155 of the base station (AP) learns that "the terminal #p supports the 'single-carrier scheme' and the 'OFDM scheme'".

From the data 3003 related to "supported error-correcting coding schemes" in FIG. 53, the signal processor 155 of the base station (AP) learns that the terminal #p "supports the decoding of 'error-correcting coding scheme #C' and the decoding of 'error-correcting coding scheme #D'".

From the data 5301 related to "supported precoding methods" in FIG. 53, the signal processor 155 of the base station (AP) learns that the terminal #p "supports the reception of 'precoding method #A' and the reception of 'precoding method #B'".

Consequently, by having the base station or AP take into account the communication methods supported by the terminal #p, the communication environment, and the like, and appropriately generate and transmit modulated signals receivable by the terminal #p, an advantageous effect of improving the data transmission efficiency in the system including the base station or AP and the terminal #p may be obtained.

Second Example

As the second example, suppose that the reception apparatus of the terminal #p is the configuration illustrated in FIG. 35, and the reception apparatus of the terminal #p supports the following, for example.
The reception, for example, of "communication scheme #A" and "communication scheme #B" described in Embodiment 3 is supported.
If the other end of communication transmits modulated signals of multiple streams to the terminal #p, the terminal #p does not support the reception of such signals.
Thus, in the case in which the other end of communication performs phase change when transmitting modulated signals of multiple streams to the terminal #p, the terminal #p does not support the reception of such signals.
The single-carrier scheme and the OFDM scheme are supported.
As the error-correcting coding scheme, the decoding of "error-correcting coding scheme #C" and the decoding of "error-correcting coding scheme #D" are supported.
The reception of "precoding method #A" and the reception of "precoding method #B" described above are not supported.

Thus, terminal #p having the configuration of FIG. 35 supporting the above generates the reception capability notification symbols 2702 adopting the configuration illustrated in FIG. 53 on the basis of the rules described in Embodiment 3 and the description in the present embodiment, and transmits the reception capability notification symbols 2702 by following the procedure in FIG. 27, for example.

At this time, the terminal #p generates the reception capability notification symbols 2702 adopting the configuration illustrated in FIG. 53 in the transmission apparatus 3403 in FIG. 34, for example; and following the procedure in FIG. 27, the transmission apparatus 3403 of FIG. 34 transmits the reception capability notification symbols 2702 adopting the configuration illustrated in FIG. 53.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that the terminal #p supports the "communication scheme #A" and the "communication scheme #B" from the data 3001 related to "supported schemes".

Also, from the data 2901 related to "reception for multiple streams supported/unsupported" in FIG. 53, the signal processor 155 of the base station (AP) learns that "if the other end of communication transmits modulated signals of multiple streams to the terminal #p, the terminal #p does not support the reception of such signals".

Consequently, since the data 2801 related to "demodulation of modulated signal with phase change supported/unsupported" in FIG. 53 is invalid, the signal processor 155 of the base station (AP) decides not to transmit a phase-changed modulated signal, and outputs a control signal 157 including this information.

Also, since the data 5301 related to "supported precoding methods" in FIG. 53 is invalid, the signal processor 155 of the base station (AP) decides not to transmit the modulated signals of multiple streams, and outputs a control signal 157 including this information.

From the data 3002 related to "multi-carrier scheme supported/unsupported" in FIG. 53, the signal processor 155 of the base station (AP) learns that "the terminal #p supports the 'single-carrier scheme' and the 'OFDM scheme'".

From the data 3003 related to "supported error-correcting coding schemes" in FIG. 53, the signal processor 155 of the base station (AP) learns that the terminal #p "supports the decoding of 'error-correcting coding scheme #C' and the decoding of 'error-correcting coding scheme #D'".

For example, the terminal #p is equipped with the configuration of FIG. 35, and consequently, by executing operations as described above to cause the base station or AP not to transmit the modulated signals of multiple streams to the terminal #p, the base station or AP is able to appropriately transmit modulated signals that the terminal #p is able to demodulate and decode. With this arrangement, an advantageous effect of improved data transmission efficiency in the system including the base station or AP and the terminal #p may be obtained.

Third Example

As the third example, suppose that the reception apparatus of the terminal #p is the configuration illustrated in FIG. 19, and the reception apparatus of the terminal #p supports the following, for example.
The reception, for example, of "communication scheme #A" and "communication scheme #B" described in Embodiment 3 is supported.
If the other end of communication transmits modulated signals of multiple streams in "communication scheme #B" to the terminal #p, the terminal #p supports the reception of such signals. Also, in "communication scheme #A" and "communication scheme #B", if the other end of communication transmits a modulated signal of a single stream to the terminal #p, the terminal #p supports the reception of such a signal.
Additionally, in the case in which the other end of communication performs phase change when transmission modulated signals of multiple streams to the terminal #p, the terminal #p supports the reception of such signals.
The single-carrier scheme and the OFDM scheme are supported.
As the error-correcting coding scheme, the decoding of "error-correcting coding scheme #C" and the decoding of "error-correcting coding scheme #D" are supported.
The reception of "precoding method #A" described above is supported. In other words, in the third example, the reception of the "precoding method #B" described above is not supported.

Thus, terminal #p having the configuration of FIG. 19 supporting the above generates the reception capability notification symbols 2702 adopting the configuration illustrated in FIG. 53 on the basis of the rules described in Embodiment 3 and the description in the present embodiment, and transmits the reception capability notification symbols 2702 by following the procedure in FIG. 27, for example.

At this time, the terminal #p generates the reception capability notification symbols 2702 adopting the configuration illustrated in FIG. 53 in the transmission apparatus 3403 in FIG. 34, for example, and following the procedure in FIG. 27, the transmission apparatus 3403 of FIG. 34 transmits the reception capability notification symbols 2702 adopting the configuration illustrated in FIG. 53.

Note that in the case of the third example, since the terminal #p supports the reception of "precoding method #A" and does not support the reception of "precoding method #B", bit m0 is set to 1 and bit m1 is set to 0 in the data 5301 related to "supported precoding methods".

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and thereby learns that terminal #p supports the "communication scheme #A" and the "communication scheme #B" from the data 3001 related to "supported schemes".

Also, from the data 2901 related to "reception for multiple streams supported/unsupported" in FIG. 53, the signal processor 155 of the base station (AP) learns that "if the other end of communication transmits modulated signals of multiple streams to the terminal #p, the terminal #p supports the reception of such signals" and "if the other end of communication transmits a modulated signal of a single stream in "communication scheme #A" and "communication scheme B" to the terminal #p, the terminal #p supports the reception of such a signal".

Additionally, from the data 2801 related to "demodulation of modulated signal with phase change supported/unsupported" in FIG. 53, the signal processor 155 of the base station (AP) learns that terminal #p "supports demodulation of modulated signal with phase change".

From the data 3002 related to "multi-carrier scheme supported/unsupported" in FIG. 53, the signal processor 155 of the base station (AP) learns that "the terminal #p supports the 'single-carrier scheme' and the 'OFDM scheme'".

From the data 3003 related to "supported error-correcting coding schemes" in FIG. 53, the signal processor 155 of the base station (AP) learns that the terminal #p "supports the decoding of 'error-correcting coding scheme #C' and the decoding of 'error-correcting coding scheme #D'".

From the data 5301 related to "supported precoding methods" in FIG. 53, the signal processor 155 of the base station (AP) learns that the terminal #p "supports the reception of 'precoding method #A'".

Consequently, by having the base station or AP take into account the communication methods supported by the terminal #p, the communication environment, and the like, and appropriately generate and transmit modulated signals receivable by the terminal #p, an advantageous effect of improving the data transmission efficiency in the system including the base station or AP and the terminal #p may be obtained.

Fourth Example

As the fourth example, suppose that the configuration of the reception apparatus of the terminal #p is the configuration illustrated in FIG. 19, and the reception apparatus of the terminal #p supports the following, for example.

The reception, for example, of "communication scheme #A" and "communication scheme #B" described in Embodiment 3 is supported.

If the other end of communication transmits modulated signals of multiple streams in "communication scheme #B" to the terminal #p, the terminal #p supports the reception of such signals. Also, in "communication scheme #A" and "communication scheme #B", if the other end of communication transmits a modulated signal of a single stream to the terminal #p, the terminal #p supports the reception of such a signal.

The single-carrier scheme is supported. Note that in the single-carrier scheme, assume that the base station on the other end of communication does not support "performing phase change in the case of modulated signals of multiple streams", and also does not support "performing precoding".

Consequently, in the case in which the other end of communication performs phase change when transmitting modulated signals of multiple streams to the terminal #p, the terminal #p does not support the reception of such signals.

As the error-correcting coding scheme, the decoding of "error-correcting coding scheme #C" and the decoding of "error-correcting coding scheme #D" are supported.

The reception of "precoding method #A" described above is supported.

Thus, terminal #p having the configuration of FIG. 19 supporting the above generates the reception capability notification symbols 2702 adopting the configuration illustrated in FIG. 53 on the basis of the rules described in Embodiment 3 and the description in the present embodiment, and transmits the reception capability notification symbols 2702 by following the procedure in FIG. 27, for example.

At this time, terminal #p generates the reception capability notification symbols 2702 illustrated in FIG. 53 in the transmission apparatus 3403 of FIG. 34, for example, and following the procedure in FIG. 27, the transmission apparatus 3403 of FIG. 34 transmits the reception capability notification symbols 2702 illustrated in FIG. 53.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and from the data 2901 related to "reception for multiple streams supported/unsupported" in FIG. 53, learns that "if the other end of communication transmits modulated signals of multiple streams to the terminal #p, the terminal #p supports the reception of such signals" and "if the other end of communication transmits a modulated signal of a single stream in "communication scheme #A" and "communication scheme #B" to the terminal #p, the terminal #p supports the reception of such a signal".

From the data 3002 related to "multi-carrier scheme supported/unsupported" in FIG. 53, the signal processor 155 of the base station (AP) learns that "the terminal #p supports the 'single-carrier scheme'".

Consequently, since the data 2801 related to "demodulation of modulated signal with phase change supported/unsupported" in FIG. 53 is invalid, the signal processor 155 of the base station (AP) decides not to transmit a phase-changed modulated signal, and outputs a control signal 157 including this information.

Also, since the data 5301 related to "supported precoding methods" in FIG. 53 is invalid, the signal processor 155 of the base station (AP) outputs control information 157 indicating that "precoding is not executed".

From the data 3003 related to "supported error-correcting coding schemes" in FIG. 53, the signal processor 155 of the base station (AP) learns that the terminal #p "supports the decoding of 'error-correcting coding scheme #C' and the decoding of 'error-correcting coding scheme #D'".

Consequently, by having the base station or AP take into account the communication methods supported by the terminal #p, the communication environment, and the like, and appropriately generate and transmit modulated signals receivable by the terminal #p, an advantageous effect of improving the data transmission efficiency in the system including the base station or AP and the terminal #p may be obtained.

Fifth Example

As the fifth example, suppose that the reception apparatus of the terminal #p is the configuration illustrated in FIG. 35, and the reception apparatus of the terminal #p supports the following, for example.

The reception, for example, of "communication scheme #A" described in Embodiment 3 is supported.
Consequently, if the other end of communication transmits modulated signals of multiple streams to the terminal #p, the terminal #p does not support the reception of such signals.
Thus, in the case in which the other end of communication performs phase change when transmitting modulated signals for multiple streams to the terminal #p, the terminal #p does not support the reception of such signals.
Furthermore, if the other end of communication transmits modulated signals of multiple streams generated using "precoding method #A", the terminal #p does not support the reception of such signals. Also, if the other end of communication transmits modulated signals of multiple streams generated using "precoding method #B", the terminal #p does not support the reception of such signals.
Only the single-carrier scheme is supported.
As the error-correcting coding scheme, only the decoding of "error-correcting coding scheme #C" is supported.

Thus, terminal #p having the configuration of FIG. 35 supporting the above generates the reception capability notification symbols 2702 adopting the configuration illustrated in FIG. 53 on the basis of the rules described in Embodiment 3 and the description in the present embodiment, and transmits the reception capability notification symbols 2702 by following the procedure in FIG. 27, for example.

At this time, the terminal #p generates the reception capability notification symbols 2702 adopting the configuration illustrated in FIG. 53 in the transmission apparatus 3403 in FIG. 34, for example, and following the procedure in FIG. 27, the transmission apparatus 3403 of FIG. 34 transmits the reception capability notification symbols 2702 adopting the configuration illustrated in FIG. 53.

The signal processor 155 of the base station (AP) in FIG. 22 acquires a baseband signal group 154 including the reception capability notification symbols 2702 transmitted by terminal #p through the reception antenna group 151 and the radio section group 153. Additionally, the signal processor 155 of the base station (AP) in FIG. 22 extracts the data included in the reception capability notification symbols 2702, and learns that terminal #p supports the "communication scheme #B" from the data 3001 related to "supported schemes".

Consequently, since the data 2801 related to "demodulation of modulated signal with phase change supported/unsupported" in FIG. 53 is invalid, and the communication scheme #A is supported, the signal processor 155 of the base station (AP) decides not to transmit a phase-changed modulated signal, and outputs a control signal 157 including this information. This is because the communication scheme #A does not support the transmitting and reception of modulated signals for multiple streams.

Also, since the data 2901 related to "reception for multiple streams supported/unsupported" in FIG. 53 is invalid, and the communication scheme #A is supported, the signal processor 155 of the base station (AP) decides not to transmit modulated signals for multiple streams to the terminal #p, and outputs a control signal 157 including this information. This is because the communication scheme #A does not support the transmitting and reception of modulated signals for multiple streams.

Additionally, since the communication scheme #A is supporting, the data 5301 related to "supported precoding methods" in FIG. 53 is invalid, and the signal processor 155 of the base station (AP) decides not to transmit the modulated signals of multiple streams, and outputs a control signal 157 including this information.

Additionally, since the data 3003 related to "supported error-correcting coding schemes" in FIG. 53 is invalid, and the communication method #A is supported, the signal processor 155 of the base station (AP) decides to use "error-correcting coding scheme #C", and outputs a control signal 157 including this information. This is because the communication scheme #A supports the "error-correcting coding scheme #C".

For example, as in FIG. 35, "communication scheme #A" is supported, and consequently, by executing operations as described above to cause the base station or AP not to transmit modulated signals for multiple streams to the terminal #p, the base station or AP is able to appropriately transmit modulated signals in "communication scheme #A". As a result, an advantageous effect of improved data transmission efficiency in the system including the base station or AP and the terminal #p may be obtained.

As above, the base station or AP acquires information related to the demodulation schemes supported by the terminal #p from the terminal #p on the other end of communication with the base station or AP, and on the basis of the information, decides the number of modulated signals, the modulated signal communication scheme, the signal processing method of the modulated signal, and the like, and thereby is able to appropriately transmit modulated signals receivable by the terminal #p. As a result, an advantageous effect of improved data transmission efficiency in the system including the base station or AP and the terminal #p may be obtained.

At this time, by including multiple pieces of information in the reception capability notification symbols 2702 like in FIG. 53, for example, the base station or AP is able to determine the validity/invalidity of the information included in the reception capability notification symbols 2702 easily. This arrangement has an advantage of enabling fast determination of the modulated signal scheme and/or the signal processing method and the like for transmission.

Additionally, on the basis of the content of the information of the reception capability notification symbols 2702 transmitted by each terminal #p, the base station or AP is able to transmit modulated signals to each terminal #p by a favorable transmission method, thereby improving the data transmission efficiency.

Also, the base station or AP in the present embodiment adopts the configuration in FIG. 1, and communicates with multiple terminals. The reception capability (the supported demodulation schemes) of the multiple terminals on the other end of communication with the base station or AP in FIG. 1 may be the same or different from each other. Each of the multiple terminals transmits reception capability notification symbols including information related to the supported demodulated schemes. The base station or AP acquires the information related to the supported demodulation schemes from each terminal, and on the basis of this information, decides the number of modulated signals, the modulated signal communication scheme, the signal processing method of the modulated signal, and the like, and thereby is able to transmit modulated signals receivable by each terminal on the basis of the reception capability (supported demodulated schemes) for each terminal. With this arrangement, an advantageous effect of improved data transmission efficiency in the system including the base station or AP and multiple terminals may be obtained. Note that the base station or AP uses certain time intervals or certain frequencies to transmit modulated signals to multiple terminals, and in this case, transmits one or more modulated signals to each terminal. Consequently, each terminal may also transmit reception capability notification symbols as described above to the base station or AP.

Note that the method of configuring the information of the reception capability notification symbols described in the present embodiment is an example, and the method of configuring the information of the reception capability notification symbols is not limited thereto. Also, the transmission procedure by which terminal #p transmits the reception capability notification symbols to the base station or AP and the description of the present embodiment regarding the transmission timings are merely one example, and the configuration is not limited thereto.

Also, the present embodiment describes an example in which multiple terminals transmit the reception capability notification symbols, but the method of configuring the information of the reception capability notification symbols transmitted by the multiple terminals may be different or the same among the terminals. Also, the transmission procedure and the transmission timing by which the multiple terminals transmit the reception capability notification symbols may be different or the same among the terminals.

(Supplement 4)

In this specification, when the transmission apparatus of the base station or AP transmits a modulated signal of a single stream, FIG. 35 is illustrated as an example of the configuration of the reception apparatus of the terminal #p on the other end of communication with the base station or AP, but the configuration of terminal #p that receives the modulated signal of a single stream is not limited to FIG. 35. For example, the reception apparatus of the terminal #p may also have a configuration equipped with multiple reception antennas. For example, in FIG. 19, in the case in which the modulated signal u2 channel estimators 1905_2 and 1907_2 do not operate, the channel estimators operate with respect to a single modulated signal, and thus even with such a configuration, the modulated signal of a single stream may be received.

Consequently, in the description in this specification, even if the operation of the embodiment described using FIG. 35 has the reception apparatus configuration of the above description instead of FIG. 19, similar operation may be achieved, and similar advantageous effects may be obtained.

Also, in this specification, the configurations of FIGS. 28, 29, 30, and 53 are described as examples of the configuration of reception capability notification symbols transmitted by the terminal #p. At this time, an advantageous effect of the reception capability notification symbols "including multiple pieces of information (multiple pieces of data)" is described. In the following, methods of transmitting the "multiple pieces of information (multiple pieces of data)" included in the reception capability notification symbols transmitted by the terminal #p will be described.

Exemplary Configuration 1:

For example, among the data 2801 related to "demodulation of modulated signal with phase change supported/unsupported", the data 2901 related to "reception for multiple streams supported/unsupported", the data 3001 related to "supported schemes", the data 3002 related to "multi-carrier scheme supported/unsupported", and the data 3003 related to "supported error-correcting coding schemes" in FIG. 30, at least two or more pieces of data (information) are transmitted using the same frame or the same subframe.

Exemplary Configuration 2:

For example, among the data 2801 related to "demodulation of modulated signal with phase change supported/unsupported", the data 2901 related to "reception for multiple streams supported/unsupported", the data 3001 related to "supported schemes", the data 3002 related to "multi-carrier scheme supported/unsupported", the data 3003 related to "supported error-correcting coding schemes", and the data 5301 related to "supported precoding methods" in FIG. 53, at least two or more pieces of data (information) are transmitted using the same frame or the same subframe.

At this point, "frame" and "subframe" will be described.

Figure 54:
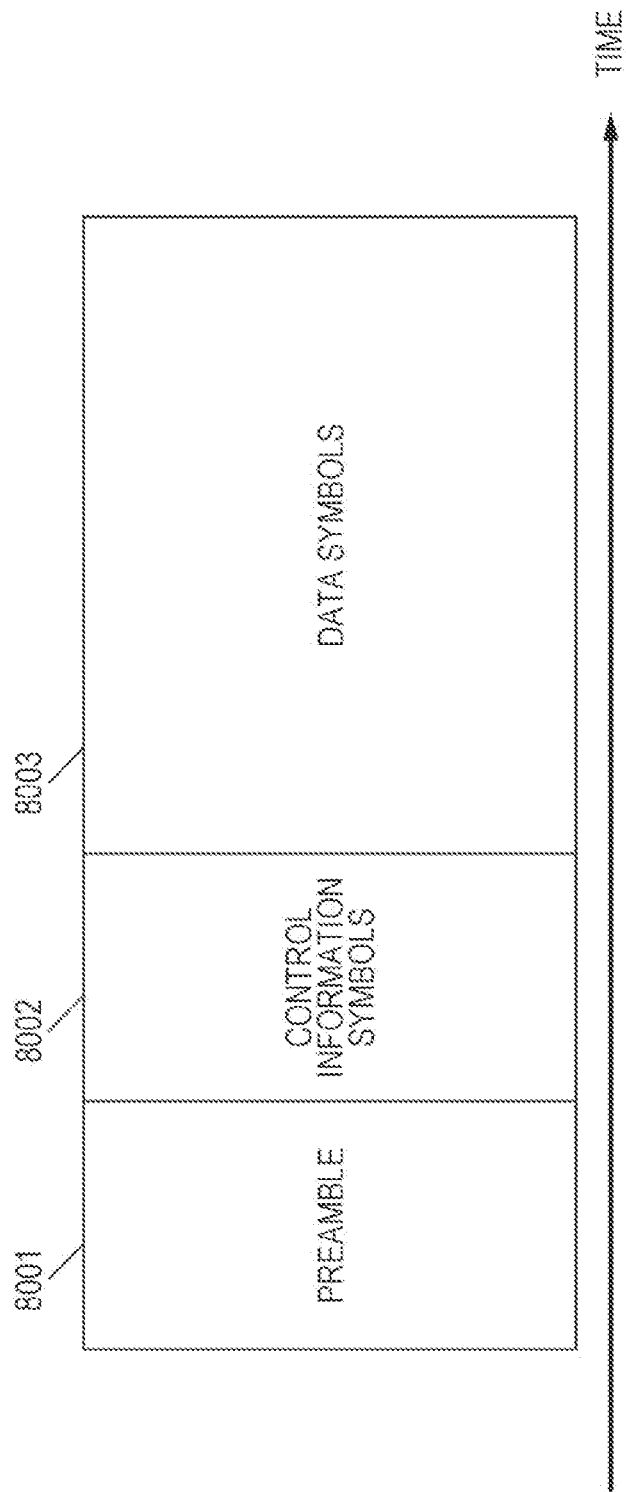
FIG. 54 is a diagram illustrating an example of a configuration of a frame.

FIG. 54 is a diagram illustrating an example of the configuration of a frame. In FIG. 54, the horizontal axis is time. For example, in FIG. 54, assume that the frame includes a preamble 8001, control information symbols 8002, and data symbols 8003. However, the frame does not have to be configured to include all three of the above. For example, the frame may "at least include the preamble 8001", "at least include the control information symbols 8002", "at least include the preamble 8001 and the data symbols 8003", "at least include the preamble 8001 and the control information symbols 8002", "at least include the preamble 8001 and the data symbols 8003", or "at least include the preamble 8001, the control information symbols 8002, and the data symbols 8003".

Additionally, the terminal #p transmits the reception capability notification symbols using the symbols of any of the preamble 8001, the control information symbols 8002, or the data symbols 8003.

Note that FIG. 54 may also be called a subframe. Also, a term other than frame or subframe may be used.

Using a method like the above, by having the terminal #p transmit at least two or more pieces of information included in the reception capability notification symbols, the advantageous effects described in Embodiment 3, Embodiment 5, Embodiment 11, and the like may be obtained.

Exemplary Configuration 3:

For example, among the data 2801 related to "demodulation of modulated signal with phase change supported/unsupported", the data 2901 related to "reception for multiple streams supported/unsupported", the data 3001 related to "supported schemes", the data 3002 related to "multi-carrier scheme supported/unsupported", and the data 3003 related to "supported error-correcting coding schemes" in FIG. 30, at least two or more pieces of data (information) are transmitted using the same packet.

Exemplary Configuration 4:

For example, among the data 2801 related to "demodulation of modulated signal with phase change supported/unsupported", the data 2901 related to "reception for multiple streams supported/unsupported", the data 3001 related to "supported schemes", the data 3002 related to "multi-carrier scheme supported/unsupported", the data 3003 related to "supported error-correcting coding schemes", and the data 5301 related to "supported precoding methods" in FIG. 53, at least two or more pieces of data (information) are transmitted using the same packet.

Consider the frame in FIG. 54. Additionally, assume that the frame "at least includes the preamble 8001 and the data symbols 8003", "at least includes the control information symbols 8002 and the data symbols 8003", or "at least includes the preamble 8001, the control information symbols 8002, and the data symbols 8003".

At this time, there are two methods of transmitting a packet, for example.

First Method:

The data symbols 8003 are included in multiple packets. In this case, at least two pieces of data (information) included in the reception capability notification symbols are transmitted by the data symbols 8003.

Second Method:

The packet is transmitted by the data symbols of multiple frames. In this case, at least two or more pieces of data (information) included in the reception capability notification symbols are transmitted using multiple frames.

Using a method like the above, by having the terminal #p transmit at least two or more pieces of data (information) included in the reception capability notification symbols, the advantageous effects described in Embodiment 3, Embodiment 5, Embodiment 11, and the like may be obtained.

Note that in FIG. 54, the term "preamble" is used, but the term is not limited thereto. The "preamble" is assumed to include at least one or more symbols or signals of "a symbol or signal by which the other end of communication detects a modulated signal", "a symbol or signal by which the other end of communication executes channel estimation (propagation environment estimation)", "a symbol or signal by which the other end of communication executes time synchronization", "a symbol or signal by which the other end of communication executes frequency synchronization", and "a symbol or signal by which the other end of communication executes frequency offset estimation".

Also, in FIG. 54, the term "control information symbols" is used, but the term is not limited thereto. The "control information symbols" are assumed to be symbols including at least one or more pieces of information of "information about the error-correcting coding scheme for generating data symbols", "information about the modulation scheme for generating data symbols", "information about the number of symbols included in the data symbols", "information related to the data symbol transmission method", "information other than data symbols that needs to be transmitted to the other end of communication", and "information other than data symbols".

Note that the order in which the preamble 8001, the control information symbols 8002, and the data symbols 8003 are transmitted, or in other words, the frame configuration method, is not limited to FIG. 54.

In Embodiment 3, Embodiment 5, Embodiment 11, and the like, the terminal #p is described as transmitting the reception capability notification symbols, and the other end of communication with the terminal #p is described as a base station or AP, but the configuration is not limited thereto. For example, the other end of communication with the base station or AP may be the terminal #p, and the base station or AP may transmit reception capability notification symbols to the terminal #p on the other end of communication. Alternatively, the other end of communication with the terminal #p may be another terminal, and the terminal #p may transmit reception capability notification symbols to the other terminal on the other end of communication. Alternatively, the other end of communication with the base station or AP may be another base station or AP, and the base station or AP may transmit reception capability notification symbols to the other base station or AP on the other end of communication.

Embodiment 12

In Embodiment 1 to Embodiment 11, Supplement 1 to Supplement 4, and the like, the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like are described using Formula (2), Formula (44), and the like, for example, while in addition, it is noted that the values of the phase change values do not have to be based on these formulas, and also that "it is sufficient to change the phase periodically or regularly".

Figure 55:
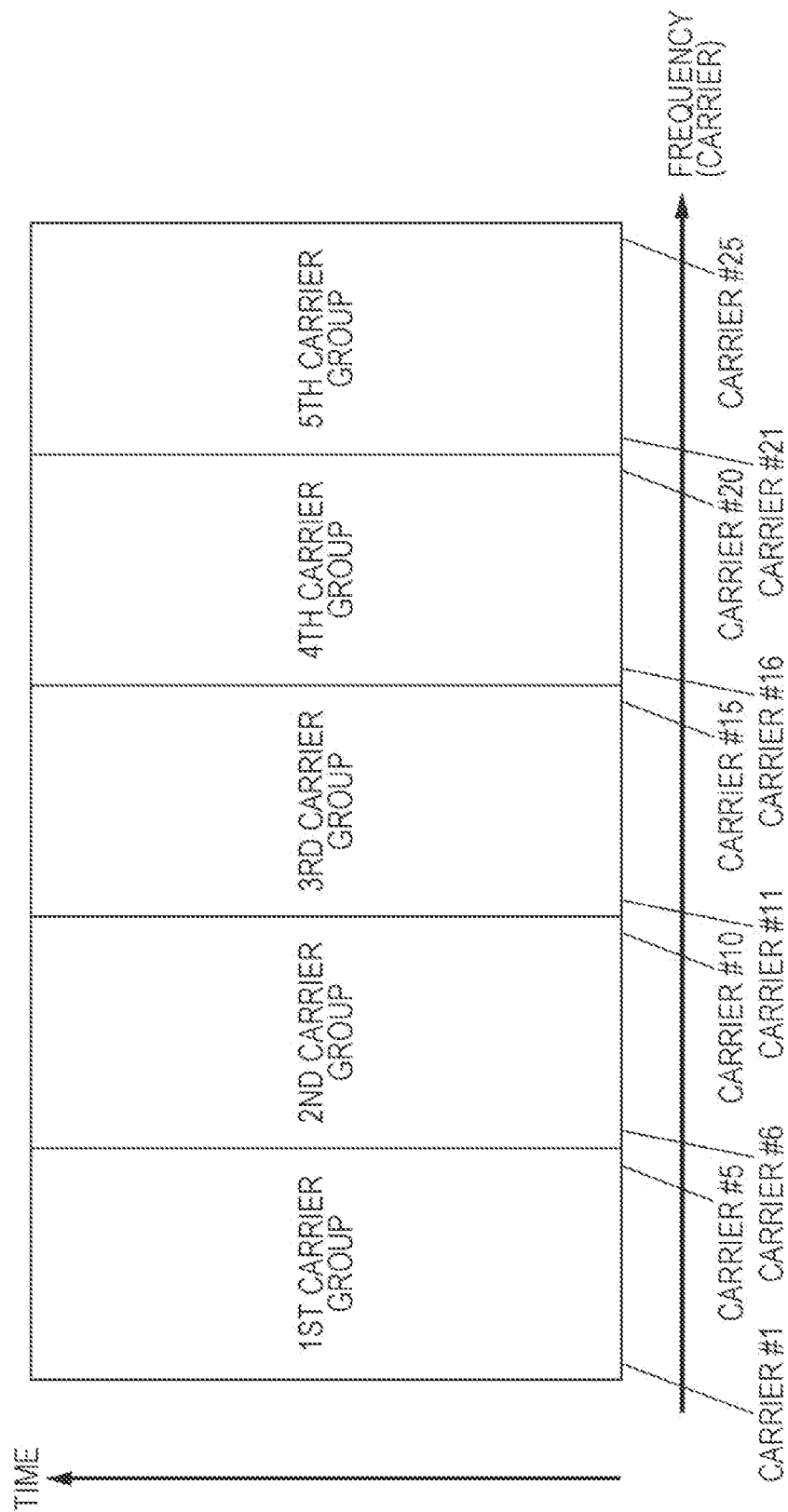
FIG. 55 is a diagram illustrating an example of carrier groups of modulated signals transmitted by a base station or AP.

In the present embodiment, another example of being "sufficient to change the phase periodically or regularly" will be described. FIG. 55 is a diagram illustrating an example of carrier groups of modulated signals transmitted by a base station or AP. In FIG. 55, the horizontal axis indicates frequency (carrier), while the vertical axis indicates time.

For example, like in FIG. 55, consider a first carrier group including carrier #1 to carrier #5, a second carrier group including carrier #6 to carrier #10, a third carrier group including carrier #11 to carrier #15, a fourth carrier group including carrier #16 to carrier #20, and a fifth carrier group including carrier #21 to carrier #25. Assume that, to transmit data to a certain terminal (certain user) (terminal #p), the base station or AP uses the first carrier group, the second carrier group, the third carrier group, the fourth carrier group, and the fifth carrier group.

Assume that Yp(i) is the phase change value used by the phase changer 305A, yp(i) is the phase change value used by the phase changer 305B, Vp(i) is the phase change value used by the phase changer 3801A, and vp(i) is the phase change value used by the phase changer 3801B in FIGS. 3, 4, 26, 38, 39, 40, 41, 42, 43, 44, 45, 46, 47, 48, 49, and the like.

At this time, assume that in the phase changer 305A, phase change is executed on symbols belonging to the first carrier group of FIG. 55, using $e^{j \times E1}$ as the phase change value Yp(i). Note that E1 is assumed to be a real number. For example, E1 is 0 (radians)≤E1<2×π (radians).

Additionally, assume that in the phase changer 305A, phase change is executed on symbols belonging to the second carrier group of FIG. 55, using $e^{j \times E2}$ as the phase change value Yp(i). Note that E2 is assumed to be a real number. For example, E2 is 0 (radians)≤E2<2×π (radians).

Assume that in the phase changer 305A, phase change is executed on symbols belonging to the third carrier group of FIG. 55, using $e^{j \times E3}$ as the phase change value Yp(i). Note that E3 is assumed to be a real number. For example, E3 is 0 (radians)≤E3<2×π (radians).

Assume that in the phase changer 305A, phase change is executed on symbols belonging to the fourth carrier group of FIG. 55, using $e^{j \times E4}$ as the phase change value Yp(i). Note that E4 is assumed to be a real number. For example, E4 is 0 (radians)≤E4<2×π (radians).

Assume that in the phase changer 305A, phase change is executed on symbols belonging to the fifth carrier group of FIG. 55, using $e^{j \times E5}$ as the phase change value Yp(i). Note that E5 is assumed to be a real number. For example, E5 is 0 (radians)≤E5<2×π (radians).

As a first example, there is a method in which "E1≠E2, and E1≠E3, and E1≠E4, and E1≠E5, and E2≠E3, and E2≠E4, and E2≠E5, and E3≠E4, and E3≠E5, and E4≠E5" holds. When generalized, the method is one in which "x is an integer equal to 1 or greater, y is an integer equal to 1 or greater, x≠y holds, and for all x and y satisfying these conditions, Ex≠Ey holds".

As a second example, there is a method in which "E1≠E2, or E1≠E3, or E1≠E4, or E1≠E5, or E2≠E3, or E2≠E4, or E2≠E5, or E3≠E4, or E3≠E5, or E4≠E5" holds. When generalized, the method is one in which "there exists a set of x, y such that x is an integer equal to 1 or greater, y is an integer equal to 1 or greater, x≠y holds, and Ex≠Ey holds".

Also, assume that in the phase changer 305B, phase change is executed on symbols belonging to the first carrier group of FIG. 55, using $e^{j \times F1}$ as the phase change value yp(i). Note that F1 is assumed to be a real number. For example, F1 is 0 (radians)≤F1<2×π (radians).

Additionally, assume that in the phase changer 305B, phase change is executed on symbols belonging to the second carrier group of FIG. 55, using $e^{j \times F2}$ as the phase change value yp(i). Note that F2 is assumed to be a real number. For example, F2 is 0 (radians)≤F2<2×π (radians).

Assume that in the phase changer 305B, phase change is executed on symbols belonging to the third carrier group of FIG. 55, using $e^{j \times F3}$ as the phase change value yp(i). Note that F3 is assumed to be a real number. For example, F3 is 0 (radians)≤F3<2×π (radians).

Assume that in the phase changer 305B, phase change is executed on symbols belonging to the fourth carrier group of FIG. 55, using $e^{j \times F4}$ as the phase change value yp(i). Note that F4 is assumed to be a real number. For example, F4 is 0 (radians)≤F4<2×π (radians).

Assume that in the phase changer 305B, phase change is executed on symbols belonging to the fifth carrier group of FIG. 55, using $e^{j \times F5}$ as the phase change value yp(i). Note that F5 is assumed to be a real number. For example, F5 is 0 (radians)≤F5<2×π (radians).

As a first example, there is a method in which "F1≠F2, and F1≠F3, and F1≠F4, and F1≠F5, and F2≠F3, and F2≠F4, and F2≠F5, and F3≠F4, and F3≠F5, and F4≠F5" holds. When generalized, the method is one in which "x is an integer equal to 1 or greater, y is an integer equal to 1 or greater, x≠y holds, and for all x and y satisfying these conditions, Fx≠Fy holds".

As a second example, there is a method in which "F1≠F2, or F1≠F3, or F1≠F4, or F1≠F5, or F2≠F3, or F2≠F4, or F2≠F5, or F3≠F4, or F3≠F5, or F4≠F5" holds. When generalized, the method is one in which "there exists a set of x, y such that x is an integer equal to 1 or greater, y is an integer equal to 1 or greater, x≠y holds, and Fx≠Fy holds".

Also, assume that in the phase changer 3801A, phase change is executed on symbols belonging to the first carrier group of FIG. 55, using $e^{j \times G1}$ as the phase change value Vp(i). Note that G1 is assumed to be a real number. For example, G1 is 0 (radians)≤G1<2×π (radians).

Also, assume that in the phase changer 3801A, phase change is executed on symbols belonging to the second carrier group of FIG. 55, using $e^{j \times G2}$ as the phase change value Vp(i). Note that G2 is assumed to be a real number. For example, G2 is 0 (radians)≤G2<2×π (radians).

Assume that in the phase changer 3801A, phase change is executed on symbols belonging to the third carrier group of FIG. 55, using $e^{j \times G3}$ as the phase change value Vp(i). Note that G3 is assumed to be a real number. For example, G3 is 0 (radians)≤G3<2×π (radians).

Assume that in the phase changer 3801A, phase change is executed on symbols belonging to the fourth carrier group of FIG. 55, using $e^{j \times G4}$ as the phase change value Vp(i). Note that G4 is assumed to be a real number. For example, G4 is 0 (radians)≤G4<2×π (radians).

Assume that in the phase changer 3801A, phase change is executed on symbols belonging to the fifth carrier group of FIG. 55, using $e^{j \times G5}$ as the phase change value Vp(i). Note that G5 is assumed to be a real number. For example, G5 is 0 (radians)≤G5<2×π (radians).

As a first example, there is a method in which "G1≠G2, and G1≠G3, and G1≠G4, and G1≠G5, and G2≠G3, and G2≠G4, and G2≠G5, and G3≠G4, and G3≠G5, and G4≠G5" holds. When generalized, the method is one in which "x is an integer equal to 1 or greater, y is an integer equal to 1 or greater, x≠y holds, and for all x and y satisfying these conditions, Gx≠Gy holds".

As a second example, there is a method in which "G1≠G2, or G1≠G3, or G1≠G4, or G1≠G5, or G2≠G3, or G2≠G4, or G2≠G5, or G3≠G4, or G3≠G5, or G4≠G5" holds. When generalized, the method is one in which "there exists a set of x, y such that x is an integer equal to 1 or greater, y is an integer equal to 1 or greater, x≠y holds, and Gx≠Gy holds".

Also, assume that in the phase changer 3801B, phase change is executed on symbols belonging to the first carrier group of FIG. 55, using $e^{j \times H1}$ as the phase change value vp(i). Note that H1 is assumed to be a real number. For example, H1 is 0 (radians)≤H1<2×π (radians).

Additionally, assume that in the phase changer 3801B, phase change is executed on symbols belonging to the second carrier group of FIG. 55, using $e^{j \times H2}$ as the phase change value vp(i). Note that H2 is assumed to be a real number. For example, H2 is 0 (radians)≤H2<2×π (radians).

Assume that in the phase changer 3801B, phase change is executed on symbols belonging to the third carrier group of FIG. 55, using $e^{j \times H3}$ as the phase change value vp(i). Note that H3 is assumed to be a real number. For example, H3 is 0 (radians)≤H3<2×π (radians).

Assume that in the phase changer 3801B, phase change is executed on symbols belonging to the fourth carrier group of FIG. 55, using $e^{j \times H4}$ as the phase change value vp(i). Note that H4 is assumed to be a real number. For example, H4 is 0 (radians)≤H4<2×π (radians).

Assume that in the phase changer 3801B, phase change is executed on symbols belonging to the fifth carrier group of FIG. 55, using $e^{j \times H5}$ as the phase change value vp(i). Note that H5 is assumed to be a real number. For example, H5 is 0 (radians)≤H5<2×π (radians).

As a first example, there is a method in which "H1≠H2, and H1≠H3, and H1≠H4, and H1≠H5, and H2≠H3, and H2≠H4, and H2≠H5, and H3≠H4, and H3≠H5, and H4≠H5" holds. When generalized, the method is one in which "x is an integer equal to 1 or greater, y is an integer equal to 1 or greater, x≠y holds, and for all x and y satisfying these conditions, Hx≠Hy holds".

As a second example, there is a method in which "H1≠H2, or H1≠H3, or H1≠H4, or H1≠H5, or H2≠H3, or H2≠H4, or H2≠H5, or H3≠H4, or H3≠H5, or H4≠H5" holds. When generalized, the method is one in which "there exists a set of x, y such that x is an integer equal to 1 or greater, y is an integer equal to 1 or greater, x≠y holds, and Hx≠Hy holds".

Note that although the first carrier group to the fifth carrier group exist in FIG. 55, the number of existing carrier groups is not limited to 5, and it is possible to carry out the embodiment similarly insofar as there are 2 or more carrier groups. Also, the carrier groups may be set to 1. For example, one or more carrier groups may be configured to exist, on the basis of communication conditions, feedback information from a terminal, and the like. When the carrier group is 1, phase change is not executed. Like the example in FIG. 55, each carrier group may also be set to a fixed number of values.

Also, a configuration is taken in which all of the first carrier group, the second carrier group, the third carrier group, the fourth carrier group, and the fifth carrier group are provided with five carriers, but the configuration is not limited thereto. Consequently, it is sufficient for a carrier group to be provided with one or more carriers. Additionally, different carrier groups may have the same or different numbers of provided carriers. For example, in FIG. 55, the number of carriers provided in the first carrier group is 5, and the number of carriers provided in the second carrier group is also 5 (the same). As a different example, the number of carriers provided in the first carrier group of FIG. 55 may be set to 5, while the number of carriers provided in the second carrier group may be set to a different number such as 10.

Figure 56:
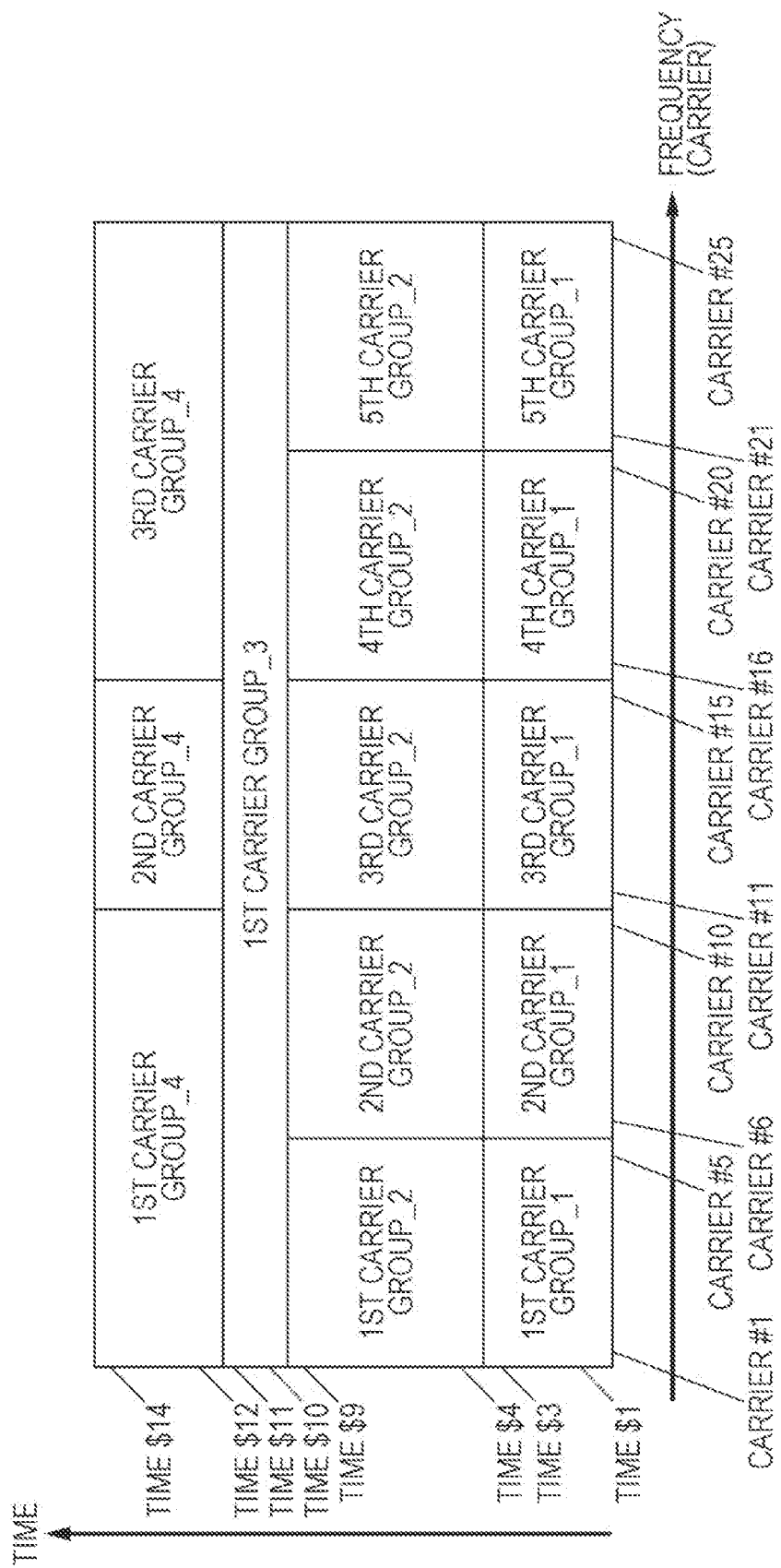
FIG. 56 is a diagram illustrating a different example from FIG. 55 of carrier groups of modulated signals transmitted by a base station or AP.

FIG. 56 is a diagram illustrating a different example from FIG. 55 of carrier groups of modulated signals transmitted by a base station or AP. Note that in FIG. 56, the horizontal axis indicates frequency (carrier), while the vertical axis indicates time.

A first carrier group_1 includes from carrier #1 to carrier #5, and from time $1 to time $3. A second carrier group_1 includes from carrier #6 to carrier #10, and from time $1 to time $3. A third carrier group_1 includes from carrier #11 to carrier #15, and from time $1 to time $3. A fourth carrier group_1 includes from carrier #16 to carrier #20, and from time $1 to time $3. A fifth carrier group_1 includes from carrier #21 to carrier #25, and from time $1 to time $3.

A first carrier group_2 includes from carrier #1 to carrier #5, and from time $4 to time $9. A second carrier group_2 includes from carrier #6 to carrier #10, and from time $4 to time $9. A third carrier group_2 includes from carrier #11 to carrier #15, and from time $4 to time $9. A fourth carrier group_2 includes from carrier #16 to carrier #20, and from time $4 to time $9. A fifth carrier group_2 includes from carrier #21 to carrier #25, and from time $4 to time $9.

A first carrier group_3 includes from carrier #1 to carrier #25, and from time $10 to time $11.

A first carrier group_4 includes from carrier #1 to carrier #10, and from time $12 to time $14. A second carrier group_4 includes from carrier #11 to carrier #15, and from time $12 to time $14. A third carrier group_4 includes from carrier #16 to carrier #25, and from time $12 to time $14.

In FIG. 56, assume that, to transmit data to a certain terminal (certain user) (terminal #p), the base station or AP uses from carrier #1 to carrier #25, from time $1 to time $14.

Assume that Yp(i) is the phase change value used by the phase changer 305A, yp(i) is the phase change value used by the phase changer 305B, Vp(i) is the phase change value used by the phase changer 3801A, and vp(i) is the phase change value used by the phase changer 3801B in FIGS. 3, 4, 26, 38, 39, 40, 41, 42, 43, 44, 45, 46, 47, 48, 49, and the like.

At this time, assume that in the phase changer 305A, phase change is executed on symbols belonging to the first carrier group_1 of FIG. 56, using $e^{j \times E11}$ as the phase change value Yp(i). Note that E11 is assumed to be a real number. For example, E11 is 0 (radians)≤E11<2×π (radians).

Additionally, assume that in the phase changer 305A, phase change is executed on symbols belonging to the second carrier group_1 of FIG. 56, using $e^{j \times E21}$ as the phase change value Yp(i). Note that E21 is assumed to be a real number. For example, E21 is 0 (radians)≤E21<2×π (radians).

Assume that in the phase changer 305A, phase change is executed on symbols belonging to the third carrier group_1 of FIG. 56, using $e^{j \times E31}$ as the phase change value Yp(i). Note that E31 is assumed to be a real number. For example, E31 is 0 (radians)≤E31<2×π (radians).

Assume that in the phase changer 305A, phase change is executed on symbols belonging to the fourth carrier group_1 of FIG. 56, using $e^{j \times E41}$ as the phase change value Yp(i). Note that E41 is assumed to be a real number. For example, E41 is 0 (radians)≤E41<2×π (radians).

Assume that in the phase changer 305A, phase change is executed on symbols belonging to the fifth carrier group_1 of FIG. 56, using $e^{j \times E51}$ as the phase change value Yp(i). Note that E51 is assumed to be a real number. For example, E51 is 0 (radians)≤E51<2×π (radians).

As a first example, there is a method in which "E11≠E21, and E11≠E31, and E11≠E41, and E11≠E51, and E21≠E31, and E21≠E41, and E21≠E51, and E31≠E41, and E31≠E51, and E41≠E51" holds. When generalized, the method is one in which "x is an integer equal to 1 or greater, y is an integer equal to 1 or greater, x≠y holds, and for all x and y satisfying these conditions, Ex1≠Ey1 holds".

As a second example, there is a method in which "E11≠E21, or E11≠E31, or E11≠E41, or E11≠E51, or E21≠E31, or E21≠E41, or E21≠E51, or E31≠E41, or E31≠E51, or E41≠E51" holds. When generalized, the method is one in which "there exists a set of x, y such that x is an integer equal to 1 or greater, y is an integer equal to 1 or greater, x≠y holds, and Ex1≠Ey1 holds".

Also, assume that in the phase changer 305B, phase change is executed on symbols belonging to the first carrier group_1 of FIG. 56, using $e^{j \times F11}$ as the phase change value yp(i). Note that F11 is assumed to be a real number. For example, F11 is 0 (radians)≤F11<2×π (radians).

Additionally, assume that in the phase changer 305B, phase change is executed on symbols belonging to the second carrier group_1 of FIG. 56, using $e^{j \times F21}$ as the phase change value yp(i). Note that F21 is assumed to be a real number. For example, F21 is 0 (radians)≤F21<2×π (radians).

Assume that in the phase changer 305B, phase change is executed on symbols belonging to the third carrier group_1 of FIG. 56, using $e^{j \times F31}$ as the phase change value yp(i). Note that F31 is assumed to be a real number. For example, F31 is 0 (radians)≤F31<2×π (radians).

Assume that in the phase changer 305B, phase change is executed on symbols belonging to the fourth carrier group_1 of FIG. 56, using $e^{j \times F41}$ as the phase change value yp(i).

Note that F41 is assumed to be a real number. For example, F41 is 0 (radians)≤F41<2×π (radians).

Assume that in the phase changer 305B, phase change is executed on symbols belonging to the fifth carrier group_1 of FIG. 56, using $e^{j \times F51}$ as the phase change value yp(i). Note that F51 is assumed to be a real number. For example, F51 is 0 (radians)≤F51<2×π (radians).

As a first example, there is a method in which "F11≠F21, and F11≠F31, and F11≠F41, and F11≠F51, and F21≠F31, and F21≠F41, and F21≠F51, and F31≠F41, and F31≠F51, and F41≠F51" holds. When generalized, the method is one in which "x is an integer equal to 1 or greater, y is an integer equal to 1 or greater, x≠y holds, and for all x and y satisfying these conditions, Fx1≠Fy1 holds".

As a second example, there is a method in which "F11≠F21, or F11≠F31, or F11≠F41, or F11≠F51, or F21≠F31, or F21≠F41, or F21≠F51, or F31≠F41, or F31≠F51, or F41≠F51" holds. When generalized, the method is one in which "there exists a set of x, y such that x is an integer equal to 1 or greater, y is an integer equal to 1 or greater, x≠y holds, and Fx1≠Fy1 holds".

Also, assume that in the phase changer 3801A, phase change is executed on symbols belonging to the first carrier group_1 of FIG. 56, using $e^{j \times G11}$ as the phase change value Vp(i). Note that G11 is assumed to be a real number. For example, G11 is 0 (radians)≤G11<2×π (radians).

Additionally, assume that in the phase changer 3801A, phase change is executed on symbols belonging to the second carrier group_1 of FIG. 56, using $e^{j \times G21}$ as the phase change value Vp(i). Note that G21 is assumed to be a real number. For example, G21 is 0 (radians)≤G21<2×π (radians).

Assume that in the phase changer 3801A, phase change is executed on symbols belonging to the third carrier group_1 of FIG. 56, using $e^{j \times G31}$ as the phase change value Vp(i). Note that G31 is assumed to be a real number. For example, G31 is 0 (radians)≤G31<2×π (radians).

Assume that in the phase changer 3801A, phase change is executed on symbols belonging to the fourth carrier group_1 of FIG. 56, using $e^{j \times G41}$ as the phase change value Vp(i). Note that G41 is assumed to be a real number. For example, G41 is 0 (radians)≤G41<2×π (radians).

Assume that in the phase changer 3801A, phase change is executed on symbols belonging to the fifth carrier group_1 of FIG. 56, using $e^{j \times G51}$ as the phase change value Vp(i). Note that G51 is assumed to be a real number. For example, G51 is 0 (radians)≤G51<2×π (radians).

For example, as a first example, there is a method in which "G11≠G21, and G11≠G31, and G11≠G41, and G11≠G51, and G21≠G31, and G21≠G41, and G21≠G51, and G31≠G41, and G31≠G51, and G41≠G51" holds. When generalized, the method is one in which "x is an integer equal to 1 or greater, y is an integer equal to 1 or greater, x≠y holds, and for all x and y satisfying these conditions, Gx1≠Gy1 holds".

As a second example, there is a method in which "G11≠G21, or G11≠G31, or G11≠G41, or G11≠G51, or G21≠G31, or G21≠G41, or G21≠G51, or G31≠G41, or G31≠G51, or G41≠G51" holds. When generalized, the method is one in which "there exists a set of x, y such that x is an integer equal to 1 or greater, y is an integer equal to 1 or greater, x≠y holds, and Gx1≠Gy1 holds".

Also, assume that in the phase changer 3801B, phase change is executed on symbols belonging to the first carrier group_1 of FIG. 56, using $e^{j \times H11}$ as the phase change value vp(i). Note that H11 is assumed to be a real number. For example, H11 is 0 (radians)≤H11<2×π (radians).

Additionally, assume that in the phase changer 3801B, phase change is executed on symbols belonging to the second carrier group_1 of FIG. 56, using $e^{j \times H21}$ as the phase change value vp(i). Note that H21 is assumed to be a real number. For example, H21 is 0 (radians)≤H21<2×π (radians).

Assume that in the phase changer 3801B, phase change is executed on symbols belonging to the third carrier group_1 of FIG. 56, using $e^{j \times H31}$ as the phase change value vp(i). Note that H31 is assumed to be a real number. For example, H31 is 0 (radians)≤H31<2×π (radians).

Assume that in the phase changer 3801B, phase change is executed on symbols belonging to the fourth carrier group_1 of FIG. 56, using $e^{j \times H41}$ as the phase change value vp(i). Note that H41 is assumed to be a real number. For example, H41 is 0 (radians)≤H41<2×π (radians).

Assume that in the phase changer 3801B, phase change is executed on symbols belonging to the fifth carrier group_1 of FIG. 56, using $e^{j \times H51}$ as the phase change value vp(i). Note that H51 is assumed to be a real number. For example, H51 is 0 (radians)≤H51<2×π (radians).

As a first example, there is a method in which "H11≠H21, and H11≠H31, and H11≠H41, and H11≠H51, and H21≠H31, and H21≠H41, and H21≠H51, and H31≠H41, and H31≠H51, and H41≠H51" holds. When generalized, the method is one in which "x is an integer equal to 1 or greater, y is an integer equal to 1 or greater, x≠y holds, and for all x and y satisfying these conditions, Hx1≠Hy1 holds".

As a second example, there is a method in which "H11≠H21, or H11≠H31, or H11≠H41, or H11≠H51, or H21≠H31, or H21≠H41, or H21≠H51, or H31≠H41, or H31≠H51, or H41≠H51" holds. When generalized, the method is one in which "there exists a set of x, y such that x is an integer equal to 1 or greater, y is an integer equal to 1 or greater, x≠y holds, and Hx1≠Hy1 holds".

Assume that in the phase changer 305A, phase change is executed on symbols belonging to the first carrier group_2 of FIG. 56, using $e^{j \times E12}$ as the phase change value Yp(i). Note that E12 is assumed to be a real number. For example, E12 is 0 (radians)≤E12<2×π (radians).

Additionally, assume that in the phase changer 305A, phase change is executed on symbols belonging to the second carrier group_2 of FIG. 56, using $e^{j \times E22}$ as the phase change value Yp(i). Note that E22 is assumed to be a real number. For example, E22 is 0 (radians)≤E22<2×π (radians).

Assume that in the phase changer 305A, phase change is executed on symbols belonging to the third carrier group_2 of FIG. 56, using $e^{j \times E32}$ as the phase change value Yp(i). Note that E32 is assumed to be a real number. For example, E32 is 0 (radians)≤E32<2×π (radians).

Assume that in the phase changer 305A, phase change is executed on symbols belonging to the fourth carrier group_2 of FIG. 56, using $e^{j \times E42}$ as the phase change value Yp(i). Note that E42 is assumed to be a real number. For example, E42 is 0 (radians)≤E42<2×π (radians).

Assume that in the phase changer 305A, phase change is executed on symbols belonging to the fifth carrier group_2 of FIG. 56, using $e^{j \times E52}$ as the phase change value Yp(i). Note that E52 is assumed to be a real number. For example, E52 is 0 (radians)≤E52<2×π (radians).

As a first example, there is a method in which "E12≠E22, and E12≠E32, and E12≠E42, and E12≠E52, and E22≠E32, and E22≠E42, and E22≠E52, and E32≠E42, and E32≠E52, and E42≠E52" holds. When generalized, the method is one in which "x is an integer equal to 1 or greater, y is an integer equal to 1 or greater, x≠y holds, and for all x and y satisfying these conditions, Ex2≠Ey2 holds".

As a second example, there is a method in which "E12≠E22, or E12≠E32, or E12≠E42, or E12≠E52, or E22≠E32, or E22≠E42, or E22≠E52, or E32≠E42, or E32≠E52, or E42≠E52" holds. When generalized, the method is one in which "there exists a set of x, y such that x is an integer equal to 1 or greater, y is an integer equal to 1 or greater, x≠y holds, and Ex2≠Ey2 holds".

Also, assume that in the phase changer 305B, phase change is executed on symbols belonging to the first carrier group_2 of FIG. 56, using $e^{j \times F12}$ as the phase change value yp(i). Note that F12 is assumed to be a real number. For example, F12 is 0 (radians)≤F12<2×π (radians).

Additionally, assume that in the phase changer 305B, phase change is executed on symbols belonging to the second carrier group_2 of FIG. 56, using $e^{j \times F22}$ as the phase change value yp(i). Note that F22 is assumed to be a real number. For example, F22 is 0 (radians)≤F22<2×π (radians).

Assume that in the phase changer 305B, phase change is executed on symbols belonging to the third carrier group_2 of FIG. 56, using $e^{j \times F32}$ as the phase change value yp(i). Note that F32 is assumed to be a real number. For example, F32 is 0 (radians)≤F32<2×π (radians).

Assume that in the phase changer 305B, phase change is executed on symbols belonging to the fourth carrier group_2 of FIG. 56, using $e^{j \times F42}$ as the phase change value yp(i). Note that F42 is assumed to be a real number. For example, F42 is 0 (radians)≤F42<2×π (radians).

Assume that in the phase changer 305B, phase change is executed on symbols belonging to the fifth carrier group_2 of FIG. 56, using $e^{j \times F52}$ as the phase change value yp(i). Note that F52 is assumed to be a real number. For example, F52 is 0 (radians)≤F52<2×π (radians).

As a first example, there is a method in which "F12≠F22, and F12≠F32, and F12≠F42, and F12≠F52, and F22≠F32, and F22≠F42, and F22≠F52, and F32≠F42, and F32≠F52, and F42≠F52" holds. When generalized, the method is one in which "x is an integer equal to 1 or greater, y is an integer equal to 1 or greater, x≠y holds, and for all x and y satisfying these conditions, Fx2≠Fy2 holds".

As a second example, there is a method in which "F12≠F22, or F12≠F32, or F12≠F42, or F12≠F52, or F22≠F32, or F22≠F42, or F22≠F52, or F32≠F42, or F32≠F52, or F42≠F52" holds. When generalized, the method is one in which "there exists a set of x, y such that x is an integer equal to 1 or greater, y is an integer equal to 1 or greater, x≠y holds, and Fx2≠Fy2 holds".

Also, assume that in the phase changer 3801A, phase change is executed on symbols belonging to the first carrier group_2 of FIG. 56, using $e^{j \times G12}$ as the phase change value Vp(i). Note that G12 is assumed to be a real number. For example, G12 is 0 (radians)≤G12<2×π (radians).

Additionally, assume that in the phase changer 3801A, phase change is executed on symbols belonging to the second carrier group_2 of FIG. 56, using $e^{j \times G22}$ as the phase change value Vp(i). Note that G22 is assumed to be a real number. For example, G22 is 0 (radians)≤G22<2×π (radians).

Assume that in the phase changer 3801A, phase change is executed on symbols belonging to the third carrier group_2 of FIG. 56, using $e^{j \times G32}$ as the phase change value Vp(i). Note that G32 is assumed to be a real number. For example, G32 is 0 (radians)≤G32<2×π (radians).

Assume that in the phase changer 3801A, phase change is executed on symbols belonging to the fourth carrier group_2 of FIG. 56, using $e^{j \times G42}$ as the phase change value Vp(i). Note that G42 is assumed to be a real number. For example, G42 is 0 (radians)≤G42<2×π (radians).

Assume that in the phase changer 3801A, phase change is executed on symbols belonging to the fifth carrier group_2 of FIG. 56, using $e^{j \times G52}$ as the phase change value Vp(i). Note that G52 is assumed to be a real number. For example, G52 is 0 (radians)≤G52<2×π (radians).

As a first example, there is a method in which "G12≠G22, and G12≠G32, and G12≠G42, and G12≠G52, and G22≠G32, and G22≠G42, and G22≠G52, and G32≠G42, and G32≠G52, and G42≠G52" holds. When generalized, the method is one in which "x is an integer equal to 1 or greater, y is an integer equal to 1 or greater, x≠y holds, and for all x and y satisfying these conditions, Gx2≠Gy2 holds".

As a second example, there is a method in which "G12≠G22, or G12≠G32, or G12≠G42, or G12≠G52, or G22≠G32, or G22≠G42, or G22≠G52, or G32≠G42, or G32≠G52, or G42≠G52" holds. When generalized, the method is one in which "there exists a set of x, y such that x is an integer equal to 1 or greater, y is an integer equal to 1 or greater, x≠y holds, and Gx2≠Gy2 holds".

Also, assume that in the phase changer 3801B, phase change is executed on symbols belonging to the first carrier group_2 of FIG. 56, using $e^{j \times H12}$ as the phase change value vp(i). Note that H12 is assumed to be a real number. For example, H12 is 0 (radians)≤H12<2×π (radians).

Additionally, assume that in the phase changer 3801B, phase change is executed on symbols belonging to the second carrier group_2 of FIG. 56, using $e^{j \times H22}$ as the phase change value vp(i). Note that H22 is assumed to be a real number. For example, H22 is 0 (radians)≤H22<2×π (radians).

Assume that in the phase changer 3801B, phase change is executed on symbols belonging to the third carrier group_2 of FIG. 56, using $e^{j \times H32}$ as the phase change value vp(i). Note that H32 is assumed to be a real number. For example, H32 is 0 (radians)≤H32<2×π (radians).

Assume that in the phase changer 3801B, phase change is executed on symbols belonging to the fourth carrier group_2 of FIG. 56, using $e^{j \times H42}$ as the phase change value vp(i). Note that H42 is assumed to be a real number. For example, H42 is 0 (radians)≤H42<2×π (radians).

Assume that in the phase changer 3801B, phase change is executed on symbols belonging to the fifth carrier group_2 of FIG. 56, using $e^{j \times H52}$ as the phase change value vp(i). Note that H52 is assumed to be a real number. For example, H52 is 0 (radians)≤H52<2×π (radians).

As a first example, there is a method in which "H12≠H22, and H12≠H32, and H12≠H42, and H12≠H52, and H22≠H32, and H22≠H42, and H22≠H52, and H32≠H42, and H32≠H52, and H42≠H52" holds. When generalized, the method is one in which "x is an integer equal to 1 or greater, y is an integer equal to 1 or greater, x≠y holds, and for all x and y satisfying these conditions, Hx2≠Hy2 holds".

As a second example, there is a method in which "H12≠H22, or H12≠H32, or H12≠H42, or H12≠H52, or H22≠H32, or H22≠H42, or H22≠H52, or H32≠H42, or H32≠H52, or H42≠H52" holds. When generalized, the method is one in which "there exists a set of x, y such that x is an integer equal to 1 or greater, y is an integer equal to 1 or greater, x≠y holds, and Hx2≠Hy2 holds".

Assume that in the phase changer 305A, phase change is executed on symbols belonging to the first carrier group_3 of FIG. 56, using $e^{j \times E13}$ as the phase change value Yp(i). Note that E13 is assumed to be a real number. For example, E13 is 0 (radians)≤E13<2×π (radians).

Assume that in the phase changer 305A, phase change is executed on symbols belonging to the first carrier group_4 of FIG. 56, using $e^{j \times E14}$ as the phase change value Yp(i). Note that E14 is assumed to be a real number. For example, E14 is 0 (radians)≤E14<2×π (radians).

Additionally, assume that in the phase changer 305A, phase change is executed on symbols belonging to the second carrier group_4 of FIG. 56, using $e^{j \times E24}$ as the phase change value Yp(i). Note that E24 is assumed to be a real number. For example, E24 is 0 (radians)≤E24<2×π (radians).

Assume that in the phase changer 305A, phase change is executed on symbols belonging to the third carrier group_4 of FIG. 56, using $e^{j \times E34}$ as the phase change value Yp(i). Note that E34 is assumed to be a real number. For example, E34 is 0 (radians)≤E34<2×π (radians).

As a first example, there is a method in which "E14≠E24, and E14≠E34, and E24≠E34" holds. When generalized, the method is one in which "x is an integer equal to 1 or greater, y is an integer equal to 1 or greater, x≠y holds, and for all x and y satisfying these conditions, Ex4≠Ey4 holds".

As a second example, there is a method in which "E14≠E24, or E14≠E34, or E24≠E34" holds. When generalized, the method is one in which "there exists a set of x, y such that x is an integer equal to 1 or greater, y is an integer equal to 1 or greater, x≠y holds, and Ex4≠Ey4 holds".

Also, assume that in the phase changer 305B, phase change is executed on symbols belonging to the first carrier group_4 of FIG. 56, using $e^{j \times F14}$ as the phase change value yp(i). Note that F14 is assumed to be a real number. For example, F14 is 0 (radians)≤F14<2×π (radians).

Additionally, assume that in the phase changer 305B, phase change is executed on symbols belonging to the second carrier group_4 of FIG. 56, using $e^{j \times F24}$ as the phase change value yp(i). Note that F24 is assumed to be a real number. For example, F24 is 0 (radians)≤F24<2×π (radians).

Assume that in the phase changer 305B, phase change is executed on symbols belonging to the third carrier group_4 of FIG. 56, using $e^{j \times F34}$ as the phase change value yp(i). Note that F34 is assumed to be a real number. For example, F34 is 0 (radians)≤F34<2×π (radians).

As a first example, there is a method in which "F14≠F24, and F14≠F34, and F24≠F34" holds. When generalized, the method is one in which "x is an integer equal to 1 or greater, y is an integer equal to 1 or greater, x≠y holds, and for all x and y satisfying these conditions, Fx4≠Fy4 holds".

As a second example, there is a method in which "F14≠F24, or F14≠F34, or F24≠F34" holds. When generalized, the method is one in which "there exists a set of x, y such that x is an integer equal to 1 or greater, y is an integer equal to 1 or greater, x≠y holds, and Fx4≠Fy4 holds".

Also, assume that in the phase changer 3801A, phase change is executed on symbols belonging to the first carrier group_4 of FIG. 56, using $e^{j \times G14}$ as the phase change value Vp(i). Note that G14 is assumed to be a real number. For example, G14 is 0 (radians)≤G14<2×π (radians).

Additionally, assume that in the phase changer 3801A, phase change is executed on symbols belonging to the second carrier group_4 of FIG. 56, using $e^{j \times G24}$ as the phase change value Vp(i). Note that G24 is assumed to be a real number. For example, G24 is 0 (radians)≤G24<2×π (radians).

Assume that in the phase changer 3801A, phase change is executed on symbols belonging to the third carrier group_4 of FIG. 56, using $e^{j \times G34}$ as the phase change value Vp(i). Note that G34 is assumed to be a real number. For example, G34 is 0 (radians)≤G34<2×π (radians).

For example, as a first example, there is a method in which "G14≠G24, and G14≠G34, and G24≠G34" holds. When generalized, the method is one in which "x is an integer equal to 1 or greater, y is an integer equal to 1 or greater, x≠y holds, and for all x and y satisfying these conditions, Gx4≠Gy4 holds".

As a first example, there is a method in which "G14≠G24, or G14≠G34, or G24≠G34" holds. When generalized, the method is one in which "there exists a set of x, y such that x is an integer equal to 1 or greater, y is an integer equal to 1 or greater, x≠y holds, and Gx4≠Gy4 holds".

Also, assume that in the phase changer 3801B, phase change is executed on symbols belonging to the first carrier group_4 of FIG. 56, using $e^{j \times H14}$ as the phase change value vp(i). Note that H14 is assumed to be a real number. For example, H14 is 0 (radians)≤H14<2×π (radians).

Additionally, assume that in the phase changer 3801B, phase change is executed on symbols belonging to the second carrier group_4 of FIG. 56, using $e^{j \times H24}$ as the phase change value vp(i). Note that H24 is assumed to be a real number. For example, H24 is 0 (radians)≤H24<2×π (radians).

Assume that in the phase changer 3801B, phase change is executed on symbols belonging to the third carrier group_4 of FIG. 56, using $e^{j \times H34}$ as the phase change value vp(i). Note that H34 is assumed to be a real number. For example, H34 is 0 (radians)≤H34<2×π (radians).

As a first example, there is a method in which "H14≠F24, and H14≠H34, and H24≠H34" holds. When generalized, the method is one in which "x is an integer equal to 1 or greater, y is an integer equal to 1 or greater, x≠y holds, and for all x and y satisfying these conditions, Hx4≠Hy4 holds".

As a second example, there is a method in which "H14≠F24, or H14≠H34, or H24≠H34" holds. When generalized, the method is one in which "there exists a set of x, y such that x is an integer equal to 1 or greater, y is an integer equal to 1 or greater, x≠y holds, and Hx4≠Hy4 holds".

At this time, characteristics like the following may be included.

Like the "segment from time $1 to time $3" and "from time $4 to time $9", when the method of dividing frequencies is the same (the frequency used by the first carrier group_1 and the frequency used by the first carrier group_2 are the same, and the frequency used by the second carrier group_1 and the frequency used by the second carrier group_2 are the same, and the frequency used by the third carrier group_1 and the frequency used by the third carrier group_2 are the same, and the frequency used by the fourth carrier group_1 and the frequency used by the fourth carrier group_2 are the same, and the frequency used by the fifth carrier group_1 and the frequency used by the fifth carrier group_2 are the same), the phase change value used by the Xth carrier group_1 (where X is 1, 2, 3, 4, 5) in the "segment from time $1 to time $3" and the phase change value used by the Xth carrier group_2 in the "segment from time $4 to time $9" may be the same or different.

For example, E11=E12 may hold, or E11≠E12 may hold. E21=E22 may hold, or E21≠E22 may hold. E31=E32 may hold, or E31≠E32 may hold. E41=E42 may hold, or E41≠E42 may hold. E51=E52 may hold, or E51≠E52 may hold.

Also, F11=F12 may hold, or F11≠F12 may hold. F21=F22 may hold, or F21≠F22 may hold. F31=F32 may hold, or F31≠F32 may hold. F41=F42 may hold, or F41≠F42 may hold. F51=F52 may hold, or F51≠F52 may hold.

G11=G12 may hold, or G11≠G12 may hold. G21=G22 may hold, or G21≠G22 may hold. G31=G32 may hold, or G31≠G32 may hold. G41=G42 may hold, or G41≠G42 may hold. G51=G52 may hold, or G51≠G52 may hold.

H11=H12 may hold, or H11≠H12 may hold. H21=H22 may hold, or H21≠H22 may hold. H31=H32 may hold, or H31≠H32 may hold. H41=H42 may hold, or H41≠H42 may hold. H51=H52 may hold, or H51≠H52 may hold.

The method of dividing frequency may also be changed together with time. For example, "from time $1 to time $3" in FIG. 56, the frequency is divided into 5 from carrier #1 to carrier #25, and five carrier groups are generated. Subsequently, "from time $10 to time $11", a single carrier group containing carrier #1 to carrier #25 is generated. Also, "from time $12 to time $14", the frequency is divided into 3 from carrier #1 to carrier #25, and three carrier groups are generated.

Note that the method of dividing frequency is not limited to the method in FIG. 56. The frequencies allocated to a certain user may be treated as one carrier group, or two or more carrier groups may be generated. Also, it is sufficient for the number of carriers included in a carrier group to be 1 or more.

The description described above using FIG. 56 states that "to transmit data to a certain terminal (certain user) (terminal #p), the base station or AP uses from carrier #1 to carrier #25, from time $1 to time $14", but the base station or AP may also allocate from carrier #1 to carrier #25, from time $1 to time $14 to transmit data to multiple terminals (multiple users). Hereinafter, this point will be described. Note that the settings with respect to each carrier group of the phase change value Yp(i) used by the phase changer 305A, the phase change value yp(i) used by the phase changer 305B, the phase change value Vp(i) used by the phase changer 3801A, and the phase change value vp(i) used by the phase changer 3801B in FIGS. 3, 4, 26, 38, 39, 40, 41, 42, 43, 44, 45, 46, 47, 48, 49, and the like are as described above, and thus a description is omitted.

As a first example, in FIG. 56, terminal allocation (user allocation) may be executed using time division.

For example, assume that the base station or AP uses "from time $1 to time $3" to transmit data to the terminal (user) p1 (that is, p=p1). Additionally, assume that the base station or AP uses "from time $4 to time $9" to transmit data to the terminal (user) p2 (that is, p=p2). Assume that the base station or AP uses "from time $10 to time $11" to transmit data to the terminal (user) p3 (that is, p=p3). Assume that the base station or AP uses "from time $12 to time $14" to transmit data to the terminal (user) p4 (that is, p=p4).

As a second example, in FIG. 56, terminal allocation (user allocation) may be executed using frequency division.

For example, assume that the base station or AP uses the first carrier group_1 and the second carrier group_1 to transmit data to the terminal (user) p1 (that is, p=p1). Additionally, assume that the base station or AP uses the third carrier group_1, the fourth carrier group_1, and the fifth carrier group_1 to transmit data to the terminal (user) p2 (that is, p=p2).

As a third example, in FIG. 56, terminal allocation (user allocation) may be executed using combined time and frequency division.

For example, assume that the base station or AP uses the first carrier group_1, the first carrier group_2, the second carrier group_1, and the second carrier group_2 to transmit data to the terminal (user) p1 (that is, p=p1). Additionally, assume that the base station or AP uses the third carrier group_1, the fourth carrier group_1, and the fifth carrier group_1 to transmit data to the terminal (user) p2 (that is, p=p2). Assume that the base station or AP uses the third carrier group_2 and the fourth carrier group_2 to transmit data to the terminal (user) p3 (that is, p=p3). Assume that the base station or AP uses the fifth carrier group_2 to transmit data to the terminal (user) p4 (that is, p=p4). Assume that the base station or AP uses the first carrier group_3 to transmit data to the terminal (user) p5 (that is, p=p5). Assume that the base station or AP uses the first carrier group_4 to transmit data to the terminal (user) p6 (that is, p=p6). Assume that the base station or AP uses the second carrier group_4 and the third carrier group_4 to transmit data to the terminal (user) p7 (that is, p=p7).

Note that in the description described above, the method of configuring the carrier groups is not limited to FIG. 56. For example, as long as there are one or more carriers included in a carrier group, the carrier groups may be configured in any way. Also, the intervals of time included in a carrier group are not limited to the configuration in FIG. 56. Also, the frequency division method, the time division method, and the combined time and frequency division method for user allocation is not limited to the examples described above, and it is possible to carry out an embodiment by executing any kind of division.

According to examples like the above, in the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like described in Embodiment 1 to Embodiment 11, Supplement 1 to Supplement 4, and the like, by "changing the phase periodically or regularly", the advantageous effects described in Embodiment 1 to Embodiment 11, Supplement 1 to Supplement 4, and the like may be obtained.

Figure 57:
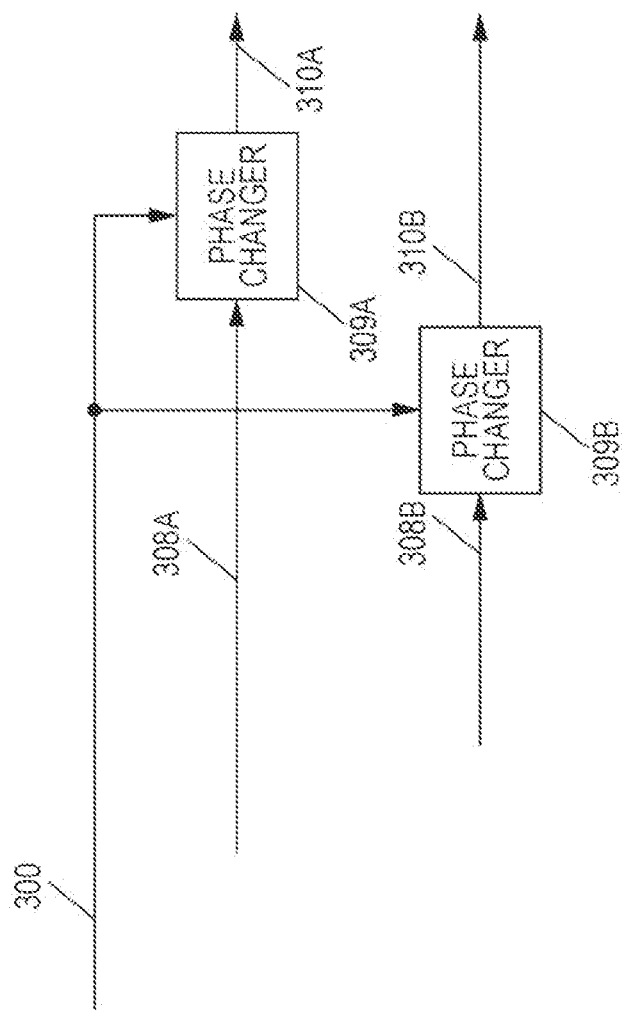
FIG. 57 is a diagram illustrating an example of a configuration in which phase changers are added.

Note that in FIGS. 3, 4, 26, 38, 39, 40, 41, 42, 43, 44, 45, 46, 47, 48, 49, and the like, the configuration from the inserter 307A and the inserter 307B may also be the configuration of FIG. 57. FIG. 57 is a diagram illustrating an example of a configuration in which phase changers are added. In FIG. 57, the characteristic point is that the phase changer 309A has been inserted. The operation of the phase changer 309A executes signal processing for phase change or CDD (CSD) similarly to the phase changer 309B.

Embodiment 13

In Embodiment 1 to Embodiment 11, Supplement 1 to Supplement 4, and the like, if both "the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like" and the computations in the weight combiner 303 are considered as a whole, such as by referencing Formula (37), Formula (42), Formula (43), Formula (45), Formula (47), and Formula (48), for example, the precoding matrix corresponds to switching according to i.

Also, in the weight combiner 303, in the case of using Formula (21), Formula (22), Formula (23), Formula (24), Formula (25), Formula (26), Formula (27), and Formula (28), for example, the precoding matrix corresponds to switching according to i.

If considered with reference to Formula (37), Formula (42), Formula (43), Formula (45), Formula (47), and Formula (48), when the precoding matrix is switched by i, Formula (52) holds. Note that i is taken to be the symbol number. For example, i is an integer equal to 0 or greater.

$$\begin{pmatrix} zp1(i) \\ zp2(i) \end{pmatrix} = Fp(i) \begin{pmatrix} sp1(i) \\ sp2(i) \end{pmatrix} \quad (52)$$

$$= \begin{pmatrix} ap(i) & bp(i) \\ cp(i) & dp(i) \end{pmatrix} \begin{pmatrix} sp1(i) \\ sp2(i) \end{pmatrix}$$

Note that in Formula (52), zp1(i) is the first phase-changed signal, zp2(i) is the second phase-changed signal, sp1(i) is the user #p mapped signal 301A, and sp2(i) is the user #p mapped signal 301B. Fp(i) is a matrix used in weight combining, that is, a precoding matrix. The precoding matrix may be treated as a function of i. For example, the operation may be one of switching the precoding matrix periodically or regularly. However, in the present embodiment, zp1(i) is called the first precoded signal, and zp2(i) is called the second precoded signal. Note that from Formula (52), Formula (53) holds.

$$Fp(i) = \begin{pmatrix} ap(i) & bp(i) \\ cp(i) & dp(i) \end{pmatrix} \quad (53)$$

Note that in Formula (53), ap(i) may be defined as a complex number. Thus, ap(i) may also be a real number. Also, bp(i) may be defined as a complex number. Thus, bp(i) may also be a real number. Also, cp(i) may be defined as a complex number. Thus, cp(i) may also be a real number. Also, dp(i) may be defined as a complex number. Thus, dp(i) may also be a real number.

Since this is similar to the description of Formula (37), Formula (42), Formula (43), Formula (45), Formula (47), and Formula (48), zp1(i) corresponds to 103_1 in FIG. 1, and zp2(i) corresponds to 103_2 in FIG. 1. Alternatively, zp1(i) corresponds to 103_1 in FIG. 52, and zp2(i) corresponds to 103_2 in FIG. 52. Note that zp1(i) and zp2(i) are transmitted using identical frequencies and identical times.

Figure 58:
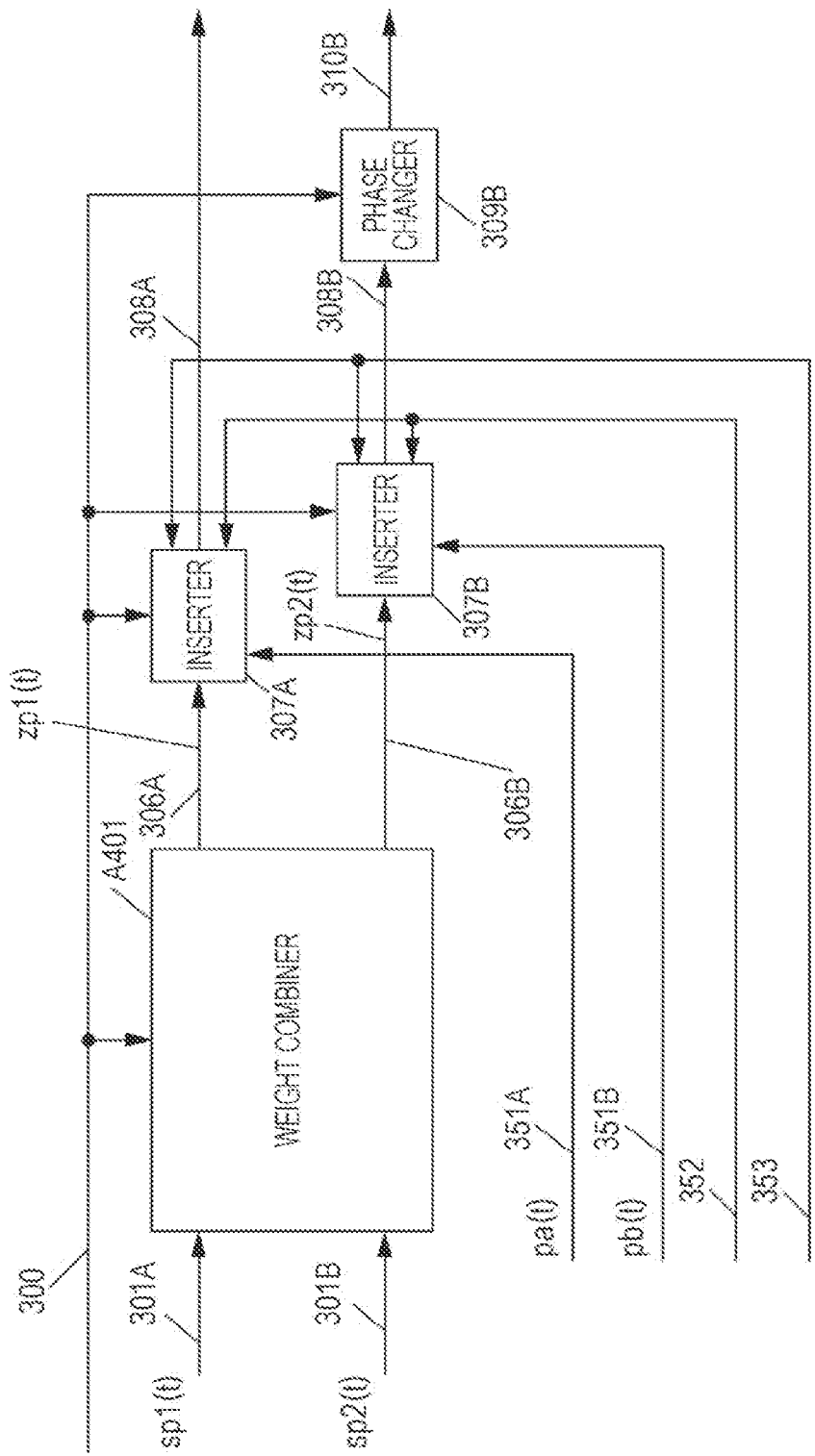
FIG. 58 is a diagram illustrating a first exemplary configuration of the signal processor for user #p in FIGS. 1 and 52.

FIG. 58 is a diagram illustrating a first exemplary configuration of the user #p signal processor 102_p of FIGS. 1 and 52 including the computation (Formula (52)) described above. In FIG. 58, parts which operate similarly to FIG. 3 and the like are denoted with the same numbers, and a detailed description is omitted.

The computation of Formula (52) is executed by a weight combiner A401 in FIG. 58.

Figure 59:
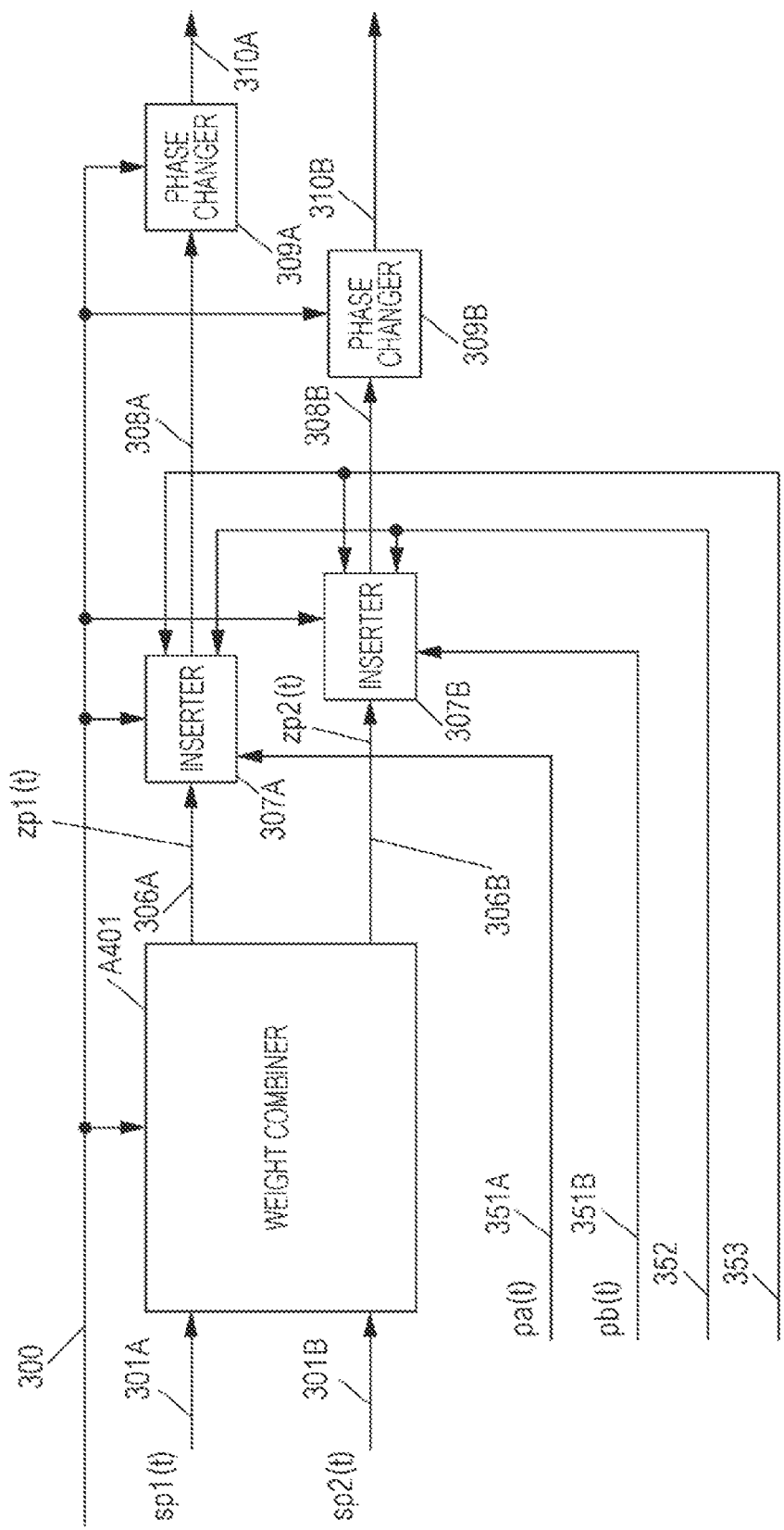
FIG. 59 is a diagram illustrating a second exemplary configuration of the signal processor for user #p in FIGS. 1 and 52.

FIG. 59 is a diagram illustrating a second exemplary configuration of the user #p signal processor 102_p of FIGS. 1 and 52 including the computation (Formula (52)) described above. In FIG. 59, parts which operate similarly to FIG. 3 and the like are denoted with the same numbers, and a detailed description is omitted.

Similarly to FIG. 58, the computation of Formula (52) is executed by the weight combiner A401 in FIG. 59. The characteristic point is that the weight combiner A401 executes the precoding process while switching the precoding matrix regularly or periodically, for example. In FIG. 59, the point of difference from FIG. 58 is that the phase changer 309A has been inserted. Note that the detailed operation of precoding switching will be described later. The operation of the phase changer 309A executes signal processing for phase change or CDD (CSD) similarly to the phase changer 309B.

Although not illustrated in FIGS. 58 and 59, each of the pilot symbol signal (pa(t)) (351A), the pilot symbol signal (pb(t)) (351B), the preamble signal 352, and the control information symbol signal 353 may also be a signal subjected to processing such as phase change.

Additionally, zp1(i) and zp2(i) are processed as illustrated in FIG. 1 or FIG. 52. This point has been described in the foregoing embodiments.

Meanwhile, in Embodiment 1 to Embodiment 11, Supplement 1 to Supplement 4, and the like, the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like are described using Formula (2), Formula (44), and the like, for example; while in addition, it is noted that the values of the phase change values do not have to be based on these formulas, and also that "it is sufficient to change the phase periodically or regularly". Consequently, for the precoding matrix indicated by Formula (53) in Formula (52), "it is sufficient to change the precoding matrix periodically or regularly". Hereinafter, an example of changing the precoding matrix periodically or regularly will be described.

For example, like in FIG. 55, consider a first carrier group including carrier #1 to carrier #5, a second carrier group including carrier #6 to carrier #10, a third carrier group including carrier #11 to carrier #15, a fourth carrier group including carrier #16 to carrier #20, and a fifth carrier group including carrier #21 to carrier #25. Assume that, to transmit data to a certain terminal (certain user) (terminal #p), the base station or AP uses the first carrier group, the second carrier group, the third carrier group, the fourth carrier group, and the fifth carrier group.

At this time, assume that precoding is performed on the symbol (set) (sp1(i) and sp2(i)) belonging to the first carrier group in FIG. 55, using U1 as the precoding matrix Fp(i) in Formula (52) and Formula (53).

Additionally, assume that precoding is performed on the symbol (set) (sp1(i) and sp2(i)) belonging to the second carrier group in FIG. 55, using U2 as the precoding matrix Fp(i) in Formula (52) and Formula (53).

Assume that precoding is performed on the symbol (set) (sp1(i) and sp2(i)) belonging to the third carrier group in FIG. 55, using U3 as the precoding matrix Fp(i) in Formula (52) and Formula (53).

Assume that precoding is performed on the symbol (set) (sp1(i) and sp2(i)) belonging to the fourth carrier group in FIG. 55, using U4 as the precoding matrix Fp(i) in Formula (52) and Formula (53).

Assume that precoding is performed on the symbol (set) (sp1(i) and sp2(i)) belonging to the fifth carrier group in FIG. 55, using U5 as the precoding matrix Fp(i) in Formula (52) and Formula (53).

As a first example, there is a method in which "U1≠U2, and U1≠U3, and U1≠U4, and U1≠U5, and U2≠U3, and U2≠U4, and U2≠U5, and U3≠U4, and U3≠U5, and U4≠U5" holds. When generalized, the method is one in which "x is an integer equal to 1 or greater, y is an integer equal to 1 or greater, x≠y holds, and for all x and y satisfying these conditions, Ux≠Uy holds".

As a second example, there is a method in which "U1≠U2, or U1≠U3, or U1≠U4, or U1≠U5, or U2≠U3, or U2≠U4, or U2≠U5, or U3≠U4, or U3≠U5, or U4≠U5" holds. When generalized, the method is one in which "there exists a set of x, y such that x is an integer equal to 1 or greater, y is an integer equal to 1 or greater, x≠y holds, and Ux≠Uy holds".

Note that although the first carrier group to the fifth carrier group exist in FIG. 55, the number of existing carrier groups is not limited to 5, and it is possible to carry out the embodiment similarly insofar as there are 2 or more carrier groups. Also, the carrier groups may be set to 1. For example, one or more carrier groups may be configured to exist, on the basis of communication conditions, feedback information from a terminal, and the like. When the carrier group is 1, the changing of the precoding matrix is not executed. Like the example in FIG. 55, each carrier group may also be set to a fixed number of values.

Also, a configuration is taken in which all of the first carrier group, the second carrier group, the third carrier group, the fourth carrier group, and the fifth carrier group are provided with five carriers, but the configuration is not limited thereto. Consequently, it is sufficient for a carrier group to be provided with one or more carriers. Additionally, different carrier groups may have the same or different numbers of provided carriers. For example, in FIG. 55, the number of carriers provided in the first carrier group is 5, and the number of carriers provided in the second carrier group is also 5 (the same). As a different example, the number of carriers provided in the first carrier group of FIG. 55 may be set to 5, while the number of carriers provided in the second carrier group may be set to a different number such as 10.

Additionally, the matrices U1, U2, U3, U4, and U5 are conceivably expressed by the matrix on the left side of Formula (5), the matrix on the left side of Formula (6), the matrix on the left side of Formula (7), the matrix on the left side of Formula (8), the matrix on the left side of Formula (9), the matrix on the left side of Formula (10), the matrix on the left side of Formula (11), the matrix on the left side of Formula (12), the matrix on the left side of Formula (13), the matrix on the left side of Formula (14), the matrix on the left side of Formula (15), the matrix on the left side of Formula (16), the matrix on the left side of Formula (17), the matrix on the left side of Formula (18), the matrix on the left side of Formula (19), the matrix on the left side of Formula (20), the matrix on the left side of Formula (21), the matrix on the left side of Formula (22), the matrix on the left side of Formula (23), the matrix on the left side of Formula (24), the matrix on the left side of Formula (25), the matrix on the left side of Formula (26), the matrix on the left side of Formula (27), the matrix on the left side of Formula (28), the matrix on the left side of Formula (29), the matrix on the left side of Formula (30), the matrix on the left side of Formula (31), the matrix on the left side of Formula (32), the matrix on the left side of Formula (33), the matrix on the left side of Formula (34), the matrix on the left side of Formula (35), the matrix on the left side of Formula (36), and the like, for example, but the matrices are not limited thereto.

In other words, the precoding matrix Fp(i) may be any kind of matrix such as the matrix on the left side of Formula (5), the matrix on the left side of Formula (6), the matrix on the left side of Formula (7), the matrix on the left side of Formula (8), the matrix on the left side of Formula (9), the matrix on the left side of Formula (10), the matrix on the left side of Formula (11), the matrix on the left side of Formula (12), the matrix on the left side of Formula (13), the matrix on the left side of Formula (14), the matrix on the left side of Formula (15), the matrix on the left side of Formula (16), the matrix on the left side of Formula (17), the matrix on the left side of Formula (18), the matrix on the left side of Formula (19), the matrix on the left side of Formula (20), the matrix on the left side of Formula (21), the matrix on the left side of Formula (22), the matrix on the left side of Formula (23), the matrix on the left side of Formula (24), the matrix on the left side of Formula (25), the matrix on the left side of Formula (26), the matrix on the left side of Formula (27), the matrix on the left side of Formula (28), the matrix on the left side of Formula (29), the matrix on the left side of Formula (30), the matrix on the left side of Formula (31), the matrix on the left side of Formula (32), the matrix on the left side of Formula (33), the matrix on the left side of Formula (34), the matrix on the left side of Formula (35), and the matrix on the left side of Formula (36).

FIG. 56 illustrates a different example from FIG. 55 of carrier groups of modulated signals transmitted by a base station or AP, taking frequency (carrier) on the horizontal axis and time on the vertical axis.

A first carrier group_1 includes from carrier #1 to carrier #5, and from time $1 to time $3. A second carrier group_1 includes from carrier #6 to carrier #10, and from time $1 to time $3. A third carrier group_1 includes from carrier #11 to carrier #15, and from time $1 to time $3. A fourth carrier group_1 includes from carrier #16 to carrier #20, and from time $1 to time $3. A fifth carrier group_1 includes from carrier #21 to carrier #25, and from time $1 to time $3.

A first carrier group_2 includes from carrier #1 to carrier #5, and from time $4 to time $9. A second carrier group_2 includes from carrier #6 to carrier #10, and from time $4 to time $9. A third carrier group_2 includes from carrier #11 to carrier #15, and from time $4 to time $9. A fourth carrier group_2 includes from carrier #16 to carrier #20, and from time $4 to time $9. A fifth carrier group_2 includes from carrier #21 to carrier #25, and from time $4 to time $9.

A first carrier group_3 includes from carrier #1 to carrier #25, and from time $10 to time $11.

A first carrier group_4 includes from carrier #1 to carrier #10, and from time $12 to time $14. A second carrier group_4 includes from carrier #11 to carrier #15, and from time $12 to time $14. A third carrier group_4 includes from carrier #16 to carrier #25, and from time $12 to time $14.

In FIG. 56, assume that, to transmit data to a certain terminal (certain user) (terminal #p), the base station or AP uses from carrier #1 to carrier #25, from time $1 to time $14.

At this time, assume that precoding is performed on the symbol (set) (sp1(i) and sp2(i)) belonging to the first carrier group_1 in FIG. 56, using the matrix U11 as the precoding matrix Fp(i) in Formula (52) and Formula (53).

Additionally, assume that precoding is performed on the symbol (set) (sp1(i) and sp2(i)) belonging to the second carrier group_1 in FIG. 56, using the matrix U21 as the precoding matrix Fp(i) in Formula (52) and Formula (53).

Assume that precoding is performed on the symbol (set) (sp1(i) and sp2(i)) belonging to the third carrier group_1 in FIG. 56, using the matrix U31 as the precoding matrix Fp(i) in Formula (52) and Formula (53).

Assume that precoding is performed on the symbol (set) (sp1(i) and sp2(i)) belonging to the fourth carrier group_1 in FIG. 56, using the matrix U41 as the precoding matrix Fp(i) in Formula (52) and Formula (53).

Assume that precoding is performed on the symbol (set) (sp1(i) and sp2(i)) belonging to the fifth carrier group_1 in FIG. 56, using the matrix U51 as the precoding matrix Fp(i) in Formula (52) and Formula (53).

As a first example, there is a method in which "U11≠U21, and U11≠U31, and U11≠U41, and U11≠U51, and U21≠U31, and U21≠U41, and U21≠U51, and U31≠U41, and U31≠U51, and U41≠U51" holds. When generalized, the method is one in which "x is an integer equal to 1 or greater, y is an integer equal to 1 or greater, x≠y holds, and for all x and y satisfying these conditions, Ux1≠Uy1 holds".

As a second example, there is a method in which "U11≠U21, or U11≠U31, or U11≠U41, or U11≠U51, or U21≠U31, or U21≠U41, or U21≠U51, or U31≠U41, or U31≠U51, or U41≠U51" holds. When generalized, the method is one in which "there exists a set of x, y such that x is an integer equal to 1 or greater, y is an integer equal to 1 or greater, x≠y holds, and Ux1≠Uy1 holds".

Additionally, the matrices U11, U21, U31, U41, and U51 are conceivably expressed by the matrix on the left side of Formula (5), the matrix on the left side of Formula (6), the matrix on the left side of Formula (7), the matrix on the left side of Formula (8), the matrix on the left side of Formula (9), the matrix on the left side of Formula (10), the matrix on the left side of Formula (11), the matrix on the left side of Formula (12), the matrix on the left side of Formula (13), the matrix on the left side of Formula (14), the matrix on the left side of Formula (15), the matrix on the left side of Formula (16), the matrix on the left side of Formula (17), the matrix on the left side of Formula (18), the matrix on the left side of Formula (19), the matrix on the left side of Formula (20), the matrix on the left side of Formula (21), the matrix on the left side of Formula (22), the matrix on the left side of Formula (23), the matrix on the left side of Formula (24), the matrix on the left side of Formula (25), the matrix on the left side of Formula (26), the matrix on the left side of Formula (27), the matrix on the left side of Formula (28), the matrix on the left side of Formula (29), the matrix on the left side of Formula (30), the matrix on the left side of Formula (31), the matrix on the left side of Formula (32), the matrix on the left side of Formula (33), the matrix on the left side of Formula (34), the matrix on the left side of Formula (35), the matrix on the left side of Formula (36), and the like, for example, but the matrices are not limited thereto.

In other words, the precoding matrix Fp(i) may be any kind of matrix such as the matrix on the left side of Formula (5), the matrix on the left side of Formula (6), the matrix on the left side of Formula (7), the matrix on the left side of Formula (8), the matrix on the left side of Formula (9), the matrix on the left side of Formula (10), the matrix on the left side of Formula (11), the matrix on the left side of Formula (12), the matrix on the left side of Formula (13), the matrix on the left side of Formula (14), the matrix on the left side of Formula (15), the matrix on the left side of Formula (16), the matrix on the left side of Formula (17), the matrix on the left side of Formula (18), the matrix on the left side of Formula (19), the matrix on the left side of Formula (20), the matrix on the left side of Formula (21), the matrix on the left side of Formula (22), the matrix on the left side of Formula (23), the matrix on the left side of Formula (24), the matrix on the left side of Formula (25), the matrix on the left side of Formula (26), the matrix on the left side of Formula (27), the matrix on the left side of Formula (28), the matrix on the left side of Formula (29), the matrix on the left side of Formula (30), the matrix on the left side of Formula (31), the matrix on the left side of Formula (32), the matrix on the left side of Formula (33), the matrix on the left side of Formula (34), the matrix on the left side of Formula (35), and the matrix on the left side of Formula (36).

Also, assume that precoding is performed on the symbol (set) (sp1(i) and sp2(i)) belonging to the first carrier group_2 in FIG. 56, using the matrix U12 as the precoding matrix Fp(i) in Formula (52) and Formula (53).

Additionally, assume that precoding is performed on the symbol (set) (sp1(i) and sp2(i)) belonging to the second carrier group_2 in FIG. 56, using the matrix U22 as the precoding matrix Fp(i) in Formula (52) and Formula (53).

Assume that precoding is performed on the symbol (set) (sp1(i) and sp2(i)) belonging to the third carrier group_2 in FIG. 56, using the matrix U32 as the precoding matrix Fp(i) in Formula (52) and Formula (53).

Assume that precoding is performed on the symbol (set) (sp1(i) and sp2(i)) belonging to the fourth carrier group_2 in FIG. 56, using the matrix U42 as the precoding matrix Fp(i) in Formula (52) and Formula (53).

Assume that precoding is performed on the symbol (set) (sp1(i) and sp2(i)) belonging to the fifth carrier group_2 in FIG. 56, using the matrix U52 as the precoding matrix Fp(i) in Formula (52) and Formula (53).

As a first example, there is a method in which "U12≠U22, and U12≠U32, and U12≠U42, and U12≠U52, and U22≠U32, and U22≠U42, and U22≠U52, and U32≠U42, and U32≠U52, and U42≠U52" holds. When generalized, the method is one in which "x is an integer equal to 1 or greater, y is an integer equal to 1 or greater, x≠y holds, and for all x and y satisfying these conditions, Ux2≠Uy2 holds".

As a second example, there is a method in which "U12≠U22, or U12≠U32, or U12≠U42, or U12≠U52, or U22≠U32, or U22≠U42, or U22≠U52, or U32≠U42, or U32≠U52, or U42≠U52" holds. When generalized, the method is one in which "there exists a set of x, y such that x is an integer equal to 1 or greater, y is an integer equal to 1 or greater, x≠y holds, and Ux2≠Uy2 holds".

Additionally, the matrices U12, U22, U32, U42, and U52 are conceivably expressed by the matrix on the left side of Formula (5), the matrix on the left side of Formula (6), the matrix on the left side of Formula (7), the matrix on the left side of Formula (8), the matrix on the left side of Formula (9), the matrix on the left side of Formula (10), the matrix on the left side of Formula (11), the matrix on the left side of Formula (12), the matrix on the left side of Formula (13), the matrix on the left side of Formula (14), the matrix on the left side of Formula (15), the matrix on the left side of Formula (16), the matrix on the left side of Formula (17), the matrix on the left side of Formula (18), the matrix on the left side of Formula (19), the matrix on the left side of Formula (20), the matrix on the left side of Formula (21), the matrix on the left side of Formula (22), the matrix on the left side of Formula (23), the matrix on the left side of Formula (24), the matrix on the left side of Formula (25), the matrix on the left side of Formula (26), the matrix on the left side of Formula (27), the matrix on the left side of Formula (28), the matrix on the left side of Formula (29), the matrix on the left side of Formula (30), the matrix on the left side of Formula (31), the matrix on the left side of Formula (32), the matrix on the left side of Formula (33), the matrix on the left side of Formula (34), the matrix on the left side of Formula (35), the matrix on the left side of Formula (36), and the like, for example, but the matrices are not limited thereto.

In other words, the precoding matrix Fp(i) may be any kind of matrix such as the matrix on the left side of Formula (5), the matrix on the left side of Formula (6), the matrix on the left side of Formula (7), the matrix on the left side of Formula (8), the matrix on the left side of Formula (9), the matrix on the left side of Formula (10), the matrix on the left side of Formula (11), the matrix on the left side of Formula (12), the matrix on the left side of Formula (13), the matrix on the left side of Formula (14), the matrix on the left side of Formula (15), the matrix on the left side of Formula (16), the matrix on the left side of Formula (17), the matrix on the left side of Formula (18), the matrix on the left side of Formula (19), the matrix on the left side of Formula (20), the matrix on the left side of Formula (21), the matrix on the left side of Formula (22), the matrix on the left side of Formula (23), the matrix on the left side of Formula (24), the matrix on the left side of Formula (25), the matrix on the left side of Formula (26), the matrix on the left side of Formula (27), the matrix on the left side of Formula (28), the matrix on the left side of Formula (29), the matrix on the left side of Formula (30), the matrix on the left side of Formula (31), the matrix on the left side of Formula (32), the matrix on the left side of Formula (33), the matrix on the left side of Formula (34), the matrix on the left side of Formula (35), and the matrix on the left side of Formula (36).

Assume that precoding is performed on the symbol (set) (sp1(i) and sp2(i)) belonging to the first carrier group_3 in FIG. 56, using the matrix U13 as the precoding matrix Fp(i) in Formula (52) and Formula (53).

Assume that precoding is performed on the symbol (set) (sp1(i) and sp2(i)) belonging to the first carrier group_4 in FIG. 56, using the matrix U14 as the precoding matrix Fp(i) in Formula (52) and Formula (53).

Additionally, assume that precoding is performed on the symbol (set) (sp1(i) and sp2(i)) belonging to the second carrier group_4 in FIG. 56, using the matrix U24 as the precoding matrix Fp(i) in Formula (52) and Formula (53).

Assume that precoding is performed on the symbol (set) (sp1(i) and sp2(i)) belonging to the third carrier group_4 in FIG. 56, using the matrix U34 as the precoding matrix Fp(i) in Formula (52) and Formula (53).

As a first example, there is a method in which "U14≠U24, and U14≠U34, and U24≠U34" holds. When generalized, the method is one in which "x is an integer equal to 1 or greater, y is an integer equal to 1 or greater, x≠y holds, and for all x and y satisfying these conditions, Ux4≠Uy4 holds".

As a second example, there is a method in which "U14≠U24, or U14≠U34, or U24≠U34" holds. When generalized, the method is one in which "there exists a set of x, y such that x is an integer equal to 1 or greater, y is an integer equal to 1 or greater, x≠y holds, and Ux4≠Uy4 holds".

Additionally, the matrices U14, U24, and U34 are conceivably expressed by the matrix on the left side of Formula (5), the matrix on the left side of Formula (6), the matrix on the left side of Formula (7), the matrix on the left side of Formula (8), the matrix on the left side of Formula (9), the matrix on the left side of Formula (10), the matrix on the left side of Formula (11), the matrix on the left side of Formula (12), the matrix on the left side of Formula (13), the matrix on the left side of Formula (14), the matrix on the left side of Formula (15), the matrix on the left side of Formula (16), the matrix on the left side of Formula (17), the matrix on the left side of Formula (18), the matrix on the left side of Formula (19), the matrix on the left side of Formula (20), the matrix on the left side of Formula (21), the matrix on the left side of Formula (22), the matrix on the left side of Formula (23), the matrix on the left side of Formula (24), the matrix on the left side of Formula (25), the matrix on the left side of Formula (26), the matrix on the left side of Formula (27), the matrix on the left side of Formula (28), the matrix on the left side of Formula (29), the matrix on the left side of Formula (30), the matrix on the left side of Formula (31), the matrix on the left side of Formula (32), the matrix on the left side of Formula (33), the matrix on the left side of Formula (34), the matrix on the left side of Formula (35), the matrix on the left side of Formula (36), and the like, for example, but the matrices are not limited thereto.

In other words, the precoding matrix Fp(i) may be any kind of matrix such as the matrix on the left side of Formula (5), the matrix on the left side of Formula (6), the matrix on the left side of Formula (7), the matrix on the left side of Formula (8), the matrix on the left side of Formula (9), the matrix on the left side of Formula (10), the matrix on the left side of Formula (11), the matrix on the left side of Formula (12), the matrix on the left side of Formula (13), the matrix on the left side of Formula (14), the matrix on the left side of Formula (15), the matrix on the left side of Formula (16), the matrix on the left side of Formula (17), the matrix on the left side of Formula (18), the matrix on the left side of Formula (19), the matrix on the left side of Formula (20), the matrix on the left side of Formula (21), the matrix on the left side of Formula (22), the matrix on the left side of Formula (23), the matrix on the left side of Formula (24), the matrix on the left side of Formula (25), the matrix on the left side of Formula (26), the matrix on the left side of Formula (27), the matrix on the left side of Formula (28), the matrix on the left side of Formula (29), the matrix on the left side of Formula (30), the matrix on the left side of Formula (31), the matrix on the left side of Formula (32), the matrix on the left side of Formula (33), the matrix on the left side of Formula (34), the matrix on the left side of Formula (35), and the matrix on the left side of Formula (36).

At this time, characteristics like the following may be included.

Like the "segment from time $1 to time $3" and "from time $4 to time $9", when the method of dividing frequencies is the same (the frequency used by the first carrier group_1 and the frequency used by the first carrier group_2 are the same, and the frequency used by the second carrier group_1 and the frequency used by the second carrier group_2 are the same, and the frequency used by the third carrier group_1 and the frequency used by the third carrier group_2 are the same, and the frequency used by the fourth carrier group_1 and the frequency used by the fourth carrier group_2 are the same, and the frequency used by the fifth carrier group_1 and the frequency used by the fifth carrier group_2 are the same), the precoding matrix used by the Xth carrier group_1 (where X is 1, 2, 3, 4, 5) in the "segment from time $1 to time $3" and the precoding matrix used by the Xth carrier group_2 in the "segment from time $4 to time $9" may be the same or different.

For example, U11=U12 may hold, or U11≠U12 may hold. U21=U22 may hold, or U21≠U22 may hold. U31=U32 may hold, or U31≠U32 may hold. U41=U42 may hold, or U41≠U42 may hold. U51=U52 may hold, or U51≠U52 may hold.

The method of dividing frequency may also be changed together with time. For example, "from time $1 to time $3" in FIG. 56, the frequency is divided into 5 from carrier #1 to carrier #25, and five carrier groups are generated. Subsequently, "from time $10 to time $11", a single carrier group containing carrier #1 to carrier #25 is generated. Also, "from time $12 to time $14", the frequency is divided into 3 from carrier #1 to carrier #25, and three carrier groups are generated.

Note that the method of dividing frequency is not limited to the method in FIG. 56. The frequencies allocated to a certain user may be treated as one carrier group, or two or more carrier groups may be generated. Also, it is sufficient for the number of carriers included in a carrier group to be 1 or more.

The description described above using FIG. 56 states that "to transmit data to a certain terminal (certain user) (terminal #p), the base station or AP uses from carrier #1 to carrier #25, from time $1 to time $14", but the base station or AP may also allocate from carrier #1 to carrier #25, from time $1 to time $14 to transmit data to multiple terminals (multiple users). Hereinafter, this point will be described. Note that since the settings with respect to each carrier group of the precoding matrix Fp(i) have been described earlier, a description is omitted here.

For example, as a first example, in FIG. 56, terminal allocation (user allocation) may be executed using time division.

For example, assume that the base station or AP uses "from time $1 to time $3" to transmit data to the terminal (user) p1 (that is, p=p1). Additionally, assume that the base station or AP uses "from time $4 to time $9" to transmit data to the terminal (user) p2 (that is, p=p2). Assume that the base station or AP uses "from time $10 to time $11" to transmit data to the terminal (user) p3 (that is, p=p3). Assume that the base station or AP uses "from time $12 to time $14" to transmit data to the terminal (user) p4 (that is, p=p4).

As a second example, in FIG. 56, terminal allocation (user allocation) may be executed using frequency division.

For example, assume that the base station or AP uses the first carrier group_1 and the second carrier group_1 to transmit data to the terminal (user) p1 (that is, p=p1). Additionally, assume that the base station or AP uses the third carrier group_1, the fourth carrier group_1, and the fifth carrier group_1 to transmit data to the terminal (user) p2 (that is, p=p2).

As a third example, in FIG. 56, terminal allocation (user allocation) may be executed using combined time and frequency division.

For example, assume that the base station or AP uses the first carrier group_1, the first carrier group_2, the second carrier group_1, and the second carrier group_2 to transmit data to the terminal (user) p1 (that is, p=p1). Additionally, assume that the base station or AP uses the third carrier group_1, the fourth carrier group_1, and the fifth carrier group_1 to transmit data to the terminal (user) p2 (that is, p=p2). Assume that the base station or AP uses the third carrier group_2 and the fourth carrier group_2 to transmit data to the terminal (user) p3 (that is, p=p3). Assume that the base station or AP uses the fifth carrier group_2 to transmit data to the terminal (user) p4 (that is, p=p4). Assume that the base station or AP uses the first carrier group_3 to transmit data to the terminal (user) p5 (that is, p=p5). Assume that the base station or AP uses the first carrier group_4 to transmit data to the terminal (user) p6 (that is, p=p6). Assume that the base station or AP uses the second carrier group_4 and the third carrier group_4 to transmit data to the terminal (user) p7 (that is, p=p7).

Note that in the description described above, the method of configuring the carrier groups is not limited to FIG. 56. For example, as long as there are one or more carriers included in a carrier group, the carrier groups may be configured in any way. Also, the intervals of time included in a carrier group are not limited to the configuration in FIG. 56. Also, the frequency division method, the time division method, and the combined time and frequency division method for user allocation is not limited to the examples described above, and it is possible to carry out an embodiment by executing any kind of division.

In accordance with examples like the above, by "changing the precoding matrix periodically or regularly" in a process similar to "changing the phase periodically or regularly" described in Embodiment 1 to Embodiment 11, Supplement 1 to Supplement 4, and the like, the advantageous effects described in Embodiment 1 to Embodiment 11, Supplement 1 to Supplement 4, and the like may be obtained.

Embodiment 14

Embodiment 1, Embodiment 3, and the like describe switching between performing phase change and not performing phase change for the phase change before precoding (weight combining) and/or the phase change after precoding (weight combining), or in other words, in the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like.

Embodiment 1, Supplement 2, and the like describe switching between performing phase change and not performing phase change (switching between performing a CDD (CSD) process and not performing a CDD (CSD) process) in the phase changer 309B of FIGS. 3, 4, 26, 38, 39, and the like. Obviously, the switching between performing phase change and not performing phase change (switching between performing a CDD (CSD) process and not performing a CDD (CSD) process) may also be executed in the phase changer 309A in FIGS. 57 and 59.

In the present embodiment, a supplementary explanation of this point will be given.

Embodiment 1, Embodiment 3, and the like describe switching between performing phase change and not performing phase change for the phase change before precoding (weight combining) and/or the phase change after precoding (weight combining), or in other words, in the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like, but this phase change is described as an operation of the user #p signal processor 102_$p$ in FIGS. 1 and 52.

Consequently, in the signal processor for each user, a "selection between performing phase change and not performing phase change in the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like" is executed. In other words, in the user #p signal processor 102_$p$ in FIGS. 1 and 52, for p from 1 to M, a "selection between performing phase change and not performing phase change in the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like" is executed individually.

Embodiment 1, Supplement 2, and the like describe switching between performing phase change and not performing phase change (switching between performing a CDD (CSD) process and not performing a CDD (CSD) process) in the phase changer 309B of FIGS. 3, 4, 26, 38, 39, and the like. Obviously, the switching between performing phase change and not performing phase change (switching between performing a CDD (CSD) process and not performing a CDD (CSD) process) in the phase changer 309A in FIGS. 57 and 59 is described. This process is described as an operation of the user #p signal processor 102_$p$ in FIGS. 1 and 52.

Consequently, in the signal processor for each user, a "selection between performing phase change and not performing phase change (a selection between performing a CDD (CSD) process and not performing a CDD (CSD) process) in the phase changer 309B in FIGS. 3, 4, 26, 38, 39, and the like", and/or a "selection between performing phase change and not performing phase change (a selection between performing a CDD (CSD) process and not performing a CDD (CSD) process) in the phase changer 309A in FIGS. 57 and 59" is executed. In other words, in the user #p signal processor 102_$p$ in FIGS. 1 and 52, for p from 1 to M, a "selection between performing phase change and not performing phase change (a selection between performing a CDD (CSD) process and not performing a CDD (CSD) process) in the phase changer 309B in FIGS. 3, 4, 26, 38, 39, and the like", and/or a "selection between performing phase change and not performing phase change (a selection between performing a CDD (CSD) process and not performing a CDD (CSD) process) in the phase changer 309A in FIGS. 57 and 59" is executed individually.

Also, Embodiment 1 and Embodiment 3 describe a base station or AP using control information symbols included in the other symbols 603 or 703 of FIGS. 8 and 9, for example, to transmit "information related to performing phase change or not performing phase change in the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like", and also describe a base station or AP using the preamble 1001, 1101 and the control information symbols 1002, 1102 of FIGS. 10 and 11, for example, to transmit "information related to performing phase change or not performing phase change in the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like".

In the present embodiment, a supplementary explanation of this point will be given.

For example, assume that the base station or AP transmits a modulated signal addressed to the user #p with the frame configuration of FIGS. 8 and 9. As an example, assume that the modulated signals of multiple streams are transmitted.

Figure 60:
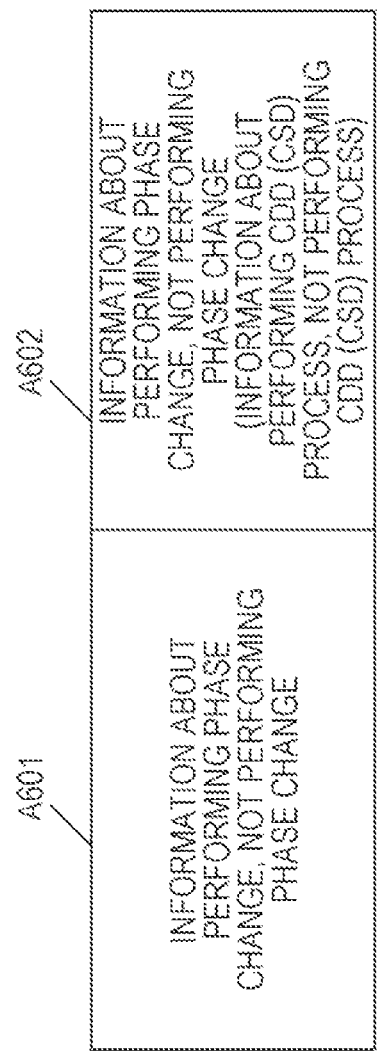

At this time, assume that the control information symbols included in the other symbols 603 and 703 of FIGS. 8 and 9 include the "information about performing phase change or not performing phase change" A601 and/or the "information about performing phase change or not performing phase change (information about performing a CDD (CSD) process or not performing a CDD (CSD) process)" A602 illustrated in FIG. 60.

The "information about performing phase change or not performing phase change" A601 is information indicating whether the base station or AP "has performed phase change or has not performed phase change in the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like". The user #p terminal, by obtaining the "information about performing phase change or not performing phase change" A601, performs demodulation/decoding of the data symbols of the user #p modulated signals transmitted by the base station or AP.

The "information about performing phase change or not performing phase change (information about performing a CDD (CSD) process or not performing a CDD (CSD) process)" A602 is information indicating whether the base station or AP "has performed phase change or has not performed phase change (has or has not performed the CDD (CSD) process) in the phase changer 309A and the phase changer 309B in FIGS. 3, 4, 26, 38, 39, 57, 59, and the like". The user #p terminal, by obtaining the "information about performing phase change or not performing phase change (information about performing a CDD (CSD) process or not performing a CDD (CSD) process)" A602, performs demodulation/decoding of the data symbols of the user #p modulated signals transmitted by the base station or AP.

Note that the "information about performing phase change or not performing phase change" A601 may be generated individually for each user. In other words, for example, "information about performing phase change or not performing phase change" A601 addressed to user #1, "information about performing phase change or not performing phase change" A601 addressed to user #2, "information about performing phase change or not performing phase change" A601 addressed to user #3, and so on may exist. Note that the information does not have to be generated for each user.

Similarly, the "information about performing phase change or not performing phase change (information about performing a CDD (CSD) process or not performing a CDD (CSD) process)" A602 may also be generated individually for each user. In other words, for example, "information about performing phase change or not performing phase change (information about performing a CDD (CSD) process or not performing a CDD (CSD) process)" A602 addressed to user #1, "information about performing phase change or not performing phase change (information about performing a CDD (CSD) process or not performing a CDD (CSD) process)" A602 addressed to user #2, "information about performing phase change or not performing phase change (information about performing a CDD (CSD) process or not performing a CDD (CSD) process)" A602 addressed to user #3, and so on may exist. Note that the information does not have to be generated for each user.

Note that in FIG. 60, an example is described in which both the "information about performing phase change or not performing phase change" A601 and the "information about performing phase change or not performing phase change (information about performing a CDD (CSD) process or not performing a CDD (CSD) process)" A602 exist in the control information symbols, but a configuration in which only one exists is also acceptable.

For example, assume that the base station or AP transmits a modulated signal addressed to the user #p with the frame configuration of FIGS. 10 and 11. As an example, the case of transmitting the modulated signals of multiple streams will be described.

At this time, assume that the control information symbols 1002 and 1102 included in the preamble 1001 and 1101 of FIGS. 10 and 11 include the "information about performing phase change or not performing phase change" A601 and/or the "information about performing phase change or not performing phase change (information about performing a CDD (CSD) process or not performing a CDD (CSD) process)" A602 illustrated in FIG. 60.

The "information about performing phase change or not performing phase change" A601 is information indicating whether the base station or AP "has performed phase change or has not performed phase change in the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like". The user #p terminal, by obtaining the "information about performing phase change or not performing phase change" A601, performs demodulation/decoding of the data symbols of the user #p modulated signals transmitted by the base station or AP.

The "information about performing phase change or not performing phase change (information about performing a CDD (CSD) process or not performing a CDD (CSD) process)" A602 is information indicating whether the base station or AP "has performed phase change or has not performed phase change (has or has not performed the CDD (CSD) process) in the phase changer 309A and the phase changer 309B in FIGS. 3, 4, 26, 38, 39, 57, 59, and the like". The user #p terminal, by obtaining the "information about performing phase change or not performing phase change (information about performing a CDD (CSD) process or not performing a CDD (CSD) process)" A602, performs demodulation/decoding of the data symbols of the user #p modulated signals transmitted by the base station or AP.

Note that the "information about performing phase change or not performing phase change" A601 may be generated individually for each user. In other words, for example, "information about performing phase change or not performing phase change" A601 addressed to user #1, "information about performing phase change or not performing phase change" A601 addressed to user #2, "information about performing phase change or not performing phase change" A601 addressed to user #3, and so on may exist. Note that the information does not have to be generated for each user.

Similarly, the "information about performing phase change or not performing phase change (information about performing a CDD (CSD) process or not performing a CDD (CSD) process)" A602 may also be generated individually for each user. In other words, for example, "information about performing phase change or not performing phase change (information about performing a CDD (CSD) process or not performing a CDD (CSD) process)" A602 addressed to user #1, "information about performing phase change or not performing phase change (information about performing a CDD (CSD) process or not performing a CDD (CSD) process)" A602 addressed to user #2, "information about performing phase change or not performing phase change (information about performing a CDD (CSD) process or not performing a CDD (CSD) process)" A602 addressed to user #3, and so on may exist. Note that the information does not have to be generated for each user.

Note that in FIG. 60, an example is described in which both the "information about performing phase change or not performing phase change" A601 and the "information about performing phase change or not performing phase change (information about performing a CDD (CSD) process or not performing a CDD (CSD) process)" A602 exist in the control information symbols, but a configuration in which only one exists is also acceptable.

Next, operation of the reception apparatus will be described.

Since the configuration and operation of the reception apparatus has been described using FIG. 19 in Embodiment 1, a description will be omitted for the content that has been described in Embodiment 1.

The control information decoder 1909 of FIG. 19 acquires the information of FIG. 60 included in the input signal, and outputs a control information signal 1901 including the information.

The signal processor 1911 executes demodulation/decoding of the data symbols on the basis of the information of FIG. 60 included in the control information signal 1901, and acquires and outputs received data 1912.

By performing as above, the advantageous effects described in this specification may be obtained.

Embodiment 15

In Embodiment 1 to Embodiment 11, Supplement 1 to Supplement 4, and the like, if both "the phase changer 305B, the phase changer 305A, the phase changer 3801B, and the phase changer 3801A in FIGS. 3, 4, 26, 38, 39, 40, 41, 42, 43, 44, 45, 46, 47, 48, 49, and the like" and the computations in the weight combiner 303 are considered as a whole, such as by referencing Formula (37), Formula (42), Formula (43), Formula (45), Formula (47), and Formula (48), for example, the precoding matrix corresponds to switching according to i.

Also, in the weight combiner 303, in the case of using Formula (21), Formula (22), Formula (23), Formula (24), Formula (25), Formula (26), Formula (27), and Formula (28), for example, the precoding matrix corresponds to switching according to i.

This point has been described in Embodiment 13, and FIGS. 58 and 59 illustrate the configuration of the user #p signal processor 102_p of FIGS. 1 and 52.

In the present embodiment, an operation similar to Embodiment 13, namely switching between performing a precoding matrix change and not performing a precoding matrix change in the weight combiner A401 in FIGS. 58 and 59, will be described.

FIGS. 58 and 59 described in Embodiment 13 correspond to the user #p signal processor 102_p of FIGS. 1 and 52. Consequently, in the signal processor for each user, a selection of whether to perform a precoding matrix change or not to perform a precoding matrix change is executed by the weight combiner A401. In other words, in the user #p signal processor 102_p of FIGS. 1 and 52, for p from 1 to M, a selection of whether to perform a precoding matrix change or not to perform a precoding matrix change is executed individually by the weight combiner A401.

For example, assume that the base station or AP transmits a modulated signal addressed to the user #p with the frame configuration of FIGS. 8 and 9. As an example, assume that the modulated signals of multiple streams are transmitted.

Figure 61:
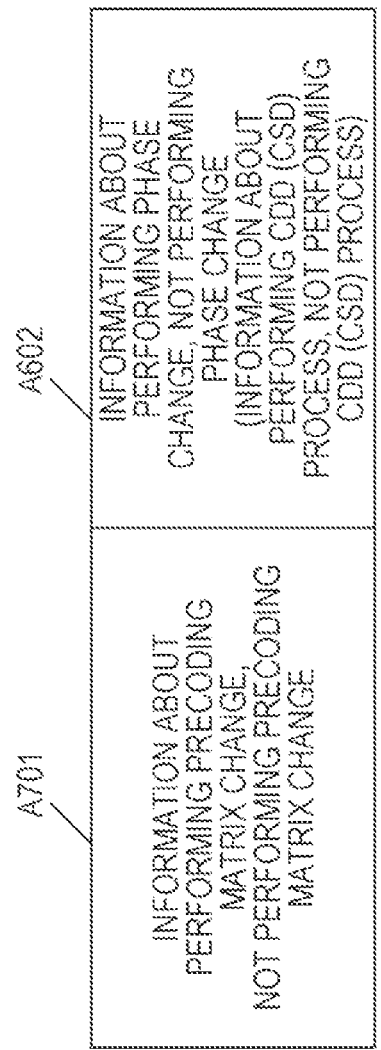

At this time, assume that the control information symbols included in the other symbols 603 and 703 of FIGS. 8 and 9 include the "information about performing a precoding matrix change or not performing a precoding matrix change" A701 and/or the "information about performing phase change or not performing phase change (information about performing a CDD (CSD) process or not performing a CDD (CSD) process)" A602 illustrated in FIG. 61.

The "information about performing a precoding matrix change or not performing a precoding matrix change" A701 is information indicating whether the base station or AP "will perform a precoding matrix change or not perform a precoding matrix change in the weight combiner A401 in FIGS. 58 and 59". The user #p terminal, by obtaining the "information about performing a precoding matrix change or not performing a precoding matrix change" A701, performs demodulation/decoding of the data symbols of the user #p modulated signals transmitted by the base station or AP.

The "information about performing phase change or not performing phase change (information about performing a CDD (CSD) process or not performing a CDD (CSD) process)" A602 is information indicating whether the base station or AP "has performed phase change or has not performed phase change (has or has not performed the CDD (CSD) process) in the phase changer 309A and the phase changer 309B in FIGS. 58, 59, and the like". The user #p terminal, by obtaining the "information about performing phase change or not performing phase change (information about performing a CDD (CSD) process or not performing a CDD (CSD) process)" A602, performs demodulation/decoding of the data symbols of the user #p modulated signals transmitted by the base station or AP.

Note that the "information about performing a precoding matrix change or not performing a precoding matrix change" A701 may be generated individually for each user. In other words, for example, "information about performing a precoding matrix change or not performing a precoding matrix change" A701 addressed to user #1, "information about performing a precoding matrix change or not performing a precoding matrix change" A701 addressed to user #2, "information about performing a precoding matrix change or not performing a precoding matrix change" A701 addressed to user #3, and so on may exist. Note that the information does not have to be generated for each user.

Similarly, the "information about performing phase change or not performing phase change (information about performing a CDD (CSD) process or not performing a CDD (CSD) process)" A602 may also be generated individually for each user. In other words, for example, "information about performing phase change or not performing phase change (information about performing a CDD (CSD) process or not performing a CDD (CSD) process)" A602 addressed to user #1, "information about performing phase change or not performing phase change (information about performing a CDD (CSD) process or not performing a CDD (CSD) process)" A602 addressed to user #2, "information about performing phase change or not performing phase change (information about performing a CDD (CSD) process or not performing a CDD (CSD) process)" A602 addressed to user #3, and so on may exist. Note that the information does not have to be generated for each user.

Note that in FIG. 61, an example is described in which both the "information about performing a precoding matrix change or not performing a precoding matrix change" A701 and the "information about performing phase change or not performing phase change (information about performing a CDD (CSD) process or not performing a CDD (CSD) process)" A602 exist in the control information symbols, but a configuration in which only one exists is also acceptable.

For example, assume that the base station or AP transmits a modulated signal addressed to the user #p with the frame configuration of FIGS. 10 and 11. As an example, the case of transmitting the modulated signals of multiple streams will be described.

At this time, assume that the control information symbols 1002 and 1102 included in the preamble 1001 and 1101 of FIGS. 10 and 11 include the "information about performing a precoding matrix change or not performing a precoding matrix change" A701 and/or the "information about performing phase change or not performing phase change (information about performing a CDD (CSD) process or not performing a CDD (CSD) process)" A602 illustrated in FIG. 61.

The "information about performing a precoding matrix change or not performing a precoding matrix change" A701 is information indicating whether the base station or AP "will perform a precoding matrix change or not perform a precoding matrix change in the weight combiner A401 in FIGS. 58 and 59". The user #p terminal, by obtaining the "information about performing a precoding matrix change or not performing a precoding matrix change" A701, performs demodulation/decoding of the data symbols of the user #p modulated signals transmitted by the base station or AP.

The "information about performing phase change or not performing phase change (information about performing a CDD (CSD) process or not performing a CDD (CSD) process)" A602 is information indicating whether the base station or AP "has performed phase change or has not performed phase change (has or has not performed the CDD (CSD) process) in the phase changer 309A and the phase changer 309B in FIGS. 58, 59, and the like". The user #p terminal, by obtaining the "information about performing phase change or not performing phase change (information about performing a CDD (CSD) process or not performing a CDD (CSD) process)" A602, performs demodulation/decoding of the data symbols of the user #p modulated signals transmitted by the base station or AP.

Note that the "information about performing a precoding matrix change or not performing a precoding matrix change" A701 may be generated individually for each user. In other words, for example, "information about performing a precoding matrix change or not performing a precoding matrix change" A701 addressed to user #1, "information about performing a precoding matrix change or not performing a precoding matrix change" A701 addressed to user #2, "information about performing a precoding matrix change or not performing a precoding matrix change" A701 addressed to user #3, and so on may exist. Note that the information does not have to be generated for each user.

Similarly, the "information about performing phase change or not performing phase change (information about performing a CDD (CSD) process or not performing a CDD (CSD) process)" A602 may also be generated individually for each user. In other words, for example, "information about performing phase change or not performing phase change (information about performing a CDD (CSD) process or not performing a CDD (CSD) process)" A602 addressed to user #1, "information about performing phase change or not performing phase change (information about performing a CDD (CSD) process or not performing a CDD (CSD) process)" A602 addressed to user #2, "information about performing phase change or not performing phase change (information about performing a CDD (CSD) process or not performing a CDD (CSD) process)" A602 addressed to user #3, and so on may exist. Note that the information does not have to be generated for each user.

Note that in FIG. 61, an example is described in which both the "information about performing a precoding matrix change or not performing a precoding matrix change" A701 and the "information about performing phase change or not performing phase change (information about performing a CDD (CSD) process or not performing a CDD (CSD) process)" A602 exist in the control information symbols, but a configuration in which only one exists is also acceptable.

Next, operation of the reception apparatus will be described.

Since the configuration and operation of the reception apparatus has been described using FIG. 19 in Embodiment 1, a description will be omitted for the content that has been described in Embodiment 1.

The control information decoder 1909 of FIG. 19 acquires the information of FIG. 61 included in the input signal, and outputs a control information signal 1901 including the information.

The signal processor 1911 executes demodulation/decoding of the data symbols on the basis of the information of FIG. 61 included in the control information signal 1901, and acquires and outputs received data 1912.

By performing as above, the advantageous effects described in this specification may be obtained.

(Supplement 5)

Although not illustrated in FIGS. 3, 4, 26, 38, 39, 57, 58, and the like, each of the pilot symbol signal (pa(t)) (351A), the pilot symbol signal (pb(t)) (351B), the preamble signal 352, and the control information symbol signal 353 may also be a signal subjected to processing such as phase change.

Embodiment 16

Embodiments such as Embodiment 1, Embodiment 2, and Embodiment 3 describe a configuration in which the weight combiner 303, the phase changer 305A, and/or the phase changer 305B exist in FIGS. 3, 4, 26, 40, 41, 42, 43, 44, 45, 46, 47, and 48, for example. The following describes a configuration method for obtaining favorable reception quality in an environment in which direct waves are dominant or an environment in which multipath or the like exists.

First, a method of phase change when the weight combiner 303 and the phase changer 305B exist, like in FIGS. 3, 4, 41, 45, 47, and the like, will be described.

For example, as described in the embodiments described thus far, assume that the phase change value in the phase changer 305B is given as yp(i). Note that i is taken to be the symbol number. For example, i is an integer equal to 0 or greater.

For example, the phase change value yp(i) assumes N periods, and prepares N values as phase change values. Note that N is taken to be an integer equal to 2 or greater. Additionally, for example, Phase[0], Phase[1], Phase[2], Phase[3], . . . , Phase[N−2], Phase[N−1] are prepared as the N values. In other words, the result is Phase[k], where k is taken to be an integer from 0 to N−1. Additionally, Phase[k] is taken to be a real number from 0 radians to $2\pi$ radians. Also, u is taken to be an integer from 0 to N−1, v is taken to be an integer from 0 to N−1, and assume that u≠v. Additionally, assume that Phase[u]≠Phase[v] holds for all u, v satisfying these conditions. Note that the method of setting the phase change value yp(i) when assuming the period N has been described in other embodiments of this specification. Additionally, M values are extracted from Phase[0], Phase[1], Phase[2], Phase[3], . . . , Phase[N−2], Phase[N−1], and these M values are expressed as Phase_1[0], Phase_1[1], Phase_1[2], . . . , Phase_1[M−2], Phase_1[M−1]. In other words, the result is Phase_1[k], where k is taken to be an integer from 0 to M−1. Note that M is taken to be an integer less than N and equal to 2 or greater.

At this time, assume that the phase change value yp(i) takes any value among Phase_1[0], Phase_1[1], Phase_1[2], . . . , Phase_1[M−2], Phase_1[M−1]. Additionally, assume that each of Phase_1[0], Phase_1[1], Phase_1[2], . . . , Phase_1[M−2], Phase_1[M−1] is used at least once as the phase change value yp(i).

For example, one example is a method in which the period of the phase change value yp(i) is M. In this case, the following formula holds.

$$yp(i=u+v\times M)=\text{Phase\_1}[u] \quad (54)$$

Note that u is an integer from 0 to M−1. Also, v is taken to be an integer equal to 0 or greater.

Figure 62:
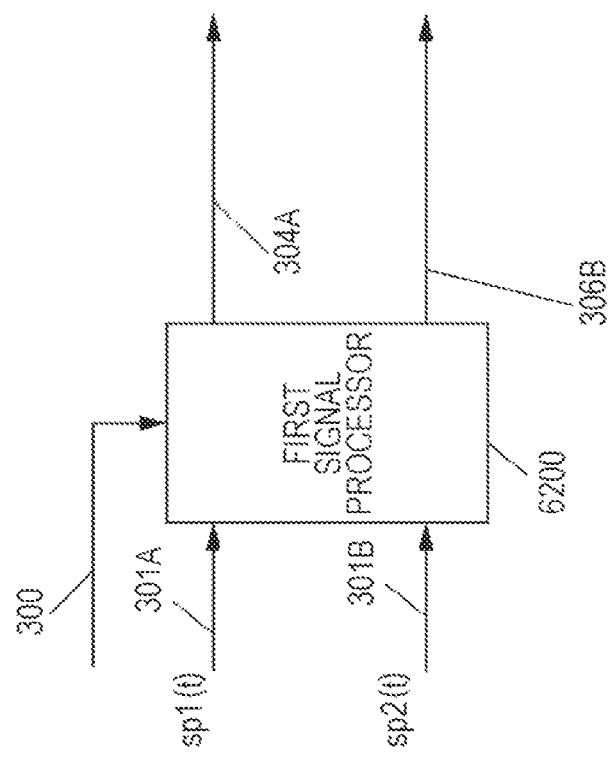
FIG. 62 is a diagram illustrating an example of a configuration of a first signal processor.

Also, the weight combining process and the phase change process may be executed individually in the weight combiner 303 and the phase changer 305B as in FIG. 3 and the like, or the process in the weight combiner 303 and the process in the phase changer 305B may be performed by a first signal processor 6200 as in FIG. 62. Note that in FIG. 62, parts which operate similarly to FIG. 3 are denoted with the same numbers.

For example, in Formula (3), provided that Fp is the matrix for weight combining, and Pp is a matrix related to phase change, a matrix Wp(=Pp×Fp) is prepared in advance. Additionally, the first signal processor 6200 in FIG. 62 may use the matrix Wp, a signal 301A (sp1(t)), and a signal 301B (sp2(t)) to generate signals 304A and 306B.

Additionally, the phase changers 309A, 309B, 3801A, and 3801B in FIGS. 3, 4, 41, 45, and 47 may or may not execute signal processing for phase change.

As above, by setting the phase change value yp(i), by the spatial diversity effect, an advantageous effect may be obtained whereby the reception apparatus has a higher probability of being able to obtain favorable reception quality in an environment in which direct waves are dominant or an environment in which multipath or the like exists.

Furthermore, by reducing the number of values that the phase change value yp(i) may take as described above, there is a higher probability of being able to reduce the circuit scale of the transmission apparatus and the reception apparatus while also reducing the impact on the data reception quality.

Next, a method of phase change when the weight combiner 303, the phase changer 305A, and the phase changer 305B exist, like in FIGS. 26, 40, 43, 44, and the like, will be described.

As described in the other embodiments, assume that the phase change value in the phase changer 305B is given as yp(i). Note that i is taken to be the symbol number. For example, i is an integer equal to 0 or greater.

For example, the phase change value yp(i) assumes Nb periods, and prepares Nb values as phase change values. Note that Nb is taken to be an integer equal to 2 or greater. Additionally, for example, Phase_b[0], Phase_b[1], Phase_b[2], Phase_b[3], . . . , Phase_b[Nb−2], Phase_b[Nb−1] are prepared as the Nb values. In other words, the result is Phase_b[k], where k is taken to be an integer from 0 to Nb−1. Additionally, Phase_b[k] is taken to be a real number from 0 radians to $2\pi$ radians. Also, u is taken to be an integer from 0 to Nb−1, v is taken to be an integer from 0 to Nb−1, and assume that u≠v. Additionally, assume that Phase_b[u]≠Phase_b[v] holds for all u, v satisfying these conditions. Note that the method of setting the phase change value yp(i) when assuming the period Nb has been described in other embodiments of this specification. Additionally, Mb values are extracted from Phase_b[0], Phase_b[1], Phase_b[2], Phase_b[3], . . . , Phase_b[Nb−2], Phase_b[Nb−1], and these Mb values are expressed as Phase_1[0], Phase_1[1], Phase_1[2], . . . , Phase_1[Mb−2], Phase_1[Mb−1]. In other words, the result is Phase_1[k], where k is taken to be an integer from 0 to Mb−1. Note that Mb is taken to be an integer less than Nb and equal to 2 or greater.

At this time, assume that the phase change value yp(i) takes any value among Phase_1[0], Phase_1[1], Phase_1[2], . . . , Phase_1[Mb−2], Phase_1[Mb−1]. Additionally, assume that each of Phase_1[0], Phase_1[1], Phase_1[2], . . . , Phase_1[Mb−2], Phase_1[Mb−1] is used at least once as the phase change value yp(i).

For example, one example is a method in which the period of the phase change value yp(i) is Mb. In this case, the following holds.

$$yp(i=u+v\times Mb)=\text{Phase\_1}[u] \quad (55)$$

Note that u is an integer from 0 to Mb−1. Also, v is taken to be an integer equal to 0 or greater.

As described in the other embodiments, assume that the phase change value in the phase changer 305A is given as Yp(i). Note that i is taken to be the symbol number. For example, i is an integer equal to 0 or greater. For example, the phase change value Yp(i) assumes Na periods, and prepares Na values as phase change values. Note that Na is taken to be an integer equal to 2 or greater. Additionally, for example, Phase_a[0], Phase_a[1], Phase_a[2], Phase_a[3], . . . , Phase_a[Na−2], Phase_a[Na−1] are prepared as the Na values. In other words, the result is Phase_a[k], where k is taken to be an integer from 0 to Na−1. Additionally, Phase_a[k] is taken to be a real number from 0 radians to $2\pi$ radians. Also, u is taken to be an integer from 0 to Na−1, v is taken to be an integer from 0 to Na−1, and assume that u≠v. Additionally, assume that Phase_a[u]≠Phase_a[v] holds for all u, v satisfying these conditions. Note that the method of setting the phase change value Yp(i) when assuming the period Na has been described in other embodiments of this specification. Additionally, Ma values are extracted from Phase_a[0], Phase_a[1], Phase_a[2], Phase_a[3], ..., Phase_a[Na−2], Phase_a[Na−1], and these Ma values are expressed as Phase_2[0], Phase_2[1], Phase_2[2], ..., Phase_2[Ma−2], Phase_2[Ma−1]. In other words, the result is Phase_2[k], where k is taken to be an integer from 0 to Ma−1. Note that Ma is taken to be an integer less than Na and equal to 2 or greater.

At this time, assume that the phase change value Yp(i) takes any value among Phase_2[0], Phase_2[1], Phase_2[2], ..., Phase_2[Ma−2], Phase_2[Ma−1]. Additionally, assume that each of Phase_2[0], Phase_2[1], Phase_2[2], ..., Phase_2[Ma−2], Phase_2[Ma−1] is used at least once as the phase change value Yp(i).

For example, one example is a method in which the period of the phase change value Yp(i) is Ma. In this case, the following holds.

$$Yp(i=u+v\times Ma)=\text{Phase\_2}[u] \quad (56)$$

Note that u is an integer from 0 to Ma−1. Also, v is taken to be an integer equal to 0 or greater.

Figure 63:
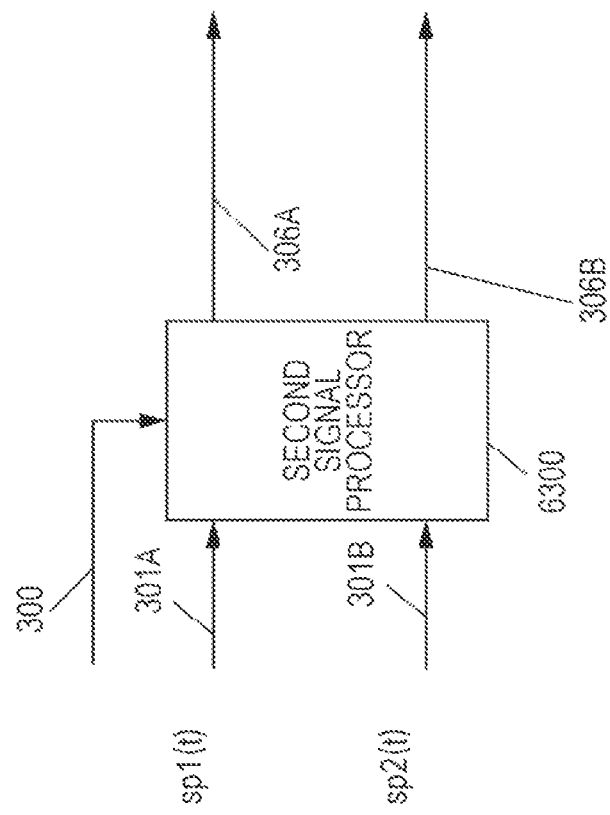
FIG. 63 is a diagram illustrating an example of a configuration of a second signal processor.

Also, the weight combining process and the phase change process may be executed individually in the weight combiner 303 and the phase changers 305A, 305B as in FIGS. 26, 40, 43, 44, and the like, or the process in the weight combiner 303 and the process in the phase changers 305A, 305B may be performed by a second signal processor 6300 as in FIG. 63. Note that in FIG. 63, parts which operate similarly to FIGS. 26, 40, 43, and 44 are denoted with the same numbers.

For example, in Formula (42), provided that Fp is the matrix for weight combining, and Pp is the matrix related to phase change, the matrix Wp(=Pp×Fp) is prepared in advance. Additionally, the second signal processor 6300 in FIG. 63 may use the matrix Wp, the signal 301A (sp1(t)), and the signal 301B (sp2(t)) to generate signals 306A and 306B.

Additionally, the phase changers 309A, 309B, 3801A, and 3801B in FIGS. 26, 40, 43, and 44 may or may not execute signal processing for phase change.

Also, Na and Nb may have the same value or different values. Additionally, Ma and Mb may have the same value or different values.

As above, by setting the phase change value yp(i) and the phase change value Yp(i), by the spatial diversity effect, an advantageous effect may be obtained whereby the reception apparatus has a higher probability of being able to obtain favorable reception quality in an environment in which direct waves are dominant or an environment in which multipath or the like exists. Furthermore, by reducing the number of values that the phase change value yp(i) may take or reducing the number of values that the phase change value Yp(i) may take as described above, there is a higher probability of being able to reduce the circuit scale of the transmission apparatus and the reception apparatus while also reducing the impact on the data reception quality.

Note that the present embodiment is highly likely to be effective when applied to the methods of phase change described in the other embodiments of this specification. However, it is also possible to carry out an embodiment similarly by applying the present embodiment to other methods of phase change.

Embodiment 17

In the present embodiment, a method of phase change when the weight combiner 303 and the phase changer 305B exist, like in FIGS. 3, 4, 41, 45, 47, and the like, will be described.

For example, as described in the other embodiments, assume that the phase change value in the phase changer 305B is given as yp(i). Note that i is taken to be the symbol number. For example, i is an integer equal to 0 or greater.

For example, assume that the phase change value yp(i) has N periods. Note that N is taken to be an integer equal to 2 or greater. Additionally, Phase[0], Phase[1], Phase[2], Phase[3], ..., Phase[N−2], Phase[N−1] are prepared as the N values. In other words, the result is Phase[k], where k is taken to be an integer from 0 to N−1. Additionally, Phase[k] is taken to be a real number from 0 radians to 2π radians. Also, u is taken to be an integer from 0 to N−1, v is taken to be an integer from 0 to N−1, and assume that u≠v. Additionally, assume that Phase[u]≠Phase[v] holds for all u, v satisfying these conditions. In this case, assume that Phase[k] is expressed by the following formula. Note that k is taken to be an integer from 0 to N−1.

$$\text{Phase}[k] = \frac{k\pi}{N} \quad (57)$$

However, assume that the units of Formula (57) are radians. Additionally, Phase[0], Phase[1], Phase[2], Phase[3], ..., Phase[N−2], and Phase[N−1] are used such that the period of the phase change value yp(i) becomes N. To achieve the period N, the values may be arranged as Phase[0], Phase[1], Phase[2], Phase[3], ..., Phase[N−2], Phase[N−1] or the like. Note that to achieve the period N, for example, assume that the following holds.

$$yp(i=u+v\times N)=yp(i=u+(v+1)\times N) \quad (58)$$

Note that u is an integer from 0 to N−1, and v is an integer equal to 0 or greater. Additionally, Formula (58) holds for all u, v satisfying these conditions.

Note that the weight combining process and the phase change process may be executed individually in the weight combiner 303 and the phase changer 305B as in FIG. 3 and the like, or the process in the weight combiner 303 and the process in the phase changer 305B may be performed by a first signal processor 6200 as in FIG. 62. Note that in FIG. 62, parts which operate similarly to FIG. 3 are denoted with the same numbers.

For example, in Formula (3), provided that Fp is the matrix for weight combining, and Pp is a matrix related to phase change, a matrix Wp(=Pp×Fp) is prepared in advance. Additionally, the first signal processor 6200 in FIG. 62 may use the matrix Wp, a signal 301A (sp1(t)), and a signal 301B (sp2(t)) to generate signals 304A and 306B.

Additionally, the phase changers 309A, 309B, 3801A, and 3801B in FIGS. 3, 4, 41, 45, and 47 may or may not execute signal processing for phase change.

As above, by setting the phase change value yp(i), by the spatial diversity effect, an advantageous effect may be obtained whereby the reception apparatus has a higher probability of being able to obtain favorable reception quality in an environment in which direct waves are dominant or an environment in which multipath or the like exists. Furthermore, by limiting the number of values that the phase change value yp(i) may take as described above, there is a higher probability of being able to reduce the circuit scale of the transmission apparatus and the reception apparatus while also reducing the impact on the data reception quality.

Next, a method of phase change when the weight combiner 303, the phase changer 305A, and the phase changer 305B exist, like in FIGS. 26, 40, 43, 44, and the like, will be described.

As described in the other embodiments, assume that the phase change value in the phase changer 305B is given as yp(i). Note that i is taken to be the symbol number. For example, i is an integer equal to 0 or greater.

For example, assume that the phase change value yp(i) has Nb periods. Note that Nb is taken to be an integer equal to 2 or greater. Additionally, Phase_b[0], Phase_b[1], Phase_b[2], Phase_b[3], . . . , Phase_b[Nb−2], Phase_b[Nb−1] are prepared as the Nb values. In other words, the result is Phase_b[k], where k is taken to be an integer from 0 to Nb−1. Additionally, Phase_b[k] is taken to be a real number from 0 radians to $2\pi$ radians. Also, u is taken to be an integer from 0 to Nb−1, v is taken to be an integer from 0 to Nb−1, and assume that u≠v. Additionally, assume that Phase_b[u] ≠Phase_b[v] holds for all u, v satisfying these conditions. In this case, assume that Phase_b[k] is expressed by the following formula. Note that k is taken to be an integer from 0 to Nb−1.

$$\text{Phase\_b}[k] = \frac{k\pi}{Nb} \qquad (59)$$

However, assume that the units of Formula (59) are radians. Additionally, Phase_b[0], Phase_b[1], Phase_b[2], Phase_b[3], . . . , Phase_b[Nb−2], and Phase_b[Nb−1] are used such that the period of the phase change value yp(i) becomes Nb. To achieve the period Nb, the values may be arranged as Phase_b[0], Phase_b[1], Phase_b[2], Phase_b[3], . . . , Phase_b[Nb−2], Phase_b[Nb−1] or the like. Note that to achieve the period Nb, for example, assume that the following holds.

$$yp(i=u+v \times Nb) = yp(i=u+(v+1) \times Nb) \qquad (60)$$

Note that u is an integer from 0 to Nb−1, and v is an integer equal to 0 or greater. Additionally, Formula (60) holds for all u, v satisfying these conditions.

As described in the other embodiments, assume that the phase change value in the phase changer 305A is given as Yp(i). Note that i is taken to be the symbol number. For example, i is an integer equal to 0 or greater. For example, assume that the phase change value Yp(i) has Na periods. Note that Na is taken to be an integer equal to 2 or greater. Additionally, Phase_a[0], Phase_a[1], Phase_a[2], Phase_a[3], . . . , Phase_a[Na−2], Phase_a[Na−1] are prepared as the Na values. In other words, the result is Phase_a[k], where k is taken to be an integer from 0 to Na−1. Additionally, Phase_a[k] is taken to be a real number from 0 radians to $2\pi$ radians. Also, u is taken to be an integer from 0 to Na−1, v is taken to be an integer from 0 to Na−1, and assume that u≠v. Additionally, assume that Phase_a[u]≠Phase_a[v] holds for all u, v satisfying these conditions. In this case, assume that Phase_a[k] is expressed by the following formula. Note that k is taken to be an integer from 0 to Na−1.

$$\text{Phase\_a}[k] = \frac{k\pi}{Na} \qquad (61)$$

However, assume that the units of Formula (61) are radians. Additionally, Phase_a[0], Phase_a[1], Phase_a[2], Phase_a[3], . . . , Phase_a[Na−2], and Phase_a[Na−1] are used such that the period of the phase change value Yp(i) becomes Na. To achieve the period Na, the values may be arranged as Phase_a[0], Phase_a[1], Phase_a[2], Phase_a[3], . . . , Phase_a[Na−2], Phase_a[Na−1] or the like. Note that to achieve the period Na, for example, assume that the following holds.

$$Yp(i=u+v \times Na) = Yp(i=u+(v+1) \times Na) \qquad (62)$$

Note that u is an integer from 0 to Na−1, and v is an integer equal to 0 or greater. Additionally, Formula (62) holds for all u, v satisfying these conditions.

Note that the weight combining process and the phase change process may be executed individually in the weight combiner 303 and the phase changers 305A, 305B as in FIGS. 26, 40, 43, 44, and the like, or the process in the weight combiner 303 and the process in the phase changers 305A, 305B may be performed by a second signal processor 6300 as in FIG. 63. Note that in FIG. 63, parts which operate similarly to FIGS. 26, 40, 43, and 44 are denoted with the same numbers.

For example, in Formula (42), provided that Fp is the matrix for weight combining, and Pp is the matrix related to phase change, the matrix Wp(=Pp×Fp) is prepared in advance. Additionally, the second signal processor 6300 in FIG. 63 may use the matrix Wp, the signal 301A (sp1(t)), and the signal 301B (sp2(t)) to generate signals 306A and 306B.

Additionally, the phase changers 309A, 309B, 3801A, and 3801B in FIGS. 26, 40, 43, and 44 may or may not execute signal processing for phase change.

Also, Na and Nb may have the same value or different values.

As above, by setting the phase change value yp(i) and the phase change value Yp(i), by the spatial diversity effect, an advantageous effect may be obtained whereby the reception apparatus has a higher probability of being able to obtain favorable reception quality in an environment in which direct waves are dominant or an environment in which multipath or the like exists. Furthermore, by limiting the number of values that the phase change value yp(i) and the phase change value Yp(i) may take as described above, there is a higher probability of being able to reduce the circuit scale of the transmission apparatus and the reception apparatus while also reducing the impact on the data reception quality.

Note that the present embodiment is highly likely to be effective when applied to the methods of phase change described in the other embodiments of this specification. However, it is also possible to carry out an embodiment similarly by applying the present embodiment to other methods of phase change.

Obviously, the present embodiment and Embodiment 16 may also be combined and carried out. In other words, M phase change values may be extracted from Formula (57). Also, Mb phase change values may be extracted from Formula (59), and Ma phase change values may be extracted from Formula (61).

Embodiment 18

In the present embodiment, a method of phase change when the weight combiner 303 and the phase changer 305B exist, like in FIGS. 3, 4, 41, 45, 47, and the like, will be described.

For example, as described in the other embodiments, assume that the phase change value in the phase changer 305B is given as yp(i). Note that i is taken to be the symbol number. For example, i is an integer equal to 0 or greater.

For example, assume that the phase change value yp(i) has N periods. Note that N is taken to be an integer equal to 2 or greater. Additionally, Phase[0], Phase[1], Phase[2], Phase[3], . . . , Phase[N−2], Phase[N−1] are prepared as the N values. In other words, the result is Phase[k], where k is taken to be an integer from 0 to N−1. Additionally, Phase[k] is taken to be a real number from 0 radians to $2\pi$ radians. Also, u is taken to be an integer from 0 to N−1, v is taken to be an integer from 0 to N−1, and assume that u≠v. Additionally, assume that Phase[u]≠Phase[v] holds for all u, v satisfying these conditions. In this case, assume that Phase[k] is expressed by the following formula. Note that k is taken to be an integer from 0 to N−1.

$$\text{Phase}[k] = \frac{k \times 2 \times \pi}{N} \quad (63)$$

However, assume that the units of Formula (63) are radians. Additionally, Phase[0], Phase[1], Phase[2], Phase [3], . . . , Phase[N−2], and Phase[N−1] are used such that the period of the phase change value yp(i) becomes N. To achieve the period N, the values may be arranged as Phase [0], Phase[1], Phase[2], Phase[3], . . . , Phase[N−2], Phase [N−1] or the like. Note that to achieve the period N, for example, assume that the following holds.

$$yp(i=u+v\times N)=yp(i=u+(v+1)\times N) \quad (64)$$

Note that u is an integer from 0 to N−1, and v is an integer equal to 0 or greater. Additionally, Formula (64) holds for all u, v satisfying these conditions.

Note that the weight combining process and the phase change process may be executed individually in the weight combiner 303 and the phase changer 305B as in FIG. 3 and the like, or the process in the weight combiner 303 and the process in the phase changer 305B may be performed by a first signal processor 6200 as in FIG. 62. Note that in FIG. 62, parts which operate similarly to FIG. 3 are denoted with the same numbers.

For example, in Formula (3), provided that Fp is the matrix for weight combining, and Pp is a matrix related to phase change, a matrix Wp(=Pp×Fp) is prepared in advance. Additionally, the first signal processor 6200 in FIG. 62 may use the matrix Wp, a signal 301A (sp1(t)), and a signal 301B (sp2(t)) to generate signals 304A and 306B.

Additionally, the phase changers 309A, 309B, 3801A, and 3801B in FIGS. 3, 4, 41, 45, and 47 may or may not execute signal processing for phase change.

As above, by setting the phase change value yp(i), in the complex plane, values that the phase change value yp(i) may take are made to exist uniformly from the perspective of phase, and a spatial diversity effect is obtained. With this arrangement, an advantageous effect may be obtained whereby the reception apparatus has a higher probability of being able to obtain favorable reception quality in an environment in which direct waves are dominant or an environment in which multipath or the like exists.

Next, a method of phase change when the weight combiner 303, the phase changer 305A, and the phase changer 305B exist, like in FIGS. 26, 40, 43, 44, and the like, will be described.

As described in the other embodiments, assume that the phase change value in the phase changer 305B is given as yp(i). Note that i is taken to be the symbol number. For example, i is an integer equal to 0 or greater.

For example, assume that the phase change value yp(i) has Nb periods. Note that Nb is taken to be an integer equal to 2 or greater. Additionally, Phase_b[0], Phase_b[1], Phase_b[2], Phase_b[3], . . . , Phase_b[Nb−2], Phase_b[Nb−1] are prepared as the Nb values. In other words, the result is Phase_b[k], where k is taken to be an integer from 0 to Nb−1. Additionally, Phase_b[k] is taken to be a real number from 0 radians to $2\pi$ radians. Also, u is taken to be an integer from 0 to Nb−1, v is taken to be an integer from 0 to Nb−1, and assume that u≠v. Additionally, assume that Phase_b[u]≠Phase_b[v] holds for all u, v satisfying these conditions. In this case, assume that Phase_b[k] is expressed by the following formula. Note that k is taken to be an integer from 0 to Nb−1.

$$\text{Phase\_b}[k] = \frac{k \times 2 \times \pi}{Nb} \quad (65)$$

However, assume that the units of Formula (65) are radians. Additionally, Phase_b[0], Phase_b[1], Phase_b[2], Phase_b[3], . . . , Phase_b[Nb−2], and Phase_b[Nb−1] are used such that the period of the phase change value yp(i) becomes Nb. To achieve the period Nb, the values may be arranged as Phase_b[0], Phase_b[1], Phase_b[2], Phase_b [3], . . . , Phase_b[Nb−2], Phase_b[Nb−1] or the like. Note that to achieve the period Nb, for example, assume that the following holds.

$$yp(i=u+v\times Nb)=yp(i=u+(v+1)\times Nb) \quad (66)$$

Note that u is an integer from 0 to Nb−1, and v is an integer equal to 0 or greater. Additionally, Formula (66) holds for all u, v satisfying these conditions.

As described in the other embodiments, assume that the phase change value in the phase changer 305A is given as Yp(i). Note that i is taken to be the symbol number. For example, i is an integer equal to 0 or greater. For example, assume that the phase change value Yp(i) has Na periods. Note that Na is taken to be an integer equal to 2 or greater. Additionally, Phase_a[0], Phase_a[1], Phase_a[2], Phase_a [3], . . . , Phase_a[Na−2], Phase_a[Na−1] are prepared as the Na values. In other words, the result is Phase_a[k], where k is taken to be an integer from 0 to Na−1. Additionally, Phase_a[k] is taken to be a real number from 0 radians to $2\pi$ radians. Also, u is taken to be an integer from 0 to Na−1, v is taken to be an integer from 0 to Na−1, and assume that u≠v. Additionally, assume that Phase_a[u]≠Phase_a[v] holds for all u, v satisfying these conditions. In this case, assume that Phase_a[k] is expressed by the following formula. Note that k is taken to be an integer from 0 to Na−1.

$$\text{Phase\_a}[k] = \frac{k \times 2 \times \pi}{Na} \quad (67)$$

However, assume that the units of Formula (67) are radians. Additionally, Phase_a[0], Phase_a[1], Phase_a[2], Phase_a[3], . . . , Phase_a[Na−2], and Phase_a[Na−1] are used such that the period of the phase change value w(i) becomes Na. To achieve the period Na, the values may be arranged as Phase_a[0], Phase_a[1], Phase_a[2], Phase_a [3], . . . , Phase_a[Na−2], Phase_a[Na−1] or the like. Note that to achieve the period Na, for example, assume that the following holds.

$$Yp(i=u+v\times Na)=Yp(i=u+(v+1)\times Na) \quad (68)$$

Note that u is an integer from 0 to Na−1, and v is an integer equal to 0 or greater. Additionally, Formula (68) holds for all u, v satisfying these conditions.

Note that the weight combining process and the phase change process may be executed individually in the weight combiner 303 and the phase changers 305A, 305B as in FIGS. 26, 40, 43, 44, and the like, or the process in the weight combiner 303 and the process in the phase changers 305A, 305B may be performed by a second signal processor 6300 as in FIG. 63. Note that in FIG. 63, parts which operate similarly to FIGS. 26, 40, 43, and 44 are denoted with the same numbers.

For example, in Formula (42), provided that Fp is the matrix for weight combining, and Pp is the matrix related to phase change, the matrix Wp(=Pp×Fp) is prepared in advance. Additionally, the second signal processor 6300 in FIG. 63 may use the matrix Wp, the signal 301A (sp1(t)), and the signal 301B (sp2(t)) to generate signals 306A and 306B.

Additionally, the phase changers 309A, 309B, 3801A, and 3801B in FIGS. 26, 40, 43, and 44 may or may not execute signal processing for phase change.

Also, Na and Nb may have the same value or different values.

As above, by setting the phase change value yp(i) and the phase change value Yp(i), in the complex plane, values that the phase change value yp(i) and the phase change value Yp(i) may take are made to exist uniformly from the perspective of phase, and a spatial diversity effect is obtained. With this arrangement, an advantageous effect may be obtained whereby the reception apparatus has a higher probability of being able to obtain favorable reception quality in an environment in which direct waves are dominant or an environment in which multipath or the like exists.

Note that the present embodiment is highly likely to be effective when applied to the methods of phase change described in the other embodiments of this specification. However, it is also possible to carry out an embodiment similarly by applying the present embodiment to other methods of phase change.

Obviously, the present embodiment and Embodiment 16 may also be combined and carried out. In other words, M phase change values may be extracted from Formula (63). Also, Mb phase change values may be extracted from Formula (65), and Ma phase change values may be extracted from Formula (67).

(Supplement 6)

Regarding the modulation scheme, even if a modulation scheme other than the modulation schemes described in this specification is used, it is possible to carry out the embodiments and other content described in this specification. For example, non-uniform (NU)-QAM, π/2 shift BPSK, π/4 shift QPSK, a PSK scheme shifted by a phase of certain value, and the like may also be used.

Additionally, the phase changers 309A and 309B may also be cyclic delay diversity (CDD) or cyclic shift diversity (CSD).

In this specification, for example, in FIGS. 3, 4, 26, 33, 38, 39, 40, 41, 42, 43, 44, 45, 46, 47, 48, 58, 59, and the like, the mapped signal sp1(t) and the mapped signal sp2(t) are described as transmitting mutually different data, but are not limited thereto. In other words, the mapped signal sp1(t) and the mapped signal sp2(t) may also transmit identical data. For example, when the symbol number i=a (where a is an integer equal to 0 or greater, for example), the mapped signal sp1(i=a) and the mapped signal sp2(i=a) may transmit identical data.

Note that the method by which the mapped signal sp1(i=a) and the mapped signal sp2(i=a) transmit identical data is not limited to the above technique. For example, the mapped signal sp1(i=a) and the mapped signal sp2(i=b) may also transmit identical data (where b is an integer equal to 0 or greater, and a≠b). Furthermore, multiple symbols of sp1(i) may be used to transmit a first data sequence, while multiple symbols of sp2(i) may be used to transmit a second data sequence.

Embodiment 19

In this specification, in the "user #p signal processor" 102_$p$ provided in the base station of FIG. 1, FIG. 52, or the like, multiple precoding matrices switchable by a weight combiner (for example, 303) in FIGS. 3, 4, 26, 38, 39, 40, 41, 42, 43, 44, 45, 46, 47, 48, 58, 59, and the like are provided, or in other words, multiple codebooks are provided. The base station may be configured to select, on the basis of feedback information transmitted by the user #p, that is, the terminal #p, a precoding matrix for generating modulated signal to transmit to the user #p from among the switchable precoding matrices, or in other words, from among the switchable codebooks, and the "user #p signal processor" 102_$p$ may be configured to execute the computational operations of the precoding matrix. Note that the selection of the precoding matrix, that is, the codebook in the base station may be decided by the base station. Hereinafter, this point will be described.

Figure 64:
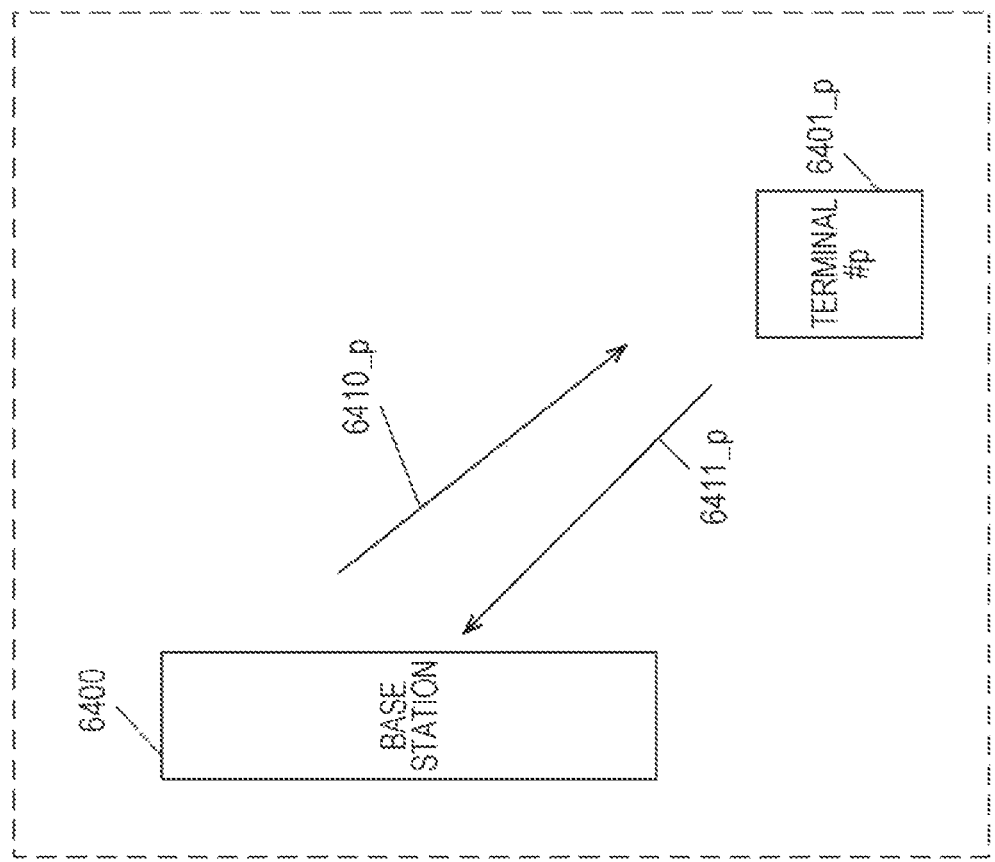
FIG. 64 is a diagram illustrating an example of the relationship between a base station (AP) and a terminal.

FIG. 64 illustrates the relationship between the base station and the user #p, that is, the terminal #p. A base station 6400 transmits a modulated signal (namely, 6410_$p$), and the terminal #p 6401_$p$ receives the modulated signal transmitted by the base station.

For example, assume that the modulated signal transmitted by the base station 6400 includes reference symbols, a reference signal, a preamble, or the like for estimating the channel state, such as the reception electric field strength.

The terminal #p 6401_$p$ estimates the channel state from the reference symbols, reference signal, preamble, or the like transmitted by the base station. Subsequently, the terminal #p 6401_$p$ transmits a modulated signal including information about the channel state to the base station (6411_$p$). Also, from the channel state, the terminal #p 6401_$p$ may transmit an indicator of a precoding matrix for generating a modulated signal that the base station transmits to the terminal #p.

On the basis of this feedback information obtained from the terminal, the base station 6400 selects a precoding matrix, that is, a codebook, to use for generating a modulated signal to transmit to the terminal #p. A specific example of operation is described below.

Assume that the weight combiner of the base station is capable of the computations of "matrix A, matrix B, matrix C, matrix D" as precoding matrices, that is, codebooks, which may be used to generate a modulated signal to transmit to the user #p, that is, the terminal #p. Additionally, in order to generate a modulated signal for transmitting to the user #p, that is, the terminal #p, as the weight combining, in the case of deciding to use "matrix A", the base station executes weight combining, that is, precoding, using "matrix A" in the weight combiner (for example, 303) in FIGS. 3, 4, 26, 38, 39, 40, 41, 42, 43, 44, 45, 46, 47, 48, 58, 59, or the like provided in the base station, and the base station generates a modulated signal for the user #p, that is, the terminal #p. Subsequently, the base station transmits the generated modulated signal.

Similarly, in order to generate a modulated signal for transmitting to the user #p, that is, the terminal #p, as the weight combining, in the case of deciding to use "matrix B", the base station executes weight combining, that is, precoding, using "matrix B" in the weight combiner (for example, 303) in FIGS. 3, 4, 26, 38, 39, 40, 41, 42, 43, 44, 45, 46, 47, 48, 58, 59, or the like provided in the base station, and the base station generates a modulated signal for the user #p, that is, the terminal #p. Subsequently, the base station transmits the generated modulated signal.

In order to generate a modulated signal for transmitting to the user #p, that is, the terminal #p, as the weight combining, in the case of deciding to use "matrix C", the base station executes weight combining, that is, precoding, using "matrix C" in the weight combiner (for example, 303) in FIGS. 3, 4, 26, 38, 39, 40, 41, 42, 43, 44, 45, 46, 47, 48, 58, 59, or the like provided in the base station, and the base station generates a modulated signal for the user #p, that is, the terminal #p. Subsequently, the base station transmits the generated modulated signal.

In order to generate a modulated signal for transmitting to the user #p, that is, the terminal #p, as the weight combining, in the case of deciding to use "matrix D", the base station executes weight combining, that is, precoding, using "matrix D" in the weight combiner (for example, 303) in FIGS. 3, 4, 26, 38, 39, 40, 41, 42, 43, 44, 45, 46, 47, 48, 58, 59, or the like provided in the base station, and the base station generates a modulated signal for the user #p, that is, the terminal #p. Subsequently, the base station transmits the generated modulated signal.

Note that in the example described above, an example in which four types of precoding matrices, that is, codebooks, which may be used by the base station to generate a modulated signal are provided is described, but the number of provided matrices is not limited to 4, and it is possible to carry out the embodiment similarly insofar as multiple matrices are provided. Also, the phase change described in this specification may or may not be performed after the weight combining. At this time, whether to perform or not perform phase change may be switched according to a control signal or the like.

Similarly, even in the multiplexing signal processor 104 of FIG. 1, multiple matrices (which may also be called codebooks) for generating an output signal (modulated signal) may be prepared, and on the basis of feedback information from the terminal, the base station may select a matrix to use in the multiplexing signal processor 104 of FIG. 1, and use the selected matrix to generate an output signal. Note that the selection of the matrix to use may be decided by the base station. Hereinafter, this point will be described. Note that since the exchange between the base station and the terminal has been described above using FIG. 64, a description is omitted here.

Assume that the multiplexing signal processor 104 of the base station is capable of the computations of "matrix α, matrix β, matrix γ, matrix δ" as precoding matrices, that is, codebooks, which may be used to generate a modulated signal to transmit to the terminal. Additionally, in the case in which the base station decides to use "matrix α" as the process of the multiplexing signal processor, in the multiplexing signal processor in FIG. 1 or the like provided in the base station, multiplexing signal processing is performed using "matrix α", a modulated signal is generated, and the base station transmits the generated modulated signal.

Similarly, in the case in which the base station decides to use "matrix β" as the process of the multiplexing signal processor, in the multiplexing signal processor in FIG. 1 or the like provided in the base station, multiplexing signal processing is performed using "matrix β", a modulated signal is generated, and the base station transmits the generated modulated signal.

In the case in which the base station decides to use "matrix γ" as the process of the multiplexing signal processor, in the multiplexing signal processor in FIG. 1 or the like provided in the base station, multiplexing signal processing is performed using "matrix γ", a modulated signal is generated, and the base station transmits the generated modulated signal.

In the case in which the base station decides to use "matrix δ" as the process of the multiplexing signal processor, in the multiplexing signal processor in FIG. 1 or the like provided in the base station, multiplexing signal processing is performed using "matrix δ", a modulated signal is generated, and the base station transmits the generated modulated signal.

Note that in the example described above, an example in which four types of matrices, that is, codebooks, which may be used by the base station to generate a modulated signal are provided is described, but the number of provided matrices is not limited to 4, and it is possible to carry out the embodiment similarly insofar as multiple matrices are provided.

Assume that the multiplexing signal processor 7000$p$ of FIG. 52 in the base station is capable of the computations of "matrix P, matrix Q, matrix R, matrix S" as precoding matrices, that is, codebooks, which may be used to generate a modulated signal to transmit to the user #p, that is, the terminal #p. Note that p is taken to be an integer from 1 to M. Subsequently, in order to generate a modulation scheme for transmitting to the user #p, that is, the terminal #p, as the multiplexing signal processing, in the case of deciding to use "matrix P", the base station executes multiplexing signal processing using "matrix P" in the multiplexing signal processor 7000$p$ of FIG. 52 provided in the base station, and the base station generates a modulated signal for the user #p, that is, the terminal #p. Subsequently, the base station transmits the generated modulated signal.

Similarly, in order to generate a modulation scheme for transmitting to the user #p, that is, the terminal #p, as the multiplexing signal processing, in the case of deciding to use "matrix Q", the base station executes multiplexing signal processing using "matrix Q" in the multiplexing signal processor 7000$p$ of FIG. 52 provided in the base station, and the base station generates a modulated signal for the user #p, that is, the terminal #p. Subsequently, the base station transmits the generated modulated signal.

In order to generate a modulation scheme for transmitting to the user #p, that is, the terminal #p, as the multiplexing signal processing, in the case of deciding to use "matrix R", the base station executes multiplexing signal processing using "matrix R" in the multiplexing signal processor 7000$p$ of FIG. 52 provided in the base station, and the base station generates a modulated signal for the user #p, that is, the terminal #p. Subsequently, the base station transmits the generated modulated signal.

In order to generate a modulation scheme for transmitting to the user #p, that is, the terminal #p, as the multiplexing signal processing, in the case of deciding to use "matrix S", the base station executes multiplexing signal processing using "matrix S" in the multiplexing signal processor 7000$p$ of FIG. 52 provided in the base station, and the base station generates a modulated signal for the user #p, that is, the terminal #p. Subsequently, the base station transmits the generated modulated signal.

Note that in the example described above, an example in which four types of precoding matrices, that is, codebooks, which may be used by the base station to generate a modulated signal are provided is described, but the number of provided matrices is not limited to 4, and it is possible to carry out the embodiment similarly insofar as multiple matrices are provided.

As above, even if each section operates as described in the present embodiment, the advantageous effects described in this specification may be obtained similarly. Therefore, it is also possible to carry out the present embodiment in combination with the other embodiments described in this specification, and the advantageous effects described in each embodiment may be obtained similarly.

Embodiment 20

In the description from Embodiment 1 to Embodiment 19, the case of the configuration in FIG. 1, FIG. 52, and the like is described as the configuration of the base station or AP. In other words, the case in which the base station is capable of transmitting modulated signals to multiple users, that is, multiple terminals, at the same time is described. In the present embodiment, an example will be described for a case in which the configuration of the base station or AP is a configuration like that of FIG. 65.

FIG. 65 illustrates a configuration of the base station or AP in the present embodiment.

An error-correcting coder 6502 accepts data 6501 and a control signal 6500 as input, and on the basis of information related to error-correcting coding included in the control signal 6500, such as information about the error-correcting coding scheme and the code rate, for example, the error-correcting coder 6502 executes error-correcting coding, and outputs error-correcting coded data 6503.

A mapper 6504 accepts the control signal 6500 and the error-correcting coded data 6503 as input, and on the basis of information about the modulation scheme included in the control signal 6500, executes mapping to output a stream #1 baseband signal 6505_1 and a stream #2 baseband signal 6505_2.

A signal processor 6506 accepts the control signal 6500, the stream #1 baseband signal 6505_1, and the stream #2 baseband signal 65052 as input, performs signal processing on the stream #1 baseband signal 6505_1 and the stream #2 baseband signal 65052 on the basis of information related to the transmission method included in the control signal 6500, and generates and outputs a first modulated signal 6506_A and a second modulated signal 6506_B.

A radio section 6507_A accepts the first modulated signal 6506_A and the control signal 6500 as input, performs processing such as frequency conversion on the first modulated signal 6506_A, and outputs a first transmission signal 6508_A. The first transmission signal 6508_A is output from an antenna section #A 6509_A as a radio wave.

Similarly, a radio section 6507_B accepts the second modulated signal 6506_B and the control signal 6500 as input, performs processing such as frequency conversion on the second modulated signal 6506_B, and outputs a second transmission signal 6508_B. The second transmission signal 6508_B is output from an antenna section #B 6509_B as a radio wave.

Note that the first transmission signal 6508_A and the second transmission signal 6508_B are signals with identical times and identical frequencies (bands).

The signal processor 6506 in FIG. 65 is provided with the configuration of any of FIGS. 3, 4, 26, 38, 39, 40, 41, 42, 43, 44, 45, 46, 47, 48, 58, and 59, for example. At this time, the signal corresponding to the signal of 6505_1 in FIG. 65 becomes 301A, the signal corresponding to the signal of 6505_2 becomes 301B, and the signal corresponding to the signal of 6500 becomes 300. Additionally, in FIGS. 3, 4, 26, 38, 39, 40, 41, 42, 43, 44, 45, 46, 47, 48, 58, and 59, dual output signals exist, and these dual output signals correspond to the signals 6506_A and 6506_B in FIG. 65.

Note that the signal processor 6506 in FIG. 65 is provided with a single configuration of any of FIGS. 3, 4, 26, 38, 39, 40, 41, 42, 43, 44, 45, 46, 47, 48, 58, and 59, for example. In other words, the configuration may be considered to be a transmission apparatus supporting single-user multiple-input multiple-output (MIMO).

Consequently, in the case of carrying out each embodiment from Embodiment 1 to Embodiment 19, the base station transmits modulated signals to multiple terminals in a certain time band and a certain frequency band, as illustrated in FIG. 24, but the base station provided with the transmission apparatus of FIG. 65 transmits, in a certain time band and a certain frequency band, modulated signals to a single terminal. Consequently, in each embodiment from Embodiment 1 to Embodiment 19, the base station provided with the transmission apparatus of FIG. 65 executes an exchange with terminal #p=1, and carries out each embodiment from Embodiment 1 to Embodiment 19. Even with this arrangement, each embodiment from Embodiment 1 to Embodiment 19 may be carried out, and the advantageous effects described in each embodiment may be obtained similarly.

Note that the base station provided with the transmission apparatus of FIG. 65 is capable of exchanging data with multiple terminals by utilizing time-division multiple access (TDMA), frequency-division multiple access (FDMA), and/or code-division multiple access (CDMA).

Obviously, the embodiments described in this specification and other content may also be combined plurally.

Also, each embodiment is merely exemplary, and for example, even if examples of "modulation schemes, error-correcting coding schemes (such as the error-correcting codes, code lengths, and code rates to use), control information, and the like" are given, it is still possible to carry out a similar configuration even in the case of applying different "modulation schemes, error-correcting coding schemes (such as the error-correcting codes, code lengths, and code rates to use), control information, and the like".

Regarding the modulation scheme, even if a modulation scheme other than the modulation schemes described in this specification is used, it is possible to carry out the embodiments and other content described in this specification. For example, amplitude phase-shift keying (APSK) (such as 16APSK, 64APSK, 128APSK, 256APSK, 1024APSK, and 4096APSK, for example), pulse-amplitude modulation (PAM) (such as 4PAM, 8PAM, 16PAM, 64PAM, 128PAM, 256PAM, 1024PAM, and 4096PAM, for example), phase-shift keying (such as BPSK, QPSK, 8PSK, 16PSK, 64PSK, 128PSK, 256PSK, 1024PSK, and 4096PSK, for example), quadrature amplitude modulation (QAM) (such as 4QAM, 8QAM, 16QAM, 64QAM, 128QAM, 256QAM, 1024QAM, and 4096QAM, for example), and the like may be applied, and in each modulation scheme, uniform mapping or non-uniform mapping may be used. Also, a method of arranging 2, 4, 8, 16, 64, 128, 256, 1024 signal points or the like in the I-Q plane (a modulation scheme having 2, 4, 8, 16, 64, 128, 256, 1024 signal points or the like) is not limited to the signal point arrangement methods of the modulation schemes illustrated in this specification.

In this specification, it is conceivable to provide the transmission apparatus in communication/broadcasting equipment such as a broadcasting station, a base station, an access point, a terminal, or a mobile phone, for example.

Meanwhile, it is conceivable to provide the reception apparatus in communication equipment such as a television, a radio, a terminal, a personal computer, a mobile phone, an access point, or a base station. It is also conceivable for the transmission apparatus and the reception apparatus in the present disclosure to be a piece of equipment including a communication function, in which the equipment is able to connect, over some kind of interface, to an apparatus for executing an application, such as a television, a radio, a personal computer, or a mobile phone. Also, in the present embodiment, symbols other than data symbols, such as pilot symbols (a preamble, unique word, postamble, reference symbols, or the like), control information symbols, and the like, for example, may also be arranged in a frame in any way. Additionally, although designated as pilot symbols and control information symbols herein, such symbols may be given any kind of designation, as the function itself is what is important.

For example, in a transmitter/receiver, it is sufficient for the pilot symbols to be known symbols modulated using PSK modulation (or symbols transmitted by a transmitter that the receiver is able to know by synchronizing with the transmitter). The receiver uses these symbols to execute frequency synchronization, time synchronization, the estimation (for each modulated signal) of channel state information (CSI), signal detection, and the like.

Also, the control information symbols are symbols for transmitting information that needs to be transmitted to the other party (such as the modulation scheme, error-correcting coding scheme, and the code rate of the error-correcting coding scheme used for communication, and higher-layer settings information, for example) in order to achieve the communication of information other than data (of an application or the like).

Note that the present disclosure is not limited to the embodiments, and that various modifications are possible. For example, in each embodiment, the case of carrying out the present disclosure as a communication apparatus is described, but the configuration is not limited thereto, and it is also possible to execute the communication method as software.

Note that, for example, a program that executes the above communication method may be stored in read-only memory (ROM) in advance, and the program may be run by a central processing unit (CPU).

In addition, a program that executes the above communication method may be stored on a computer-readable storage medium, the program stored on the storage medium may be loaded into the random access memory (RAM) of a computer, and the computer may be made to operate by following the program.

Additionally, each component of each of the above embodiments typically may be realized an integrated circuit, that is, a large-scale integration (LSI) chip. These components may be realized individually as separate chips, or alternatively, all or some of the configuration of each embodiment may be included on a single chip. Although LSI is discussed herein, the circuit integration methodology may also be referred to as integrated circuit (IC), system LSI, super LSI, or ultra LSI, depending on the degree of integration. Furthermore, the circuit integration methodology is not limited to LSI, and may be also be realized with special-purpose circuits or general-purpose processors. A field-programmable gate array (FPGA) capable of being programmed after LSI fabrication, or a reconfigurable processor whose internal LSI circuit cell connections and settings may be reconfigured, may also be used. Furthermore, if circuit integration technology that may be substituted for LSI appears as a result of progress in semiconductor technology or another derived technology, obviously the new technology may be used to integrate the function blocks. Biotechnology applications and the like are also a possibility.

In this specification, a variety of frame configurations are described. A modulated signal with a frame configuration described in this specification is assumed to be transmitted using a multi-carrier scheme such as OFDM by, for example, a base station (AP) provided with the transmission apparatus of FIG. 1. At this time, when a terminal (user) which is communicating with the base station (AP) transmits a modulated signal, the modulated signal transmitted by the terminal may be considered to be the application method referred to as the single-carrier scheme (the base station (AP), is able to transmit a data symbol group to multiple terminals at the same time by using OFDM, while in addition, the terminals become able to reduce power consumption by using the single-carrier scheme).

Additionally, a time-division duplex (TDD) scheme whereby a terminal transmits a modulated signal using a portion of the frequency band used by the modulated signal transmitted by the base station (AP) may also be applied.

The present disclosure is useful in a communication apparatus such as a base station.

The invention claimed is:

1. An integrated circuit for a base station apparatus, the integrated circuit comprising:
at least one input which, in operation, receives an input; and
circuitry coupled to the at least one input, the circuitry, in operation, controls:
receiving capability information indicative of capabilities of a terminal apparatus, the capability information including at least one main capability field and a plurality of dependent capability fields, each associated with one of the at least one main capability field, wherein the at least one main capability field includes a multi-stream capability field for indicating whether multi-stream is supported or not, and the plurality of dependent capability fields include a precoding field for indicating a precoding method that is supported by the terminal apparatus;
generating a transmission stream based on the at least one main capability field and the plurality of dependent capability fields in the received capability information;
performing spatial multiplexing on transmission streams and generating N multiplexed signal streams (N is an integer equal to 2 or greater); and
transmitting the N multiplexed signal streams, based on the multi-stream capability field in the received capability information.

2. The integrated circuit according to claim 1, wherein the at least one main capability field includes an OFDM (Orthogonal Frequency Division Multiplexing) capability field for indicating whether an OFDM scheme is supported or not; and
when the OFDM capability field indicates that an OFDM scheme is supported for the terminal apparatus, one or more OFDM symbols are generated by applying OFDM processing on a symbol sequence.

3. The integrated circuit according to claim 1, wherein the plurality of dependent capability fields include a Phase Hopping capability field for indicating whether Phase Hopping is supported or not; and when the Phase Hopping capability field indicates that Phase Hopping is supported for the terminal apparatus, Phase Hopping is performed to generate the transmission stream.

4. The integrated circuit according to claim 1, wherein the plurality of dependent capability fields include a Modulation Coding Scheme (MCS) capability field for indicating an MCS that is supported by the terminal apparatus; and one or more transmission streams are generated for each of M terminal apparatuses using the MCS indicated by the MCS capability field.

5. The integrated circuit according to claim 1, wherein the generating of the transmission stream includes:

performing error correction coding on a data signal for the terminal apparatus to generate a coded data signal;

modulating the coded data signal to generate a symbol sequence; and performing signal processing on the symbol sequence and generating the transmission stream.

6. The integrated circuit according to claim 1, wherein when the multi-stream capability field indicates that multi-stream is supported for the terminal apparatus, two or more transmission streams are generated, and when the multi-stream capability field indicates that multi-stream is not supported for the terminal apparatus, one transmission stream is generated.

7. The integrated circuit according to claim 1, wherein when the precoding field indicates the precoding method, two or more transmission streams are generated by using the indicated precoding method.

\* \* \* \* \*